United States Patent [19]
Bohannon et al.

[11] Patent Number: 6,134,324
[45] Date of Patent: Oct. 17, 2000

[54] METHOD AND SYSTEM FOR DISTRIBUTING A PLURALITY OF SOFTWARE PRODUCTS, AND LIMITING ACCESS THERETO

[75] Inventors: James Bohannon; Eric Chang, both of San Jose, Calif.

[73] Assignee: LSI Logic Corporation, Milpitas, Calif.

[21] Appl. No.: 08/865,307

[22] Filed: May 29, 1997

Related U.S. Application Data

[63] Continuation of application No. 08/511,000, Aug. 3, 1995, abandoned, which is a continuation of application No. 08/241,937, May 12, 1994, abandoned, which is a continuation of application No. 07/739,206, Jul. 31, 1991, abandoned.

[51] Int. Cl.[7] .................................................. H04L 9/00
[52] U.S. Cl. ........................................................ 380/4
[58] Field of Search ............................................ 380/4, 5

[56] References Cited

U.S. PATENT DOCUMENTS

| | | | |
|---|---|---|---|
| 4,528,643 | 7/1985 | Freeny, Jr. ........................... | 364/900 |
| 4,677,604 | 6/1987 | Selby, III et al. ..................... | 369/33 |
| 4,905,163 | 2/1990 | Garber et al. ........................ | 364/513 |
| 4,985,615 | 1/1991 | Iijima ................................... | 235/492 |
| 5,010,571 | 4/1991 | Katznelson .......................... | 380/4 |
| 5,058,162 | 10/1991 | Santon et al. ........................ | 380/25 |
| 5,065,429 | 11/1991 | Lang .................................... | 380/25 |
| 5,191,611 | 3/1993 | Lang .................................... | 380/25 |
| 5,204,897 | 4/1993 | Wyman ................................ | 380/4 |
| 5,276,901 | 1/1994 | Howell et al. ........................ | 395/800 |
| 5,291,601 | 3/1994 | Sands ................................... | 395/700 |
| 5,319,705 | 6/1994 | Halter et al. ......................... | 380/4 |
| 5,400,319 | 3/1995 | Fite et al. ............................. | 369/275.5 |
| 5,412,717 | 5/1995 | Fischer ................................. | 380/4 |
| 5,457,746 | 10/1995 | Dolphin ................................ | 380/4 |
| 5,553,139 | 9/1996 | Ross et al. ............................ | 380/4 |
| 5,646,992 | 7/1997 | Subler et al. ......................... | 380/4 |

OTHER PUBLICATIONS

Peter Norton's DOS Guide Revised & Expanded, Peter Norton, Brady Book, New York, NY, 1987, pp. 141–155.
Unix Review, Compact Distribution, Oct. 1990, V8, N10, p. 64(6), Kershner, Ken & Passarielli, Ben.

*Primary Examiner*—Salvatore Cangialosi

[57] ABSTRACT

A technique for mass distributing software products, especially integrated circuit design tools and design libraries, while allowing only a selected portion of the products to be loaded onto and used on a computer. One or more volumes of CD-ROM contains one or more software products, each of which are encrypted with a key code. The CD-ROMs are mass distributed to customers. A separate configuration file, uniquely configured for each customer, contains a list of only the selected portion of software products, and contains the key codes for decrypting only those products. A loader module is provided for controlling the decryption and loading of only the selected portion of products, based on information in the configuration file. Each software product is hierarchically arranged by class, file set and file, and files may be shared between products.

18 Claims, 13 Drawing Sheets

| PRODUCT NAME | CLASS NAMES | FILE SET NAMES | SIZE OF FILE SET | ROOT PATH OF FILE SET | VOLUME NO. WHERE CONTENTS OF FILE SET IS LOCATED |
|---|---|---|---|---|---|
| I | A | FILE SET 1 | 40M | a | 1 |
| | | FILE SET 2 | 20M | b | 1 |
| | B | FILE SET 3 | 65M | b | 2 |
| | | FILE SET 4 | 80M | a | 4 |
| | | FILE SET 5 | 25M | a | 4 |
| II | A | FILE SET 1 | 40M | a | 1 |
| | | FILE SET 2 | 20M | b | 1 |
| | C | FILE SET 6 | 100M | b | 3 |
| | | FILE SET 7 | 50M | b | 3 |
| | | | | | |

FIG. 3

| FILE NAME LIST | FILE DATE LIST | FILE PERMISSION DATA | FILE SIZE LIST | FILE CONTENTS LIST |
|---|---|---|---|---|
| FILE 1 | X·XX | | 18M | |
| FILE 2 | X·XX | | 22M | |
| FILE 3 | X·XX | | | |
| FILE 4 | | | | |
| FILE 5 | | | | |
| FILE 6 | | | | |
| FILE 7 | | | | |
| | | | | |
| | | | | |
| | | | | |

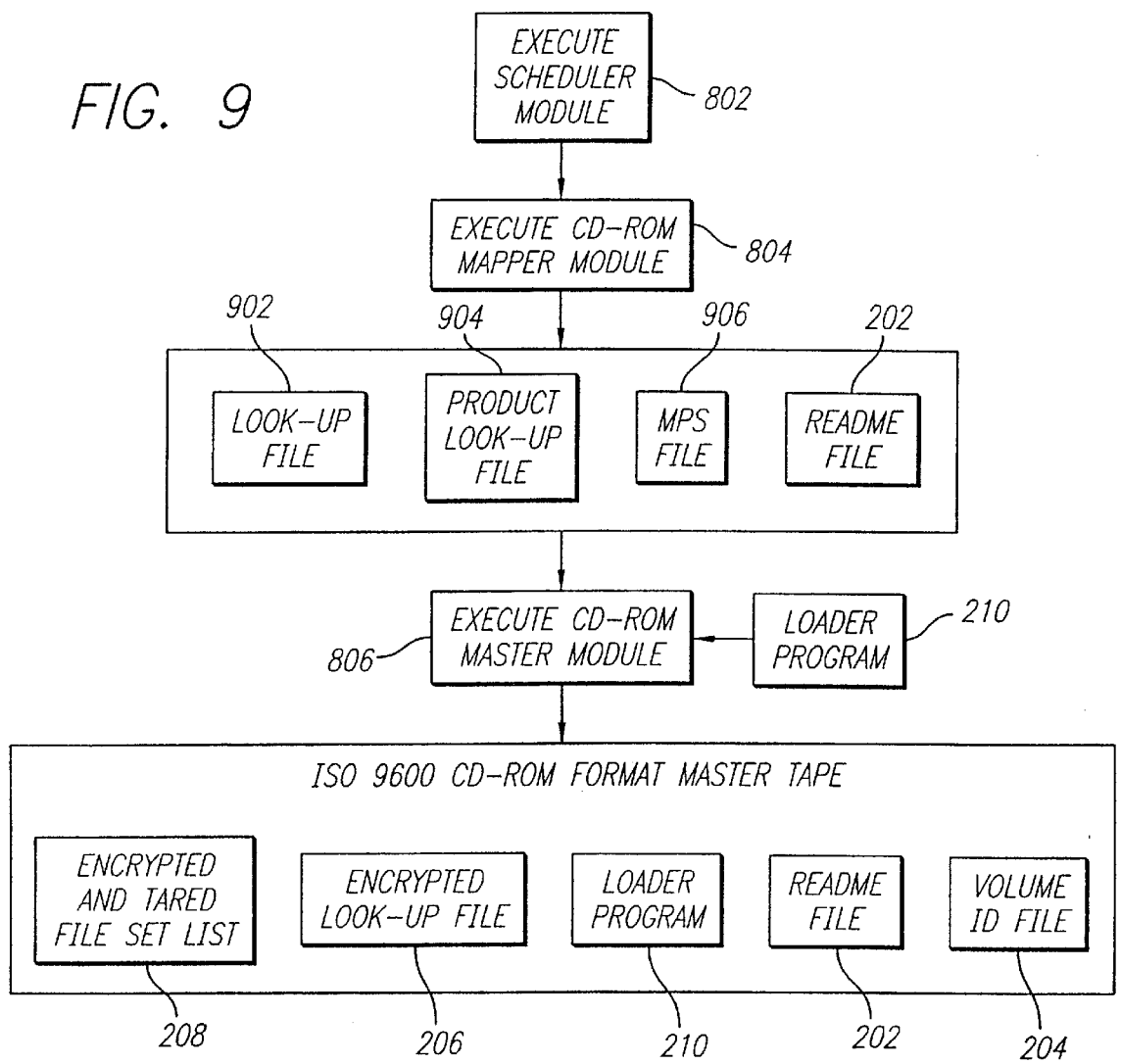
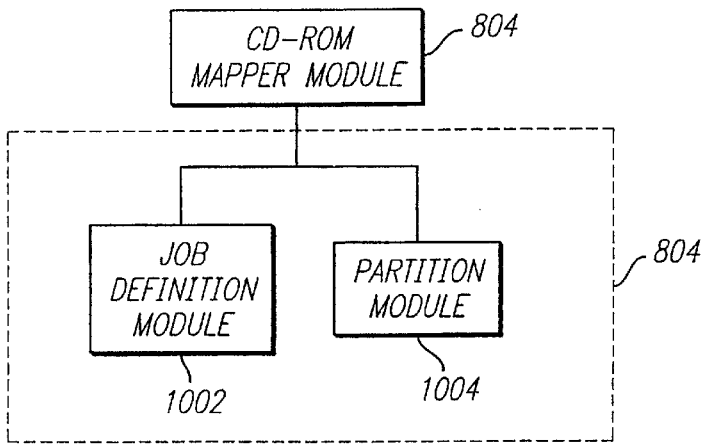

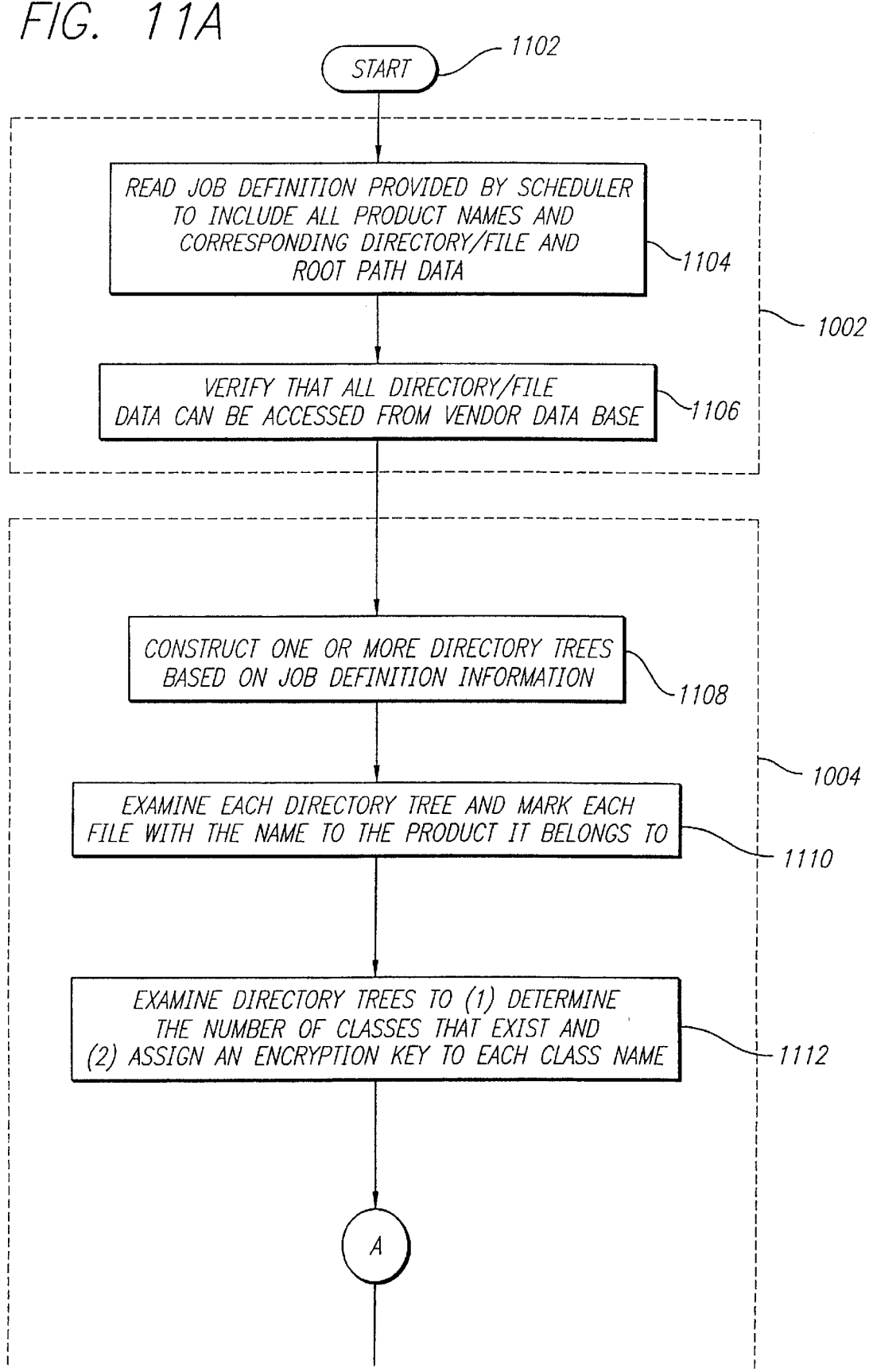

METHOD AND SYSTEM FOR DISTRIBUTING A PLURALITY OF SOFTWARE PRODUCTS, AND LIMITING ACCESS THERETO

This application is a continuation of now abandoned application, Ser. No. 08/511,000, filed Aug. 3, 1995, which is a continuation of abandoned application Ser. No. 08/241,937, filed May 12, 1994 which is a continuation of abandoned application, Ser. No. 07/739,206, filed Jul. 31, 1991.

TECHNICAL FIELD OF THE INVENTION

The present invention relates to techniques for distributing software products on a mass storage media device such as a CD-ROM.

BACKGROUND OF THE INVENTION

Electronic Computer Aided Design (ECAD) systems have become important in the design of electronic circuits, and are virtually indispensable in the design of semiconductor chips. A typical ECAD system comprises a computer workstation loaded with a suite of software-based design tools and software-based design libraries. The designer (user) uses these tools and libraries to create a coded layout of a device, and forwards the code for the design to a manufacturer (vendor) via suitable means, such as magnetic tape or the like. Using the tape, the manufacturer is able to fabricate a physical device based on the information contained on the tape. The manufacturer is typically also the purveyor of the software-based design tools and design libraries, although sometimes a third party becomes involved. Together, the design tools and design libraries are referred to as software "products".

ECAD systems allow the manufacturing tape to be generated in an efficient and highly reliable manner. ECAD systems may be configured with one or more "products" which allow the user to perform a variety of chip design tasks. For example, customer "A" may desire a product that allows him to perform the logic design of a chip. In contrast, customer "B" may desire a product for performing the logic design and a second product which allows it to perform the actual chip layout. On the other hand, customer "C" may desire the two products mentioned above plus an additional product that allows it to do some type of simulation analysis. Moreover, a given product may be dedicated to a specific chip technology. For example, a customer may require a product for 2 micron technology, while another customer may require a product dedicated to 3 micron technology.

A typical vendor of ECAD software may offer a variety of design products to a given customer. The remaining issue is how the vendor distributes the software products desired by the customer in a cost effective manner.

One type of software distribution system employs a tape media (for example, floppy disk or tape diskette) which is sent to the customer. The tape media contains only those products licensed by the customer.

One disadvantage with tape media distribution systems is that because the number of different software products is quite large, each software shipment is typically a separate tape-production job. It is not convenient to inventory pre-written tape media because of the large amount of separate overlapping pieces of software products. Furthermore, tape media generally can only store a small amount of data files (about 36 megabytes) and as such, many volumes of tapes must be used to distribute one or more products.

In contrast to tape storage media devices, a CD-ROM is a mass storage media device which offers several advantages. First, a CD-ROM can hold about 680 megabytes of data. Second, the cost-per-byte is lower for moderate levels of distribution (over 100 copies) than tape media.

Recently, software vendors have begun to distribute software products on CD-ROM. The CD-ROM, however, is formatted according to an ISO-9660 format.

A common operating system for ECAD systems is the UNIX (trademark) operating system. Workstations are typically used to perform chip design type functions and other more labor intensive design operations for which personal computers are not well suited.

However, the distribution of products on CD-ROM for operating systems such as UNIX is difficult because the ISO-9660 format does not provide inherent protection for the contents of the CD-ROM. This becomes a problem (e.g.) when software products having restrictions on distribution are involved. As such, the use of CD-ROMs to distribute a plurality of software products is not practical, if the customer receiving the plurality of products is not licensed for all of the products. Moreover, the ISO-9660 format does not preserve the original UNIX-based file dates and file permissions of the products. In the UNIX environment, it is essential that permission information be preserved. Permission information relates to whether a given file can be written, read or executed.

To overcome some of these disadvantages and to take advantage of software distribution on CD-ROM, some vendors have attempted to control the unauthorized use of products on CD-ROM by performing "run-time authorization checking." One form of this checking is referred to as "network licensing." This preventive measure, however, is not practical for some software products and especially for data files which are intended to be used by external software products which are not configured for run-time authorization checking.

Alternatively, software vendors have attempted to control the unauthorized use of products by sending each product on a separate CD-ROM. This is a more expensive and logistically difficult approach in that each customer must be sent a different set of CD-ROMs. Furthermore, each CD-ROM must be mastered separately, thus incurring the CD-ROM mastering set-up charge for each customer shipment. As such, it is not practical to limit the production of a CD-ROM to only a single software product.

Conventional apparatus and processes for the provision of multiple products on CD-ROM is not easy or cost effective. An improved software distribution apparatus and process is of key importance to the distribution of software products on CD-ROM and/or other mass storage devices.

DISCLOSURE OF THE INVENTION

It is therefore an object of the present invention to provide an improved technique for distributing a plurality of software products to all users of any or all of the products, while limiting usage thereof on a user-by user basis.

According to the invention, a technique is provided that allows a software vendor to distribute multiple software products on one or more mass-produced volumes of a mass storage media device. The present invention allows each customer to load only a specified portion of the products, namely those products which they are licensed (e.g.) to use.

The apparatus of the present invention includes one or more volumes of a storage media device. Every customer receives the same volume set, which contains the entire plurality of software products. The number of volumes of the storage media device is dependant on the number of software products to be distributed by the vendor. In one embodiment, the storage media device is a CD-ROM which can be readily mass produced in a cost effective manner.

According to an aspect of the invention, the storage media devices comprise one or more software products. Each of the software products is encrypted with a unique key code such that the customer can not directly load the software products from the storage media devices onto their computer (CPU).

The apparatus further comprises a separate site configuration file, which is uniquely configured for each customer. The site configuration file is preferably stored on a low cost storage medium, such as a floppy disk, and is also provided to the customer.

The site configuration file includes a list of the software products that the customer is licensed to use. The site configuration file also includes a list of encryption key codes for each of the licensed products. The site configuration file may also include a list of the authorized CPU-IDs. The list of CPU-IDs provides a data base from which to ensure that only licensed computers (e.g., workstations) are being loaded with the licensed software products.

The apparatus further comprises a "loader module". The loader module exercises control over the loading of software products from the volumes of CD-ROM, and is preferably stored on each of the volumes. The loader module is configured to determine whether the host computer is licensed for loading the software products. This is performed by reading the site configuration file to verify that the CPU-ID of the host machine is contained in the CPU-ID list. Once this verification is made, the loader module is then configured to retrieve the encryption keys from the site configuration file. Using these encryption keys, the loader module is configured to decrypt and then load onto the licensed computer only those software products on the storage media devices that the customer is licensed to use.

Another feature of the present invention is that encryption keys for successive releases of a particular software product are re-used such that a customer may be shipped a new volume set of storage media devices and re-use his old site configuration file to load the updated software products. This simplifies mass distribution of software products, because only the site configuration files must be uniquely generated and shipped separately for each customer. The software products themselves are simply duplicated and shipped to every customer.

Another feature of the present invention is that new encryption keys are used for new software products. Thus, combinations of "old" and "new" software products may co-exist on one CD-ROM. For existing customers, only those who license the newly-included software products will need to be shipped a new site configuration file.

Another feature of the present invention is that the software vendor may license third-party vendors to distribute one or more products to their customers. In this situation, the volumes of CD-ROM are sent to the third-party vendor in the same manner as described above. However, the software vendor provides the third-party vendor with the capability of creating its own site configuration files. The third-party vendor then creates a site configuration file for each of its customers. The present invention allows the software vendor to restrict the ability of third-party vendor from creating site configuration files that would "unlock" every software product on the CD-ROM. In this way, the software vendor can allow a third-party distributer to distribute only a portion of the products contained on the volumes of CD-ROM.

Others have attempted to exercise control over the distribution of multiple software products using run time authorization techniques. For various reasons, these techniques do effectively restrict access to un-licensed products. The technique of the present invention utilizes load time authorization. One effect of this is that the customer, in essence, does not even know that the un-licensed products exist on the volume(s) of CD-ROM in his possession.

Other objects, features and advantages of the invention will become evident in light of the following description thereof.

BRIEF DESCRIPTION OF THE DRAWINGS

FIG. 3 is a pictorial illustration showing the architecture of a look-up file.

FIG. 9 is a high level flow showing the operation of the CD-ROM mastering tool module.

FIG. 10 is a high level block diagram showing the architecture of the CD-ROM mapper module.

FIGS. 11A–11C are a high level flow chart showing the operation of the CD-ROM mapper module.

DETAILED DESCRIPTION OF THE INVENTION

The present invention relates to a technique for allowing a software vendor to distribute multiple software products to a customer for use with an Electronic Computer-Aided Design (ECAD) system. One feature of the present invention is that the customers can only load those products for which they are licensed to use. This feature allows a software vendor to mass distribute multiple software products while allowing customers to load only certain software products. Another feature of the present invention is that customers can only load products onto a licensed ECAD system. This feature allows a software vendor to control which ECAD system the software products are being loaded on. As will be appreciated from the following detailed description, the present invention provides many other features and advantages heretofore unavailable in conventional software distribution apparatus and methods.

Figure 1:
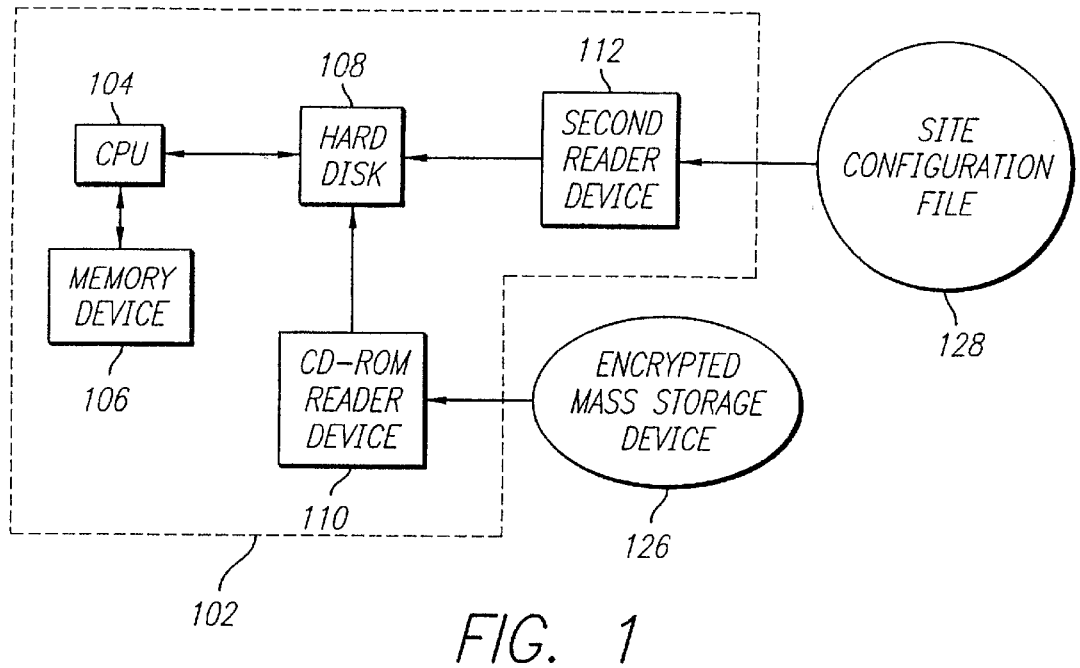
FIG. 1 is a high level block the diagram showing the environment of the present invention.

FIG. 1 shows a generalized "user" ECAD system 102, which will be loaded with certain software products. ECAD system 102 may take a number of forms and configurations. By way of example only, ECAD system 102 may be a Sun Microsystem SPARC (trademark) workstation operating with a UNIX (trademark) operating system.

The ECAD system 102 of the type described above generally comprises a CPU 104, a memory 106 and a hard disk 108. The ECAD system 102 further comprises a CD-ROM reader device 110 and an additional information retrieval device 112, such as a floppy disc drive or tape reader. As will be further described herein, the CD-ROM reader 110 is used to load the "software products" onto the ECAD system 102. Not shown is a tape drive, which would be used to transmit the finalized design to the chip manufacturer. For purposes of this discussion, the chip manufacturer is the principal purveyor of the software products.

According to the invention, an encrypted mass storage media device 126 is provided, and contains an entire suite of software tools and design libraries from the vendor (chip manufacturer). However, a particular customer (user of ECAD system 102) may not need or may not have paid for the entire suite of tools and libraries. Hence, a site configuration file 128 is also provided, which provides for restricted access to the tools and libraries contained on the encrypted mass storage device 126.

The encrypted mass storage device 126 generally contains the software products for which the software vendor desires to mass distribute to one or more customers. Although only one mass storage device 126 is depicted, several mass storage media devices will typically be necessary to distribute all of the vendor's software products. As will be more fully described herein, each software product on the mass storage device 126 is encrypted with a key code. This feature requires that the customer must be given the keys codes in order to load particular products from the mass storage media device 126 onto the ECAD workstation 102.

The site configuration file 128 is generally provided to give each customer the key codes and to allow the customer to load their licensed products onto the ECAD system 102. The site configuration file 128 is therefore unique to each customer. Preferably, the site configuration file is also encrypted, to prevent the customer from gaining access to software products he is not authorized to use. As will be more fully described herein, the site configuration file is provided with a listing of the software products licensed to the customer and the corresponding key codes which are used to "unlock" the software products on mass storage device 126. The site configuration file 128 is further provided with a listing of the particular ECAD systems 102 (i.e., CPU IDs) for which the licensed software products are authorized to be loaded on.

Preferably, the encrypted mass storage device 126 is that of an encrypted CD-ROM (referred to herein as encrypted CD-ROM storage device 126). As such, the ECAD system 102 must be configured with the CD-ROM reader device 110. Although the present invention will be described with reference to an encrypted CD-ROM, other mass storage devices presently known or developed in the future may be configured according to the techniques of the present invention. By way of example only, such other storage media devices include, but are not limited to floppy disks, hard disks and optical disks. If other mass storage devices are used, the CD_ROM reader 110 of the ECAD system 102 must be replaced with an appropriate device.

Preferably, the site configuration file 128 is stored on a separate storage media device such as a floppy disk. In this case, the second reader 112 is a disc drive. Alternatively, the site configuration file 128 could be stored on other storage media devices. It could also be manually inputted by the customer to the ECAD system 102, via a keyboard (not shown).

The architecture and method of operation of the encrypted CD-ROM storage device 126 and the site configuration file 128 will be described first, from the viewpoint of the user. Thereafter, the architecture and process for configuring both the encrypted CD-ROM storage device 126 and the site configuration file 128 will be described.

Figure 2:
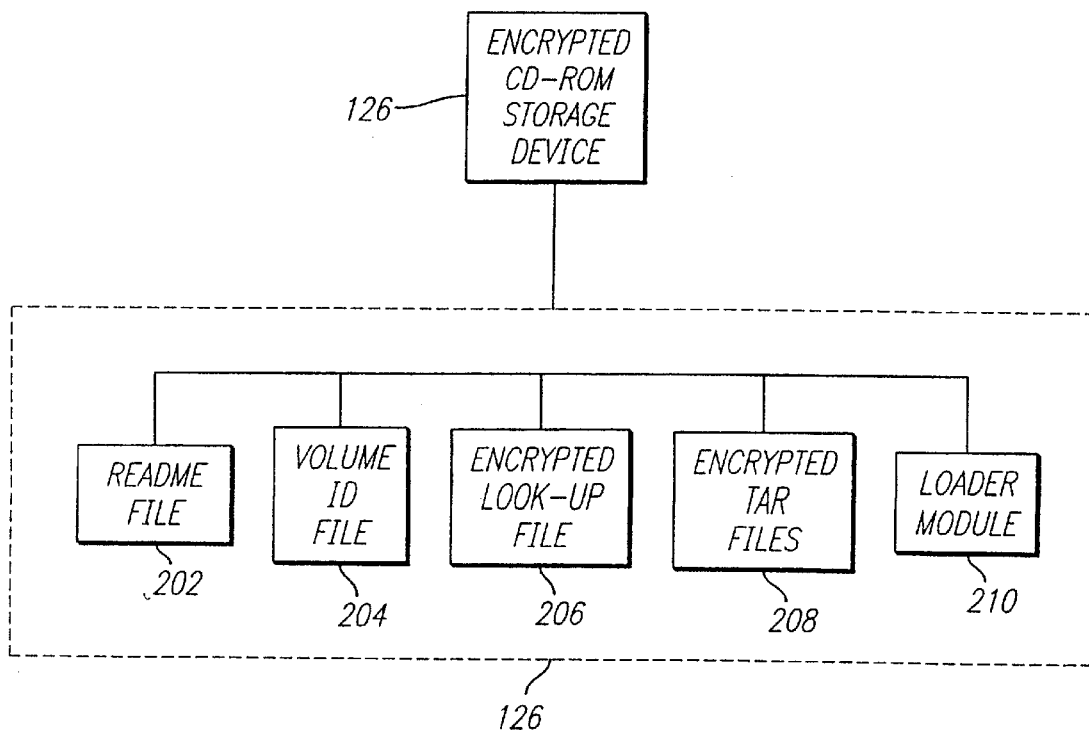
FIG. 2 is a high level block diagram showing the architecture of an encrypted CD-ROM storage device.

FIG. 2 shows a high level block diagram of the architecture of the encrypted CD-ROM storage device 126. The CD-ROM storage device 126 includes a README file 202. README file 202 contains information relating to the software vendor and use of the software products.

CD-ROM storage device 126 further comprises a volume ID file 204. Volume ID file 204 is simply a data file that identifies the volume of CD-ROM. A software vendor having multiple products to distribute may require multiple volumes of CD-ROM (i.e. volumes 1–6).

CD-ROM storage device 126 further comprises a look-up file 206. Preferably, the look-up file 206 is encrypted. As will be described more fully herein, look-up file 206 generally provides a listing of all the software products and other information necessary to load the licensed software products onto the customer's ECAD system 102. The look-up file 206 is common to each volume of CD-ROM.

CD-ROM storage device 126 further comprises a file set 208. The file set is preferably created using the UNIX "TAR" utility, and is preferably encrypted. The file set list 208 provides a location in which to store the contents and other pertinent information (such as size and permission data) of each file set. As will be described more fully herein, each file set is encrypted with a key code such that the customer can not load particular file sets without the proper key code. Thereafter, each file set is operated on by the UNIX utility TAR to compile each of the files for a given file set.

CD-ROM storage device 126 further comprises a loader module (program) 210. As will be more fully described herein, the loader module 210 is generally configured (1) to read the site configuration file 128 to ascertain whether the CPU-ID of the particular ECAD system 102 is licensed, (2) upon verification of the ECAD system 102 CPU-ID, to read the encryption key codes from the site configuration file 128, and (3) to "unlock" the software products (one software product is made up of one or more file sets stored in file set list 208) corresponding to the key codes. The loader program is further configured to load the "unlocked" file sets onto the ECAD system 102.

FIG. 3 shows a pictorial illustration of the structure of the look-up file 206. The look-up file 206 first comprises a product name list 302. Product name list 302 is a listing of software products being distributed on all volumes of the CD-ROMs. In the illustration of FIG. 3, two products are shown; Product "I" and Product "II".

Look-up file 206 is further configured with a class name list 304. Class name list 304 is a list of what classes make up a given product. In the present invention the following hierarchy is employed. A product is made up of one or more classes. A class is made up of one or more file sets. A file set is made up of one or more data files.

In the illustration of FIG. 3, Product I is made up of classes A and B. Product II is made up of classes A and C. As will be noticed, class A is shared by both product I and product II. As such, the "class" feature of the present invention provides an elegant way of sharing file sets among two or more software products.

Look-up file 206 is further configured with a file set list 306. File set list 306 is a listing of what file sets make up a given class. In the illustration of FIG. 3, class A is made-up of FileSet1 and FileSet2. As will be described more fully herein, a class may be made up of one or more file sets, the only restriction being that for each file set (1) the combined size of all the files that make-up the file set not exceed some maximum percentage of the storage capacity of the CD-ROM storage device 126 (10 percent in one embodiment) and (2) that each file within a file set share the same root path.

File sets are sized to a specified maximum fraction of the capacity of a single CD-ROM volume (about 10% of 680 megabytes). If the total size of all the files within a file set is greater than this maximum value, then prior to the actual configuration of the CD-ROM, the file set is divided into multiple file sets until the size of each of the file sets is within the specified value. This process will be described more fully herein. Additionally, in the UNIX environment it is important to ensure that the files in a given file set share the same root path.

Look-up file 206 is further configured with a file set size list 308. File set size list 308 is a listing of the size of each file set.

Look-up file 206 is further configured with a root path list 310. Root path list 310 is a listing of the root path for each file set.

Look-up file 206 is further configured with a volume no. list 312. Volume no. list 312 identifies on which volume of CD-ROM the contents of a particular file set are located.

Figures 4, 5:
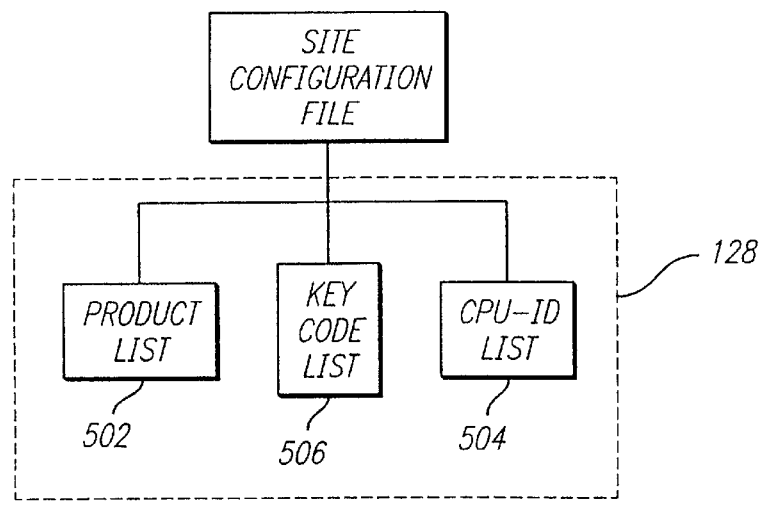
FIG. 4 is a pictorial illustration showing the architecture of a file set.
FIG. 5 is a high level block diagram showing the architecture of a site configuration file.

FIG. 4 shows a block diagram of the architecture of a single encrypted TAR file (file set) 208. The file set 208 is configured with a file name list 406. File name list 406 is a listing of the file names that make up a given file set. In the illustration of FIG. 4, fileset1 is made-up of file1 and file2.

File set 208 is further configured with a file date list 408. File date list 408 identifies the original date of the creation of the file as opposed to the date that the CD-ROM was created. Knowledge of the file date of a file allows the vendor to trace any problems that may arise in the operation of the software product.

File set 208 further comprises a file permission list 410. File permission list 410 is provided so that the vendor can establish the file set permissions such as write, read, and execute. Unlike the conventional ISO-9660 format CD-ROM, the present invention preserves original file permissions and file dates.

File set 208 is further configured with a file size list 412. File size list 412 identifies the size of the file. This information may be useful for a variety of reason. By way of example only, it may be useful in informing the customer how much space is necessary in order to load a given file set.

File set 208 is further configured with a file content list 414. File contents list 414 contains the data content for each file.

FIG. 5 shows a high level block diagram of the architecture of the site configuration file 128. As shown, the site configuration file 128 comprises a product list 502, a CPU-ID list 504 and an encryption key code list 506.

The product list 502 is simply a list of the product names (not contents) that a particular customer is licensed to use. The product list 502 will typically vary from customer to customer.

The CPU-ID file 504 is a list containing the CPU-ID for each ECAD system 102 the customer is licensed to load the software products on. As will be described more fully herein, at the beginning of the loading process, the present invention first verifies that a licensed ECAD system 102 (FIG. 1) is attempting to load the software products. The CPU-ID list 504 will vary from customer to customer.

The key code list 506 is a list containing all key codes necessary to decrypt the file sets which make-up the licensed products in the product list 502. The key code list 506 will also typically vary from customer to customer. As will be described more fully herein, for each new release of CD-ROM (i.e. completely revised set of volumes of CD-ROMs), the key codes from the previous release are re-used so that it is not necessary to send a new site configuration file 128 to a customer when the vendor sends a new release of software on CD-ROM. The site configuration file is preferably encrypted.

Figure 6A:
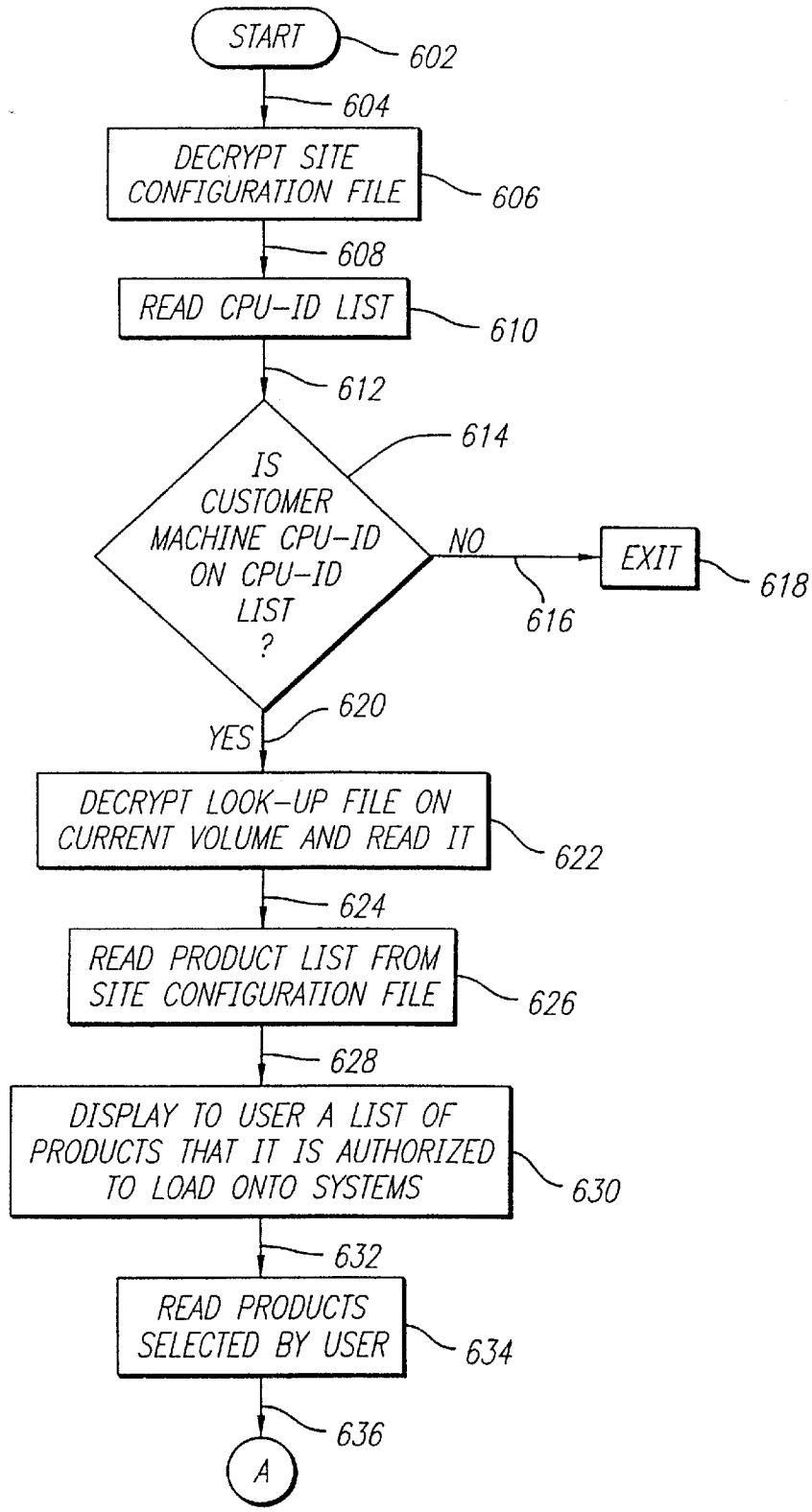
FIGS. 6A and 6B is a high level flow chart showing the operation of the loader program.
Figure 6B:
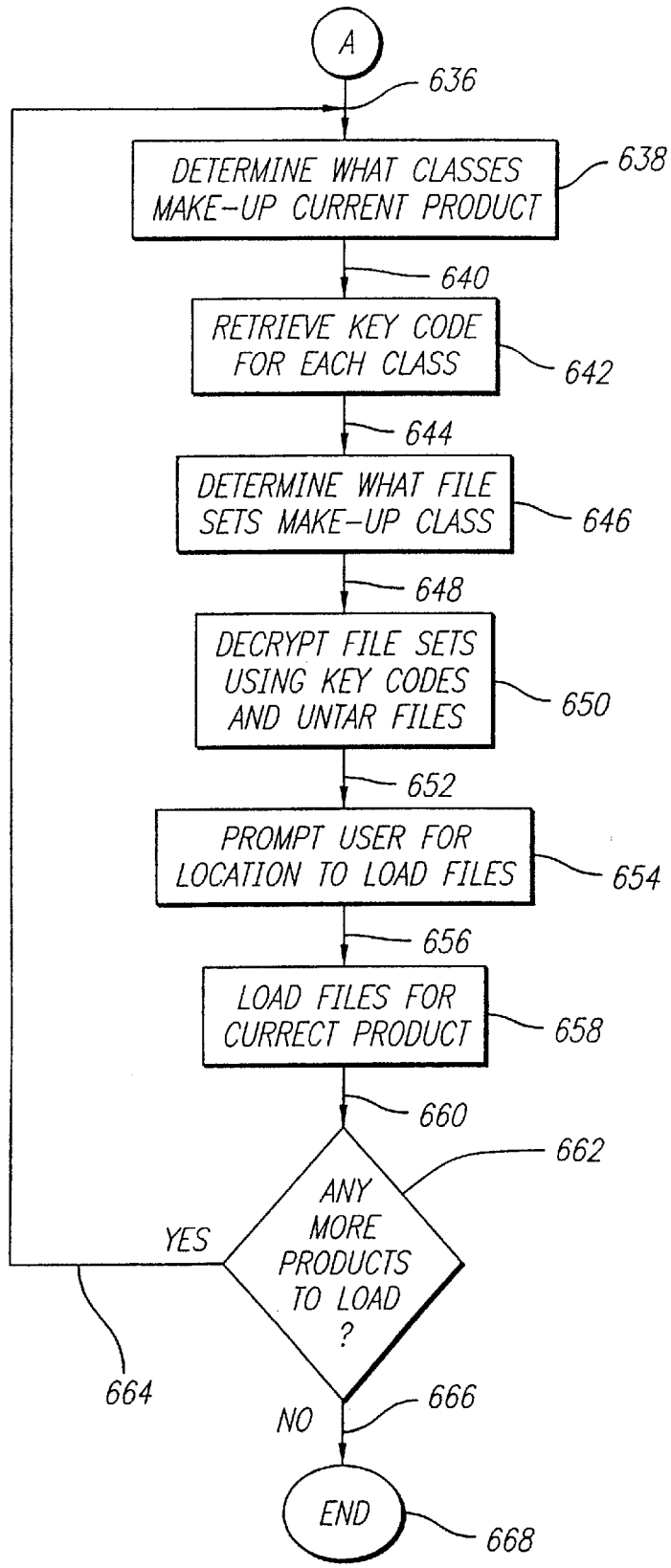

FIGS. 6A and 6B show a high level flow chart of the operation of the loader module 210 (FIG. 2). A start block 602 initiates operation of the loader module 210. Control is then passed along a logic path 604 to an operational block 606.

As shown by operational block 606, the loader module 210 is first configured to decrypt the site configuration file 128. Control is then passed along a logic path 608 to an operational block 610.

As shown by operational block 610, the loader module 210 is then configured to read the CPU-ID list 504 of the site configuration file 128. Control is then passed along a logic path 612 to an decisional block 614.

As shown by decisional block 614, the loader module 210 is then configured to access the running host CPU-ID and determine whether this CPU-ID is in the list of licensed CPU-IDs. If the host CPU-ID is not licensed (i.e. not in the CPU-ID list 504), control is passed along a logic path 616 to an operational block 618 where operation of the loader module 210 is terminated. A display error message may be generated instructing the customer that the current machine is not licensed to load the software products. If, however, the host CPU-ID is licensed, control is then passed along a logic path 620 to an operational block 622.

As shown by operational block 622, the loader module 210 is then configured to read and decrypt the look-up file 206 stored on the CD-ROM 126. Control is then passed along a logic path 624 to an operational block 626.

As shown by operational block 626, the loader module 210 is then configured to read the product list 502 on the site configuration file 128. Control is then passed along a logic path 628 to an operational block 630.

As shown by operational block 630, the loader module 210 is then configured to display to the customer a list of the products that it is licensed to load and prompt the customer for a selection. This is performed by comparing the list of products contained in the product list 502 with the list of products contained in the look-up file 206. Control is then passed along a logic path 632 to an operational block 634.

As shown by operational block 634, the loader module 210 is then configured to read the products selected by the customer. Control is then passed along a logic path 636 to an operational block 638.

As shown by operational block 638, the loader module 210 is then configured to determine what classes make-up the first product selected by the customer (identified as "current product" in FIG. 6). Control is then passed along a logic path 640 to an operational block 642.

As shown by operational block 642, the loader module 210 is then configured to retrieve the key codes from the key code list 506 for each class that make up the current product. As discussed before, the key codes in the key code list 506 are cross-referenced to a particular class. As such, knowledge of what classes make up a given product also reveals which key codes are necessary to load the file sets for each product. Control is then passed along a logic path 644 to an operational block 646.

As shown by operational block 646, the loader module 210 is then configured to retrieve the list of file set names from the look-up file 206 that make-up a given class. Control is then passed along a logic path 648 to an operational block 650.

As shown by operational block 650, the loader module 210 is then configured to decrypt each of the file sets in the file set list 208 using the key codes retrieved from the key code list 506 and the file set names retrieved from the look-up file 206. Thereafter, the loader module 210 is further configured to "untar" each file set. Control is then passed along a logic path 652 to an operational block 654.

As shown by operational block 654, the loader module 210 is then configured to prompt the customer for the location where to load the file sets that make up the current product. Control is then passed along a logic path 656 to an operational block 658.

As shown by operational block 658, the loader module 210 is then configured to load each of the file sets to the designated location. Control is then passed along a logic path 660 to a decisional block 662.

As shown by decisional block 662, the loader module 210 is then configured to determine whether any more products need to be loaded. If additional products need to be loaded, control is returned along a logic path 664 to operational block 638 where the next product is loaded. If all products selected by the customer have been loaded, control is passed along a logic path 666 to an operational block 668 where operation of the loader module 210 is terminated.

Heretofore described has been the physical architecture of the encrypted CD-ROM storage device 126 and the site configuration file 128. Also described has been the loader module 210 which loads the software products from the encrypted CD-ROM storage device 126 to the user's ECAD system 102 using the site configuration file 128. Following is a description of the architecture and process for the vendor generating the encrypted CD-ROM storage device 126 and the site configuration file 128.

Figure 7:
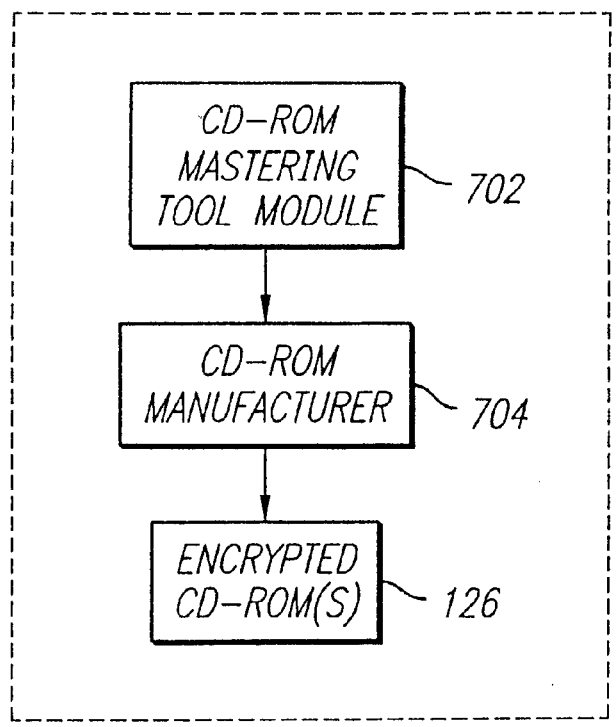
FIG. 7 is a high level flow chart showing the process for configuring the encrypted CD-ROM storage device.

FIG. 7 shows a high level flow chart of the process for creating the encrypted CD-ROM storage device 126. Shown is a CD-ROM mastering tool module 702. CD-ROM mastering tool module 702 is provided to create a master tape for each volume of CD-ROM. As will be more fully described herein, CD-ROM mastering tool module 702 is configured to automatically determine the number of volumes of CD-ROM necessary based on the number and complexity of software products to be mass-distributed.

As shown by block 704, the master tape generated by the CD-ROM mastering tool module 702 is sent to a CD-ROM manufacturer. The CD-ROM manufacturer utilizes the master tapes to generate one or more volumes of CD-ROM storage device 126.

Figure 8:
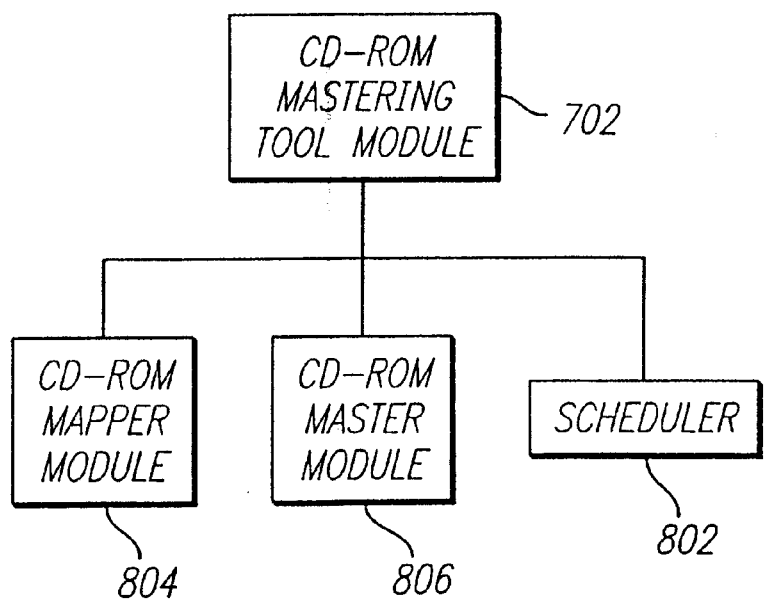
FIG. 8 is a high level block diagram showing the architecture of the CD-ROM mastering tool module which is used to generate the CD-ROM master tape.

FIG. 8 shows a high level block diagram of the architecture of the CD-ROM mastering tool module 702. As shown, the CD-ROM mastering tool module 702 first comprises a scheduler module 802. Scheduler module 802 is configured to (1) generate a job definition list (not shown) indicative of the products to be loaded onto the CD-ROM storage device and (2) to assign a serial number. The job definition list is a list of the product names and corresponding directory and/or file names that make-up the product as well as the root path location of the directories and/or files.

The CD-ROM mastering tool module 702 further comprises a CD-ROM mapper module 804. As will be described more fully herein, the CD-ROM mapper module 802 is generally provided to read the job definition list from the scheduler 802 and to configure each of the directories and/or files that make-up a product into a structure more compatible for mass distribution.

The CD-ROM mastering tool module 702 further comprises a CD-ROM master module 806. The CD-ROM master module 804 is generally provided to configure the output of the CD-ROM mapper module 804 such that each of the file sets is in the proper ISO-9660 format.

FIG. 9 shows a high level flow chart of the inter-operation of the scheduler module 802, the CD-ROM mapper module 804, the CD-ROM master module 806.

The operation of CD-ROM mastering tool module 702 first begins with operation of scheduler module 802. Scheduler module 802 generates a job definition list which in inputted to the CD-ROM mapper module 804. As described before, the job definition list is simply a list of all the products to be mass distributed and the directory and/or file names that make-up the products. The location of the directories and/of files (i.e location of directories and/or files within the vendor's computer systems) is also provided in the job definition list.

CD-mapper module 804 is configured to read the job definition list and output four files; a look-up file 902, a product look-up file 904, an MPS file 906, and the README file 202.

The look-up file 902 is an un-encrypted version of the look-up file 206 stored on the CD-ROM storage device 126. Look-up file 206 was previously discussed with reference to FIGS. 2 and 3.

Product look-up file 906 is identical to look-up file 902 except that a listing of the key codes for each class is provided. As will be described more fully herein, the product look-up file 906 is used by a site-configuration program (to be described) to generate the site-configuration file 128.

The MPS file 904 is a listing of each file set and the names of the files that make-up the file set.

Thereafter, look-up file 902, product look-up file 904, MPS file 906, and README file 202 are outputted to the CD-ROM master module 806. The CD-ROM master module 804 operates on these data files to generate one or more master tapes. Each master tape is representative of one volume of CD-ROM. Each master tape has configured thereon the following five files: the file set list 208, the look-up file 206, loader program 210, README file 202, and the volume ID file 204. As discussed with reference to FIGS. 2 and 3, the look-up file 206, loader program 210, and README file 202 are common to each volume of CD-ROM.

FIG. 10 shows a more detailed block diagram of the architecture of the CD-ROM mapper module 804. CD-ROM mapper module 804 first comprises a job definition module 1002. Job definition module 1002 is generally configured to read the job definition file provided by the scheduler 802. The job definition file includes a list of the product names that the vendor desires to mass distribute and the directories and/or files (with root path locations) that make-up the products.

The CD-ROM mapper module 804 further comprises a partition module 1004. As will be described in more detail with reference to FIG. 11, the partition module 1104 is generally configured to take the job definition file and (1) organize the file sets into a set of distinct classes that make-up a given product into classes and assign a separate encryption key to each class, (2) generate the MPS file 906 that contains a listing of the file sets with the corresponding files that make-up each file set, (3) generate the look-up file 902 and product look-up file 904, (4) generate the README file 202, (5) output the MPS file 906, look-up file 902, product look-up file 904 and README file 202 to the CD-ROM master module 806, and (6) to output another copy of the product look-up file to a site configuration module (to be described) to be used for creating the site configuration file 128.

Figure 11B:
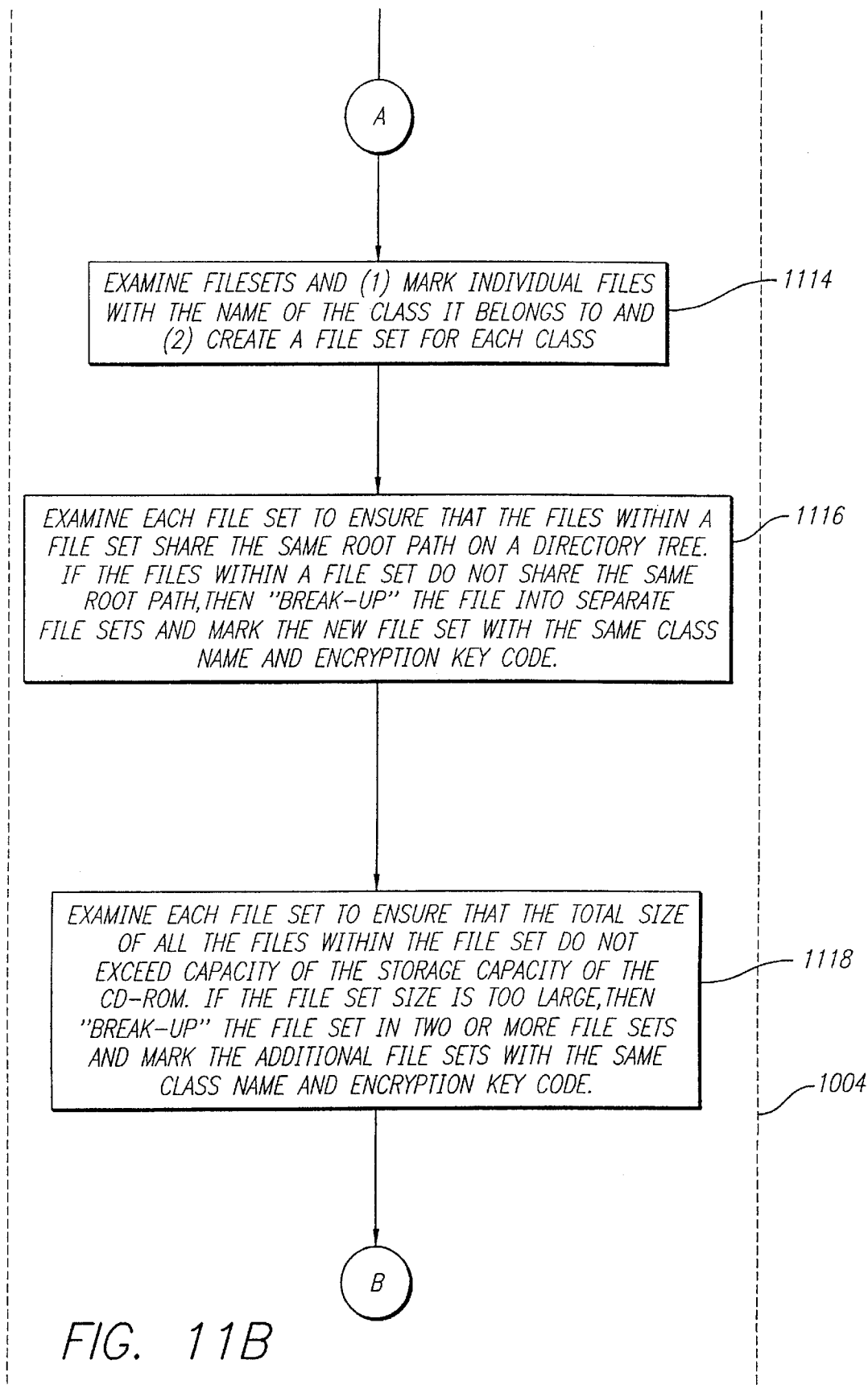
Figure 11C:
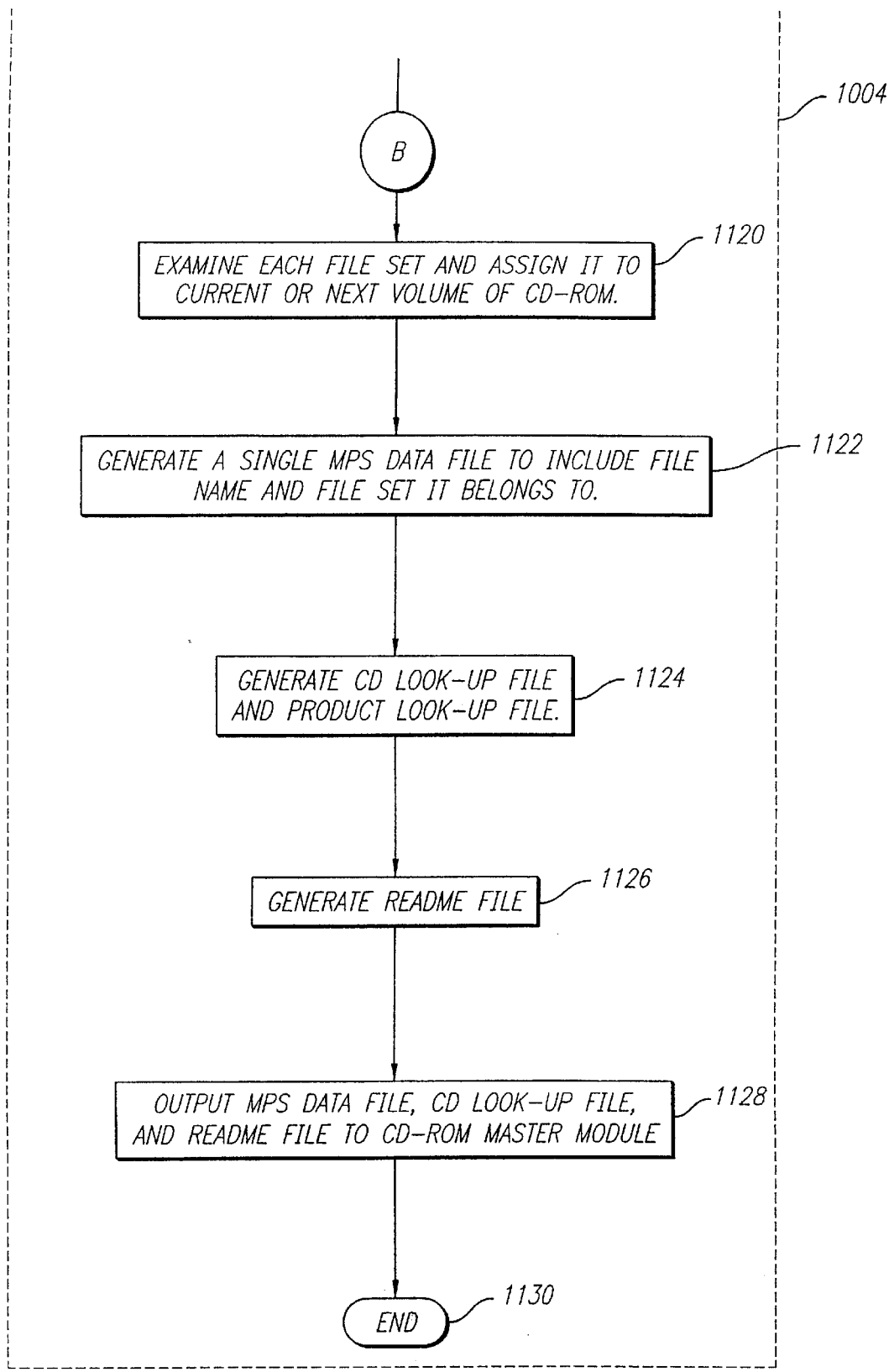

FIGS. 11A–11C show a high level flow chart of the operation of the CD-ROM mapper module 804. A start block 1102 initiates operation of the CD-ROM mapper module 804. Control is then passed to an operational block 1104.

As shown by operational block 1104, the CD-ROM mapper module 804 is first configured to read the job definition file provided by the scheduler 802. As described above, the job definition file includes all of the products the vendor desires to mass distribute and the corresponding directory and/or files that make-up the product. Control is then passed to an operational block 1106.

As shown by operational block 1106, the CD-ROM mapper module 804 is then configured to verify that all the directories and/or files for each product can actually be accessed. This step is necessary to ensure that some part of the vendor network is not "down" and thus unable to transmit the directories and/or files. Control is then passed to an operational block 1108.

As shown by operational block 1108, the CD-ROM mapper module 804 is then configured to access the directories and/or files and construct one or more directory trees. Control is then passed to an operational block 1110.

As shown by operational block 1110, the CD-ROM mapper module 804 is then configured to examine each directory tree and "mark" each of the files contained therein with the name of the product that it belongs to. The product names are maintained as a linked-list attached to each file node in the directory tree. Control is then passed to an operational block 1112.

As shown by operational block 1112, the CD-ROM mapper module 804 is then configured to examine each of the directory trees to (1) determine the number of classes of files that exist and (2) to assign an encryption key code to each class. A class is defined as a group of non-overlapping files that make-up a product. For example, if one file is shared by two or more products, then that file becomes a class of its own. Another example would be if ten files belong only to one product, then these ten files would become a single class. Control is then passed to an operational block 1114.

As shown by operational block 1114, the CD-ROM mapper module 804 is then configured to examine each file and "mark" it with the name of the class that the file belongs to. At this point, the CD-ROM mapper module 804 is also configured to make each class a file set. Control is then passed to an operational block 1116.

As shown by operational block 1116, the CD-ROM mapper module 804 is then configured to examine each file set to ensure that the files within the file set share the same root path. If the files within a file set do not share the same root path, the CD-ROM mapper module 804 is configured to "break-up" the file set into one or more file sets such that all the files within a given file set share the same root path. If this occurs, the CD-ROM mapper module 804 is further configured to mark each of the additional file sets with the same class name and encryption key code. Control is then passed to an operational block 1118.

As shown by operational block 1118, the CD-ROM mapper module 804 is then configured to re-examine each file set to ensure that the cumulative size of all the files within each file set does not exceed a predetermined size. In the preferred embodiment, this predetermined size is approximately 10 percent of the storage capacity of the CD-ROM storage device 126. If the size of a file set is too large, the CD-ROM mapper module 804 is configured to "break-up" the file set into one or more file sets such that each of the file sets are within the specified size restriction. If this occurs, the CD-ROM mapper module 804 is also configured to mark each of the additional file sets with the same class name and encryption key code. Control is then passed to an operational block 1120.

As shown by operational block 1120, the CD-ROM mapper module 804 is then configured to assign each file set to a particular volume of CD-ROM. The CD-ROM mapper module 804 examines each file set to determine whether it can fit within the size constraints of the current volume CD-ROM. If it can, the file set is assigned to that volume of CD-ROM. If the file set is larger then the available space on the current volume of CD-ROM, the CD-ROM mapper module 804 is configured to create a new volume of CD-ROM and assign the file set to that volume of CD-ROM. This process continues until each and every file set has been assigned to a volume of CD-ROM. Control is then passed to an operational block 1122.

As shown by operational block 1122, the CD-ROM mapper module 804 is then configured to generate the single MPS file 906. The MPS file 906 is a list of all file sets and the corresponding files that belong to it. The file date and permission data corresponding to each file as well as the CD-ROM volume number that the file set has been assigned is also compiled. Control is then passed to an operational block 1124.

As shown by operational block 1124, the CD-ROM mapper module 804 is then configured to generate the look-up file 902 and the product look-up file 904. Control is then passed to an operational block 1126.

As shown by operational block 1126, the CD-ROM mapper module 804 is then configured to generate the README file 202. Control is then passed to an operational block 1128.

As shown by operational block 1128, the CD-ROM mapper module 804 is then configured to output the MPS file 906, look-up file 902, product look-up file 904, and the README file 202 to the CD-ROM master module 806. Control is then passed to an operational block 1130 where operation of the CD-ROM mapper module 804 is concluded.

Figure 12:
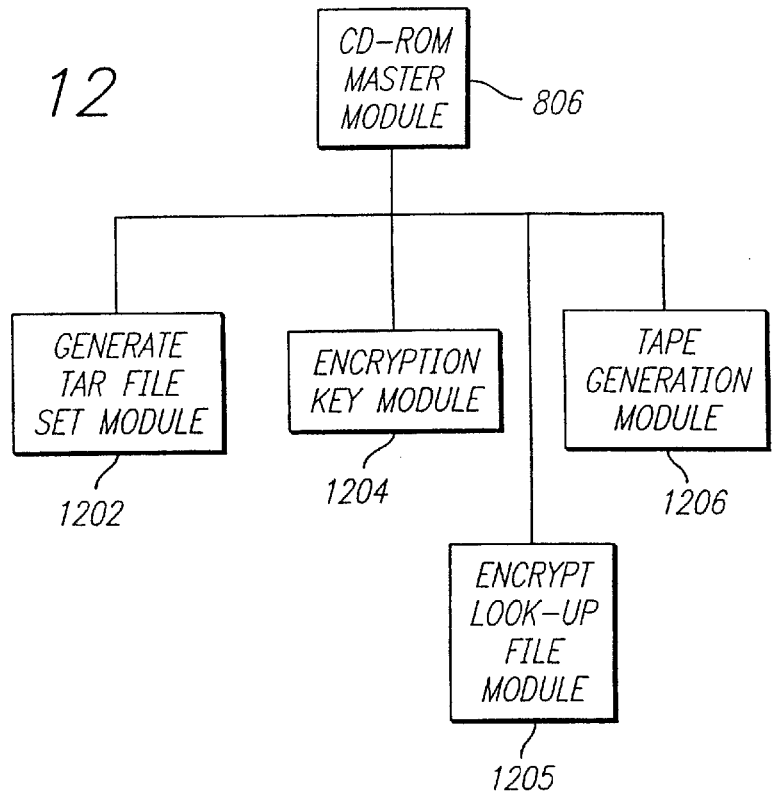
FIG. 12 is a high level block diagram showing the architecture of the CD-ROM master module.

FIG. 12 shows a more detailed block diagram of the architecture of the CD-ROM master module 806. As shown, the CD-ROM master module 806 generally comprises a generate TAR file set module 1202, an encryption key module 1204, an encryption look-up file module 1205, and a tape generation module 1206.

The generate TAR file set module 1202 is generally configured to run the UNIX utility "TAR" on each file set to compile all the files. The generate TAR file set module 1202 examines the MPS file 906 to determine which files belong to each file set.

The encryption key module 1204 is provided to encrypt each file set with the correct encryption key code (retrieved from the product look-up file 904) to generate the file list 208 shown in FIG. 2.

The encryption look-up file module 1205 is provided to encrypt the look-up file 902 with any of a number of encryption schemes to generate an unreadable look-up file 206 (shown in FIG. 2). This is necessary so that the customer will not be able to read the look-up file 206 to obtain the product codes.

The tape generation module 1206 is provided to create a master tape for each volume of CD-ROM in the ISO-9660 format. Preferably, the tape generation module utilizes the "Young Minds" software to perform this function. The Young Minds software is well known in the art and as such, a detailed description will not be provided herein.

Figure 13:
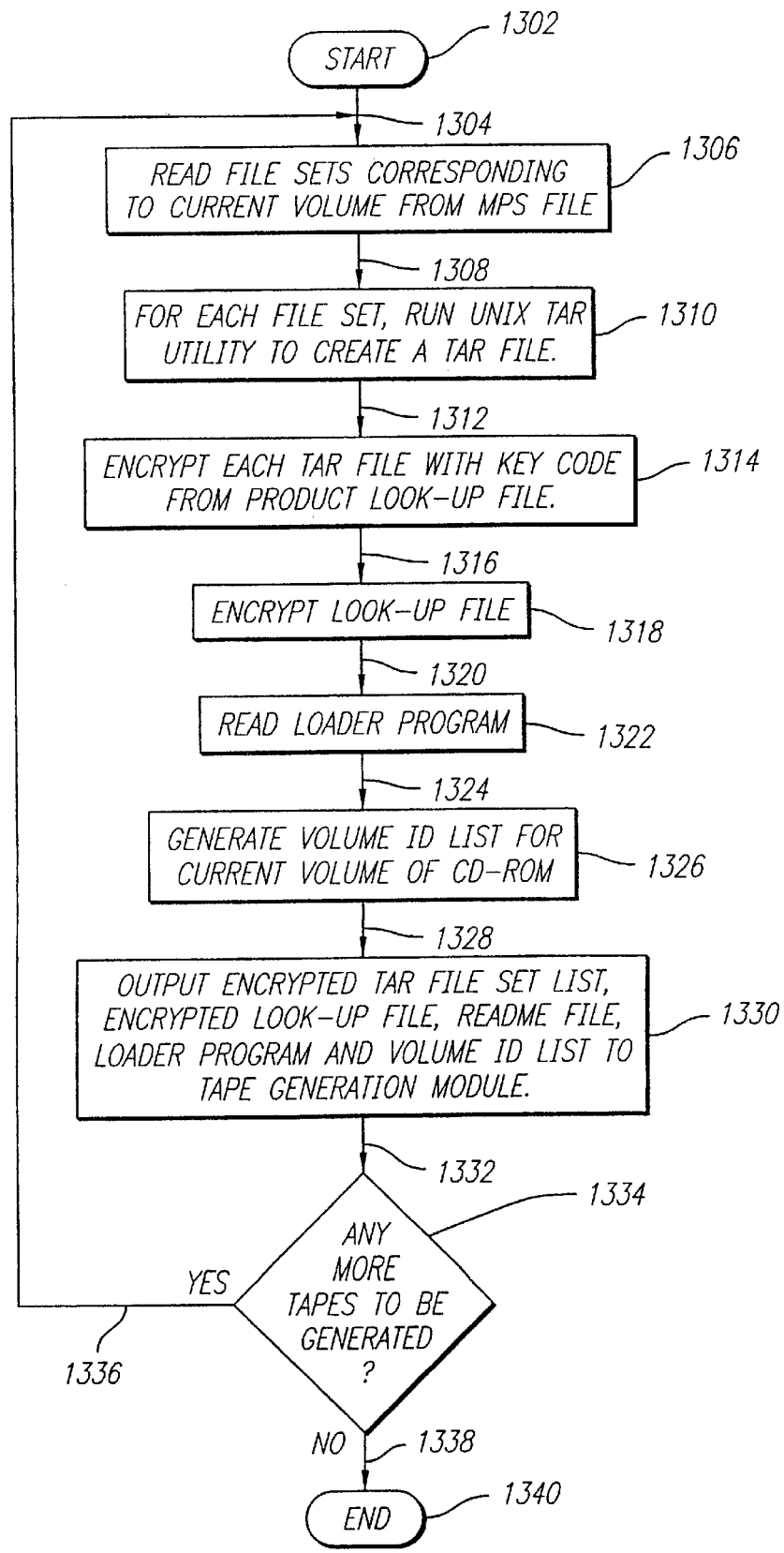
FIG. 13 is a high level flow chart showing the operation of the CD-ROM master module.

FIG. 13 shows a high level flow chart of the operation of the CD-ROM master module 806. Operation is initiated by an operational block 1302. Control is then passed along a logic path 1304 to an operational block 1306.

As shown by operational block 1306, the CD-ROM master module 806 is then configured to read the MPS file 906 and retrieve all file sets and corresponding files that have been assigned to the current volume of CD-ROM (on first pass, current volume=volume 1). Control is then passed along a logic path 1308 to an operational block 1310.

As shown by operational block 1310, the CD-ROM master module 806 is then configured to run the UNIX TAR utility to compile the files that make up each file set. Control is then passed along a logic path 1312 to an operational block 1314.

As shown by operational block 1314, the CD-ROM master module 806 is then configured to encrypt each file set with the corresponding key code. This information is retrieved from the product look-up file 904 where each class has been assigned a key code and knowledge of what file sets make-up a class is available. Control is then passed along a logic path 1316 to an operational block 1318.

As shown by operational block 1318, the CD-ROM master module 806 is then configured to encrypt a copy of the look-up file 902. Control is then passed along a logic path 1320 to an operational block 1322.

As shown by operational block 1322, the CD-ROM master module 806 is then configured to read a copy of the loader program 210. Control is then passed along a logic path 1324 to an operational block 1326.

As shown by operational block 1326, the CD-ROM master module 806 is then configured to generate a volume ID file 204 for the current volume of CD-ROM. Control is then passed along a logic path 1328 to an operational block 1330.

As shown by operational block 1330, the CD-ROM master module 806 is then configured to output the file set list 208, look-up file 206, volume ID file 204, README file 202, and loader program 210 to the tape generation module 1206. Although not shown, the tape generation module 1206 is then configured to generate a master tape for the current volume of CD-ROM. Control is then passed along a logic path 1332 to a decisional block 1334.

As shown by decisional block 1334, the CD-ROM master module 806 is then configured to determine whether any more volumes of CD-ROM need to be generated. If additional volumes of CD-ROM need to be generated, then control is returned along a logic path 1336 to operational block 1304 where the current volume of CD-ROM is incremented to the next volume. However, if no additional volumes of CD-ROM need to generated, then control is passed along a logic path 1138 to an operational block 1340 where operation of the CD-ROM master module 806 is terminated.

At this point, each of the CD-ROM master tapes (one for each volume of CD-ROM) can now be sent to a CD-ROM manufacturer (such as the 3M Corporation or the Sony Corporation) where the CD-ROMs are fabricated.

Figure 14:
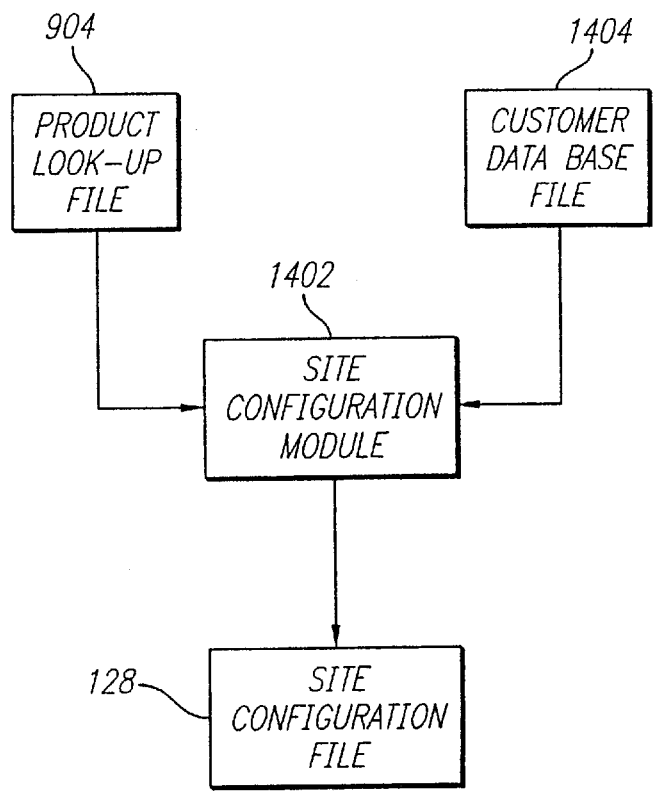
FIG. 14 is a high level flow chart showing the process for configuring the site configuration file.

FIG. 14 shows a high level flow chart of the process for configuring the site configuration file 128. Shown is a site configuration module 1402 used by the software vendor to generate a unique site configuration file 128 for each customer. As will be described more fully herein, the site configuration module 1402 generates the site configuration file 128 based on data from a customer data base file 1404 unique to each customer and the product look-up file 906.

The customer data base file 1404 includes all of the software products licensed by the customer as well as the CPU-IDs of the licensed machines.

The product look-up file 906 supplies the encryption key code for each of licensed products.

Figure 15:
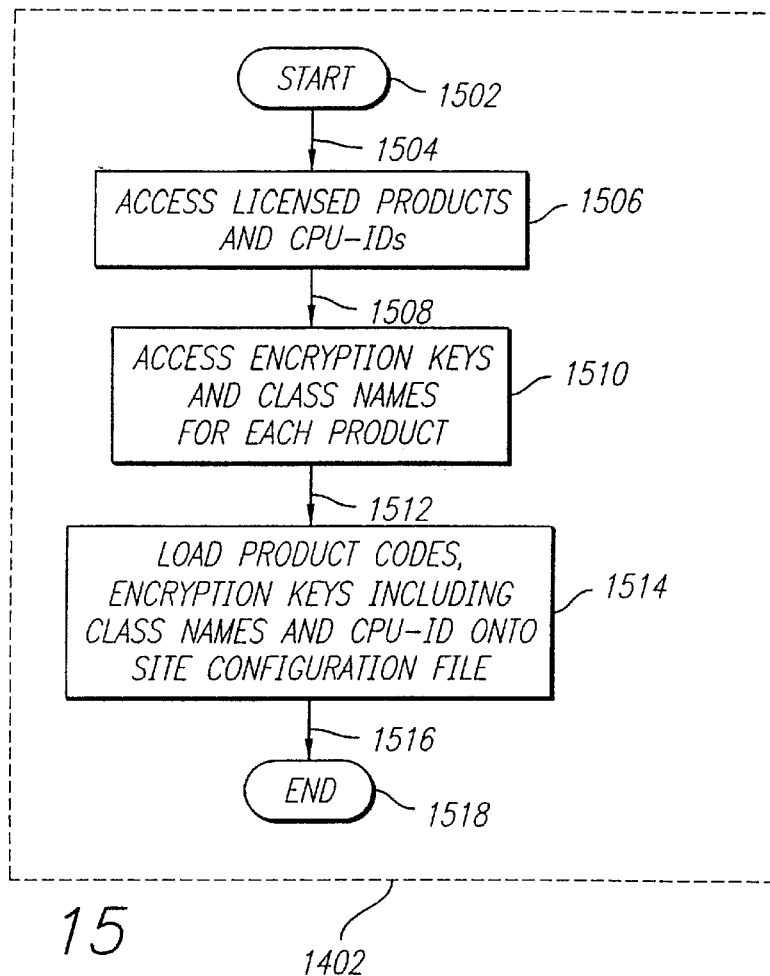
FIG. 15 is a high level block diagram showing the operation of the site configuration module.

FIG. 15 shows a high level flow chart of the operation of the site configuration module 1402. Operation of the site configuration module 1402 is initiated with an operational block 1502. Control is then passed along a logic path 1504 to an operational block 1506.

As shown by operational block 1506, the site configuration module 1402 is first configured to read the customer data base file 1404 and generate the product list 502 and the CPU-ID list 504. As described with reference to FIG. 5, the product list 502 is a list of licensed software products while the CPU-ID list 504 is a list of the CPU-IDs indicative of which machines the customer is licensed to load the software products on. Control is then passed along a logic path 1508 to an operational block 1510.

As denoted by operational block 1510, the site configuration module 1402 is then configured to read the product look-up file 904 and access (1) the class names corresponding to the licensed products obtained from the customer data base file 1404 and (2) the encryption key codes for each class. The site configuration module 1402 is then configured to generate the key code list 506. As described with reference to FIG. 5, the key code list 506 is a list of licensed class names and corresponding key codes to "unlock" the file sets that make-up the class. Control is then passed along a logic path 1512 to an operational block 1514.

As denoted by operational block 1514, the site configuration module 1402 is then configured to load the product list 502, CPU-ID list 504, and the key code list 506 onto a storage medium such as a floppy disk. The floppy disk containing the site configuration file 128 is then sent to the customer along with the various volumes of the CD-ROM storage device 126. Control is then passed along a logic path 1516 to an operational block 1518 where operation of the site configuration module 1402 is concluded.

It is desirable that the product list 502, CPU-ID list 504, and the key code list 506 occupy only a few lines of data. This would allow the site configuration file 128 to be sent to the customer ways other then a floppy disk. By way of example only, the site configuration file 128 could be sent to the customer on any other low cost storage medium or via modem or via facsimile. If the site configuration file 128 is sent via a facsimile, the customer could then "key in" the contents of the site configuration file 128 directly into the licensed machine.

Figure 16:
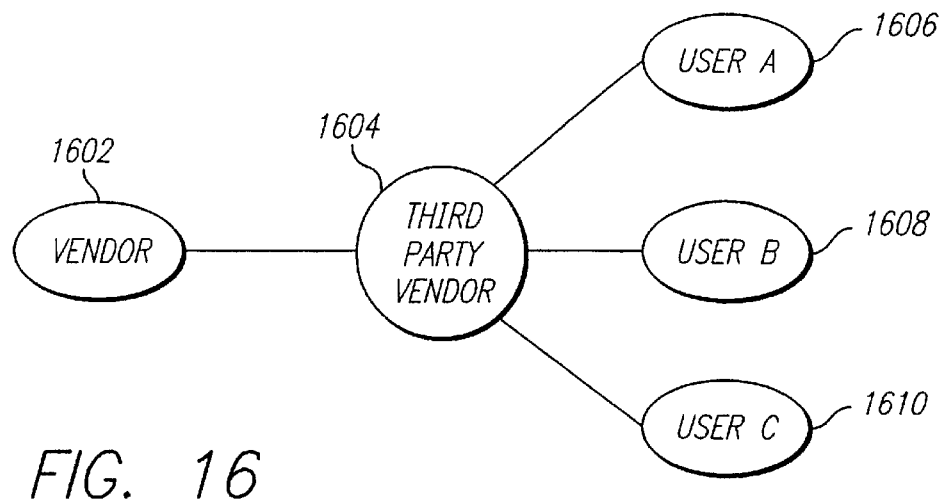
FIG. 16 is a high level block diagram showing the architecture of the present invention when used for third-party distributors.

FIG. 16 shows a high level block diagram of the architecture and method of the present invention with respect to third-party software vendors. Shown is a software vendor 1602 who may license a third party vendor 1604 to distribute its software products to customers 1606, 1608, and 1610.

In the present invention, the third party vendor 1604 is provided with a revised product look-up file. The revised product look-up file is a version of the product look-up file 904 minus any products and/or encryption key codes that the software vendor 1602 does not want the third party vendor 1604 to distribute. The third party vendor 1604 is thereby restricted in the type of site configuration files 128 that it can generate and distribute. As described heretofore, the third party vendor 1604 can then send to its customers (1) a copy of the software products on one or more volumes of CD-ROM storage device 126 and (2) a unique site configuration file 128.

It bears mention, that the various files that are or may be encrypted, are encrypted with any suitable encryption algorithm.

Inasmuch as files and/or file sets may be shared by different products, the "class" designation of intersecting files allows for only one instance of a file/file set to be written on the CD-ROM, which reduces the overall CD-ROM storage requirement. Each product contains a pointer designating the classes of files needed to completely describe the product.

The foregoing description is intended primarily for purposes of illustration. The present invention may be embodied in other forms or carried out in other ways without departing from the spirit or scope of the invention. Modifications and variations still falling within the spirit or the scope of the invention will be readily apparent to those having skill in the art to which the invention most nearly pertains.

Appended hereto, and forming part of the disclosure hereof are:

Appendix 1, which is a code listing for CD Mapper;
Appendix 2, which is a code listing for CD Loader;
Appendix 3, which is a code listing for CD Master; and
Appendix 4, which is a code listing for CD Configuration.

*Appendix 1: Code listing for CD Mapper*

```
/* ---------------------------------------------------------------*
 * program: cd_mapper.c
 * purpose: cd_mapper takes a job definition for producing CD-ROM
 *          inventory and produces an MPS file and other information
 *          for the cd_master program for generating master tapes for
 *          a CD-ROM manufacturer.
 * author:  James Bohannon
 * date:    1 Feb 91
 *
 * change history:
 *    date       name        description
 *    -------------------------------------------------------------
 *    29APR91    Posner      Modified load_prescription_info, added
 *                           new arg to load_prescription call.
 * ---------------------------------------------------------------*/
#include        <stdio.h>
#include        <sys/types.h>
#include        <sys/stat.h>
#include        "lsisys.h"
#include        "ma.h"
#include        "lsigpal.h"
#include        "libdef.h"
#include        "lsitype.h"
#include        "lsinhsh.h"
#include        "lsisort.h"
#include        "mps.h"
#include        "mps_def.h"
#include        "mps_func.h"
#include        "environ.h"
#include        "aspen_notify.h"
#include        "aspen_config.h"
#include        "prescription.h"
#include        "cd_mapper.h"

/* flags */
#define CD_MAPPER_SUBJECT "CD-Mapper Failure"
#define PRESCRIPTION_EXT ".prescription"

#define ASPEN_CONFIG_FILE "/w/aspen/aspen.config"
#define SCRATCH_DIR "/w/aspen/scratch"

char *program_name = "cd_mapper: ";
aspen_data *aspen_info;

static notify_list *notification_list;
boolean check_for_lib_corruption = TRUE;

static char *job_number;
/* The name of the previous prod_lookup file to use
   for re-using the same encryption keys in the new
   prod_lookup file */
char *reuse_prodlookup = NULL;

#define NO_DEST_REL_PATH "<NULL>"

/* external declarations */
extern char *strcpy(), *strcat(), *malloc();

static product *get_job_definition_from_prescription_file();
static product *get_list_of_products_and_locations();

/*-------------------------------------------------------------*
 * Main program
 *-------------------------------------------------------------*/
main(argc, argv)
int argc;
```

- Page 1 -

```
char *argv[];
        {
        product *all_products;

printf("(c) Copyright 1991 LSI Logic Corporation\n");
        printf("cd_mapper:  Mapping Tool for CD-ROM Mastering\n");
        printf("Version 2.0 - July 1991\n\n");
        printf("cd_mapper:  Initializing...\n");
        initialize(argc, argv);

printf("cd_mapper:  Loading products and locations...\n");
        all_products = get_job_definition_from_prescription_file();

perform_mapping_and_generate_output_files(job_number, all_products);

exit(0);
        return(0);
        }
/*---------------------------------------------------------*
 *
 *---------------------------------------------------------*/
static initialize(argc, argv)
int argc;
char *argv[];
        {
        parse_args(argc, argv);
        load_reuse_prodlookup();
        init_notification(job_number);
        load_aspen_config_info();
        }
/*---------------------------------------------------------*
 * Parse arguments sent into cd_mapper.
 *     args are: [-c] <job_number> [<job#_of_prev_prod_lookup>]
 * If no args are given the usage is stated.
 * The -c option suppresses library corruption checking,
 * speeding up the program run significantly.
 *---------------------------------------------------------*/
static parse_args(argc, argv)
int argc;
char *argv[];
        {
        char *job_arg, *reuse_arg = NULL;

if ((argc < 2) || (argc > 4)) {
                printf(
                        "One or two or three arguments are required for cd_mapper.\n
                printf(
"The usage is:  cd_mapper [-c] <job#> [<job#_of_previous_cd_lookup_file>]\n");
                printf("The -c option suppresses library corruption checking\n");
                exit(1);
                }
        if (strcmp(argv[1], "-c") == 0) {
                check_for_lib_corruption = FALSE;
                job_arg = argv[2];
                if (argc == 4) reuse_arg = argv[3];
                }
        else {
                if (argc == 3) reuse_arg = argv[2];
                job_arg = argv[1];
                } job_number = (char *)malloc((unsigned)strlen(job_arg)+1);
        strcpy(job_number, job_arg);

if (reuse_arg != NULL) {
                reuse_prodlookup = (char *)malloc(MAXFNAMESIZE+1);
```

- PAGE 2 -

```
                    strcy  reuse_prodlookup, LOOKUP_FL_PATH);
                    strcat(reuse_prodlookup, reuse_arg),
                    strcat(reuse_prodlookup, LOOKUP_FILE_NAME);
                    strcat(reuse_prodlookup, reuse_arg);
                    }
        }
/*----------------------------------------------------------*
 * Load in the ASPEN configuration file
 *----------------------------------------------------------*/
static load_aspen_config_info()
        {
        if (! load_aspen_config(ASPEN_CONFIG_FILE)) {
                printf(
"cd_mapper:  An error occurred while reading the aspen.config file: %s.\n",
                        ASPEN_CONFIG_FILE);
                printf(
"Either the file was not readable or a syntax error was encountered.\n");
                printf("No further processing will occur.\n");
                append_notification(
                    "cd_mapper could not read the aspen configuration file\n");
                append_notification("or a syntax error occurred within it.\n");
                append_notification(".\nNo further processing will occur.\n");
                notify((notify_list *)NULL, CD_MAPPER_SUBJECT, SCRATCH_DIR);
                exit(2);
                }
        aspen_info = get_general_aspen_data();
        notification_list = get_notify_list(CD_MASTER_LIST);
        }
/*----------------------------------------------------------*
 *
 *----------------------------------------------------------*/
static load_prescription_info()
        {
        char prescription_file_name[MAXFNAMESIZE];
        boolean ignore_missing_files = FALSE;

strcpy(prescription_file_name, aspen_info->job_dir);
        strcat(prescription_file_name, job_number);
        strcat(prescription_file_name, "/");
        strcat(prescription_file_name, job_number);
        strcat(prescription_file_name, PRESCRIPTION_EXT);

if (! load_prescription(prescription_file_name, aspen_info->job_dir,
                TRUE, check_for_lib_corruption, ignore_missing_files)) {
                printf("\n\ncd_mapper:  No subjob files will be generated\n");
                append_notification("\n\nNo subjob files will be generated.\n");
                notify(notification_list, CD_MAPPER_SUBJECT, SCRATCH_DIR);
                exit(3);
                }
        free_all_validation_memory();
        }
/*----------------------------------------------------------*
 *
 *----------------------------------------------------------*/
static product *get_list_of_products_and_locations()
        {
        hash_table product_table;
        memory_group product_group;
        product *all_products, *this_product;
        location *this_loc;
        disk_record_data *disk_record_list;

disk_record_list = (disk_record_data *)
                get_prescription_list(DISK_LIST);

product_group = gpalloc(1024);
```

- Page 3 -

```
                                     product                   FALSE
        smaketab(&pre  st_table, product_group, FS  !);
        all_products = NULL;
        while (disk_record_list != NULL) {
                if (! shashget((pointer *)&this_product, product_table,
                        disk_record_list->product_code, 0)) {
                        this_product = (product *)
                                qalloc(sizeof(struct product_struct), product_group
                        this_product->next = all_products;
                        all_products = this_product;
                        this_product->product_code = disk_record_list->product_code
                        this_product->location_list = NULL;
                        this_product->product_description = "---";
                        shashinsert((pointer)this_product, product_table,
                                this_product->product_code, 0);
                        }
                this_loc = (location *)qalloc(
                        sizeof(struct location_struct), product_group);
                this_loc->root_path = disk_record_list->root_path;
                this_loc->relative_path = disk_record_list->relative_path;
                this_loc->next = this_product->location_list;
                this_product->location_list = this_loc;

disk_record_list = disk_record_list->next;
                }
        if (all_products == NULL) {
                printf("cd_mapper:  No products found in prescription file.\n");
                printf("cd_mapper:  No further processing will occur.\n");
                exit(5);
                }
        return(all_products);
        }
/*--------------------------------------------------------------*
 *  build_product_description_table creates a hash table
 *  with the product_code as the key and a product_description
 *  as the contents.  It uses the product_codes listed in
 *  the prescription file to find all product codes, and
 *  then assumes that each product code is also authorized
 *  as part of some AUTH_GROUP in another section of the
 *  prescription file to find the description.  This means
 *  that, to create a CD-ROM master with nice product
 *  descriptions, the MASTER nickname in the ATLAS database
 *  should specify all product codes for some auth group
 *  to make sure their descriptions all appear in the
 *  prescription file.
 *--------------------------------------------------------------*/
static load_product_descriptions(all_products)
product *all_products;
        {
        product *this_product;
        auth_group_data *this_group;
        auth_product_data *this_group_prod;
        hash_table temp_prod_table;
        memory_group temp_prod_group;
        char *description, *cp;

this_group = get_auth_group_list();
        if (this_group == NULL) {
                printf(
"cd_mapper:  WARNING...no auth group data found in prescription file.\n");
                printf(
"cd_mapper:  Thus, no product descriptions will be included on the CD-ROM.\n");
                printf(
"cd_mapper:  Try adding product codes to the nickname MASTER in the database.\n\n")
                return;
                }
```

```
                temp_prod_grp   = gpalloc(1024);
                smaketab(&temp_prod_table, temp_prod_group, FALSE);
                while (this_group != NULL) {
                        for (this_group_prod = this_group->products;
                                this_group_prod != NULL;
                                this_group_prod = this_group_prod->next) {
                                shashinsert((pointer)this_group_prod->description,
                                        temp_prod_table, this_group_prod->product_code, 0);
                        }
                        this_group = this_group->next;
                } for (this_product = all_products;  this_product != NULL;
                        this_product = this_product->next) {
                        if (! shashget((pointer *)&description, temp_prod_table,
                                this_product->product_code, 0)) {
                                printf(
"cd_mapper:      WARNING...product %s not found in authgroup data in prescription file.'
                                        this_product->product_code);
                                printf(
"cd_mapper:      Thus, no product description for it will be included on the CD-ROM.\n"
                                printf(
"cd_mapper:      Try adding the product code to the nickname MASTER in the database.\n\)
                        }
                        else this_product->product_description = description;

/* make sure the product description doesn't damage the
                           cd_lookup file syntax later... */
                        for (cp = this_product->product_description;
                                *cp != '\0'; cp++) {
                                if (*cp == ';') *cp = ':';
                        }
                }
                gpfree(temp_prod_group);
        }
/*------------------------------------------------------------*
 *
 *------------------------------------------------------------*/
static product *get_job_definition_from_prescription_file()
        {
        product *all_products;

load_prescription_info();
        all_products = get_list_of_products_and_locations();
        load_product_descriptions(all_products);

return(all_products);
        }
```

- Page 5-

```
/*
 *  Definitions for cd_mapper
 */
#define CD_MAPPER_SUBJECT "CD-Mapper Failure"
/* must append job number to product lookup file name */
#define LOOKUP_FILE_PATH "/w/aspen/jobs/"
#define LOOKUP_FILE_NAME "/prod_lookup."
#define CD_LOOKUP_FILE_NAME "/cd_lookup."
#define README_FILE_NAME "/README."
#define JOB_FILE_NAME    "/job."

/* definition of the data structure passed into
 * the partitioning algorithm
 */
typedef struct location_struct {
        char *root_path; /* includes trailing '/' */
        char *relative_path;
        struct location_struct *next;
        } location;

typedef struct product_struct {
        char *product_code;
        char *product_description;
        location *location_list;
        struct product_struct *next;
        } product;
```

```
/*---------------------           -------------------------          ------------------------
**
** module    : cd_parser
**
** purpose   : provide all functions to parser CD ROM related files
**             which defined in cd-rom.h - YMTRANS_TBL, LOOKUP, CD_VOLUME,
**             SITE_CONFIG
**
** author    : Eric J. Chang
**
** date      : Feb. 15 1991
**
** entry points : ym_parser(YMTRANS_TBL *ym_ptr)
**
**                cd_volume_parser(CD_VOLUME *cd_volume_ptr)
**
**                site_config_parser(SITE_CONFIG *site_config_ptr)
**
**                lookup_parser(LOOKUP *lookup_ptr)
**
**----------------------------------------------------------------------------*/ include      "cd-rom.h"

extern SITE_CONFIG site_config;
extern LOOKUP      product_lookup;
extern LOOKUP      cd_lookup;
extern CD_VOLUME   cd_volume;
extern YMTRANS_TBL ym_trans;
extern int         tok;
extern int lex_tdecrypt_file();
extern int lex_decrypt_file();

hash_table encrypt_key_ht;

/*-------------------------------------------------------------------------
** function : build_ym_node()
** purpose  : build a YM_REC for YMTRANS_TBL
**------------------------------------------------------------------------*/ static int build_ym_node(ym_ptr)
YMTRANS_TBL *ym_ptr;
{
YM_REC *ym_rec;

/*--------------------------------
    ** get and initialize 1 YM_REC
    **-----------------------------*/ ym_rec=(YM_REC *) qalloc(sizeof(YM_REC),ym_ptr->ym_mem);
    ym_rec->file_type = NULL;
    ym_rec->trans_name = NULL;
    ym_rec->original_name = NULL;

/*----------------------
    ** file_type
    **-------------------*/ ym_rec->file_type = (char *) qalloc((unsigned)strlen(ym_ptr->ym_tstr) + 1,
            ym_ptr->ym_mem);
    strcpy(ym_rec->file_type,ym_ptr->ym_tstr);

if ((tok=lexget(ym_ptr->ym_tstr)) == EOF) {
        printf("Error parsing cd_lookup (1)\n");
        return(FALSE);
```

— PAGE 7 —

```
    }

/*--------------------
    ** trans_name
    **-------------------*/ ym_rec->trans_name = (char *) qalloc((unsigned)strlen(ym_ptr->ym_tstr) + 1,
                ym_ptr->ym_mem);
    strcpy(ym_rec->trans_name,ym_ptr->ym_tstr);

/*--------------------
    ** original_name
    **-------------------*/ if ((tok=lexget(ym_ptr->ym_tstr)) == EOF) {
        printf("Error parsing cd_lookup (2)\n");
        return(FALSE);
    } ym_rec->original_name = (char *) qalloc(
                (unsigned)strlen(ym_ptr->ym_tstr) + 1,ym_ptr->ym_mem);
    strcpy(ym_rec->original_name,ym_ptr->ym_tstr);

shashinsert((pointer)ym_rec, ym_ptr->ym_ht, ym_rec->original_name, 0);

return(TRUE);

}
/*-----------------------------------------------------------------------
** function : build_cd_volume_cd_id()
** purpose  : build cd_id for CD_VOLUME
**----------------------------------------------------------------------*/ static int build_cd_volume_cd_id(cd_volume_ptr)
CD_VOLUME *cd_volume_ptr;
{
    switch(tok=lexget(cd_volume_ptr->cd_volume_tstr)) {
        case tok_identifier :
            break;
        default :
            printf("Error parsing cd_lookup (3)\n");
            return(FALSE);
    } cd_volume_ptr->cd_id = (char *) qalloc((unsigned)
        strlen(cd_volume_ptr->cd_volume_tstr) + 1,cd_volume_ptr->cd_volume_mem);

strcpy(cd_volume_ptr->cd_id,cd_volume_ptr->cd_volume_tstr);
    tok = lexget(cd_volume_ptr->cd_volume_tstr);
    if (tok != tok_terminator) {
        printf("Error parsing cd_volume (1)\n");
        return(FALSE);
    } return(TRUE);
}

/*-----------------------------------------------------------------------
** function : build_volume_no()
** purpose  : build volume_no for CD_VOLUME
**----------------------------------------------------------------------*/ static int build_volume_no(cd_volume_ptr)
```

```
                              ptr
                               \
CD_VOLUME *cd_volume_   t;
{
    switch(tok=lexget(cd_volume_ptr->cd_volume_tstr)) {
        case tok_identifier :
            break;
        default     :
            printf("Error parsing cd_volume (2)\n");
            return(FALSE);
    } sscanf(cd_volume_ptr->cd_volume_tstr,"%d",&(cd_volume_ptr->volume_no));
    tok = lexget(cd_volume_ptr->cd_volume_tstr);
    if (tok != tok_terminator) {
        printf("Error parsing cd_volume (3)\n");
        return(FALSE);
    }
    return(TRUE);
}

/*------------------------------------------------------------------------
** function : build_site_config_cd_id()
** purpose  : build cd_id for SITE_CONFIG
**----------------------------------------------------------------------*/ static int build_site_config_cd_id(site_config_ptr)
SITE_CONFIG *site_config_ptr;
{
    switch(tok=lexget(site_config_ptr->site_config_tstr)) {
        case tok_identifier :
            break;
        default     :
            printf("Error parsing site_config (1)\n");
            return(FALSE);
    } site_config_ptr->cd_id = (char *) qalloc((unsigned)
        strlen(site_config_ptr->site_config_tstr) + 1,site_config_ptr->site_config strcpy(site_config_ptr->cd_id,site_config_ptr->site_config_tstr);
    tok = lexget(site_config_ptr->site_config_tstr);
    if (tok != tok_terminator) {
        printf("Error parsing site_config (2)\n");
        return(FALSE);
    } return(TRUE);
}

/*------------------------------------------------------------------------
** function : build_lookup_cd_id()
** purpose  : build cd_id for LOOKUP
**----------------------------------------------------------------------*/ static int build_lookup_cd_id(lookup_ptr)
LOOKUP *lookup_ptr;
{
    switch(tok=lexget(lookup_ptr->lookup_tstr)) {
        case tok_identifier :
            break;
        default     :
            printf("Error parsing cd_lookup (4)\n");
            return(FALSE);
    } lookup_ptr->cd_id = (char *) qalloc(
```

```
                  (unsigned)strlen(lookup_ptr->lookup_str) + 1,
           /* p-t */
        lookup_ptr->lookup_mem);
    strcpy(lookup_ptr->cd_id,lookup_ptr->lookup_tstr);

tok = lexget(lookup_ptr->lookup_tstr);
    if (tok != tok_terminator) {
        printf("Error parsing cd_lookup (5)\n");
        return(FALSE);
    }
    return(TRUE);
} static int load_class_key(site_config_ptr)
SITE_CONFIG *site_config_ptr;
{
char *class_name, *encryption_key;

tok = lexget(site_config_ptr->site_config_tstr);
    if (tok != tok_identifier) {
        printf("Error parsing site_config (3)\n");
        return(FALSE);
        }
    class_name = (char *)qalloc((unsigned)
        strlen(site_config_ptr->site_config_tstr)+1,
         site_config_ptr->site_config_mem);
    strcpy(class_name, site_config_ptr->site_config_tstr);

tok = lexget(site_config_ptr->site_config_tstr);
    if (tok != tok_identifier) {
        printf("Error parsing site_config (4)\n");
        return(FALSE);
        }
    encryption_key = (char *)qalloc((unsigned)
        strlen(site_config_ptr->site_config_tstr)+1,
         site_config_ptr->site_config_mem);
    strcpy(encryption_key, site_config_ptr->site_config_tstr);

tok = lexget(site_config_ptr->site_config_tstr);
    if (tok != tok_terminator) {
        printf("Error parsing site_config (5)\n");
        return(FALSE);
        } shashinsert((pointer)encryption_key, encrypt_key_ht,
        class_name, 0);

return(TRUE);
}

/*---------------------------------------------------------------------
** function : build_cpu_list()
** purpose  : build site_cpu_ht for SITE_CONFIG
**-------------------------------------------------------------------*/ static int build_cpu_list(site_config_ptr)
SITE_CONFIG *site_config_ptr;
{
    while((tok = lexget(site_config_ptr->site_config_tstr)) != EOF) {
        switch(tok) {
            case tok_terminator :
                break;
            case tok_identifier :
                if (!get_cpu_node(site_config_ptr)) return(FALSE);
                break;
            default :
                printf("Error parsing site_config (6)\n");
```

```
            return(FALSE);
        }
        if (tok == tok_terminator) break;
    }
    return(TRUE);
}

/*-------------------------------------------------------------------
** function : get_cpu_node()
** purpose  : insert 1 cpu into site_cpu_ht for SITE_CONFIG
**            called by build_cpu_list()
**----------------------------------------------------------------*/ static int get_cpu_node(site_config_ptr)
SITE_CONFIG *site_config_ptr;
{
CPU_ID *cpu_ptr;

cpu_ptr=(char *) qalloc((unsigned)
        strlen(site_config_ptr->site_config_tstr)+1,
        site_config_ptr->site_config_mem);

strcpy(cpu_ptr,site_config_ptr->site_config_tstr);

if (is_hex_str(cpu_ptr) == FALSE) {
        printf("Error parsing site config (7)\n");
        return(FALSE);
    } shashinsert((pointer)cpu_ptr, site_config_ptr->site_cpu_ht, cpu_ptr, 0);
    return(TRUE);
}

/*-------------------------------------------------------------------
** function : build_product_list()
** purpose  : build site_product_ht for SITE_CONFIG
**----------------------------------------------------------------*/ static int build_product_list(site_config_ptr)
SITE_CONFIG *site_config_ptr;
{
    while((tok = lexget(site_config_ptr->site_config_tstr)) != EOF) {
        switch(tok) {
            case tok_terminator :
                break;
            case tok_identifier :
                if(!get_product_node(site_config_ptr))
                    return(FALSE);
                break;
            default     :
                printf("Error parsing site_config (8)\n");
                return(FALSE);
        }
        if (tok == tok_terminator) break;
    }
    return(TRUE);
}

/*-------------------------------------------------------------------
** function : get_product_node()
** purpose  : insert 1 entro into site_product_ht for SITE_CONFIG
**            called by build_product_list()
**----------------------------------------------------------------*/
```

```
static int get_product_node(site_config_ptr)
SITE_CONFIG *site_config_ptr;
{
PRODUCT_CODE *product_ptr;

product_ptr=(char *) qalloc((unsigned)
        strlen(site_config_ptr->site_config_tstr)+1,
        site_config_ptr->site_config_mem);
    strcpy(product_ptr,site_config_ptr->site_config_tstr);

shashinsert((pointer)product_ptr,
        site_config_ptr->site_product_ht, product_ptr, 0);

return(TRUE);
}

/*------------------------------------------------------------------------
** function : build_class()
** purpose  : build class_ht for LOOKUP
**----------------------------------------------------------------------*/ static int build_class(lookup_ptr)
LOOKUP *lookup_ptr;
{
CLASS     *class_ptr,
          *get_class_node();
FILE_LIST *file_ptr,
          *get_file_node(),
          *file_head,
          *file_tail;

/*-----------------------------------
    ** build CLASS node except file_list
    **---------------------------------*/ if ((class_ptr=get_class_node(lookup_ptr)) == NULL)
        return(FALSE);

/*-----------------------------------
    ** build FILE_LIST for CLASS
    **---------------------------------*/ file_head = NULL;
    file_tail = NULL;

while((tok = lexget(lookup_ptr->lookup_tstr)) != EOF) {
        switch(tok) {
            case tok_terminator :
                break;
            case tok_identifier :
                file_ptr = get_file_node(lookup_ptr);
                if (file_head == NULL) {
                    file_head = file_ptr;
                    file_tail = file_ptr;
                }
                else {
                    file_tail->next = file_ptr;
                    file_tail = file_ptr;
                }
                break;
            default    :
                printf("Error parsing cd_lookup (6)\n");
                exit(99);
        }
        if (tok == tok_terminator) break;
```

```
        }                               list
        class_ptr->file_list = file_head;

shashinsert((pointer)class_ptr, lookup_ptr->class_ht,
            class_ptr->class_name, 0);

return(TRUE);
}

/*--------------------------------------------------------------------
** function : get_file_node()
** purpose  : get 1 FILE_LIST for LOOKUP
**            called by build_class()
**------------------------------------------------------------------*/ static FILE_LIST *get_file_node(lookup_ptr)
LOOKUP *lookup_ptr;
{
        FILE_LIST *file_ptr;

file_ptr = (FILE_LIST *) qalloc(sizeof(FILE_LIST),lookup_ptr->lookup_mem);
        file_ptr->file_name = NULL;
        file_ptr->next = NULL;

file_ptr->file_name = (char *)qalloc(
                    (unsigned)strlen(lookup_ptr->lookup_tstr) + 1,
            lookup_ptr->lookup_mem);
        strcpy(file_ptr->file_name,lookup_ptr->lookup_tstr);

return(file_ptr);

}

/*--------------------------------------------------------------------
** function : get_class_node()
** purpose  : build 1 CLASS for LOOKUP
**            called by build_class()
**------------------------------------------------------------------*/ static CLASS *get_class_node(lookup_ptr)
LOOKUP *lookup_ptr;
{
        CLASS *class_ptr;

/*------------------------
        ** get CLASS node
        **----------------------*/ switch(tok=lexget(lookup_ptr->lookup_tstr)) {
            case tok_identifier :
                break;
            default         :
                printf("Error parsing cd_lookup (7)\n");
                return((CLASS *)NULL);
        } class_ptr=(CLASS *)qalloc(sizeof(CLASS),lookup_ptr->lookup_mem);

class_ptr->class_name = NULL;
        class_ptr->key = NULL;
        class_ptr->file_list = NULL;

/*------------------------
        ** class_name
        **---------------------*/
```

- Page 13 -

```
                                                    unsigned
                                                       ^
    class_ptr->class_name = (char *) qalloc((unsigned)
            strlen(lookup_ptr->lookup_tstr) + 1,lookup_ptr->lookup_mem);
    strcpy(class_ptr->class_name,lookup_ptr->lookup_tstr);

/*---------------------
    ** key
    **---------------------*/ switch(tok=lexget(lookup_ptr->lookup_tstr)) {
        case tok_identifier :
            break;
        default             :
            printf("Error parsing cd_lookup (8)\n");
            return((CLASS *)NULL);
    }
    class_ptr->key = (char *) qalloc((unsigned)
            strlen(lookup_ptr->lookup_tstr) + 1,lookup_ptr->lookup_mem);
    strcpy(class_ptr->key,lookup_ptr->lookup_tstr);

return(class_ptr);
}

/*------------------------------------------------------------------
** function : build_tar_file()
** purpose  : build TAR_FILE for LOOKUP
**------------------------------------------------------------------*/ static int build_tar_file(lookup_ptr)
LOOKUP *lookup_ptr;
{
TAR_FILE *tar_file_ptr, *get_tar_file_node();

if ((tar_file_ptr=get_tar_file_node(lookup_ptr)) == NULL)
        return(FALSE);
    shashinsert((pointer)tar_file_ptr, lookup_ptr->tar_file_ht,
        tar_file_ptr->tar_file_name, 0);
    return(TRUE);
}

/*------------------------------------------------------------------
** function : get_tar_file_node()
** purpose  : build 1 TAR_FILE for LOOKUP
**            called by build_tar_file()
**------------------------------------------------------------------*/ static TAR_FILE *get_tar_file_node(lookup_ptr)
LOOKUP *lookup_ptr;
{
TAR_FILE *tar_file_ptr;
int      i;

tar_file_ptr = (TAR_FILE *) qalloc(sizeof(TAR_FILE),lookup_ptr->lookup_mem);
    tar_file_ptr->tar_file_name = NULL;
    tar_file_ptr->volume = 0;
    tar_file_ptr->size = 0;
    tar_file_ptr->path_no = 0;

for (i=0;i<4;i++) {
        switch(tok=lexget(lookup_ptr->lookup_tstr)) {
            case tok_identifier :
                switch(i) {
                    case 0:
                        tar_file_ptr->tar_file_name=(char *) qalloc((unsigned
                            strlen(lookup_ptr->lookup_tstr)+1,lookup_ptr->lo
```

— Page 14 —

```
                            strcpy(tar_file_ptr->  r_file_name,lookup_ptr->lookup
                            break;
                        case 1:
                            sscanf(lookup_ptr->lookup_tstr,"%d",&(tar_file_ptr->v
                            break;
                        case 2:
                            sscanf(lookup_ptr->lookup_tstr,"%d",&(tar_file_ptr->s
                            break;
                        case 3:
                            sscanf(lookup_ptr->lookup_tstr,"%d",&(tar_file_ptr->p
                            break;
                        default :
                            printf("Error parsing cd_lookup (9)\n");
                            return((TAR_FILE *) NULL);
                    }
                    break;
                default     :
                    printf("Error parsing cd_lookup (10)\n");
                    return((TAR_FILE *) NULL);
            }
        } if ((tok = lexget(lookup_ptr->lookup_tstr)) != tok_terminator) {
            printf("Error parsing cd_lookup (11)\n");
            return((TAR_FILE *) NULL);
        } return(tar_file_ptr);
}

/*-------------------------------------------------------------------------
** function : build_product_map()
** purpose  : build PRODUCT_MAP for LOOKUP
**-----------------------------------------------------------------------*/
static int build_product_map(lookup_ptr)
LOOKUP *lookup_ptr;
{
PRODUCT_MAP         *product_map_ptr,
                    *get_product_map_node();
PRODUCT_CLASS_LIST  *product_class_ptr,
                    *get_product_class_ptr(),
                    *product_class_head,
                    *product_class_tail,
                    *get_product_class_node();

/*-----------------------------------
    ** get PRODUCT_MAP node
    **---------------------------------*/
    if ((product_map_ptr = get_product_map_node(lookup_ptr)) == NULL) {
        return(FALSE);
    };

/*-----------------------------------
    ** get PRODUCT_CLASS_LIST for PRODUCT_MAP
    **---------------------------------*/
    product_class_head = NULL;
    product_class_tail = NULL;
    while((tok = lexget(lookup_ptr->lookup_tstr)) != EOF) {
        switch(tok) {
            case tok_identifier :
            case tok_terminator :
                break;
            default     :
                printf("Error parsing cd_lookup (12)\n");
```

```
                        return
                    ↑
              ↗  ↘(FALSE);
            }
            if (tok == tok_terminator) break;
            product_class_ptr = get_product_class_node(lookup_ptr);
            if (product_class_head == NULL) {
                product_class_head = product_class_ptr;
                product_class_tail = product_class_ptr;
            }
            else {
                product_class_tail->next = product_class_ptr;
                product_class_tail = product_class_ptr;
            }
        } product_map_ptr->product_class_list = product_class_head;

shashinsert((pointer)product_map_ptr,
            lookup_ptr->product_map_ht,
            product_map_ptr->product_code, 0);

return(TRUE);
}

/*----------------------------------------------------------------------
** function : get_product_map_node()
** purpose  : get 1 PRODUCT_MAP node
**            called by build_product_map()
**--------------------------------------------------------------------*/ static PRODUCT_MAP *get_product_map_node(lookup_ptr)
LOOKUP *lookup_ptr;
{
        PRODUCT_MAP *product_map_ptr;

product_map_ptr = (PRODUCT_MAP *) qalloc(
                sizeof(PRODUCT_MAP),lookup_ptr->lookup_mem);

product_map_ptr->product_code = NULL;
        product_map_ptr->product_description = "---";
        product_map_ptr->product_class_list = NULL;

switch(tok=lexget(lookup_ptr->lookup_tstr)) {
            case tok_terminator :
            case EOF            :
                product_map_ptr = NULL;
                return(product_map_ptr);
            case tok_identifier :
                break;
            default             :
                printf("Error parsing cd_lookup (13)\n");
                return((PRODUCT_MAP *) NULL);
        } product_map_ptr->product_code = (char *) qalloc((unsigned)
            strlen(lookup_ptr->lookup_tstr) + 1,lookup_ptr->lookup_mem);
        strcpy(product_map_ptr->product_code,lookup_ptr->lookup_tstr);

return(product_map_ptr);
}

/*----------------------------------------------------------------------
** function : get_product_class_node()
** purpose  : get 1 PRODUCT_CLASS_LIST for PRODUCT_MAP
```

```
**              called    build_product_map()
**----------------------------------------------------------------------*/ static PRODUCT_CLASS_LIST *get_product_class_node(lookup_ptr)
LOOKUP *lookup_ptr;
{
    PRODUCT_CLASS_LIST *product_class_ptr;

product_class_ptr = (PRODUCT_CLASS_LIST *) qalloc(
        sizeof(PRODUCT_CLASS_LIST),lookup_ptr->lookup_mem);
    product_class_ptr->product_class_name = NULL;
    product_class_ptr->next = NULL;

product_class_ptr->product_class_name = (char *)qalloc((unsigned)
        strlen(lookup_ptr->lookup_tstr) + 1,lookup_ptr->lookup_mem);
    strcpy(product_class_ptr->product_class_name,lookup_ptr->lookup_tstr);

return(product_class_ptr);
}

/*-----------------------------------------------------------------------
** function : init_lookup_parser()
** purpose  : initialize LOOKUP structure
**----------------------------------------------------------------------*/ static int init_lookup_parser(lookup_ptr, decrypt_the_data)
LOOKUP *lookup_ptr;
boolean decrypt_the_data;
{
    lookup_ptr->lookup_mem = gpalloc(1024);
    lookup_ptr->lookup_tstr = lexcreate(lookup_ptr->lookup_mem,
         "",LEX_ERROR,EOF,tok_identifier,tok_identifier,tok_identifier);

smaketab(&(lookup_ptr->product_map_ht),lookup_ptr->lookup_mem,FALSE);
    smaketab(&(lookup_ptr->class_ht),lookup_ptr->lookup_mem,FALSE);
    smaketab(&(lookup_ptr->tar_file_ht),lookup_ptr->lookup_mem,FALSE);

lexreswd(lookup_ptr->lookup_tstr,"cd_id",tok_cd_id);
    lexreswd(lookup_ptr->lookup_tstr,"cpu_list",tok_cpu_list);
    lexreswd(lookup_ptr->lookup_tstr,"product_list",tok_product_list);
    lexreswd(lookup_ptr->lookup_tstr,"product",tok_product);
    lexreswd(lookup_ptr->lookup_tstr,"product_description",tok_prod_desc);
    lexreswd(lookup_ptr->lookup_tstr,"class",tok_class);
    lexreswd(lookup_ptr->lookup_tstr,"file",tok_file);
    lexreswd(lookup_ptr->lookup_tstr,";",tok_terminator);
    lexletter(lookup_ptr->lookup_tstr, 0, "-.");

if (decrypt_the_data)
        lexopen(lookup_ptr->lookup_tstr, lex_decrypt_file,
                lookup_ptr->lookup_fp);
    else lexopen(lookup_ptr->lookup_tstr, lex_file,
                lookup_ptr->lookup_fp);

return(TRUE);
}

/*-----------------------------------------------------------------
 * define this buffer to be however long a product description can be
 * 256 chars is safe because this is the longest text string size
 * in Sybase for storing the product descriptions
 *----------------------------------------------------------------*/
#define THISBUFSIZE 257
static load_prod_desc(lookup_ptr)
LOOKUP *lookup_ptr;
{
    PRODUCT_MAP *product_map_ptr;
```

```
        char *prod_desc;
        char buffer[THISBUFSIZE];
            char current_product_code[BUFSIZE];

tok = lexget(lookup_ptr->lookup_tstr);
        if (tok == tok_identifier) {
                    strcpy(current_product_code, lookup_ptr->lookup_tstr);
                    }
            else {
                    printf("Error parsing cd_lookup (14)\n");
                    return(FALSE);
                    } lexgrab(buffer, "IN;", THISBUFSIZE-1, lookup_ptr->lookup_tstr);
        if (shashget((pointer *)&product_map_ptr,
            lookup_ptr->product_map_ht, current_product_code, 0)) {
            prod_desc = (char *)qalloc((unsigned)strlen(buffer)+1,
                lookup_ptr->lookup_mem);
            strcpy(prod_desc, buffer);
            product_map_ptr->product_description = prod_desc;
            }
            return(TRUE);
    }
/*--------------------------------------------------------------------
** function : lookup_parser()
** purpose  : parse LOOKUP structure
**------------------------------------------------------------------*/ lookup_parser(lookup_ptr, decrypt_the_data)
LOOKUP *lookup_ptr;
boolean decrypt_the_data;
{
    init_lookup_parser(lookup_ptr, decrypt_the_data);
    while((tok = lexget(lookup_ptr->lookup_tstr)) != EOF) {
        switch(tok) {
                case tok_cd_id :
                    if (!build_lookup_cd_id(lookup_ptr))
                        return(FALSE);
                    break;
                case tok_product:
                    if(!build_product_map(lookup_ptr))
                        return(FALSE);
                    break;
                case tok_prod_desc:
                    if (!load_prod_desc(lookup_ptr)) return(FALSE);
                    break;
                case tok_class:
                    if(!build_class(lookup_ptr))
                        return(FALSE);
                    break;
                case tok_file:
                    if(!build_tar_file(lookup_ptr))
                        return(FALSE);
                    break;
                default:
                    printf("Error parsing cd_lookup (15)\n");
                    return(FALSE);
            }
        }
        return(TRUE);
}

/*--------------------------------------------------------------------
** function : parser_err()
** purpose  :
```

— Page 18 —

```
**--------------------   --------------------------  ---------------------*/ static int parser_err()
{
    printf("Error parsing site_config file (10)\n");
    exit(99);
}
/*-----------------------------------------------------------------------
** function : init_site_config_parser()
** purpose  : initialize SITE_CONFIG parser
**----------------------------------------------------------------------*/ static int init_site_config_parser(site_config_ptr)
SITE_CONFIG *site_config_ptr;
{
    site_config_ptr->site_config_mem = gpalloc(1024);
    site_config_ptr->site_config_tstr = lexcreate(
            site_config_ptr->site_config_mem, "", LEX_ERROR, EOF,
        tok_identifier, tok_identifier, tok_identifier);

smaketab(&(site_config_ptr->site_product_ht),site_config_ptr->site_config_mem,1
    smaketab(&(site_config_ptr->site_cpu_ht),site_config_ptr->site_config_mem,FALSI
    smaketab(&encrypt_key_ht, site_config_ptr->site_config_mem, FALSE);

lexreswd(site_config_ptr->site_config_tstr,"cd_id",tok_cd_id);
    lexreswd(site_config_ptr->site_config_tstr,"cpu_list",tok_cpu_list);
    lexreswd(site_config_ptr->site_config_tstr,"product_list",tok_product_list);
    lexreswd(site_config_ptr->site_config_tstr,"product",tok_product);
    lexreswd(site_config_ptr->site_config_tstr,"class",tok_class);
    lexreswd(site_config_ptr->site_config_tstr,"file",tok_file);
    lexreswd(site_config_ptr->site_config_tstr,"end",tok_end);
    lexreswd(site_config_ptr->site_config_tstr,";",tok_terminator);

lexletter(site_config_ptr->site_config_tstr,0,"-.");

lexopen(site_config_ptr->site_config_tstr, lex_tdecrypt_file,
                site_config_ptr->site_config_fp);
/*
    lexerrfunc(site_config_ptr->site_config_tstr, parser_err);
*/ return(TRUE);

}

/*-----------------------------------------------------------------------
** function : site_config_parser()
** purpose  : parse the site_config file into SITE_CONFIG
**----------------------------------------------------------------------*/ site_config_parser(site_config_ptr)
SITE_CONFIG *site_config_ptr;
{
int   end_tag;

end_tag = 0;
    init_site_config_parser(site_config_ptr);
    while((tok = lexget(site_config_ptr->site_config_tstr)) != EOF) {
        switch(tok) {
            case tok_cd_id      :
                if (!build_site_config_cd_id(site_config_ptr))
                    return(FALSE);
                if ( end_tag == 1 )
```

- Page 19 -

```
                    return(FALSE);
                break;
            case tok_product_list :
                if (!build_product_list(site_config_ptr))
                    return(FALSE);
                if ( end_tag == 1 )
                    return(FALSE);
                break;
            case tok_cpu_list     :
                if (!build_cpu_list(site_config_ptr))
                    return(FALSE);
                if ( end_tag == 1 )
                    return(FALSE);
                break;
            case tok_class        :
                if (!load_class_key(site_config_ptr))
                    return(FALSE);
            case tok_end          :
                end_tag = 1;
                break;
            default :
                printf("Error parsing site_config file (9)\n");
                return(FALSE);
        }
    } return( (end_tag == 0) ? FALSE : TRUE);

}

/*----------------------------------------------------------------------
** function : init_cd_volume_parser()
** purpose  : initialize cd_volume_parser()
**----------------------------------------------------------------------*/ static int init_cd_volume_parser(cd_volume_ptr)
CD_VOLUME *cd_volume_ptr;
{
    cd_volume_ptr->cd_volume_mem = gpalloc(1024);
    cd_volume_ptr->cd_volume_tstr = lexcreate(cd_volume_ptr->cd_volume_mem,"",LEX_]

lexreswd(cd_volume_ptr->cd_volume_tstr,"cd_id",tok_cd_id);
    lexreswd(cd_volume_ptr->cd_volume_tstr,"volume_no",tok_cd_volume);
    lexreswd(cd_volume_ptr->cd_volume_tstr,";",tok_terminator);

lexletter(cd_volume_ptr->cd_volume_tstr,0,"-.");

lexopen(cd_volume_ptr->cd_volume_tstr,lex_file,cd_volume_ptr->cd_volume_fp);

return(TRUE);
}

/*----------------------------------------------------------------------
** function : cd_volume_parser()
** purpose  : build CD_VOLUME structure
**            cd_volume file has two lines :
**                   cd_id <job_id>;
**                   volume_no <no>;
**----------------------------------------------------------------------*/ cd_volume_parser(cd_volume_ptr)
CD_VOLUME *cd_volume_ptr;
{
```

```
                                    PARSER
        init_cd_volume_t    ser(cd_volume_ptr);
        while((tok = lexget(cd_volume_ptr->cd_volume_tstr)) != EOF) {
            switch(tok) {
                case tok_cd_id        :
                    if (!build_cd_volume_cd_id(cd_volume_ptr))
                        return(FALSE);
                    break;
                case tok_cd_volume :
                    if (!build_volume_no(cd_volume_ptr)) return(FALSE);
                    break;
                default :
                    printf("Error parsing cd_lookup (17)\n");
                    return(FALSE);
            }
        }
        return(TRUE);

}

/*-------------------------------------------------------------------------
** function : init_ym_parser()
** purpose  : initialize yp parser
**-----------------------------------------------------------------------*/ static int init_ym_parser(ym_ptr)
YMTRANS_TBL *ym_ptr;
{
    ym_ptr->ym_mem = gpalloc(1024);
    ym_ptr->ym_tstr = lexcreate(ym_ptr->ym_mem,"",LEX_ERROR,EOF,tok_identifier,tok_

/*---------------------------------------------
    ** set . and ; as general characters
    ** otherwise, filename cannot have . and ; which
    ** appear in YMTRANS.TBL
    *--------------------------------------------*/ lexletter(ym_ptr->ym_tstr,0,".;");

smaketab(&(ym_ptr->ym_ht),ym_ptr->ym_mem,FALSE);
    lexopen(ym_ptr->ym_tstr,lex_file,ym_ptr->ym_fp);

return(TRUE);
}

/*-------------------------------------------------------------------------
** function : ym_parser()
** purpose  : read young mind translation table into struct YMTRANS_TBL
**-----------------------------------------------------------------------*/ ym_parser(ym_ptr)
YMTRANS_TBL *ym_ptr;
{ init_ym_parser(ym_ptr);

while((tok = lexget(ym_ptr->ym_tstr)) != EOF) {
        if (!build_ym_node(ym_ptr))
            return(FALSE);
    } return(TRUE);

}
```

```
/* ------------------       --------------------------    --------------*
 * program: cd_mapper: cd_partition.c
 * purpose: cd_mapper takes a job definition for producing CD-ROM
 *          inventory and produces an MPS file and other information
 *          for the cd_master program for generating master tapes for
 *          a CD-ROM manufacturer.
 *
 *          cd_partition.c is the code to take a list of relative paths
 *          for directories and files (which make up products) and
 *          checks all files, gets their sizes, and partitions them into
 *          individual file sets.
 * author:  James Bohannon
 * date:       1 Feb 91
 *
 * change history:
 *    date          name           description
 *    ---------------------------------------------------------------
 *
 *
 * Entry points:
 *     perform_mapping_and_generate_output_files(job_number, all_products)
 *
 * Conceptual overview:
 *     One set of CD-ROM volumes will contain all files for all
 *     products which were scheduled as a single CD-ROM inventory
 *     job.  A product is defined by its product code.
 *
 *     A product is a set of other (lower-level) products and/or
 *     "classes".  Classes are the sets of files such that every
 *     file belongs to exactly one class and every product is made
 *     up of one or more non-overlapping classes.  The division
 *     into classes is made in a way as to minimize the number of
 *     classes.  For example, for two products which share some
 *     files, there would be three classes:  One for the overlapping
 *     set of files, and one each for the unique files for each
 *     product.
 *
 *     Every class gets its own encryption code.  This way, a
 *     customer need only receive the encryption codes for the
 *     classes which make up the products he is entitled to.  The
 *     other classes remain securely on the CD-ROMs.
 *
 *     Each class is made up of one or more file sets.  The class
 *     is divided into multiple file sets to satisfy two contraints:
 *     (1)  To load, decrypt, and untar file sets (each file set is
 *     a tar file on the CD-ROM), the end-user must provide scratch
 *     file space on his hard-disk at least as big as the largest
 *     file set on the CD-ROM volumes.  Thus, large file sets are
 *     broken into smaller file sets to reduce the largest file set
 *     size below some maximum.  Of course, the smallest any file
 *     set can be is a single file, so a single large file may exceed
 *     the desired maximum.  (2)  All the files for a single class
 *     may not fit on a single CD-ROM volume (maximum 600 MB).
 *     Thus, a class may be broken into multiple file sets to allow
 *     different file sets to reside on different CD-ROM volumes.
 *
 *     A file set must fit completely onto a single CD-ROM volume.
 *     Its encryption code corresponds to the encryption code for
 *     the class it belongs to.
 *
 *     The directory of what class each file set belongs to and
 *     what classes comprise which products and what encryption
 *     keys to use for each one resides in the so-called
 *     product_lookup file.  The directory also shows which file
 *     sets are on which CD-ROM volume.
```

- Page 22 -

```
*          The MPS-form̂ᵃᵗ file which is the other ôût̂ᵖᵘᵗ of this
*          mapping process shows each file or directory name and
*          its file set name.  This MPS file, together with the
*          product_lookup file, form a complete CD-ROM layout
*          description.
*
*      Algorithm:
*          The input to the CD-ROM partitioning and mapping algorithm
*          is a list of product_codes, and for each product_code, a
*          list of full-path names (called "location"s) of the files
*          and/or directories which make up the product.  This list of
*          locations is obtained from the BOM table leaf-node locations
*          and the root paths of their corresponding environments.  The
*          root paths must also be available to identify different
*          directory trees later.
*
*          The next step is to build a tree of the actual on-disk
*          directory structures for each location, and to verify the
*          accessibility of all of the directories and files within
*          each location, and the total size of the subdirectories and
*          files for each location.
*
*          Next, the directory tree data structure is traversed for
*          each product code and every node in the structure is marked
*          with the product code.  The product_codes are kept as a
*          linked-list attached to the node in the tree.  Note that
*          there may be multiple directory trees, one for each separate
*          root path.
*
*          Next, the leaf nodes of each tree are traversed and a list
*          is made of every combination of product_codes which appear
*          at each leaf node.  Each combination is assigned a unique
*          "class" name.  At this point, all classes and their sizes are
*          known.
*
*          Next, unique encryption keys are assigned to each class.
*          If a previously-generated product_lookup file name has been
*          provided to cd_mapper, the encryption keys used for the
*          provided to cd_mapper, the encryption keys used for equivalent
*          classes are re-used.  Class names are matched between
*          different CD-ROM inventory by their product list membership.
*
*          Next, each class is examined, and the classes are divided
*          into separate file sets based on the root paths of the files
*          in the class, i.e. for each root path included by the class,
*          a separate file set is created.  This is for convenience in
*          creating tar files out of the file sets later in cd_master.
*
*          Next, each file set is examined , and for each file set which
*          exceeds the maximum permitted file set size, it is sub-
*          divided into multiple file sets, each less than the maximum
*          permitted file set size.  Note that the maximum size is a
*          parameter which is looked up in the aspen.config file.
*          The size of each individual file set is computed during
*          this step and stored.
*
*          The final partitioning step involves assigning each file
*          set to a CD-ROM volume.  An attempt is made to keep all file
*          sets for any given product on the same volume - so, each
*          product is examined in turn and its file sets are assigned
*          to the current volume until the total size of the file sets
*          on the volume would exceed the CD-ROM maximum volume size
*          (a parameter obtained from the aspen.config file).  Then,
*          the volume number is incremented and the process continues.
*
*          Note:  The maximum file set size parameter affects two things:
```

```
*       First, the smaller it is, the less working  qReq the end-user
*       needs.  Second, the smaller it is, the less wasted space on
*       each CD-ROM volume there will be.  However, a smaller figure
*       results in more tar files and slightly higher overhead in
*       the product_lookup file size and overhead to generate and
*       later to decrypt and untar the files.  A recommended maximum
*       file set size might be 40 MB, resulting in a typical CD-ROM
*       layout of between 12 and 17 file sets per volume.  Remember
*       that a file set will still exceed the 40 MB if it contains
*       a single file which exceeds 40 MB.
*
*       Finally, every file or directory in the directory trees
*       is output to the MPS-format file, along with the file set
*       name it was assigned.  The product_lookup file is generated
*       based on all of the product-class-file_set mapping and the
*       encryption keys assigned and file set sizes computed.
*
* ---------------------------------------------------------------*/
#include        <stdio.h>
#include        <errno.h>
#include        <sys/types.h>
#include        <sys/stat.h>
#include        <sys/time.h>
#include        <dirent.h>
#include        "lsisys.h"
#include        "ma.h"
#include        "lsigpal.h"
#include        "libdef.h"
#include        "lsitype.h"
#include        "lsinhsh.h"
#include        "lsisort.h"
#include        "lsilex.h"
#include        "mps.h"
#include        "mps_def.h"
#include        "mps_func.h"
#include        "environ.h"
#include        "aspen_notify.h"
#include        "aspen_config.h"
#include        "prescription.h"
#include        "cd_mapper.h"

static boolean debug = FALSE;

boolean fatal_error_occurred = FALSE;

extern char *program_name;
extern aspen_data *aspen_info;
extern char *reuse_prodlookup;
static char job_file_full_path[MAXFNAMESIZE+1];

#define ENCRYPTION_KEY_LENGTH 8 /* bytes */
static char encryption_alphabet[] = "0123456789ABCDEFGHJKLMNPQRSTUVWXY";
/* the constant key is used to suppress key info */
/* it uses a character which is not in the encryption_alphabet */
/* so that it won't get confused as a real key */
#define CONSTANT_KEY "ZZZZZZZZ"

typedef struct linked_list_struct {
        char *contents;
        struct linked_list_struct *next;
        } linked_list;

typedef struct product_member_struct {
        char *product_code;
        struct product_member_struct *next;
        } product_member;
```

```
#define PERMISSION_SIZE 10
#define UNKNOWN_NODE_TYPE 2
define EXPANDED_PARENT_NODE 3 typedef struct disk_node_struct {
        char *relative_path;
        struct tree_struct *root_tree;
        struct disk_node_struct *parent; /* NULL: top node */
        struct disk_node_struct *children; /* NULL: leaf node */
        struct disk_node_struct *sibling;
        int size_in_bytes; /* only for leaf nodes */
        /* prods which contain this node... */
        product_member *product_membership;
        short node_type;
        char permissions[PERMISSION_SIZE+1]; /* only for leaf nodes */
        } disk_node;

typedef struct tree_struct {
        char *root_path;
        int root_path_number;
        disk_node *directory_tree;
        struct tree_struct *next;
        } tree;

typedef struct file_set_member_struct {
        disk_node *leaf_node;
        struct file_set_member_struct *next;
        } file_set_member;

typedef struct file_set_struct {
        char *file_set_name;
        file_set_member *members;
        struct file_set_struct *next;
        int total_size_in_bytes;
        short volume_number;
        } file_set;

typedef struct class_struct {
        char *class_name;
        file_set *file_set_list; /* file sets within this class */
        product_member *product_list; /* products which contain this class */
        struct class_struct *next;
        char *encryption_key;
        } class;

/* this table stores the full paths of all nodes stored in
   all the directory trees, and pointers to the disk_node for each */
static FILE *new_key_prods_file;
static hash_table full_path_table;
static hash_table class_table;
static hash_table prod_loc_table;
static hash_table new_key_prods_table;
static memory_group path_group;
static memory_group misc_group;
static char *full_key;
static int file_set_number = 1;
static int root_path_number = 1;

static int class_number = 0;
static class *all_classes = NULL;
static char *cd_id;

/* for parsing the previous prod_lookup file */
static class *previous_classes = NULL;
static int tok;
```

```
                                        pncd
                                        /\
static tstream prev_t      t_tstr;  ⅃ line number
static int prev_prod_linenumber;
#define     TOK_CD_ID               1
#define     TOK_CPU_LIST            2
#define     TOK_PRODUCT_LIST        3
#define     TOK_PRODUCT             4
#define     TOK_CLASS               5
#define     TOK_FILE                6
#define     TOK_TERMINATOR          7
#define     TOK_IDENTIFIER          8
define     TOK_PRODUCT_DESC        9 extern char *strcpy(), *strcat(), *malloc();
extern long random(), time();

/*----------------------------------------------------------------*
 * Do all of the partitioning and mapping work and generate the
 * output files which are the input to cd_master.  The information
 * is passed into this function as a complex data struture which
 * has its types defined in cd_mapper.h (product_struct,
 * location_struct).
 *
 * The input to the CD-ROM partitioning and mapping algorithm
 * is a list of product_codes, and for each product_code,  a
 * list of full-path names (called "location"s) of the files
 * and/or directories which make up the product.  This list of
 * locations is obtained from the BOM table leaf-node locations
 * and the root paths of their corresponding environments.  The
 * root paths must also be available to identify different
 * directory trees later.
 *
 * All root paths must include the trailing '/' for this code to
 * work properly.
 *----------------------------------------------------------------*/
perform_mapping_and_generate_output_files(job_number, all_products)
char *job_number;
product *all_products;
        {
        cd_id = job_number;
        init_new_key_prods_reporting();
        build_directory_trees(all_products);
        mark_products_in_trees(all_products);
        assign_classes_by_product_overlap();
        assign_encryption_keys_to_each_class();
        assign_every_leaf_disk_node_to_a_class();
        assign_file_sets_based_on_root_paths();
        subdivide_file_sets_based_on_size();
        assign_file_sets_to_cdrom_volumes();
        generate_mps_file(job_number);
        generate_product_lookup_file(job_number, all_products);
        generate_cd_lookup_file(job_number, all_products);
        generate_readme_file(job_number);
        printf("cd_mapper:   ...Finished mapping.\n");
        fclose(new_key_prods_file);
        }
/*----------------------------------------------------------------*
 * Build the multiple directory trees that make up all the
 * product locations.  While doing so, check the files on
 * disk and tally up their sizes.  There is a directory tree
 * for each root path.  Generally, the on-disk directoy tree
 * is not expanded down to the file-level.  Rather, expansion
 * is done only as far as needed to distinguish ownership between
 * different products of any given directory or file.  That is,
 * if a given directory or any of its subdirectories appears on
 * the location list of more than one product, then the directory
 * must be expanded to the next level down.  Whenever expansion
```

- Page 26 -

```
 *                     Next                                directories
 * is done to the new  level down, ALL files and d. stories at
 * that level for that directory are included into the directory
 * tree.              That
 *-------------------------------------------------------------------*/
static linked_list *parse_rel_path_into_segments(path)
char *path;
        {
        linked_list *all_segments, *segment, *last_seg;
        char *cp, *last_cp;

/* input is something like xx/yy/zz */
        /* output is linked list of xx->yy->zz */
        last_seg = NULL;
        last_cp = path;
        for (cp = path;  *cp != '\0';  cp++) {
                if (*cp == '/') {
                        *cp = '\0';
                        segment = (linked_list *)
                                malloc(sizeof(struct linked_list_struct));
                        segment->contents = (char *)malloc
                                ((unsigned)strlen(path)+1);
                        strcpy(segment->contents, path);
                        segment->next = NULL;
                        if (last_seg == NULL) all_segments = segment;
                        else last_seg->next = segment;
                        last_seg = segment;
                        *cp = '/';
                        path = cp+1;
                        last_cp = path;
                        }
                }
        segment = (linked_list *)
                malloc(sizeof(struct linked_list_struct));
        segment->contents = (char *)malloc((unsigned)strlen(last_cp)+1);
        strcpy(segment->contents, last_cp);
        segment->next = NULL;
        if (last_seg == NULL) all_segments = segment;
        else last_seg->next = segment;

return(all_segments);
        }
/*-------------------------------------------------------------------*/
static insert_loc_into_tree(this_loc, this_tree)
location *this_loc;
tree *this_tree;
        {
        disk_node *this_node, *new_node, *current_parent;
        linked_list *dir_segments;
        char this_level_rel_path[MAXFNAMESIZE+1];
        char full_path_name[MAXFNAMESIZE+1];

dir_segments = parse_rel_path_into_segments(this_loc->relative_path);

this_level_rel_path[0] = '\0';
        current_parent = NULL;
        while (dir_segments != NULL) {
                if (*this_level_rel_path != '\0')
                        strcat(this_level_rel_path, "/");
                strcat(this_level_rel_path, dir_segments->contents);
                strcpy(full_path_name, this_tree->root_path);
                strcat(full_path_name, this_level_rel_path);

if (shashget((pointer *)&this_node, full_path_table,
                        full_path_name, 0)) {
                        current_parent = this_node;
                        }
                                        - Page 27 -
```

```
                else
                        new_node = (disk_node *)malloc  /* malloc */
                                (sizeof(struct disk_node_struct));
                        new_node->relative_path = (char *)malloc
                                ((unsigned)strlen(this_level_rel_path)+1);
                        strcpy(new_node->relative_path, this_level_rel_path);
                        new_node->size_in_bytes = -1;
                        new_node->node_type = UNKNOWN_NODE_TYPE;
                        new_node->product_membership = NULL;
                        *(new_node->permissions) = '\0';
                        new_node->children = NULL;
                        new_node->parent = current_parent;
                        new_node->root_tree = this_tree;

if (current_parent != NULL) {
                                new_node->sibling = current_parent->children;
                                current_parent->children = new_node;
                                }
                        else {
                                new_node->sibling = this_tree->directory_tree;
                                this_tree->directory_tree = new_node;
                                }
                        full_key = (char *)malloc((unsigned)strlen(full_path_name)+:
                        strcpy(full_key, full_path_name);
                        shashinsert((pointer)new_node, full_path_table,
                                full_key, 0);
                        current_parent = new_node;
                        }
                dir_segments = dir_segments->next;
                }
        }
/*-----------------------------------------------------------------*/
static build_trees_for_given_locations(product_list)
product *product_list;
        {
        tree *all_trees, *this_tree;
        location *this_loc;
        char *full_path;

all_trees = NULL;
        while (product_list != NULL) {
                for (this_loc = product_list->location_list;
                        this_loc != NULL;  this_loc = this_loc->next) {
                        full_path = (char *)malloc((unsigned)
                                strlen(this_loc->root_path) +
                                strlen(this_loc->relative_path) + 1);
                        strcpy(full_path, this_loc->root_path);
                        strcat(full_path, this_loc->relative_path);
                        shashinsert((pointer)NULL, prod_loc_table, full_path, 0);

/* usually there are only one or two roots */
                        for (this_tree = all_trees;  this_tree != NULL;
                                this_tree = this_tree->next) {
                                if (strcmp(this_loc->root_path,
                                        this_tree->root_path) == 0) break;
                                }
                        if (this_tree == NULL) {
                                this_tree = (tree *)
                                        malloc(sizeof(struct tree_struct));
                                this_tree->root_path = this_loc->root_path;
                                this_tree->directory_tree = NULL;
                                this_tree->root_path_number = root_path_number++;
                                this_tree->next = all_trees;
                                all_trees = this_tree;
                                }
                        insert_loc_into_tree(this_loc, this_tree);
```

```
                            }
                    product_list = product_list->next;
            }
    }
/*--------------------------------------------------------------*/
static insert_missing_children_for_this_parent(parent, parent_full_path)
disk_node *parent;
char *parent_full_path;
        {
        DIR *dirp;
        struct dirent *dp;
        disk_node *this_new_node;
        pointer unused;
        char full_path_name[MAXFNAMESIZE+1];

if ((dirp = opendir(parent_full_path)) == NULL) {
                fatal_error_occurred = TRUE;
                printf("cd_mapper:  Could not open the directory: %s\n",
                        parent_full_path);
                printf("cd_mapper:  Is a file system down or unmounted?\n");
                printf("cd_mapper:  No further processing will occur.\n");
                exit(1);
        } errno = 0;
        for (dp = readdir(dirp); dp != NULL; dp = readdir(dirp)) {
                if (strcmp(dp->d_name, ".") == 0) continue;
                if (strcmp(dp->d_name, "..") == 0) continue;
                strcpy(full_path_name, parent_full_path);
                strcat(full_path_name, "/");
                strcat(full_path_name, dp->d_name);

if (! shashget(&unused, full_path_table, full_path_name, 0)) {
                        this_new_node = (disk_node *)malloc
                                (sizeof(struct disk_node_struct));
                        this_new_node->parent = parent;
                        this_new_node->children = NULL;
                        this_new_node->node_type = UNKNOWN_NODE_TYPE;
                        this_new_node->size_in_bytes = -1;
                        this_new_node->product_membership = NULL;
                        *(this_new_node->permissions) = '\0';
                        this_new_node->root_tree = parent->root_tree;

this_new_node->relative_path = (char *)malloc((unsigned)
                                strlen(parent->relative_path)+strlen(dp->d_name)+2)
                        strcpy(this_new_node->relative_path, parent->relative_path)
                        strcat(this_new_node->relative_path, "/");
                        strcat(this_new_node->relative_path, dp->d_name);

this_new_node->sibling = parent->children;
                        parent->children = this_new_node;
                        full_key = (char *)malloc((unsigned)strlen(full_path_name)+
                        strcpy(full_key, full_path_name);
                        shashinsert((pointer)this_new_node, full_path_table,
                                full_key, 0);
                }
        }
        /* check whether readdir() failed to read all files in the directory */
        if (errno != 0) {
                fatal_error_occurred = TRUE;
                closedir(dirp);
                printf("cd_mapper:  Error reading files in directory %s\n",
                        parent_full_path);
                printf("cd_mapper:  Is a file system down or unmounted?\n");
                printf("cd_mapper:  No further processing will occur.\n");
                exit(1);
```

```
                }                (dirp)
        else closedir(dirp);
        }
/*----------------------------------------------------------------*/
static call_insert_missing_children(this_node, full_path, length)
disk_node *this_node;
char *full_path;
int length;
        {
        char *cp;
        pointer unused;
        char parent_full_path[MAXFNAMESIZE+1];

/* Note:  if the parent is NULL, this is the top node in the
              tree.  Theorem:  There will never be any (missing children
              belonging to a top disk_node) which also are included in
              one of the products.  Proof left to the reader.  But this
              means that parent==NULL can be skipped. */
        if ((this_node->children == NULL) &&
                (this_node->parent != NULL) &&
                (this_node->parent->node_type != EXPANDED_PARENT_NODE)) { strcpy(parent_full_path, full_path);
                cp = parent_full_path+strlen(parent_full_path)-1;
                while ((*cp != '/') && (*cp != '\0') &&
                        (cp != parent_full_path)) {
                        --cp;
                        }
                *cp = '\0';

/* only need to expand a node whose location is listed
                     in the product location list passed in */
                if (shashget(&unused, prod_loc_table, parent_full_path, 0)) {
                        insert_missing_children_for_this_parent
                                (this_node->parent, parent_full_path);
                        }
                this_node->parent->node_type = EXPANDED_PARENT_NODE;
                }
        }
/*----------------------------------------------------------------*/
static add_missing_children_to_all_leaf_node_parents()
        {
        shashact(full_path_table, call_insert_missing_children);
        }
/*----------------------------------------------------------------*/
call_mark_leaf_nodes_with_info(this_node, full_path, length)
disk_node *this_node;
char *full_path;
int length;
        {
        if (this_node->children == NULL) {
                store_file_permissions(full_path, this_node->permissions);
                this_node->size_in_bytes = get_file_dir_size(full_path);
                if (this_node->size_in_bytes < 0) fatal_error_occurred = TRUE;
                }
        }
/*----------------------------------------------------------------*/
static mark_all_leaf_nodes_with_size_and_permissions()
        {
        shashact(full_path_table, call_mark_leaf_nodes_with_info);
        }
/*----------------------------------------------------------------*/
static build_directory_trees(product_list)
product *product_list;
        {
        printf("cd_mapper:  Building internal directory trees...\n");
```

- Page 30 -

```
                    1     smaller                    FALSE
        path_group = alloc(1024);
        smaketab(&full_path_table, path_group, FALSE);
        smaketab(&prod_loc_table, path_group, FALSE);
        build_trees_for_given_locations(product_list);
        add_missing_children_to_all_leaf_node_parents();
        mark_all_leaf_nodes_with_size_and_permissions();
        }
/*------------------------------------------------------------------*
 * The directory tree data structure is traversed for
 * each product code and every node in the structure is marked
 * with the product code.  The product_codes are kept as a
 * linked-list attached to the node in the tree.  Note that
 * there may be multiple directory trees, one for each separate
 * root path.
 *------------------------------------------------------------------*/
static mark_children_with_product(this_prod, this_node)
product *this_prod;
disk_node *this_node;
        {
        product_member *this_prod_member;

while (this_node != NULL) {
                if (this_node->children == NULL) {
                        this_prod_member = (product_member *)malloc(
                                sizeof(struct product_member_struct));
                        this_prod_member->product_code = this_prod->product_code;
                        this_prod_member->next = this_node->product_membership;
                        this_node->product_membership = this_prod_member;
                        }
                else mark_children_with_product(this_prod, this_node->children);
                this_node = this_node->sibling;
                }
        }
/*------------------------------------------------------------------*/
static mark_products_in_trees(product_list)
product *product_list;
        {
        product *this_prod;
        location *this_loc;
        disk_node *this_node;
        product_member *this_prod_member;
        char full_path_name[MAXFNAMESIZE+1];

printf("cd_mapper:  Marking product ownership within trees...\n");
        for (this_prod = product_list;  this_prod != NULL;
                this_prod = this_prod->next) {
                for (this_loc = this_prod->location_list;
                        this_loc != NULL;  this_loc = this_loc->next ) {
                        strcpy(full_path_name, this_loc->root_path);
                        strcat(full_path_name, this_loc->relative_path);
                        shashget((pointer *)&this_node, full_path_table,
                                full_path_name, 0);
                        if (this_node->children == NULL) {
                                this_prod_member = (product_member *)malloc(
                                        sizeof(struct product_member_struct));
                                this_prod_member->product_code = this_prod->product
                                this_prod_member->next = this_node->product_membersl
                                this_node->product_membership = this_prod_member;
                                }
                        else mark_children_with_product(this_prod, this_node->child:
                        }
                }
        }
/*------------------------------------------------------------------*
 * The leaf nodes of each tree are traversed and a list is made of
 * every combination of product_codes which appear at each leaf node.
```

- Page 31 -

```
 * Each combination is assigned a unique "class" node. At this point,
 * all classes and their sizes are known.
 *----------------------------------------------------------------*/
static char *create_class_marker(this_node)
disk_node *this_node;
        {
        char *class_marker;
        product_member *this_prod_code;
        int marker_length;

marker_length = 1;
        for (this_prod_code = this_node->product_membership;
                this_prod_code != NULL;  this_prod_code = this_prod_code->next) {
                marker_length += (strlen(this_prod_code->product_code) + 1);
                }
        class_marker = (char *)malloc((unsigned)marker_length);
        *class_marker = '\0';
        for (this_prod_code = this_node->product_membership;
                this_prod_code != NULL;  this_prod_code = this_prod_code->next) {
                strcat(class_marker, this_prod_code->product_code);
                strcat(class_marker, "@");
                }
        return(class_marker);
        }
/*----------------------------------------------------------------*/
call_assign_classes_by_overlap(this_node, full_path, length)
disk_node *this_node;
char *full_path;
int length;
        {
        char *class_name;
        pointer unused;
        product_member *this_prod_code;
        class *this_class;
        char *class_marker;

if (this_node->children != NULL) return;
        class_marker = create_class_marker(this_node);
        if (shashget(&unused, class_table, class_marker, 0)) {
                free(class_marker);
                return;
                }
        class_name = (char *)malloc((unsigned)(18+strlen(cd_id)));
        sprintf(class_name, "class%s-%d", cd_id, class_number++);

this_class = (class *)malloc(sizeof(struct class_struct));
        this_class->class_name = class_name;
        this_class->file_set_list = NULL;
        this_class->product_list = this_node->product_membership;
        this_class->next = all_classes;
        all_classes = this_class;

if (debug) {
                printf("debug: Class %s is made from products:",
                        this_class->class_name);
                for (this_prod_code = this_class->product_list;
                        this_prod_code != NULL;  this_prod_code = this_prod_code->n(
                        printf(" %s", this_prod_code->product_code);
                        }
                printf("\n");
                }
        shashinsert((pointer)this_class, class_table, class_marker, 0);
        }
/*----------------------------------------------------------------*/
static assign_classes_by_product_overlap()
        {
```

```
        parse_group = gpalloc(1024);
        prev_prod_tstr = lexcreate(parse_group, "", LEX_ERROR, EOF,
                TOK_IDENTIFIER, TOK_IDENTIFIER, TOK_IDENTIFIER);
    lexlinevar(prev_prod_tstr, &prev_prod_linenumber);
        lexletter(prev_prod_tstr, 0, "-.");
        lexreswd(prev_prod_tstr, "cd_id", TOK_CD_ID);
        lexreswd(prev_prod_tstr, "cpu_list", TOK_CPU_LIST);
        lexreswd(prev_prod_tstr, "product", TOK_PRODUCT);
        lexreswd(prev_prod_tstr, "product_description",
                TOK_PRODUCT_DESC);
        lexreswd(prev_prod_tstr, "class", TOK_CLASS);
        lexreswd(prev_prod_tstr, "file", TOK_FILE);
        lexreswd(prev_prod_tstr, ";", TOK_TERMINATOR);
        lexopen(prev_prod_tstr, lex_file, reuse_file);
        }
/*----------------------------------------------------------------
 * define this buffer to be however long a product description can be
 * 256 chars is safe because this is the longest text string size
 * in Sybase for storing the product descriptions
 *---------------------------------------------------------------*/
#define BUFSIZE 257
static skip_prev_prod_desc()
        {
        char buffer[BUFSIZE];
        lexgrab(buffer, "IN;", BUFSIZE-1, prev_prod_tstr);
        }
/*---------------------------------------------------------------*/
static load_prev_prod_info()
        {
        class *this_class;
        product_member *this_product;
        char *this_prod_code;

tok = lexget(prev_prod_tstr);
        if (tok != TOK_IDENTIFIER) {
                printf(
                        "cd_mapper:  Error 1 parsing previous prod_lookup file line
                        prev_prod_linenumber);
                        printf("cd_mapper:  The name is %s\n", reuse_prodlookup);
                        fatal_error_occurred = TRUE;
                        return;
                        }
        this_prod_code = (char *)malloc((unsigned)strlen(prev_prod_tstr)+1);
        strcpy(this_prod_code, prev_prod_tstr);

while (TRUE) {
                tok = lexget(prev_prod_tstr);
                if (tok == TOK_TERMINATOR) return;
                if (tok != TOK_IDENTIFIER) {
                        printf(
                                "cd_mapper:  Error 2 parsing previous prod_lookup file line
                                prev_prod_linenumber);
                                printf("cd_mapper:  The name is %s\n", reuse_prodlookup);
                                fatal_error_occurred = TRUE;
                                return;
                                }
                for (this_class = previous_classes;  this_class != NULL;
                        this_class = this_class->next) {
                        if (strcmp(this_class->class_name, prev_prod_tstr) == 0)
                                break;
                        }
                if (this_class == NULL) {
                        this_class = (class *)malloc(sizeof(struct class_struct));
                        this_class->class_name = (char *)malloc((unsigned)
                                strlen(prev_prod_tstr)+1);
```

```
                        strcpy(this_class->class_name, prev_prod_tstr);
                        this_class->encryption_key = NULL;
                        this_class->product_list = NULL;
                        this_class->next = previous_classes;
                        previous_classes = this_class;
                        }

/* add product membership to class */
                this_product = (product_member *)malloc(
                        sizeof(struct product_member_struct));
                this_product->next = this_class->product_list;
                this_product->product_code = this_prod_code;
                this_class->product_list = this_product;
                }
        }
/*------------------------------------------------------------------*/
static load_prev_class_info()
        {
        class *this_class;

tok = lexget(prev_prod_tstr);
        if (tok != TOK_IDENTIFIER) {
                printf(
                "cd_mapper:  Error 3 parsing previous prod_lookup file line %d\n",
                prev_prod_linenumber);
                printf("cd_mapper:  The name is %s\n", reuse_prodlookup);
                fatal_error_occurred = TRUE;
                return;
                }
        for (this_class = previous_classes;  this_class != NULL;
                this_class = this_class->next) {
                if (strcmp(this_class->class_name, prev_prod_tstr) == 0)
                        break;
                }
        if (this_class == NULL) {
                this_class = (class *)malloc(sizeof(struct class_struct));
                this_class->class_name = (char *)malloc((unsigned)
                        strlen(prev_prod_tstr)+1);
                strcpy(this_class->class_name, prev_prod_tstr);
                this_class->product_list = NULL;
                this_class->next = previous_classes;
                previous_classes = this_class;
                } tok = lexget(prev_prod_tstr);
        if (tok != TOK_IDENTIFIER) {
                printf(
                "cd_mapper:  Error 4 parsing previous prod_lookup file line %d\n",
                prev_prod_linenumber);
                printf("cd_mapper:  The name is %s\n", reuse_prodlookup);
                fatal_error_occurred = TRUE;
                return;
                }
        this_class->encryption_key = (char *)malloc((unsigned)
                strlen(prev_prod_tstr)+1);
        strcpy(this_class->encryption_key, prev_prod_tstr);

skip_to_terminator();
        }
/*------------------------------------------------------------------*/
static skip_to_terminator()
        {
        while ((tok = lexget(prev_prod_tstr)) != TOK_TERMINATOR) {
                if (tok == EOF) {
                        printf(
                        "cd_mapper:  Error 5 parsing previous prod_lookup file line
```

```
                                prev_prod_linenumber);
                                printf("cd_mapper:  The name is %s\n", reuse_prodlookup);
                                fatal_error_occurred = TRUE;
                                return;
                                }
                }
        }
/*----------------------------------------------------------------*
 * Example of prod_lookup (cd_lookup) file:
 *      cd_id 0000001;
 *      product ProductA ClassA ClassB;
 *      product_description ProductA description etc;
 *      class class000001-1 KeyA TarA TarB TarE;
 *      class class000001-2 KeyB TarA TarI;
 *      file TarA 1 30123940 1;
 *      file TarB 2 212302 1;
 *      file TarE 2 4384934 2;
 *      file TarI 2 49349349 1;
 *
 * The format is any statements of the following in any order:
 *      cd_id   <job_number>;
 *      product <product_code> <class_name> [ ... ];
 *      product_description <product_code> <description>;
 *      class   <class_name> <encryption_key> <file_set_name> [ ... ];
 *      file    <file_set_name> <cd_volume> <size_in_bytes> <root_path_number>;
 */
static parse_prodlookup_file()
        {
        while (TRUE) {
                switch(tok = lexget(prev_prod_tstr)) {
                        case TOK_CLASS: load_prev_class_info();
                                                        break;
                        case TOK_PRODUCT:
                                                        load_prev_prod_info();
                                                        break;
                        case TOK_PRODUCT_DESC:
                                                        skip_prev_prod_desc();
                                                        break;
                        case EOF:               return;
                        default:
                                                        skip_to_terminator();
                                                        break;
                        }
                if (fatal_error_occurred) return;
                }
        }
/*----------------------------------------------------------------*/
load_reuse_prodlookup()
        {
        FILE *reuse_file;

if (reuse_prodlookup == NULL) return;
        reuse_file = fopen(reuse_prodlookup, "r");
        if (reuse_file == NULL) {
                printf("cd_mapper:  Error opening previous prod_lookup file %s\n",
                        reuse_prodlookup);
                printf("cd_mapper:  No further processing will occur.\n");
                exit(1);
                }
        printf("cd_mapper:  Loading previous prod_lookup file %s\n",
                reuse_prodlookup);

initialize_prodlookup_parse(reuse_file);
        parse_prodlookup_file();
        fclose(reuse_file);
        }
```

```
/*-------------------     -------------------------     --------------*/
static boolean class_product_lists_are_equivalent(class1, class2)
class *class1, *class2;
        {
        product_member *prod1, *prod2;

for (prod1 = class1->product_list;  prod1 != NULL;
                 prod1 = prod1->next) {
                for (prod2 = class2->product_list;  prod2 != NULL;
                         prod2 = prod2->next) {
                        if (strcmp(prod1->product_code, prod2->product_code) == 0)
                                break;
                        }
                        }
                if (prod2 == NULL) return(FALSE);
                }
        for (prod2 = class2->product_list;  prod2 != NULL;
                 prod2 = prod2->next) {
                for (prod1 = class1->product_list;  prod1 != NULL;
                         prod1 = prod1->next) {
                        if (strcmp(prod1->product_code, prod2->product_code) == 0)
                                break;
                        }
                        }
                if (prod1 == NULL) return(FALSE);
                }
        return(TRUE);
        }
/*----------------------------------------------------------------*/
static boolean reuse_old_key(this_class)
class *this_class;
        {
        class *this_prev_class;

for (this_prev_class = previous_classes; this_prev_class != NULL;
                 this_prev_class = this_prev_class->next) {
                if (class_product_lists_are_equivalent
                         (this_class, this_prev_class)) {
                        this_class->encryption_key =
                                 this_prev_class->encryption_key;
                        if (debug) {
                                printf("debug: Reusing key for Class %s, renaming t(
                                         this_class->class_name, this_prev_class->cl;
                                }
                        this_class->class_name = this_prev_class->class_name;
                        return(TRUE);
                        }
                }
        return(FALSE);
        }
/*----------------------------------------------------------------*/
static init_new_key_prods_reporting()
        {
        static char new_key_prods_fname[MAXFNAMESIZE+1];

strcpy(new_key_prods_fname, LOOKUP_FILE_PATH);
        strcat(new_key_prods_fname, cd_id);
        strcat(new_key_prods_fname, "/products_with_new_keys.");
        strcat(new_key_prods_fname, cd_id);
        new_key_prods_file = fopen(new_key_prods_fname, "w");
        if (new_key_prods_file == NULL) {
                printf("cd_mapper: Cannot open output file %s\n",
                         new_key_prods_fname);
                printf("cd_mapper: No further processing will occur.\n");
                fatal_error_occurred = TRUE;
                exit(1);
```

```
                }
        fprintf(new_key_prods_file, "CD-ROM Master, Serial Number %s\n", cd_id);
        fprintf(new_key_prods_file, "Report of Products for which Encryption Keys Cl
        fprintf(new_key_prods_file, "Customers who are licensed for these products\1
        fprintf(new_key_prods_file, "require new site_config files with this master
        fprintf(new_key_prods_file, "----------------------------------------------- misc_group = gpalloc(1024);
        smaketab(&new_key_prods_table, misc_group, FALSE);
        }
/*--------------------------------------------------------------------*/
static report_product_as_using_new_keys(this_class)
class *this_class;
        {
        product_member *this_prod;
        pointer dummy;

for (this_prod = this_class->product_list;  this_prod != NULL;
                this_prod = this_prod->next) {
                if (! shashget(&dummy, new_key_prods_table,
                        this_prod->product_code, 0)) {
                        fprintf(new_key_prods_file, "   %s\n",
                                this_prod->product_code);
                        }
                else {
                        shashinsert((pointer)NULL, new_key_prods_table,
                                this_prod->product_code, 0);
                        }
                }
        }
/*--------------------------------------------------------------------*/
static assign_encryption_keys_to_each_class()
        {
        class *this_class;
        char *encryption_key;

printf("cd_mapper:  Assigning encryption keys...\n");
        for (this_class = all_classes;  this_class != NULL;
                this_class = this_class->next) {
                if (! reuse_old_key(this_class)) {
                        encryption_key = generate_a_new_encryption_key();
                        this_class->encryption_key = encryption_key;
                        report_product_as_using_new_keys(this_class);
                        }
                if (debug) {
                        printf("debug: Class %s encryption key = %s\n",
                                this_class->class_name, this_class->encryption_key)
                        }
                }
        }
/*--------------------------------------------------------------------*
 * Each class is examined, and the classes are divided
 * into separate file sets based on the root paths of the files
 * in the class, i.e. for each root path included by the class,
 * a separate file set is created.  This is for convenience in
 * creating tar files out of the file sets later in cd_master.
 *--------------------------------------------------------------------*/
static file_set *new_fileset()
        {
        file_set *this_fileset;

this_fileset = (file_set *)malloc(sizeof(struct file_set_struct));
        this_fileset->volume_number = -1;
        this_fileset->total_size_in_bytes = 0;
        this_fileset->members = NULL;
        this_fileset->file_set_name = (char *)malloc(10);
```

```
                sprintf(this_  fileset->file_set_name, "fs%d   file_set_number++);
        this_fileset->next = NULL;

return(this_fileset);
        }
/*---------------------------------------------------------------*/
call_assign_leaf_node_to_a_class(this_node, full_path, length)
disk_node *this_node;
char *full_path;
int length;
        {
        class *this_class;
        file_set *this_file_set;
        file_set_member *this_member;
        char *class_marker;

if (this_node->children != NULL) return;
        class_marker = create_class_marker(this_node);

if (! shashget((pointer *)&this_class, class_table, class_marker, 0)) {
                printf("cd_mapper:  Internal error, cannot find class for leaf node'
                fatal_error_occurred = TRUE;
                return;
                }
        if (debug) {
                printf("debug: Assigning path %s to class %s\n",
                        full_path, this_class->class_name);
                }
        if (this_class->file_set_list == NULL) {
                this_class->file_set_list = new_fileset();
                }
        this_file_set = this_class->file_set_list;
        this_member = (file_set_member *)malloc
                (sizeof(struct file_set_member_struct));
        this_member->leaf_node = this_node;
        this_member->next = this_file_set->members;
        this_file_set->members = this_member;

free(class_marker);
        }
/*---------------------------------------------------------------*/
static assign_every_leaf_disk_node_to_a_class()
        {
        printf("cd_mapper:  Partitioning into file sets by root paths...\n");
        shashact(full_path_table, call_assign_leaf_node_to_a_class);
        }
/*---------------------------------------------------------------*/
static assign_file_sets_based_on_root_paths()
        {
        class *this_class;
        hash_table root_fileset_table;
        memory_group root_group;
        file_set *root_fileset, *first_set;
        file_set_member *this_member, *next_member;
        char *root_path;

for (this_class = all_classes;  this_class != NULL;
                this_class = this_class->next) {
                root_group = gpalloc(1024);
                smaketab(&root_fileset_table, root_group, FALSE);
                first_set = this_class->file_set_list;
                this_class->file_set_list = NULL;
                next_member = first_set->members;
                while (next_member != NULL) {
                        this_member = next_member;
                        root_path = this_member->leaf_node->root_tree->root_path;
```

```
                                                            root
                                                              ∧
                            if (! shashget((pointer *)   ،et_fileset, root_fileset_table
                                    root_path, 0)) {
                                    root_fileset = new_fileset();
                                    root_fileset->next = this_class->file_set_list;
                                    this_class->file_set_list = root_fileset;
                                    shashinsert((pointer)root_fileset, root_fileset_tab:
                                            root_path, 0);
                            }
                            next_member = this_member->next;
                            this_member->next = root_fileset->members;
                            root_fileset->members = this_member;
                            if (debug) {
                                    printf("debug: path %s %s = file_set %s root_path_n
                                            this_member->leaf_node->root_tree->root_patl
                                            this_member->leaf_node->relative_path,
                                            root_fileset->file_set_name,
                                            this_member->leaf_node->root_tree->root_patl
                            }
                    }
                    gpfree(root_group);
            }
        }
/*----------------------------------------------------------------*
 * Each file set is examined, and for each file set which
 * exceeds the maximum permitted file set size, it is sub-
 * divided into multiple file sets, each less than the maximum
 * permitted file set size.  Note that the maximum size is a
 * parameter which is looked up in the aspen.config file.
 * The size of each individual file set is computed during
 * this step and stored.
 *----------------------------------------------------------------*/
static compute_file_set_size(this_set)
file_set *this_set;
        {
        file_set_member *this_member;

this_set->total_size_in_bytes = 0;
        for (this_member = this_set->members;
                this_member != NULL;  this_member = this_member->next) {
                this_set->total_size_in_bytes +=
                        this_member->leaf_node->size_in_bytes;
                }
        }
/*----------------------------------------------------------------*/
static assign_file_set_sizes(print_sizes)
boolean print_sizes;
        {
        class *this_class;
        file_set *this_set;

for (this_class = all_classes; this_class != NULL;
                this_class = this_class->next) {
                for (this_set = this_class->file_set_list;
                        this_set != NULL;  this_set = this_set->next) {
                        compute_file_set_size(this_set);
                        if (print_sizes) {
                                printf("cd_mapper: file_set %s has size %d bytes\n"
                                        this_set->file_set_name,
                                        this_set->total_size_in_bytes);
                                }
                        }
                }
        }
/*----------------------------------------------------------------
 * find largest subtree which is a directory, not a file
 * complication:  what if the subtree is a symbolic link
```

```
 *                   This                         that
 * to a directory?   1   doesn't handle that case    might
 * not work if the root path ends up being different
 *-------------------------------------------------------------*/
static file_set_member *find_largest_fileset_member(this_set)
file_set *this_set;
        {
        file_set_member *this_member, *largest_member;
        disk_node *expanding_node;
        struct stat buf;
        char full_path[MAXFNAMESIZE+1];

largest_member = NULL;
        for (this_member = this_set->members;  this_member != NULL;
                this_member = this_member->next) {
                if ((largest_member == NULL) ||
                        (largest_member->leaf_node->size_in_bytes <
                        this_member->leaf_node->size_in_bytes)) {
                        expanding_node = this_member->leaf_node;
                        strcpy(full_path, expanding_node->root_tree->root_path);
                        strcat(full_path, expanding_node->relative_path);
                        if (stat(full_path, &buf) == 0) {
                                if ((buf.st_mode & S_IFMT) == S_IFDIR) {
                                        largest_member = this_member;
                                }
                        }
                }
        }
        return(largest_member);
        }
/*-------------------------------------------------------------
 * return false if no suitable subtree was found to expand
 *-------------------------------------------------------------*/
static boolean expand_largest_subtree_in_file_set(this_set)
file_set *this_set;
        {
        file_set_member *this_member, *largest_member, *prev_member;
        disk_node *expanding_node, *this_node;
        char full_path[MAXFNAMESIZE+1];

largest_member = find_largest_fileset_member(this_set);
        if (largest_member == NULL) return(FALSE);
        expanding_node = largest_member->leaf_node;
        strcpy(full_path, expanding_node->root_tree->root_path);
        strcat(full_path, expanding_node->relative_path);
        insert_missing_children_for_this_parent(expanding_node, full_path);
        expanding_node->node_type = EXPANDED_PARENT_NODE;

for (this_node = expanding_node->children;  this_node != NULL;
                this_node = this_node->sibling) {
                this_node->product_membership = expanding_node->product_membership;
                strcpy(full_path, this_node->root_tree->root_path);
                strcat(full_path, this_node->relative_path);
                store_file_permissions(full_path, this_node->permissions);
                this_node->size_in_bytes = validate_file_dir(
                        full_path, TRUE, FALSE, NULL, NULL, NULL, TRUE);
                if (this_node->size_in_bytes < 0) fatal_error_occurred = TRUE;
                }

/* delete the old leaf node from file_set membership */
        if (this_set->members->next == NULL) this_set->members = NULL;
        else if (this_set->members == largest_member) {
                this_set->members = this_set->members->next;
                }
        else {
                prev_member = this_set->members;
                for (this_member = this_set->members->next;  this_member != NULL;
```

```
                        this_member = this_member->next) {
                        if (this_member == largest_member) {
                                prev_member->next = this_member->next;
                                break;
                                }
                        prev_member = this_member;
                        }
                }

/* now add the new leaf nodes to file_set membership */
        for (this_node = expanding_node->children;  this_node != NULL;
                this_node = this_node->sibling) {
                this_member = (file_set_member *)malloc(
                        sizeof(struct file_set_member_struct));
                this_member->leaf_node = this_node;
                this_member->next = this_set->members;
                this_set->members = this_member;
                }
        return(TRUE);
        }
/*----------------------------------------------------------------*/
static subdivide_existing_leaf_nodes(this_set, max_set_size)
file_set *this_set;
int max_set_size;
        {
        file_set *new_set;
        file_set_member *this_member;
        int running_size;

this_member = this_set->members;
        running_size = this_member->leaf_node->size_in_bytes;
        while (TRUE) {
                if ((this_member->next == NULL) ||
                        ((this_member->next->leaf_node->size_in_bytes +
                        running_size) > max_set_size)) {
                        this_set->total_size_in_bytes = running_size;
                        if (this_member->next == NULL) break;

new_set = new_fileset();
                        new_set->next = this_set->next;
                        this_set->next = new_set;
                        new_set->members = this_member->next;
                        this_member->next = NULL;

this_set = new_set;
                        this_member = this_set->members;
                        running_size = this_member->leaf_node->size_in_bytes;
                        }
                else {
                        this_member = this_member->next;
                        running_size += this_member->leaf_node->size_in_bytes;
                        }
                }
        }
/*----------------------------------------------------------------*/
static subdivide_file_sets_based_on_size()
        {
        class *this_class;
        file_set *this_set;
        int max_set_size;

printf("cd_mapper:  Subdividing file sets which are too large...\n");
        assign_file_set_sizes(FALSE);

max_set_size = atoi(aspen_info->cd_rom_max_fileset_size_in_bytes);
        for (this_class = all_classes;  this_class != NULL;
```

```
                        class                          set
           this_ ~~set~~ = this_class->next) {
               for (~~this~~_set = this_class->file_~~set~~_list; this_set != NULL;
                    this  this_set = this_set->next) {
              this    while (this_set->total_size_in_bytes > max_set_size) {
                           subdivide_existing_leaf_nodes(this_set, max_set_siz(
                           if (this_set->total_size_in_bytes > max_set_size) {
                               if (! expand_largest_subtree_in_file_set(th:
                                       break;
                           }
                        }
                   }
               }
           if (debug) printf("debug: After subdividing based on size...\n");
           assign_file_set_sizes(TRUE);
           }
/*---------------------------------------------------------------*
 * The final partitioning step involves assigning each file
 * set to a CD-ROM volume.  An attempt is made to keep all file
 * sets for any given product on the same volume - so, each
 * product is examined in turn and its file sets are assigned
 * to the current volume until the total size of the file sets
 * on the volume would exceed the CD-ROM maximum volume size
 * (a parameter obtained from the aspen.config file).  Then,
 * the volume number is incremented and the process continues.
 *---------------------------------------------------------------*/
static assign_file_sets_to_cdrom_volumes()
           {
           class *this_class;
           file_set *this_set;
           media_data *cd_rom_info;
           int bytes_on_this_volume;
           int volume_number;
           int cd_rom_capacity;

printf("cd_mapper:  Assigning file sets to CD-ROM volumes...\n");
           cd_rom_info = get_media_choices("cd_rom");
           volume_number = 1;
           bytes_on_this_volume = 0;

cd_rom_capacity = atoi(cd_rom_info->capacity);
           for (this_class = all_classes;  this_class != NULL;
                   this_class = this_class->next) {
               for (this_set = this_class->file_set_list;
                       this_set != NULL;  this_set = this_set->next) {
                       if ((bytes_on_this_volume +
                               this_set->total_size_in_bytes) >
                               cd_rom_capacity) {
                               printf("cd_mapper:  Volume %d contains %d bytes\n",
                                       volume_number, bytes_on_this_volume);
                               volume_number++;
                               bytes_on_this_volume = 0;
                       }
                       if (this_set->total_size_in_bytes > cd_rom_capacity) {
                               printf(
"cd_mapper:  File set %s (%d MB) exceeds capacity of CD-ROM (%d MB)\n",
                                       this_set->file_set_name,
                                       this_set->total_size_in_bytes / 1000000,
                                       cd_rom_capacity / 1000000);
                               fatal_error_occurred = TRUE;
                       }
                       else {
                               bytes_on_this_volume +=
                                       this_set->total_size_in_bytes;
                               this_set->volume_number = volume_number;
                       }
               }
```

— Page 42 —

```
                                  wrapper                  bytes
                   }              /\                       /\
        printf("cd_mapper:   Volume %d contains %d bytes\n",
                volume_number, bytes_on_this_volume);
        }
/*---------------------------------------------------------------*
 * Every file or directory in the directory trees
 * is output to the MPS-format file, along with the file set
 * name it was assigned.
 *---------------------------------------------------------------*/
static add_record_to_mps_job_file(
        root_path, relative_path, file_size, permissions, file_set_name)
char *root_path;
char *relative_path;
int  file_size;
char *permissions;
char *file_set_name;
        {
        pointer recptr;
        char file_full_path[MAXFNAMESIZE+1];
        char file_date_time[20];
        char file_char_size[20];

strcpy(file_full_path, root_path);
        strcat(file_full_path, relative_path);
        mps_transtime(file_full_path, file_date_time);
        sprintf(file_char_size, "%d", file_size);

recptr = mps_create_data(
                "<NULL>",
                file_date_time,
                file_char_size,
                permissions,
                "<NULL>",
                file_full_path,
                "<NULL>",
                "<NULL>",
                "<NULL>",  /* dest */
                "<NULL>",
                file_set_name,
                "<NULL>",
                "<NULL>",
                "<NULL>");

mps_append_data(job_file_full_path, recptr);
        mps_free_data(recptr);
        }
/*---------------------------------------------------------------*/
static char *initialize_job_file(job_number)
char *job_number;
        {
        char current_time[20];
        prescription_data *info_ptr;

mps_create_parser_structure(job_file_full_path);
        mps_append_header(job_file_full_path, "PROGRAM_NAME",
                "cd_mapper");
        mps_transtime("", current_time);
        mps_append_header(job_file_full_path, "CURRENT_TIME",
                current_time);
        mps_append_header(job_file_full_path, "OUTPUT_FILE",
                job_file_full_path);
        mps_append_header(job_file_full_path, "MEDIA_PROGRAM",
                "cd_master");
        mps_append_header(job_file_full_path, "JOB_NUMBER",
                job_number);
        mps_append_header(job_file_full_path, "MEDIA_NAME",
```

```
                        rom.h
                   "cd_*  ");

info_ptr = get_prescription_general_data();

mps_append_header(job_file_full_path, "TAPEWRITER",
                info_ptr->tapewriter_userid);
        mps_append_header(job_file_full_path, "PLATFORM",
                info_ptr->target_platform_name);
        }
/*----------------------------------------------------------------*/
static generate_mps_file(job_number)
char *job_number;
        {
        class *this_class;
        file_set *this_set;
        file_set_member *this_member;

printf("cd_mapper:  Generating MPS output file for cd_master...\n");
        if (fatal_error_occurred) return;

strcpy(job_file_full_path, LOOKUP_FILE_PATH);
        strcat(job_file_full_path, job_number);
        strcat(job_file_full_path, JOB_FILE_NAME);
        strcat(job_file_full_path, job_number);
        initialize_job_file(job_number);

for (this_class = all_classes; this_class != NULL;
                this_class = this_class->next) {
                for (this_set = this_class->file_set_list;
                        this_set != NULL;  this_set = this_set->next) {
                        for (this_member = this_set->members;
                                this_member != NULL;
                                this_member = this_member->next) {
                                add_record_to_mps_job_file(
                                        this_member->leaf_node->root_tree->root_path
                                        this_member->leaf_node->relative_path,
                                        this_member->leaf_node->size_in_bytes,
                                        this_member->leaf_node->permissions,
                                        this_set->file_set_name);
                                }
                        }
                } mps_generator(job_file_full_path, job_file_full_path);
        }
/*----------------------------------------------------------------*
 * The product_lookup file is generated based on all of the
 * product-class-file_set mapping and the encryption keys assigned
 * and file set sizes computed.
 *
 * The format is any statements of the following in any order:
 *     cd_id    <job_number>;
 *     product <product_code> <class_name> [ ... ];
 *     product_description <product_code> <description>;
 *     class    <class_name> <encryption_key> <file_set_name> [ ... ];
 *     file     <file_set_name> <cd_volume> <size_in_bytes> <root_path_number>;
 *----------------------------------------------------------------*/
static write_contents_of_lookup_file(
        prod_file, job_number, product_list, strip_encryption_key)
FILE *prod_file;
char *job_number;
product *product_list;
boolean strip_encryption_key;
        {
        class *this_class;
        product_member *this_prod;
```

— Page 44 —

```
                       this_set
                          ↓
        file_set *thi set;

fprintf(prod_file, "cd_id %s;\n", job_number);
        while (product_list != NULL) {
                fprintf(prod_file, "product %s", product_list->product_code);
                for (this_class = all_classes;  this_class != NULL;
                        this_class = this_class->next) {
                        for (this_prod = this_class->product_list;
                                this_prod != NULL;  this_prod = this_prod->next) {
                                if (strcmp(this_prod->product_code,
                                        product_list->product_code) == 0) {
                                        fprintf(prod_file, "\n    %s", this_class->c
                                        break;
                                        }
                                }
                        }
                fprintf(prod_file, ";\n");
                fprintf(prod_file, "product_description %s %s;\n",
                        product_list->product_code,
                        product_list->product_description);
                product_list = product_list->next;
                }
        for (this_class = all_classes;  this_class != NULL;
                this_class = this_class->next) {
                if (strip_encryption_key)
                        fprintf(prod_file, "class %s %s",
                                this_class->class_name,
                                CONSTANT_KEY);
                else fprintf(prod_file, "class %s %s",
                        this_class->class_name,
                        this_class->encryption_key);
                for (this_set = this_class->file_set_list;
                        this_set != NULL;  this_set = this_set->next) {
                        fprintf(prod_file, "\n    %s", this_set->file_set_name);
                        }
                fprintf(prod_file, ";\n");
                }
        for (this_class = all_classes;  this_class != NULL;
                this_class = this_class->next) {
                for (this_set = this_class->file_set_list;
                        this_set != NULL;  this_set = this_set->next) {
                        fprintf(prod_file, "file %s %d %d %d;\n",
                                this_set->file_set_name,
                                this_set->volume_number,
                                this_set->total_size_in_bytes,
                                this_set->members->leaf_node->root_tree->root_path_number);
                        }
                }
        }
/*----------------------------------------------------------------*/
static generate_product_lookup_file(job_number, product_list)
char *job_number;
product *product_list;
        {
        FILE *prodlookup_file;
        char prodlookup_name[MAXFNAMESIZE+1];

if (fatal_error_occurred) return;
        printf("cd_mapper:  Generating product lookup file...\n");

strcpy(prodlookup_name, LOOKUP_FILE_PATH);
        strcat(prodlookup_name, job_number);
        strcat(prodlookup_name, LOOKUP_FILE_NAME);
        strcat(prodlookup_name, job_number);
        prodlookup_file = fopen(prodlookup_name, "w");
        if (prodlookup_file == NULL) {
```

— Page 45 —

```c
            print  "cd_mapper: Cannot open out  file %s\n",
                    prodlookup_name);
            printf("cd_mapper: No further processing will occur.\n");
            fatal_error_occurred = TRUE;
            exit(1);
            }
        write_contents_of_lookup_file(
                prodlookup_file, job_number, product_list, FALSE);
        fclose(prodlookup_file);
        }
/*------------------------------------------------------------------*/
static generate_cd_lookup_file(job_number, product_list)
char *job_number;
product *product_list;
        {
        FILE *cdlookup_file;
        char cdlookup_name[MAXFNAMESIZE+1];

if (fatal_error_occurred) return;
        printf("cd_mapper:  Generating CD lookup file...\n");

strcpy(cdlookup_name, LOOKUP_FILE_PATH);
        strcat(cdlookup_name, job_number);
        strcat(cdlookup_name, CD_LOOKUP_FILE_NAME);
        strcat(cdlookup_name, job_number);
        cdlookup_file = fopen(cdlookup_name, "w");
        if (cdlookup_file == NULL) {
                fatal_error_occurred = TRUE;
                printf("cd_mapper: Cannot open output file %s\n",
                        cdlookup_name);
                printf("cd_mapper: No further processing will occur.\n");
                exit(1);
                }
        write_contents_of_lookup_file(
                cdlookup_file, job_number, product_list, TRUE);
        fclose(cdlookup_file);
        }
/*------------------------------------------------------------------*
 * The README file is generated to include plain-text information
 * on the CD-ROM of its serial number, copyright information, and
 * general description, along with a description on how to load
 * its contents.  The CD-ROM serial number is based on the job number.
 *------------------------------------------------------------------*/
static write_contents_of_readme_file(readme_file, job_number)
FILE *readme_file;
char *job_number;
        {
        fprintf(readme_file, "(c) Copyright 1991 LSI Logic Corporation\n");
        fprintf(readme_file, "CD-ROM Software Distribution, Serial Number %s\n\n",
                job_number);
        fprintf(readme_file, "The software and library products contained\n");
        fprintf(readme_file, "in this CD-ROM set should be loaded using the\n");
        fprintf(readme_file, "cd_load program provided on this CD-ROM called 'cd_lo;
        fprintf(readme_file, "Copy it onto a disk partition and execute the program
        fprintf(readme_file, "Note that cd_load. only runs on SUN4.\n\n");

fprintf(readme_file, "The cd_load program, this README file, and\n");
        fprintf(readme_file, "the table of contents (called cd_lookup)\n");
        fprintf(readme_file, "for all volumes of the CD-ROM set are contained\n");
        fprintf(readme_file, "on each volume, so the volumes may be loaded in\n");
        fprintf(readme_file, "any order.\n\n");

fprintf(readme_file, "The cd_load program will only load products\n");
        fprintf(readme_file, "authorized for your site in a file called\n");
        fprintf(readme_file, "site_config.  This file is generated by LSI Logic\n")
        fprintf(readme_file, "and is provided to your site on additional media\n");
```

```
              fprintf(readme_ file, "of your choice (not   the CD-ROM itself).\n\n");

fprintf(readme_file, "The site_config file contains the list of products\n"
              fprintf(readme_file, "authorized for you site in addition to a list of\n");
              fprintf(readme_file, "host ids which are authorized to run cd_load.\n");
              fprintf(readme_file, "You must run cd_load on one of those hosts.  The\n");
              fprintf(readme_file, "host ids specified in site_config are the same as\n")
              fprintf(readme_file, "the host ids you have requested for running\n");
              fprintf(readme_file, "LSI Logic software products.  For products\n");
              fprintf(readme_file, "authorized with network licensing (floating nodes),\n'
              fprintf(readme_file, "the host ids of the license daemons are used.\n\n");

fprintf(readme_file, "The cd_load program allows you to selectively\n");
              fprintf(readme_file, "load only a subset of the products if you choose.\n\n' fprintf(readme_file, "The cd_load program requires working space on\n");
              fprintf(readme_file, "disk over and above that required for the final\n");
              fprintf(readme_file, "to perform decoding of the products.  Typically,\n");
              fprintf(readme_file, "this working space amounts to about 50 MB.\n\n");

fprintf(readme_file, "If you are loading products which require more\n");
              fprintf(readme_file, "one directory tree (i.e. they require different\n");
              fprintf(readme_file, "root paths), cd_load will prompt for more than\n");
              fprintf(readme_file, "one path name for loading.\n\n");

fprintf(readme_file, "Please read the System Administrator's guide\n");
              fprintf(readme_file, "provided for you by LSI Logic for further\n");
              fprintf(readme_file, "information.\n\n");

fprintf(readme_file, "You may also inquire with the\n");
              fprintf(readme_file, "LSI Logic Design Tools Hotline\n");
              fprintf(readme_file, "at 1-800-MDE-4545.\n");
              }
/*---------------------------------------------------------------------*/
static generate_readme_file(job_number)
char *job_number;
        {
        FILE *readme_file;
        char readme_name[MAXFNAMESIZE+1];

printf("cd_mapper:  Generating README file...\n");
        if (fatal_error_occurred) return;

strcpy(readme_name, LOOKUP_FILE_PATH);
        strcat(readme_name, job_number);
        strcat(readme_name, README_FILE_NAME);
        strcat(readme_name, job_number);
        readme_file = fopen(readme_name, "w");
        if (readme_file == NULL) {
                printf("cd_mapper: Cannot open output file %s\n",
                        readme_name);
                printf("cd_mapper: No further processing will occur.\n");
                fatal_error_occurred = TRUE;
                exit(1);
                }
        write_contents_of_readme_file(readme_file, job_number);
        fclose(readme_file);
        }
```

```
/*---------------------------------------------------------------------
**
** module   : cd_tool
**
** purpose  : provide general shared functions used by all CD ROM tools
**
** author   : Eric J. Chang
**
** date     : Feb. 15 1991
**
** entry points :
**
**               is_dir(char *path)
**
**               is_dir_rwx(char *path)
**
**               is_digit_str(char *string)
**
**               is_hex_str(char *string)
**
**               is_dir_owned_by_user(char *path)
**
**               upper(char *string)
**
**               lower(char *string)
**
**               print_tarfile_key_ht()
**
**               print_load_class_ht()
**
**               print_load_tarfiles()
**
**               print_tarfile_list(TARFILE_LIST *tarfile_list_ptr)
**
**               print_loading_path(LOADING_PATH *target)
**
**---------------------------------------------------------------------*/ include     "cd-rom.h"

extern  SITE_CONFIG     site_config;
extern  LOOKUP          product_lookup;
extern  LOOKUP          cd_lookup;
extern  YMTRANS_TBL     ym_trans;
extern  int             tok;

extern  memory_group    load_product_mem;
extern  hash_table      load_product_ht;
extern  hash_table      load_class_ht;
extern  hash_table      load_tarfile_ht;
extern  hash_table      tarfile_key_ht;
extern  TARFILE_LIST    *tarfile_head;
extern  TARFILE_LIST    *tarfile_tail;
extern  LOADING_PATH    *target_path_head;
extern  LOADING_PATH    *target_path_tail;
extern  char            site_config_dir[256];
extern  char            cd_dir[256];
extern  char            target_dir[256];
extern  char            temp_dir[256];

/*---------------------------------------------------------------------
** function : is_dir()
** purpose  : check if input path is directory or not
**            TRUE of yes else FALSE
**            the path can also be a symbolic link to directory
**---------------------------------------------------------------------*/
```

```
int is_dir(path)
char *path;
{
struct stat buf;
char    sympath[BUFSIZE];
int     bufsize;

if (lstat(path,&buf) == -1)
        return(FALSE);

/*-----------------
    ** if symbolic
    **----------------*/ if (S_ISLNK(buf.st_mode)) { if ((bufsize = readlink(path,sympath,BUFSIZE)) == -1) {
            printf("\nError following a symbolic link\n");
            return(FALSE);
        }
        sympath[bufsize] = '\0';

return(is_dir(sympath));
    } return(S_ISDIR(buf.st_mode)?TRUE:FALSE);

}

/*------------------------------------------------------------------
** function : is_dir_rwx()
** purpose  : check if the input path is dir and also be have read,
**            write and executable permission for the user
**            TRUE if yes else FALSE
**            The path can also be a symbolic link to dir
**------------------------------------------------------------------*/
int is_dir_rwx(path)
char *path;
{
struct stat buf;
char sympath[BUFSIZE];
int bufsize;

if (lstat(path,&buf) == -1) return(FALSE);

/* if path is a symbolic link */
    if (S_ISLNK(buf.st_mode)) {
        if ((bufsize = readlink(path,sympath,BUFSIZE)) == -1) {
            printf("\nError following a symbolic link\n");
            return(FALSE);
        }
        sympath[bufsize] = '\0';
        return(is_dir_rwx(sympath));
    } if (access(path, R_OK) != 0) return(FALSE);
    if (access(path, W_OK) != 0) return(FALSE);
    if (access(path, X_OK) != 0) return(FALSE);

return(TRUE);
}
/*------------------------------------------------------------------
** function : is_digit_str()
```

```
**  purpose  : check if the input string is a digit or not
**             TRUE if yes else FALSE
**-----------------------------------------------------------------*/ is_digit_str(string)
char *string;
{
int len,i;
      len = strlen(string);
      for(i=0;i<len;i++) {
           if (!isdigit(*(string+i))) return(FALSE);
      }
      return(TRUE);
}

/*-----------------------------------------------------------------
** function : is_hex_str()
** purpose  : check if the input string is a hex digit or not
**             TRUE if yes else FALSE
**-----------------------------------------------------------------*/ is_hex_str(string)
char *string;
{
int len,i;
char *upper();
char buf[BUFSIZE];

strcpy(buf,string);

/*-------------------------------------------------
      ** the input string should be case insensitive
      **----------------------------------------------*/ upper(buf);

len = strlen(buf);

for(i=0;i<len;i++) {

/*------------------------------------------
           ** each char should be 0-9 or A-F
           **---------------------------------------*/ if (isdigit(*(buf+i))||
               (*(buf+i)>='A' && *(buf+i)<='F')) continue;

return(FALSE);

} return(TRUE);

}

/*-----------------------------------------------------------------
** function : is_dir_owned_by_user()
** purpose  : check if the input path is owned by owner or not
**             TRUE if yes else FALSE
**-----------------------------------------------------------------*/ is_dir_owned_by_user(path)
char *path;
{
struct stat buf;
int user_id;
```

```c
    if (lstat(path,&buf) == -1)    // buf
        return(FALSE);

/*------------------------------
    ** if root, OK
    **----------------------------*/ if ((user_id = getuid()) == 0)
        return(TRUE);

return((buf.st_uid == user_id)?TRUE:FALSE);
}

/*----------------------------------------------------------------------
** function : upper()
** purpose  : transform in input string to all upper cases
**--------------------------------------------------------------------*/ char *upper(string)
char *string;
{
int len,i;

for(i=0,len=strlen(string);i<len;i++)
        *(string+i) = toupper(*(string+i));

return(string);

}
/*----------------------------------------------------------------------
** function : lower()
** purpose  : transform input string to all lower cases
**--------------------------------------------------------------------*/ char *lower(string)
char *string;
{
int len,i;

for(i=0,len=strlen(string);i<len;i++)
        *(string+i) = tolower(*(string+i));

return(string);

}
/*----------------------------------------------------------------------
** function : print_1_tarfile_key_ht()
** purpose  : display 1 TAR_KEY on screen
**            called by print_tarfile_key_ht()
**--------------------------------------------------------------------*/ static int print_1_tarfile_key_ht(tar_key_ptr,tarfile_name)
TAR_KEY *tar_key_ptr;
char *tarfile_name;
{
    /*
    printf("\n\tTarfile %s %s",tarfile_name,tar_key_ptr->tarfile_key);
    */
}

/*----------------------------------------------------------------------
** function : print_tarfile_key_ht()
```

Page 51

```
                            the
** purpose : print t   file_key_ht on the screen
**-----------------------------------------------------------------*/ print_tarfile_key_ht()
{
int  print_1_tarfile_key_ht();
     /*
     printf("Tarfile Key Map");
     shashact(tarfile_key_ht,print_1_tarfile_key_ht);
     */
}

/*------------------------------------------------------------------
** function : print_1_loading_class()
** purpose  : display 1 class_name on the screen
**            called by print_load_class_ht()
**-----------------------------------------------------------------*/ static int print_1_loading_class(class_ptr,class_name)
char *class_ptr,*class_name;
{
/*
     printf("\n\tclass  %s",class_ptr);
*/
}

/*------------------------------------------------------------------
** function : print_load_class_ht()
** purpose  : display load_class_ht on screen
**-----------------------------------------------------------------*/ print_load_class_ht()
{
/*
int  print_1_loading_class();
     printf("Loading classes :");
     shashact(load_class_ht,print_1_loading_class);
*/
}

/*------------------------------------------------------------------
** function : print_tar_list()
** purpose  : display tar_file_name, volume and size for one TAR_FILE
**            on the screen
**            called by print_load_tarfiles()
**-----------------------------------------------------------------*/ static int print_tar_list(tar_hd,tar_file_name)
TAR_FILE *tar_hd;
char *tar_file_name;
{
/*
     printf("\n\tfile %s %d %ld",tar_hd->tar_file_name,tar_hd->volume,tar_hd->size)
*/
}

/*------------------------------------------------------------------
** function : print_load_tarfiles()
** purpose  : display load_tarfile_ht on the screen
**-----------------------------------------------------------------*/ print_load_tarfiles(){
int  print_tar_list();
/*
     printf("Loading tarfiles :");
     shashact(load_tarfile_ht,print_tar_list);
```

```
*/
}

/*-----------------------------------------------------------------
** function : print_tarfile_list()
** purpose  : display TARFILE_LIST on the screen
**---------------------------------------------------------------*/ print_tarfile_list(tarfile_list_ptr)
TARFILE_LIST *tarfile_list_ptr;
{
TARFILE_LIST *tar_ptr;
    /*
    for(tar_ptr = tarfile_list_ptr;tar_ptr != NULL;tar_ptr=tar_ptr->next) {
        printf("\ntar %s size %d",tar_ptr->tarfile->tar_file_name,tar_ptr->tarfil
    }
    */
}

/*-----------------------------------------------------------------
** function : print_loading_path()
** purpose  : display LOADING_PATH on the screen
**---------------------------------------------------------------*/ print_loading_path(target)
LOADING_PATH *target;
{
LOADING_PATH *tar_ptr;
/*
    for(tar_ptr = target;tar_ptr != NULL;tar_ptr=tar_ptr->next) {
        printf("\npath no %d %s",tar_ptr->path_no,tar_ptr->target_path);
    }
*/
} static print_1_ym_ht(ym_rec,ori_file)
YM_REC *ym_rec;
char *ori_file;
{
/*
    printf("\n%-8s   %-16s   %-16s",ym_rec->file_type,ym_rec->trans_name,ym_rec->or
*/
} print_ym_trans(ym_ptr)
YMTRANS_TBL ym_ptr;
{
int print_1_ym_ht();
/*
    shashact(ym_ptr.ym_ht,print_1_ym_ht);
*/
}
```

```
#define ERRSIZE 256
char    *this_routine, mps_error_message[ERRSIZE];
int     mps_return_code;
```

```
                        for   mps
/* possible values  to  mps_return_code */
#define OK                                  0
#define NO_SUCH_FILE_OR_DIRECTORY           1
#define OPEN_FILE_FOR_READ_FAIL             2
#define OPEN_FILE_FOR_WRITE_FAIL            3
#define FILE_NAME_NOT_UNIQUE                4
#define ILLEGAL_ENTRY                                    5
#define ILLEGAL_TYPE                        6
#define SYNTAX_ERROR                        7
#define CREATE_FILE_STRUCTURE_FAIL                   8
#define ENTRY_NOT_EXIST_IN_FILE                      9
#define NULL_INPUT_PARAMETER                              10
#define GET_FILE_INFORMATION_FAIL                         11
#define CALL_FAIL                                                     12
#define OUT_OF_MEMORY                               13
#define LOGIC_ERR_FROM_CREATE_LIST                        14
#define DELETE_FILE_FAIL                            15
#define KEY_IS_NULL                                                   16
#define INSERTION_FAIL                                      17
#define DELETION_FAIL                                       18
#define LSTAT_SYSTEM_CALL_FAIL                      19
#define STAT_SYSTEM_CALL_FAIL                       20
#define CHDIR_SYSTEM_CALL_FAIL                      21
#define READLINK_SYSTEM_CALL_FAIL                   22
#define OPENDIR_SYSTEM_CALL_FAIL                    23
#define ILLEGAL_FILE_TYPE                                   24
#define WRONG_NUMBER_OF_COLUMN              25
#define INVALID_DATE                        26
#define INVALID_SIZE                        27
#define INVALID_PERMISSION                  28
#define INVALID_CHECK_SUM                   29
#define OPEN_FILE_FOR_APPEND_FAIL           30
#define END_HEADER_MISSING                                  31
#define SYNTAX_ERROR_ON_BEGIN_HEADER        32
#define SYNTAX_ERROR_ON_END_HEADER                  33
#define WRONG_INPUT_ARGUMENT                        34
define READDIR_SYSTEM_CALL_FAIL                    35 define COMMENT             100
define HEADER              101
define DATA                102 define DUMMY_HEAD          "HEAD"
define TITLE1    "REASON FILE_DATE SIZE PERMISSION CHK_SUM FILE_NAME SYM_LINK DEST_F:
#define TITLE2    "=================================================================
#define AUTOMOUNT_STR "/tmp_mnt"
#define LEN_AUTOMOUNT_STR 8
```

```c
/*
 *   mps_generator.c:  Generating output file program for Modular
 *                     Porting System generating routines
 *   Author:  Gina Liao
 *
 */
include <stdio.h>
#include <time.h>
#include "lsisys.h"
#include "mps_def.h"
#include "mps_package.h"

#define FILL_LEFT_BLANK        2
#define FILL_RIGHT_BLANK       3
#define TRUE                   1
#define FALSE                  0
#define BUFSIZE                1000
#define BLANK                  ' '
#define EOS                    '\0'

/*********************************************/
#define DEBUG                  FALSE
/*********************************************/ extern MPS_PARSER_PTR mps_parser_root_ptr;
static FILE *fp;
/* -------------------------------------------------- */
static char *fill_blank_to_max(source, max, flag)
char   *source;
int    max, flag;
{
    int i, spaces, j = 0,
    end_of_string = FALSE;
    char *buf;

if (source == NULL) {
        source = (char *) calloc (1, 7);
        strcpy(source, "<null>");
    }
    buf = (char *) calloc (1,max+1);
    if (flag == FILL_RIGHT_BLANK) {
        for (i = 0; i < max; i++) {
            if (source[i] == EOS) end_of_string = TRUE;
            if (end_of_string) buf[j++] = BLANK;
            else buf[j++] = source[i];
        }
        buf[j] = EOS;
    }
    else {
        spaces = max - strlen(source);
        for (i = 0; i < spaces; i++) buf[j++] = BLANK;
        i = 0;
        while (source[i] != EOS) buf[j++] = source[i++];
        buf[j] = EOS;
    }
    return(buf);
}
/* -------------------------------------------------- */
static prt_header(parserptr)
MPS_PARSER_PTR parserptr;
{
    MPS_HEADER_PTR curptr;

curptr = parserptr->first_headerptr;
    if (curptr == NULL) return;
    fprintf(fp, "BEGIN_HEADER\n");
```

```
    while (curptr != NULL) {
        fprintf(fp, "    %s = %s\n", curptr->keyptr, curptr->valueptr);
        curptr = curptr->aptr;
    }
    fprintf(fp, "END_HEADER\n\n");
}
/* ---------------------------------------------------------------- */
static prt_title()
{
    fprintf(fp, "%s\n", TITLE1);
    fprintf(fp, "%s\n", TITLE2);
}
/* ---------------------------------------------------------------- */
boolean mps_generator_append(infile, outfile)
char *outfile, *infile;
{
    return(mps_generator_both(infile, outfile, 1));
}
/* ---------------------------------------------------------------- */
boolean mps_generator(infile, outfile)
char *outfile, *infile;
{
    return(mps_generator_both(infile, outfile, 0));
}
/* ---------------------------------------------------------------- */
/* After an "infile" is parsed by mps_parser(), mps_generator       */
/* generates an output file "outfile" in MPS format.                */
/* ---------------------------------------------------------------- */
boolean mps_generator_both(infile, outfile, appendflag)
char *outfile, *infile;
boolean appendflag;
{
    MPS_RECORD_ORDER_NODE_PTR curptr, dummyptr;
    MPS_PARSER_PTR parserptr, find_parser_node();
    char buf[BUFSIZE], string[BUFSIZE], finish_time[13];
        int    null = 0;
    long timeofday;

this_routine = "mps_generator_both";
    load_reason_codes();
    mps_return_code = OK;
    if ((parserptr = find_parser_node(infile)) == NULL){
        mps_return_code = NO_SUCH_FILE_OR_DIRECTORY;
        mps_error(infile);
        return(FALSE);
    }
    if (appendflag) {
        if ((fp = fopen(outfile, A)) == NULL) {
            mps_return_code = OPEN_FILE_FOR_APPEND_FAIL;
                mps_error(outfile);
                return(FALSE);
        }
    }
    else {
        if ((fp = fopen(outfile, W)) == NULL) {
                mps_return_code = OPEN_FILE_FOR_WRITE_FAIL;
                mps_error(outfile);
                return(FALSE);
        }
    }
    prt_header(parserptr);
    prt_title();
    curptr = parserptr-> first_recordptr->aptr;
    while (curptr != NULL){
        switch (curptr->type) {
                case COMMENT:
```

— Page 57 —

```
                                              CURPTR
                              fprintf(fp, "%s\n", ~~urptr~~->ptr);
                              break;
        case DATA:
                              look_up_reason_code_description(((MPS_DATA_PTR)(cur]
            if (DEBUG) {
                printf("generator.c -->\n");
                printf("%s %s %s %s %s %s %s %s %s %s %s %s\n",
                       ((MPS_DATA_PTR)(curptr->ptr))->reasonptr,
                       ((MPS_DATA_PTR)(curptr->ptr))->timeptr,
                       ((MPS_DATA_PTR)(curptr->ptr))->sizeptr,
                       ((MPS_DATA_PTR)(curptr->ptr))->permptr,
                       ((MPS_DATA_PTR)(curptr->ptr))->chksumptr,
                       ((MPS_DATA_PTR)(curptr->ptr))->nameptr,
                       ((MPS_DATA_PTR)(curptr->ptr))->linkptr,
                       ((MPS_DATA_PTR)(curptr->ptr))->dstnameptr,
                       ((MPS_DATA_PTR)(curptr->ptr))->dstlinkptr,
                       ((MPS_DATA_PTR)(curptr->ptr))->dstsizeptr,
                       ((MPS_DATA_PTR)(curptr->ptr))->commentptr1,
                       ((MPS_DATA_PTR)(curptr->ptr))->commentptr2,
                       ((MPS_DATA_PTR)(curptr->ptr))->commentptr3,
                       ((MPS_DATA_PTR)(curptr->ptr))->commentptr4);
            }
/*
                sprintf(buf, "%s %-12s %s %-10s %s %s %s %s",
                        fill_blank_to_max(
            ((MPS_DATA_PTR)(curptr->ptr))->reasonptr,
            parserptr->max_file_type_column_width,
            FILL_RIGHT_BLANK),
                        fill_blank_to_max(
            ((MPS_DATA_PTR)(curptr->ptr))->timeptr,
            parserptr->max_file_time_column_width,
            FILL_RIGHT_BLANK),
                        fill_blank_to_max(
            ((MPS_DATA_PTR)(curptr->ptr))->sizeptr,
            parserptr->max_file_size_column_width,
            FILL_LEFT_BLANK),
        fill_blank_to_max(
            ((MPS_DATA_PTR)(curptr->ptr))->permptr,
            parserptr->max_file_perm_column_width,
            FILL_LEFT_BLANK),
        fill_blank_to_max(
            ((MPS_DATA_PTR)(curptr->ptr))->nameptr,
            parserptr->max_file_name_column_width,
            FILL_RIGHT_BLANK),
                        fill_blank_to_max(
            ((MPS_DATA_PTR)(curptr->ptr))->linkptr,
            parserptr->max_file_link_column_width,
            FILL_RIGHT_BLANK),
                        fill_blank_to_max(
            ((MPS_DATA_PTR)(curptr->ptr))->dstnameptr,
            parserptr->max_file_dstname_column_width,
            FILL_RIGHT_BLANK),
                        fill_blank_to_max(
            ((MPS_DATA_PTR)(curptr->ptr))->dstsizeptr,
            parserptr->max_file_dstsize_column_width,
            FILL_RIGHT_BLANK));
                fprintf(fp, "%s\n", buf);
*/
            fprintf(fp, "%s %s %s %s %s %s %s %s %s %s %s %s %s\n",
                    ((MPS_DATA_PTR)(curptr->ptr))->reasonptr,
                    ((MPS_DATA_PTR)(curptr->ptr))->timeptr,
                    ((MPS_DATA_PTR)(curptr->ptr))->sizeptr,
                    ((MPS_DATA_PTR)(curptr->ptr))->permptr,
                    ((MPS_DATA_PTR)(curptr->ptr))->chksumptr,
                    ((MPS_DATA_PTR)(curptr->ptr))->nameptr,
                    ((MPS_DATA_PTR)(curptr->ptr))->linkptr,
```

- Page 58 -

```
                              ((MPS_DATA_PTR)(curptr->ptr))->dstnameptr,
                              ((MPS_DATA_PTR)(curptr->ptr))->dstlinkptr,
                              ((MPS_DATA_PTR)(curptr->ptr))->dstsizeptr,
                              ((MPS_DATA_PTR)(curptr->ptr))->commentptr1,
                              ((MPS_DATA_PTR)(curptr->ptr))->commentptr2,
                              ((MPS_DATA_PTR)(curptr->ptr))->commentptr3,
                              ((MPS_DATA_PTR)(curptr->ptr))->commentptr4);
                     break;
              default:
                     mps_return_code = ILLEGAL_TYPE;
                     sprintf(string, "%d", curptr->type);
                     mps_error(string);
                     return(FALSE);
       }
       curptr = curptr->aptr;
    }
    fprintf(fp, "\n\n");
       timeofday = time(&null);
       fprintf(fp, "# Date Written: %s\n", ctime(&timeofday));
    fclose(fp);
    return(TRUE);
}
/* ------------------------------------------------ */
```

```
/*                   Parsing              Porting
 * mps_package.c:  Parsing routines for Modular Porting System files
 * Author:  Gina Liao
 *
 * Change History:
 *   Date      Name       Description
 * ------------------------------------------------------------
 * 30MAY91   POSNER     Added functions init_reusable_strings and
 *                      reuse_strings.  Modified mps_create_data
 *                      to use functions.  Will provide memory
 *                      savings.
 */
include <stdio.h>
include "lsisys.h"
#include "lsilib.h"
#include "mps_func.h"
#include "mps_package.h"
#include "mps_reason.h"
#include "mps_reason_def.h"

#define    MAX           1024
#define    SIZE          500
#define NULL_VALUE       "<null>"
#define NULL_SIZE        6

MPS_PARSER_PTR   mps_parser_root_ptr = NULL,
        mps_parser_last_ptr = NULL;

static hash_table reason_table;
static boolean already_loaded_reason_codes = FALSE;

static int key_flag;
static char tmp_hash_key[MAXFNAMESIZE*2+2];

/*------------------------------------------------------------
 * Variables used for reusable string processing.   30MAY91
 *----------------------------------------------------------*/
static boolean reusable_strings_initialized = FALSE;
static memory_group s_mem;
static hash_table reusable_strings_tbl;

/* ---------------------------------------------------------*/
/* Load reason codes into a global table for reference      */
/* This should be called by the parser and the generator    */
/* ---------------------------------------------------------*/
boolean load_reason_codes()
    {
    static memory_group mem_group;
    reason *this_reason;

if (already_loaded_reason_codes) return(TRUE);

mem_group = gpalloc(1024);
    smaketab(&reason_table, mem_group, FALSE);

this_reason = reason_desc;
    while (TRUE) {
        if (*this_reason->reason_code == '\0') break;
        if (! shashinsert(this_reason, reason_table,
            this_reason->reason_code, 0)) {
            fprintf(stderr,
                "Internal Error: duplicate reason codes in mps_reason.h\n");
            fprintf(stderr,
                "...Reason code is:   %s\n", this_reason->reason_code);
            return(FALSE);
        }
```

```
                ++this_reason      /* reason ^ */
            };
        already_loaded_reason_codes = TRUE;
        return(TRUE);
        }
/* --------------------------------------------------------------*/
/* Look up a reason code and its description                   */
/* --------------------------------------------------------------*/
reason *look_up_reason_code_description(reason_code)
char *reason_code;
    {
    reason *the_reason;

if (!already_loaded_reason_codes) {
        fprintf(stderr,
            "Internal Error: Reason codes looked up before loaded\n");
        return(NULL);
        }
    if (!shashget(&the_reason, reason_table, reason_code, 0)) {
        fprintf(stderr,
            "Warning:  Unknown reason code referenced: %s\n", reason_code);
        return(NULL);
        }
    return(the_reason);
    }

/*-----------------------------------------------------------------
 * function: init_reusable_strings              30MAY91
 * purpose:  This function will initialize data structures for
 *           resuing strings that are alike.  The init. will
 *           occur only the first time
 *           mps_parser_uniq_or_last_or_all is called.
 *----------------------------------------------------------------*/
init_reusable_strings()
    { if (reusable_strings_initialized) return;

s_mem = gpalloc(1024);

/*-----------------------------------------------------------
     * The reusable_strings_tbl hash provides a way
     * to save space by only allocating once the
     * space for a string.  All other times that the
     * string is present, a pointer will be returned
     * and no space allocated.
     *----------------------------------------------------------*/
    smaketab(&reusable_strings_tbl, s_mem, FALSE);
        reusable_strings_initialized = TRUE;
    } /* init_reusable_strings */

/*-----------------------------------------------------------------
 * function: reuse_string                       30MAY91
 * purpose:  This function will save space when an MPS file
 *           is loaded into memory.  Under the old system,
 *           space was allocated for each field in each rec.
 *           of a MPS file.  This function will only allocate
 *           space for a field the first time it is encountered.
 *           Each subsequent call to this function with the
 *           same string will return a pointer to the field
 *           vice reallocating space.
 *----------------------------------------------------------------*/
char *reuse_string(a_string)
char *a_string;
    {
```

- Page 61 -

```
          char *return_string;

/*-------------------------------------------
      * If a_string exists in reusable_strings_tbl
      * return contents pointer to caller.
      *-------------------------------------------*/
     if (!shashget(&return_string, reusable_strings_tbl, a_string, 0)) {
          /*-------------------------------------------
           * String does not exist in hash.
           * Allocate space for string, add string to hash,
           * then return pointer to string.
           *-------------------------------------------*/
          return_string = (char *)qalloc((unsigned)
                    strlen(a_string)+1, s_mem);
          strcpy(return_string, a_string);
          shashinsert(return_string, reusable_strings_tbl,
                    return_string, 0);
     }
     return(return_string);
} /* reuse_string */

/* -----------------------------------------------------------

-----------------------------------------------------------*/
static pointer create_record_order_node()
{
     MPS_RECORD_ORDER_NODE_PTR new;

new = (MPS_RECORD_ORDER_NODE_PTR) calloc (1, sizeof(MPS_RECORD_ORDER_NODE_TYPE)
     new->aptr = new->bptr = NULL;
     new->lptr = new->rptr = NULL;
     new->parserptr = NULL;
     new->ptr = NULL;
     new->type = UNDEFINED;
     return((pointer)new);
}
/* -----------------------------------------------------------
   -----------------------------------------------------------*/
static MPS_RECORD_ORDER_NODE_PTR create_dummy_record_order_node(parserptr)
MPS_PARSER_PTR parserptr;
{
     pointer ptr, create_record_order_node();
     MPS_RECORD_ORDER_NODE_PTR dummyptr;

ptr = create_record_order_node();
     dummyptr = (MPS_RECORD_ORDER_NODE_PTR)ptr;
     dummyptr->parserptr = parserptr;
     dummyptr->type = DUMMY;
     return(dummyptr);
}
/* -----------------------------------------------------------
     given a calling program's name, a user's name who uses
     mps_createlst, and a directory's name, an output MPS
     file format is created.
     -----------------------------------------------------------*/
pointer mps_create_parser_structure(filename)
char *filename;
{
     pointer find_parser_node();
     MPS_PARSER_PTR new;
     MPS_RECORD_ORDER_NODE_PTR dummyptr, create_dummy_record_order_node();

this_routine = "mps_create_parser_structure";
     if (filename == NULL) {
          mps_return_code = NULL_INPUT_PARAMETER;
```

```
            mps_error("")
            return(NULL);
     }
     if (find_parser_node(filename) != NULL) {
            mps_return_code = CREATE_FILE_STRUCTURE_FAIL;
            mps_error(filename);
            return((pointer)NULL);
     }
     new = (MPS_PARSER_PTR) calloc (1, sizeof(MPS_PARSER_TYPE));
     new->filenameptr = (char *) calloc (1, strlen(filename) + 1);
     strcpy(new->filenameptr, filename);
     new->memgp = gpalloc(MAX);
     smaketab(&new->file_info_hash_table, new->memgp, FALSE);
     new->max_file_name_column_width = NULL_SIZE;
     new->max_file_type_column_width = NULL_SIZE;
     new->max_file_time_column_width = NULL_SIZE;
     new->max_file_perm_column_width = NULL_SIZE;
     new->max_file_size_column_width = NULL_SIZE;
     new->max_file_link_column_width = NULL_SIZE;
     new->max_file_dstname_column_width = NULL_SIZE;
     new->max_file_dstsize_column_width = NULL_SIZE;
     dummyptr = create_dummy_record_order_node(new);
     new->first_recordptr = new->last_recordptr
                         = new->current_recordptr = dummyptr;
     new->first_commentptr = new->last_commentptr = dummyptr;
     new->first_dataptr = new->last_dataptr = dummyptr;
     new->first_headerptr = new->last_headerptr = NULL;
     new->next = NULL;
     if (mps_parser_root_ptr == NULL)
            mps_parser_root_ptr = mps_parser_last_ptr = new;
     else mps_parser_last_ptr->next= new;
     mps_parser_last_ptr = new;
     return((pointer)new);
}
/* ------------------------------------------------------------
     A node with a comment is created
   ----------------------------------------------------------*/
pointer mps_create_comment(commentptr)
char *commentptr;
{
     pointer ptr, create_record_order_node();
     MPS_RECORD_ORDER_NODE_PTR newrptr;

this_routine = "mps_create_comment";
     if (commentptr == NULL) {
            mps_return_code = NULL_INPUT_PARAMETER;
            mps_error("");
            return(NULL);
     }
     ptr = create_record_order_node();
     newrptr = (MPS_RECORD_ORDER_NODE_PTR)ptr;
     newrptr = (MPS_RECORD_ORDER_NODE_PTR)newrptr;
     newrptr->type = COMMENT;
     newrptr->ptr = (char *) calloc (1, strlen(commentptr)+1);
     strcpy(newrptr->ptr, commentptr);
     return((pointer)newrptr);
}
/* ------------------------------------------------------------
     A node loaded with a file's information such
     as time, size, ... is created.
     Modifed to be more space efficent by using reuse_string.
   ----------------------------------------------------------*/
pointer mps_create_data(reason, time, size, perm, chksum, name,
                        link, dstname, dstlink, dstsize, comment1,
                        comment2, comment3, comment4)
char *reason, *time, *size, *perm, *chksum, *name, *link, *dstname,
```

```
                      ds+size,              comment
     *dstlink, *dstsi    , *comment1, *comment2, *co   at3, *comment4;
{
        MPS_DATA_PTR newdptr;
        pointer ptr;
        MPS_RECORD_ORDER_NODE_PTR newrptr;

/* ------------------------*/
        /* newrptr: record order node*/
        /* newdptr: data record node */
        /* ------------------------*/
        ptr = create_record_order_node();
        newrptr = (MPS_RECORD_ORDER_NODE_PTR)ptr;
        newrptr->type = DATA;
        newdptr = (MPS_DATA_PTR) calloc (1, sizeof(MPS_DATA_TYPE));
        newrptr->ptr = (char *)newdptr;

init_reusable_strings();                                /*30MAY91*/ newdptr->reasonptr   = reuse_string(reason); /*30MAY91*/
        newdptr->timeptr     = reuse_string(time);
        newdptr->sizeptr     = reuse_string(size);
        newdptr->permptr     = reuse_string(perm);
        newdptr->chksumptr   = reuse_string(chksum);
        newdptr->nameptr     = reuse_string(name);
        newdptr->linkptr     = reuse_string(link);
        newdptr->dstnameptr  = reuse_string(dstname);
        newdptr->dstlinkptr  = reuse_string(dstlink);
        newdptr->dstsizeptr  = reuse_string(dstsize);
        newdptr->commentptr1 = reuse_string(comment1);
        newdptr->commentptr2 = reuse_string(comment2);
        newdptr->commentptr3 = reuse_string(comment3);
        newdptr->commentptr4 = reuse_string(comment4);

return((pointer)newrptr);
}
/* ------------------------------------------------- */
/* SHOULD BE DELETED LATER ??????????????????????? */
/*
pointer mps_create_data(type, time, size, perm, name, link, dstname, dstsize)
char *type, *time, *size, *perm, *name, *link, *dstname, *dstsize;
{
        MPS_DATA_PTR newdptr;
        pointer ptr;
        MPS_RECORD_ORDER_NODE_PTR newrptr;

ptr = create_record_order_node();
        newrptr = (MPS_RECORD_ORDER_NODE_PTR)ptr;
        newrptr->type = DATA;
        newdptr = (MPS_DATA_PTR) calloc (1, sizeof(MPS_DATA_TYPE));
        newrptr->ptr = (char *)newdptr;
        if (type == NULL) newdptr->reasonptr = NULL;
        else {
                newdptr->reasonptr = (char *) calloc (1, strlen(type) + 1);
                strcpy(newdptr->reasonptr, type);
        }
        if (time == NULL) newdptr->timeptr = NULL;
        else {
                newdptr->timeptr = (char *) calloc (1, strlen(time) + 1);
                strcpy(newdptr->timeptr, time);
        }
        if (size == NULL) newdptr->sizeptr = NULL;
        else {
                newdptr->sizeptr = (char *) calloc (1, strlen(size) + 1);
                strcpy(newdptr->sizeptr, size);
        }
        if (perm == NULL) newdptr->permptr = NULL;
```

— Page 64 —

```
        else {    /\  newptr                          (1
                newdptr->permptr = (char *) calloc (1, strlen(perm) + 1);
                strcpy(newdptr->permptr, perm);
        }
        if (name == NULL) newdptr->nameptr = NULL;
        else {
                newdptr->nameptr = (char *) calloc (1, strlen(name) + 1);
                strcpy(newdptr->nameptr, name);
        }
        if (link == NULL) newdptr->linkptr = NULL;
        else {
                newdptr->linkptr = (char *) calloc (1, strlen(link) + 1);
                strcpy(newdptr->linkptr, link);
        }
        if (dstname == NULL) newdptr->dstnameptr = NULL;
        else {
                newdptr->dstnameptr = (char *) calloc (1, strlen(dstname) + 1);
                strcpy(newdptr->dstnameptr, dstname);
        }
        if (dstsize == NULL) newdptr->dstsizeptr = NULL;
        else { newdptr->dstsizeptr = (char *) calloc (1, strlen(dstsize) + 1);
                strcpy(newdptr->dstsizeptr, dstsize);
        }
        return((pointer)newrptr);
}
*/
/* ------------------------------------------------------------*/
/* if filename not found, mps_return_code should not be set */
/* ------------------------------------------------------------*/
pointer find_parser_node(filename)
char *filename;
{
    MPS_PARSER_PTR curptr;

for (curptr = mps_parser_root_ptr;  curptr != NULL;
         curptr = curptr->next) {
        if (strcmp(curptr->filenameptr, filename) == 0)
            return((pointer)curptr);
    }
    return((pointer)NULL);
}
/* ------------------------------------------------------------
    append comment pointer to a file "filename".
   ------------------------------------------------------------*/
boolean mps_append_comment(filename, ptr)
char *filename;
pointer ptr;
{
    pointer p_parserptr, find_parser_node();
    MPS_RECORD_ORDER_NODE_PTR newrptr, new;
    MPS_PARSER_PTR parserptr;

this_routine = "mps_append_comment";
    if (ptr == NULL) {
        mps_return_code = NULL_INPUT_PARAMETER;
        mps_error("");
        return(FALSE);
    }
    new = (MPS_RECORD_ORDER_NODE_PTR)ptr;
    if ( (p_parserptr = find_parser_node(filename)) == NULL) {
        mps_return_code = NO_SUCH_FILE_OR_DIRECTORY;
        mps_error(filename);
        return(FALSE);
    }
    parserptr = (MPS_PARSER_PTR)p_parserptr;
    newrptr = (MPS_RECORD_ORDER_NODE_PTR)mps_create_comment(new->ptr);
```

```
    if (parserptr->first_commentptr == parserptr->last_recordptr){
        parserptr->first_commentptr = parserptr->last_commentptr = newrptr;
    }
    else {
        newrptr->lptr = parserptr->last_commentptr;
        parserptr->last_commentptr->rptr = newrptr;
    }
    newrptr->parserptr = parserptr;
    newrptr->bptr = parserptr->last_recordptr;
    parserptr->last_recordptr->aptr = newrptr;
    parserptr->last_recordptr = newrptr;
    parserptr->last_commentptr = newrptr;
    return(TRUE);
}
/* ---------------------------------------------------------------
------------------------------------------------------------------*/
max_column_width(newrptr, parserptr)
MPS_RECORD_ORDER_NODE_PTR    newrptr;
MPS_PARSER_PTR parserptr;
{
    if ((((MPS_DATA_PTR)(newrptr->ptr))->reasonptr) != NULL) {
        if (strlen(((MPS_DATA_PTR)(newrptr->ptr))->reasonptr) > parserptr->max_f:
            parserptr->max_file_type_column_width = strlen(((MPS_DATA_PTR)(newrp{
    }
    if ((((MPS_DATA_PTR)(newrptr->ptr))->timeptr) != NULL) {
        if (strlen(((MPS_DATA_PTR)(newrptr->ptr))->timeptr) > parserptr->max_file_t:
            parserptr->max_file_time_column_width = strlen(((MPS_DATA_PTR)(newrp{
    }
    if ((((MPS_DATA_PTR)(newrptr->ptr))->permptr) != NULL) {
        if (strlen(((MPS_DATA_PTR)(newrptr->ptr))->permptr) > parserptr->max_file_p{
            parserptr->max_file_perm_column_width = strlen(((MPS_DATA_PTR)(newrp{
    }
    if ((((MPS_DATA_PTR)(newrptr->ptr))->sizeptr) != NULL) {
        if (strlen(((MPS_DATA_PTR)(newrptr->ptr))->sizeptr) > parserptr->max_file_s:
            parserptr->max_file_size_column_width = strlen(((MPS_DATA_PTR)(newrp{
    }
    if ((((MPS_DATA_PTR)(newrptr->ptr))->nameptr) != NULL) {
        if (strlen(((MPS_DATA_PTR)(newrptr->ptr))->nameptr) > parserptr->max_file_n{
            parserptr->max_file_name_column_width = strlen(((MPS_DATA_PTR)(newrp{
    }
    if ((((MPS_DATA_PTR)(newrptr->ptr))->linkptr) != NULL) {
        if (strlen(((MPS_DATA_PTR)(newrptr->ptr))->linkptr) > parserptr->max_file_l:
            parserptr->max_file_link_column_width = strlen(((MPS_DATA_PTR)(newrp{
    }
    if ((((MPS_DATA_PTR)(newrptr->ptr))->dstnameptr) != NULL) {
        if (strlen(((MPS_DATA_PTR)(newrptr->ptr))->dstnameptr) > parserptr->max_fil{
            parserptr->max_file_dstname_column_width = strlen(((MPS_DATA_PTR)(ne{
    }
    if ((((MPS_DATA_PTR)(newrptr->ptr))->dstsizeptr) != NULL) {
        if (strlen(((MPS_DATA_PTR)(newrptr->ptr))->dstsizeptr) > parserptr->max_fil{
            parserptr->max_file_dstsize_column_width = strlen(((MPS_DATA_PTR)(ne{
    }
}

/****************************************************************/
boolean mps_append_data_uniq_and_all(filename, p_ptr, flag)
char *filename;
pointer p_ptr;
boolean flag;
{
    pointer p_newrptr, p_parserptr, mps_create_data();
    MPS_PARSER_PTR        parserptr;
    MPS_RECORD_ORDER_NODE_PTR      new, newrptr, ptr;
    char *hash_key, key[SIZE], char_flag[SIZE];

this_routine = "mps_append_data_uniq_and_all";
```

```
        key_flag = flag;  /* {149 */ if (p_ptr == NULL) {
    mps_return_code = NULL_INPUT_PARAMETER;
    mps_error("");
    return(FALSE);
}
new = (MPS_RECORD_ORDER_NODE_PTR)p_ptr;
if ((p_parserptr = find_parser_node(filename)) == NULL) {
    mps_return_code = NO_SUCH_FILE_OR_DIRECTORY;
    mps_error(filename);
    return(FALSE);
}
parserptr = (MPS_PARSER_PTR)p_parserptr;
p_newrptr = mps_create_data(((MPS_DATA_PTR)(new->ptr))->reasonptr,
                            ((MPS_DATA_PTR)(new->ptr))->timeptr,
                            ((MPS_DATA_PTR)(new->ptr))->sizeptr,
                            ((MPS_DATA_PTR)(new->ptr))->permptr,
                            ((MPS_DATA_PTR)(new->ptr))->chksumptr,
                            ((MPS_DATA_PTR)(new->ptr))->nameptr,
                            ((MPS_DATA_PTR)(new->ptr))->linkptr,
                            ((MPS_DATA_PTR)(new->ptr))->dstnameptr,
                            ((MPS_DATA_PTR)(new->ptr))->dstlinkptr,
                            ((MPS_DATA_PTR)(new->ptr))->dstsizeptr,
                            ((MPS_DATA_PTR)(new->ptr))->commentptr1,
                            ((MPS_DATA_PTR)(new->ptr))->commentptr2,
                            ((MPS_DATA_PTR)(new->ptr))->commentptr3,
                            ((MPS_DATA_PTR)(new->ptr))->commentptr4);
newrptr = (MPS_RECORD_ORDER_NODE_PTR)p_newrptr;
    switch (flag) {
        case UNIQ:
            if ((((MPS_DATA_PTR)(newrptr->ptr))->nameptr) == NULL) {
                mps_return_code = KEY_IS_NULL;
                mps_error("");
                return(FALSE);
            }
            else {
                    if (!shashinsert(newrptr, parserptr->file_info_hash
                            ((MPS_DATA_PTR)(newrptr->ptr))->nameptr,
                            strlen(((MPS_DATA_PTR)(newrptr->ptr))->name]
                        mps_return_code = INSERTION_FAIL;
                        mps_error(((MPS_DATA_PTR)(newrptr->ptr))->namep1
                        return(FALSE);
                    }
            }
            break;
        case LAST:
            if ((((MPS_DATA_PTR)(newrptr->ptr))->nameptr) == NULL) {
                    mps_return_code = KEY_IS_NULL;
                    mps_error("");
                    return(FALSE);
            }
            else {
                    /* -------------------------------------------- */
                    /* only difference between mps_append_data and  */
                    /* mps_append_data_last, i.e., delete previous  */
                    /* duplicate line and insert most current one   */
                    /* -------------------------------------------- */
                    if (shashget(&ptr, parserptr->file_info_hash_table,
                            ((MPS_DATA_PTR)(newrptr->ptr))->nameptr,
                            strlen(((MPS_DATA_PTR)(newrptr->ptr))->name]

if (!shashinsert(newrptr, parserptr->file_info_hash
                            ((MPS_DATA_PTR)(newrptr->ptr))->nameptr,
                            strlen(((MPS_DATA_PTR)(newrptr->ptr))->name]
```

```
                                                            mps_return
                                                               ∧
                                            mp  eturn_code = INSERTION_FAIL;
                                            mps_error(((MPS_DATA_PTR)(newrptr->]
                                            return(FALSE);
                                            }
                                    }
                        break;
                case ALL:
            case ALL_LAST:
                                if ((((MPS_DATA_PTR)(newrptr->ptr))->nameptr) == NU:
                                (((MPS_DATA_PTR)(newrptr->ptr))->dstnameptr) == NUL:
                                        mps_return_code = KEY_IS_NULL;
                                        mps_error("");
                                        return(FALSE);
                                        }
                                else {
                                        sprintf(key, "%s_%s",
                                        ((MPS_DATA_PTR)(newrptr->ptr))->nameptr,
                                        ((MPS_DATA_PTR)(newrptr->ptr))->dstnameptr)
                                        hash_key = (char *) calloc (1, strlen(key)+:
                                        strcpy(hash_key, key);

if (shashget(&ptr, parserptr->file_info_has]
                                                        hash_key, strlen(hash_key))
                                                if (flag == ALL) {
                                                        mps_return_code = Il
                                                        mps_error(hash_key)
                                                        }
                                                mps_delete(ptr);
                                                } if (!shashinsert(newrptr, parserptr->file_ii
                                                hash_key, strlen(hash_key))) {
                                                mps_return_code = INSERTION_FAIL;
                                                mps_error(hash_key);
                                                return(FALSE);
                                                }
                                        }
                                break;
                default:
                                mps_return_code = WRONG_INPUT_ARGUMENT;
                                sprintf(char_flag, "%d", flag);
                                mps_error(char_flag);
                                return(FALSE);
                                break;
        }
        max_column_width(newrptr, parserptr);

/* ---------------------------------------------------- */
        /* lptr and rptr are for right sequence of data nodes */
        /* ---------------------------------------------------- */
        if (parserptr->first_dataptr == parserptr->first_recordptr)
                parserptr->first_dataptr = parserptr->last_dataptr = newrptr;
        else {
                newrptr->lptr = parserptr->last_dataptr;
                parserptr->last_dataptr->rptr = newrptr;
        }
        /* ---------------------------------------------------- */
        /* aptr and bptr are for right sequence of record nodes */
        /* ---------------------------------------------------- */
        newrptr->parserptr = parserptr;
        newrptr->bptr = parserptr->last_recordptr;
        parserptr->last_recordptr->aptr = newrptr;
        parserptr->last_recordptr = newrptr;
        parserptr->last_dataptr = newrptr;
        return(TRUE);
}
```

Page 68 -

```
/* ----------------------------------------------------------*/
/*  If there is duplicate lines, concatenate source and target */
/*  file name as key to put entry in hash table.               */
/* ----------------------------------------------------------*/
boolean mps_append_data_all(filename, p_ptr)
char *filename;
pointer p_ptr;
{
    this_routine = "mps_append_data_all";
    return(mps_append_data_uniq_and_all(filename, p_ptr, ALL));
}

/* ----------------------------------------------------------*/
/* only last entry (key = source name) is in hash table if   */
/* there are duplicate lines in input file                   */
/* ----------------------------------------------------------*/
boolean mps_append_data_last(filename, p_ptr)
char *filename;
pointer p_ptr;
{
        this_routine = "mps_append_data_last";
        return(mps_append_data_uniq_and_all(filename, p_ptr, LAST));
}

/* ----------------------------------------------------------*/
/* only last entry (key = source name) is in hash table if   */
/* there are duplicate lines in input file                   */
/* ----------------------------------------------------------*/
boolean mps_append_data_all_last(filename, p_ptr)
char *filename;
pointer p_ptr;
{
        this_routine = "mps_append_data_all_last";
        return(mps_append_data_uniq_and_all(filename, p_ptr, ALL_LAST));
}
/* ----------------------------------------------------------*/
/*  If there is duplicate lines, show error message.         */
/*  Key is source file name                                  */
/* ----------------------------------------------------------*/
boolean mps_append_data(filename, p_ptr)
char *filename;
pointer p_ptr;
{
    this_routine = "mps_append_data";
    return(mps_append_data_uniq_and_all(filename, p_ptr, UNIQ));
}

/* ----------------------------------------------------------
    append a pair "keyword" and "value" to a file "filename".
   ----------------------------------------------------------*/
boolean mps_append_header(filename, keyword, value)
char *filename, *keyword, *value;
{
    pointer find_parser_node(), p_parserptr;
    MPS_PARSER_PTR parserptr;
    MPS_HEADER_PTR newhptr;

this_routine = "mps_append_header";
    if ((p_parserptr = find_parser_node(filename)) == NULL) {
        mps_return_code = NO_SUCH_FILE_OR_DIRECTORY;
        mps_error(filename);
        return(FALSE);
    }
    if ((keyword == NULL) || (value == NULL)) {
        mps_return_code = NULL_INPUT_PARAMETER;
```

- Page 69 -

```
        mps_error("")
        return(FALSE);
    }
    parserptr = (MPS_PARSER_PTR)p_parserptr;
    newhptr = (MPS_HEADER_PTR) calloc (1, sizeof(MPS_HEADER_TYPE));
    newhptr->parserptr = parserptr;
    newhptr->keyptr = (char *) calloc (1, strlen(keyword) + 1);
    strcpy(newhptr->keyptr, keyword);
    newhptr->valueptr = (char *) calloc (1, strlen(value) + 1);
    strcpy(newhptr->valueptr, value);

if (parserptr->first_headerptr == NULL) {
        parserptr->first_headerptr = parserptr->last_headerptr = newhptr;
    }
    else {
        newhptr->bptr = parserptr->last_headerptr;
        parserptr->last_headerptr->aptr = newhptr;
        parserptr->last_headerptr = newhptr;
    }
    return(TRUE);
}
/* ------------------------------------------------------------
    check if "key_filename" is found in the file "filename"
   ------------------------------------------------------------*/
pointer mps_find_data(filename, key_filename)
char *filename, *key_filename;
{
    pointer p_parserptr;
    MPS_PARSER_PTR parserptr;
    MPS_RECORD_ORDER_NODE_PTR rptr;
    char string[SIZE];

this_routine = "mps_find_data";
    if ((p_parserptr = find_parser_node(filename)) == NULL) {
        mps_return_code = NO_SUCH_FILE_OR_DIRECTORY;
        mps_error(filename);
        return((pointer)NULL);
    }
    if (key_filename == NULL) {
        mps_return_code = NULL_INPUT_PARAMETER;
        mps_error("");
        return((pointer)NULL);
    }
    parserptr = (MPS_PARSER_PTR)p_parserptr;
    if (mps_xstrlexcmp(key_filename, DUMMY_HEAD, " \t")) return((pointer)parserptr-
    if (shashget(&rptr, parserptr->file_info_hash_table, key_filename, strlen(key_f
        mps_return_code = ENTRY_NOT_EXIST_IN_FILE ;
        sprintf(string, "%s %s", key_filename, filename);
        return((pointer)NULL);
    }
    else return((pointer)rptr);
}
/* ------------------------------------------------------------
    get previous entry in "filename". The entry could be
    data or comment.
   ------------------------------------------------------------*/
pointer mps_previous_record(filename)
char *filename;
{
    pointer p_parserptr;
    MPS_PARSER_PTR parserptr;

this_routine = "mps_previous_record";
    if ((p_parserptr = find_parser_node(filename)) == NULL) {
        mps_return_code = NO_SUCH_FILE_OR_DIRECTORY;
        mps_error(filename);
```

```
            return((pointer)NULL);
    }
    parserptr = (MPS_PARSER_PTR)p_parserptr;
    if (parserptr->first_recordptr->aptr == parserptr->current_recordptr)
        return((pointer)NULL);
    else {
        parserptr->current_recordptr = parserptr->current_recordptr->bptr;
        return((pointer)parserptr->current_recordptr);
    }
}
/* ------------------------------------------------------------
    make file pointer points to first entry in data and
    comment area.
   ------------------------------------------------------------*/
boolean mps_reset_record(filename)
char *filename;
{
    pointer p_parserptr;
    MPS_PARSER_PTR parserptr;

this_routine = "mps_reset_record";
    if ((p_parserptr = find_parser_node(filename)) == NULL) {
        mps_return_code = NO_SUCH_FILE_OR_DIRECTORY;
        mps_error(filename);
        return(FALSE);
    }
    parserptr = (MPS_PARSER_PTR)p_parserptr;
    parserptr->current_recordptr = parserptr->first_recordptr;
    return(TRUE);
}
/* ------------------------------------------------------------
    get next entry in "filename". The entry could be data
    or comment.
   ------------------------------------------------------------*/
pointer mps_next_record(filename)
char *filename;
{
    pointer p_parserptr;
    MPS_PARSER_PTR parserptr;

this_routine = "mps_next_record";
    if ((p_parserptr = find_parser_node(filename)) == NULL) {
        mps_return_code = NO_SUCH_FILE_OR_DIRECTORY;
        mps_error(filename);
        return((pointer)NULL);
    }
    parserptr = (MPS_PARSER_PTR)p_parserptr;
    if (parserptr->current_recordptr->aptr == NULL) return((pointer)NULL);
    parserptr->current_recordptr = parserptr->current_recordptr->aptr;
    return((pointer)parserptr->current_recordptr);
}
/* ------------------------------------------------------------
    Given a pointer, it will tell what kind data structure
    it is. It could be "DATA", "COMMENT", "HEADER", or
    "ILLEGAL_TYPE".
   ------------------------------------------------------------*/
mps_record_type(p_ptr)
pointer p_ptr;
{
    MPS_RECORD_ORDER_NODE_PTR rptr;
    char string[SIZE];

rptr = (MPS_RECORD_ORDER_NODE_PTR)p_ptr;
    if (rptr == NULL) {
        mps_return_code = NULL_INPUT_PARAMETER;
        mps_error("");
```

```
            return(ILLEGAL_INPUT);
    }
    if (rptr->type == COMMENT || rptr->type == HEADER || rptr->type == DATA)
        return(rptr->type);
    mps_return_code = ILLEGAL_TYPE;
    sprintf(string, "%d", rptr->type);
    mps_error(string);
    return(ILLEGAL_TYPE);
}
/* --------------------------------------------------------------
    check if the comment can be found in the filename.
   --------------------------------------------------------------*/
pointer mps_find_comment(filename, comment)
char *filename, *comment;
{
    pointer p_parserptr;
    MPS_PARSER_PTR parserptr;
    MPS_RECORD_ORDER_NODE_PTR curptr;

this_routine = "mps_find_comment";
    if ((p_parserptr = find_parser_node(filename)) == NULL) {
        mps_return_code = NO_SUCH_FILE_OR_DIRECTORY;
        mps_error(filename);
        return((pointer)NULL);
    }
    parserptr = (MPS_PARSER_PTR)p_parserptr;
    if (mps_xstrlexcmp(comment, DUMMY_HEAD, " \t")) return((pointer)parserptr->first
    if ((curptr = parserptr->first_commentptr) == NULL) return((pointer)NULL);
    if (curptr->type == DUMMY) return((pointer)NULL);
    while (curptr != NULL) {
        if (mps_xstrlexcmp(curptr->ptr, comment, " \t#")) return((pointer)curptr);
        curptr = curptr->rptr;
    }
    return((pointer)NULL);
}
/* --------------------------------------------------------------
    Given a filename, check if "key" can be found.
   --------------------------------------------------------------*/
pointer mps_find_header(filename, key)
char *filename, *key;
{
    pointer p_parserptr;
    MPS_PARSER_PTR parserptr;
    MPS_HEADER_PTR curptr;

this_routine = "mps_find_header";
    if ((p_parserptr = find_parser_node(filename)) == NULL) {
        mps_return_code = NO_SUCH_FILE_OR_DIRECTORY;
        mps_error(filename);
        return((pointer)NULL);
    }
    parserptr = (MPS_PARSER_PTR)p_parserptr;
    curptr = parserptr->first_headerptr;
    while (curptr != NULL) {
        if (mps_xstrlexcmp(curptr->keyptr, key, " \t"))
            return((pointer)curptr);
        curptr = curptr->aptr;
    }
    return((pointer)NULL);
}
/* --------------------------------------------------------------
   --------------------------------------------------------------*/
/* for test only */
prt_comment(filename)
char *filename;
{
```

```
    pointer p_parserp;
    MPS_PARSER_PTR parserptr;
    MPS_RECORD_ORDER_NODE_PTR curptr;

this_routine = "prt_comment";
    printf("\n\n0------- prt_comment ----------\n");
    if ((p_parserptr = find_parser_node(filename)) == NULL) {
        mps_return_code = NO_SUCH_FILE_OR_DIRECTORY;
        mps_error(filename);
        return(NULL);
    }
    parserptr = (MPS_PARSER_PTR)p_parserptr;
    curptr = parserptr->first_commentptr->aptr;
    while (curptr != NULL) {
        printf("%s\n", (curptr->ptr));
        curptr = curptr->rptr;
    }
    printf("1------- prt_comment ----------\n");
}
/* ------------------------------------------------------------
   ----------------------------------------------------------*/
/* for test only */
prt_data(filename)
char *filename;
{
    pointer p_parserptr;
    MPS_PARSER_PTR parserptr;
    MPS_RECORD_ORDER_NODE_PTR curptr;

this_routine = "prt_data";
    printf("0------- prt_data----------\n");
    if ((p_parserptr = find_parser_node(filename)) == NULL) {
        mps_return_code = NO_SUCH_FILE_OR_DIRECTORY;
        mps_error(filename);
        return(NULL);
    }
    parserptr = (MPS_PARSER_PTR)p_parserptr;
    curptr = parserptr->first_dataptr->aptr;
    while (curptr != NULL) {
        printf("%s\n", ((MPS_DATA_PTR)curptr->ptr)->nameptr);
        curptr = curptr->rptr;
    }
    printf("1------- prt_data----------\n");
}
/* ------------------------------------------------------------
    get file size of an entry pointed by p_ptr.
   ----------------------------------------------------------*/
char *mps_file_size(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    return(((MPS_DATA_PTR)(rptr->ptr))->sizeptr);
}
/* ------------------------------------------------------------
    get file type of an entry pointed by p_ptr.
   ----------------------------------------------------------*/
char *mps_file_reason(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
```

```
        if (rptr->type != DATA) return(NULL);
        return(((MPS_DATA_PTR)(rptr->ptr))->reasonptr;
}
/* ----------------------------------------------------------
    get file date of an entry pointed by p_ptr.
   ----------------------------------------------------------*/
char *mps_file_date(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->timeptr);
}
/* ----------------------------------------------------------
    get file permission of an entry pointed by p_ptr.
   ----------------------------------------------------------*/
char *mps_file_permission(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->permptr);
}
/* ----------------------------------------------------------
    get check sum of a file name of an entry pointed by p_ptr.
   ----------------------------------------------------------*/
char *mps_file_chksum(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->chksumptr);
}
/* ----------------------------------------------------------
    get file name of an entry pointed by p_ptr.
   ----------------------------------------------------------*/
char *mps_file_name(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    if (rptr->type != DATA) return(NULL);
    return(((MPS_DATA_PTR)(rptr->ptr))->nameptr);
}
/* ----------------------------------------------------------
   ----------------------------------------------------------*/
char *mps_file_link(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
```

```
                                    DATA_PTR)
    return(((MPS_DATA_PTR(rptr->ptr))->linkptr);
}
/* ----------------------------------------------------------
    get destination file name of an entry pointed by p_ptr.
   ----------------------------------------------------------*/
char *mps_file_dstname(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->dstnameptr);
}
/* ----------------------------------------------------------
    get what destination file name points to if destination file
    name is a symbolic link.
   ----------------------------------------------------------*/
char *mps_file_dstlink(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->dstlinkptr);
}
/* ----------------------------------------------------------
    get destination file size of an entry pointed by p_ptr.
   ----------------------------------------------------------*/
char *mps_file_dstsize(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->dstsizeptr);
}
/* ----------------------------------------------------------
    get comment1 of an entry pointed by p_ptr.
   ----------------------------------------------------------*/
char *mps_file_comment1(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->commentptr1);
}
/* ----------------------------------------------------------
    get comment2 of an entry pointed by p_ptr.
   ----------------------------------------------------------*/
char *mps_file_comment2(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
```

```
        return(((MPS_DATA_PTR)(rptr->ptr))->commentptr;
}
/* ------------------------------------------------------------
        get comment3 of an entry pointed by p_ptr.
   ----------------------------------------------------------*/
char *mps_file_comment3(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->commentptr3);
}
/* ------------------------------------------------------------
        get comment4 of an entry pointed by p_ptr.
   ----------------------------------------------------------*/
char *mps_file_comment4(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != DATA) return(NULL);
    return(((MPS_DATA_PTR)(rptr->ptr))->commentptr4);
}
/* ------------------------------------------------------------
        get comment pointed by p_ptr.
   ----------------------------------------------------------*/
char *mps_comment_content(p_ptr)
pointer p_ptr;
{
    MPS_RECORD_ORDER_NODE_PTR rptr;

if (p_ptr == NULL) return(NULL);
    rptr = (MPS_RECORD_ORDER_NODE_PTR)p_ptr;
    if (rptr->type != COMMENT) return(NULL);
    return(rptr->ptr);
}
/* ------------------------------------------------------------
        get keyword pointed by p_ptr.
   ----------------------------------------------------------*/
char *mps_header_key(p_ptr)
pointer p_ptr;
{
    MPS_HEADER_PTR ptr;

ptr = (MPS_HEADER_PTR)p_ptr;
    if (ptr == NULL) return(NULL);
    return(ptr->keyptr);
}
/* ------------------------------------------------------------
        get value pointed by p_ptr.
   ----------------------------------------------------------*/
char *mps_header_value(p_ptr)
pointer p_ptr;
{
    MPS_HEADER_PTR ptr;

ptr = (MPS_HEADER_PTR)p_ptr;
    if (ptr == NULL) return(NULL);
    return(ptr->valueptr);
}
/* ------------------------------------------------------------
```

```
   free a comment pointer.
   ------------------------------------------------------------*/
mps_free_comment(ptr)
pointer ptr;
{
    free(ptr);
}
/* ------------------------------------------------------------
   free a data pointer.
   ------------------------------------------------------------*/
mps_free_data(ptr)
pointer ptr;
{
    free(ptr);
}
/* ------------------------------------------------------------
   ------------------------------------------------------------*/
boolean adjust_link_for_comment_deletion(ptr)
MPS_RECORD_ORDER_NODE_PTR ptr;
{
    if ((ptr->lptr == NULL) && (ptr->rptr == NULL))  {
/*
            ptr->parserptr->first_commentptr = ptr->parserptr->last_commentptr = NU:
*/
            ptr->parserptr->first_commentptr = ptr->parserptr->last_commentptr =
                                          ptr->parserptr->first_recordptr;
    }
    else {
        if (ptr->lptr == NULL) {
                ptr->parserptr->first_commentptr = ptr->rptr;
                ptr->parserptr->first_commentptr->lptr = NULL;
            }
            else    if (ptr->rptr == NULL) {
                        ptr->parserptr->last_commentptr = ptr->lptr;
                        ptr->lptr->rptr = NULL;
                    }
                    else {
                        ptr->lptr->rptr = ptr->rptr;
                        ptr->rptr->lptr = ptr->lptr;
                    }
    }
    return(TRUE);
}
/* ------------------------------------------------------------
   ------------------------------------------------------------*/
boolean adjust_link_for_data_deletion(ptr)
MPS_RECORD_ORDER_NODE_PTR ptr;
{
    this_routine = "adjust_link_for_data_deletion";
    if ((ptr->lptr == NULL) && (ptr->rptr == NULL))  {
/*
            ptr->parserptr->first_dataptr = ptr->parserptr->last_dataptr = NULL;
*/
            ptr->parserptr->first_dataptr = ptr->parserptr->last_dataptr =
                                          ptr->parserptr->first_recordptr;
    }
    else {
        if (ptr->lptr == NULL) {
                ptr->parserptr->first_dataptr = ptr->rptr;
                ptr->parserptr->first_dataptr->lptr = NULL;
            }
            else    if (ptr->rptr == NULL) {
                        ptr->parserptr->last_dataptr = ptr->lptr;
                        ptr->lptr->rptr = NULL;
                    }
                    else {
```

```
                            ptr->lptr->rptr = ptr->rptr;
                            ptr->rptr->lptr = ptr->lptr;
                }
        }
        if (((MPS_DATA_PTR)(ptr->ptr))->nameptr == NULL) {
            mps_return_code = KEY_IS_NULL;
            mps_error("");
            return(FALSE);
        }
        else {
                if ((key_flag == ALL) || (key_flag == ALL_LAST)) {
                        sprintf(tmp_hash_key, "%s_%s",
                            ((MPS_DATA_PTR)(ptr->ptr))->nameptr,
                            ((MPS_DATA_PTR)(ptr->ptr))->dstnameptr);
                        shashdelete(ptr->parserptr->file_info_hash_table,
                                    tmp_hash_key, strlen(tmp_hash_key));
                }
                else {
                    shashdelete(ptr->parserptr->file_info_hash_table,
                                ((MPS_DATA_PTR)(ptr->ptr))->nameptr, strlen(((MPS_D
                }
                return(TRUE);
        }
}
/* ---------------------------------------------------------------- */
/* delete ptr (MPS_ORDER_NODE_PTR) from a list of record nodes      */
/* ptr could be a data or comment node                              */
/* ---------------------------------------------------------------- */
boolean mps_delete(p_ptr)
pointer p_ptr;
{
    int rcode;
    MPS_RECORD_ORDER_NODE_PTR ptr;
    char string[SIZE];

this_routine = "mps_delete";
    ptr = (MPS_RECORD_ORDER_NODE_PTR)p_ptr;
    if (ptr == NULL){
        mps_return_code = NULL_INPUT_PARAMETER;
        mps_error("");
        return(FALSE);
    }
    if ((ptr->type != COMMENT) && (ptr->type != DATA)) {
        mps_return_code =  ILLEGAL_TYPE;
        sprintf(string, "%s", ptr->type);
        mps_error(string);
        return(FALSE);
    }
    /* ---------------------------------- */
    /* remove from record node linked list */
    /* ---------------------------------- */
    if (ptr == ptr->parserptr->last_recordptr) {
        ptr->parserptr->last_recordptr = ptr->bptr;
        ptr->bptr->aptr = NULL;
    }
    else {
        ptr->bptr->aptr = ptr-> aptr;
        ptr->aptr->bptr = ptr->bptr;
    }
    /* ------------------------------------- */
    /* remove from comment or data linked list */
    /* ------------------------------------- */
    if (ptr->type == COMMENT)
        rcode = adjust_link_for_comment_deletion(ptr);
    else rcode = adjust_link_for_data_deletion(ptr);
    if (rcode) {
```

```
            free(ptr);
            return(TRUE);
    }
    else return(FALSE);
}
/* ---------------------------------------------------------------
   ------------------------------------------------------------*/
static MPS_RECORD_ORDER_NODE_PTR previous_same_type(pptr, ptr)
MPS_RECORD_ORDER_NODE_PTR pptr, ptr;
{
    MPS_RECORD_ORDER_NODE_PTR curptr;

curptr = pptr;
    while ((curptr->type != DUMMY) && (curptr->type != ptr->type))
        curptr = curptr->bptr;
    return(curptr);
}
/* ---------------------------------------------------------------
   ------------------------------------------------------------*/
static adjust_link_for_comment_insertion(pptr, ptr)
MPS_RECORD_ORDER_NODE_PTR ptr, pptr;
{
    MPS_RECORD_ORDER_NODE_PTR previousptr, previous_same_type();

if (pptr->type == DUMMY) {
        /* no comments at all */
        if (pptr->parserptr->first_commentptr == pptr) {
            pptr->parserptr->first_commentptr = pptr->parserptr->last_commentptr = ]
        }
        else {
            ptr->rptr = pptr->parserptr->first_commentptr;
            pptr->parserptr->first_commentptr->lptr = ptr;
            pptr->parserptr->first_commentptr = ptr;
        }
    }
    else {
        previousptr = previous_same_type(pptr, ptr);
        if (previousptr->rptr == NULL) {
            ptr->lptr = previousptr;
            previousptr->rptr = ptr;
            previousptr->parserptr->last_commentptr = ptr;
        }
        else {
            ptr->lptr = previousptr;
            ptr->rptr = previousptr->rptr;
            previousptr->rptr = ptr;
            ptr->rptr->lptr = ptr;
        }
    }
    return(TRUE);
}
/* ---------------------------------------------------------------
   ------------------------------------------------------------*/
static adjust_link_for_data_insertion(pptr, ptr)
MPS_RECORD_ORDER_NODE_PTR ptr, pptr;
{
    MPS_RECORD_ORDER_NODE_PTR dummyptr, previousptr, previous_same_type();

this_routine = "adjust_link_for_data_insertion";

if (((MPS_DATA_PTR)(ptr->ptr))->nameptr == NULL) {
        mps_return_code = KEY_IS_NULL;
        mps_error("");
        return(FALSE);
    }
    else {
```

```
        if (!shashins  (ptr, ptr->parserptr->file_  fo_hash_table,
            ((MPS_DATA_PTR)(ptr->ptr))->nameptr, strlen(((MPS_DATA_PTR)(ptr->ptr))-:
            mps_return_code = INSERTION_FAIL;
            mps_error(((MPS_DATA_PTR)(ptr->ptr))->nameptr);
            return(FALSE);
        }
    }
    if (pptr->type == DUMMY) {
        /* no data at all */
        if (pptr->parserptr->first_dataptr == pptr) {
            pptr->parserptr->first_dataptr = pptr->parserptr->last_dataptr = ptr;
        }
        else {
            ptr->rptr = pptr->parserptr->first_dataptr;
            pptr->parserptr->first_dataptr->lptr = ptr;
            pptr->parserptr->first_dataptr = ptr;
        }
    }
    else {
        previousptr = previous_same_type(pptr, ptr);
        if (previousptr->rptr == NULL) {
            ptr->lptr = previousptr;
            previousptr->rptr = ptr;
            previousptr->parserptr->last_dataptr = ptr;
        }
        else {
            ptr->lptr = previousptr;
            ptr->rptr = previousptr->rptr;
            previousptr->rptr = ptr;
            ptr->rptr->lptr = ptr;
        }
    } return(TRUE);
}
/* ------------------------------------------------------------
    insert an entry pointer "p_inerted_ptr" right after "p_pptr".
------------------------------------------------------------*/
boolean mps_insert(p_pptr, p_inserted_ptr)
pointer p_pptr, p_inserted_ptr;
{
    int rcode;
    pointer p_ptr;
    MPS_RECORD_ORDER_NODE_PTR dummyptr, ptr, pptr, inserted_ptr;
    char *mps_file_reason(), *mps_file_date(), *mps_file_size(), *mps_file_permissi(
        *mps_file_name(), *mps_file_link(), *mps_file_dstname(), *mps_file_dstsize(
        string[SIZE];

this_routine = "mps_insert";
    pptr = (MPS_RECORD_ORDER_NODE_PTR)p_pptr;
    inserted_ptr = (MPS_RECORD_ORDER_NODE_PTR)p_inserted_ptr;

if (inserted_ptr == NULL || pptr == NULL) {
        mps_return_code = NULL_INPUT_PARAMETER;
        mps_error("");
        return(FALSE);
    }
    switch (inserted_ptr->type) {
        case COMMENT:
            p_ptr= mps_create_comment(inserted_ptr->ptr);
            ptr = (MPS_RECORD_ORDER_NODE_PTR)p_ptr;
            break;
        case DATA:
            if (((MPS_DATA_PTR)(inserted_ptr->ptr))->nameptr == NULL) {
                mps_return_code = KEY_IS_NULL;
                mps_error("");
```

```
                    return (FALSE)
              retur   FALSE);
          }
          if (shashget(&dummyptr,
                      pptr->parserptr->file_info_hash_table,
                      ((MPS_DATA_PTR)(inserted_ptr->ptr))->nameptr,
                      strlen(((MPS_DATA_PTR)(inserted_ptr->ptr))->nameptr))){
              mps_return_code = FILE_NAME_NOT_UNIQUE;
              mps_error(((MPS_DATA_PTR)(inserted_ptr->ptr))->nameptr);
              return(FALSE);
          }
          p_ptr = mps_create_data(mps_file_reason(inserted_ptr),
                                  mps_file_date(inserted_ptr),
                                  mps_file_size(inserted_ptr),
                                  mps_file_permission(inserted_ptr),
                                  mps_file_chksum(inserted_ptr),
                                  mps_file_name(inserted_ptr),
                                  mps_file_link(inserted_ptr),
                                  mps_file_dstname(inserted_ptr),
                                  mps_file_dstlink(inserted_ptr),
                                  mps_file_dstsize(inserted_ptr),
                                  mps_file_comment1(inserted_ptr),
                                  mps_file_comment2(inserted_ptr),
                                  mps_file_comment3(inserted_ptr),
                                  mps_file_comment4(inserted_ptr));
          ptr = (MPS_RECORD_ORDER_NODE_PTR)p_ptr;
          max_column_width(ptr, pptr->parserptr);
          break;
        default:
          mps_return_code = ILLEGAL_TYPE;
          sprintf(string, "%d", inserted_ptr->type);
          mps_error(string);
          return(FALSE);
      }
      ptr->parserptr = pptr->parserptr;
      if (pptr->parserptr->last_recordptr == pptr) {
          pptr->parserptr->last_recordptr = ptr;
          pptr->aptr = ptr;
          ptr->bptr == pptr;
      }
      else {
          ptr->bptr = pptr;
          ptr->aptr = pptr->aptr;
          pptr->aptr = ptr;
          ptr->aptr->bptr = ptr;
      }
      if (ptr->type == COMMENT) {
          rcode = adjust_link_for_comment_insertion(pptr, ptr);
      }
      else rcode = adjust_link_for_data_insertion(pptr, ptr);
      return(rcode);
}
/* -----------------------------------------------------------
      delete a keyword from a filename.
   -----------------------------------------------------------*/
boolean mps_delete_header(filename, keyword)
char *filename, *keyword;
{
      pointer p_ptr, mps_find_header();
      MPS_HEADER_PTR ptr;

this_routine = "mps_delete_header";
      if ((p_ptr = mps_find_header(filename, keyword)) == NULL) {
          mps_return_code = NO_SUCH_FILE_OR_DIRECTORY;
          mps_error(filename);
          return(FALSE);
      }
```

```c
        ptr = (MPS_HEADER_PR)p_ptr;
        if ((ptr->bptr == NULL) && (ptr->aptr == NULL)) {
            ptr->parserptr->first_headerptr = ptr->parserptr->last_headerptr = NULL;
        }
        else {
            if (ptr->bptr == NULL) {
                    ptr->parserptr->first_headerptr = ptr->aptr;
                    ptr->parserptr->first_headerptr->bptr = NULL;
            }
            else    if (ptr->aptr == NULL) {
                            ptr->parserptr->last_headerptr = ptr->bptr;
                            ptr->bptr->aptr = NULL;
                    }
                    else {
                            ptr->bptr->aptr = ptr->aptr;
                            ptr->aptr->bptr = ptr->bptr;
                    }
        }
        free(ptr);
        return(TRUE);
}

/*------------------------------------------------------------------
 * msp_remove_node - remove a mps structure node and free the data
 * areas it has reserved.
 *------------------------------------------------------------------*/
boolean mps_remove_node(filename)
char *filename;
{
        MPS_PARSER_PTR curptr, prevptr;

prevptr = NULL;

/* Find node to remove */
        for (curptr = mps_parser_root_ptr; curptr != NULL;
                curptr = curptr->next){
                if (strcmp(curptr->filenameptr, filename) == 0) {
                        /* We found it, now remove it */
                        if (prevptr == NULL)
                                /* First node in list */
                                mps_parser_root_ptr = curptr->next;
                        else
                                prevptr->next = curptr->next;

/* If last node on list, readjust last pointer */
                        if (curptr->next == NULL)
                                mps_parser_last_ptr = prevptr;

return(TRUE);
                }
                else
                        prevptr = curptr;
        }

/* No matching node was found, therefore nothing removed */
        return(FALSE);

} /* mps_remove_node */

/* ------------------------------------------------------------------
   ------------------------------------------------------------------*/
/* for test only */
print_reverse_header(filename)
```

```
char *filename;
{
    pointer p_parserptr, find_parser_node();
    MPS_PARSER_PTR parserptr;
    MPS_HEADER_PTR curptr;

printf("----reverse--\n");
    if ((p_parserptr = find_parser_node(filename)) == NULL) {
        printf("parserptr NULL\n");
        return(FALSE);
    }
    parserptr = (MPS_PARSER_PTR)p_parserptr;
    curptr = parserptr->last_headerptr;
    while (curptr != NULL) {
        printf("%s", curptr->parserptr);
        if (!strcmp(curptr->keyptr, "BEGIN_HEADER"))
            printf("%s\n", curptr->keyptr);
        else if (!strcmp(curptr->keyptr, "END_HEADER"))
                printf("%s\n\n", curptr->keyptr);
            else printf("    %s = %s\n", curptr->keyptr, curptr->valueptr);
        curptr = curptr->bptr;
    }
    printf("####reverse##\n");
}
/* ----------------------------------------------------------------
   ----------------------------------------------------------------*/
/* for test only */
print_header(filename)
char *filename;
{
    pointer p_parserptr, find_parser_node();
    MPS_PARSER_PTR parserptr;
    MPS_HEADER_PTR curptr;

printf("-------------\n");
    if ((p_parserptr = find_parser_node(filename)) == NULL) {
        printf("parserptr NULL\n");
        return(FALSE);
    }
    parserptr = (MPS_PARSER_PTR)p_parserptr;
    curptr = parserptr->first_headerptr;
    while (curptr != NULL) {
        if (!strcmp(curptr->keyptr, "BEGIN_HEADER"))
            printf("%s\n", curptr->keyptr);
        else if (!strcmp(curptr->keyptr, "END_HEADER"))
                printf("%s\n\n", curptr->keyptr);
            else printf("    %s = %s\n", curptr->keyptr, curptr->valueptr);
        curptr = curptr->aptr;
    }
    printf("############\n");
}
```

```
/*******************   *************************  (***********/
/*                                                            */
/*  mps_package.h: Definitions for Modular Porting System     */
/*                 Parser/Generator package                   */
/*  Author: Gina Liao                                         */
/*                                                            */
/**************************************************************/ include "rexx.h"
include "lsinhsh.h"
#include "mps_def.h"

#define TITLE         103
#define DUMMY         104
#define ILLEGAL_INPUT  105
#define UNDEFINED     -999
#define ERRMSG_SIZE   1000

/*------------------------------------------------------------*/
/* structure linking file record order list.                  */
/* lptr, rptr --> for right sequence of data nodes            */
/* aptr, bptr --> for right sequence of record nodes          */
/* type       --> could be COMMENT or DATA                    */
/* ptr        --> point to data node or comment node          */
/* parserptr  --> point to a node about general info          */
/*                about input parsed file                     */
/*------------------------------------------------------------*/
typedef struct MPS_RECORD_ORDER_NODE {
    struct MPS_RECORD_ORDER_NODE *bptr, *aptr, *lptr, *rptr;
    int type;
    char *ptr;
    struct MPS_PARSER_NODE *parserptr;
} MPS_RECORD_ORDER_NODE_TYPE, *MPS_RECORD_ORDER_NODE_PTR;

/*----------------------------------*/
/* structure representing data line */
/*----------------------------------*/
typedef struct MPS_DATA_NODE {
    char *reasonptr, *timeptr, *sizeptr, *permptr,
         *chksumptr, *nameptr, *linkptr, *dstnameptr,
         *dstlinkptr, *dstsizeptr, *commentptr1,
         *commentptr2, *commentptr3, *commentptr4;
} MPS_DATA_TYPE, *MPS_DATA_PTR;

/*------------------------------------*/
/* structure representing header line */
/*------------------------------------*/
typedef struct MPS_HEADER_NODE {
    char *keyptr, *valueptr;
    struct MPS_HEADER_NODE *bptr, *aptr;
    struct MPS_PARSER_NODE *parserptr;
} MPS_HEADER_TYPE, *MPS_HEADER_PTR;

/*------------------------------------------------------*/
/* Data type definitions returned by mps_parser()       */
/* structure representing general information           */
/*                                                      */
/* first_headerptr   : point to first header node       */
/* last_headerptr    : point to last header node        */
/* first_recordptr   : point to first record node.      */
/*                     record node can be data node     */
/*                     or comment node.                 */
/* last_recordptr    : point to last record node.       */
/* current_recordptr : point to current record node.    */
/* first_commentptr  : point to first comment node      */
/* last_commentptr   : point to last comment node       */
```

```
/* first_dataptr    : point to first data node
/* last_dataptr     : point to last data node      */
/*----------------------------------------------*/
typedef struct MPS_PARSER_NODE {
    char *filenameptr;
    /* about a file */
    int  max_file_type_column_width;
    int  max_file_time_column_width;
    int  max_file_perm_column_width;
    int  max_file_size_column_width;
    int  max_file_name_column_width;
    int  max_file_link_column_width;
    int  max_file_dstname_column_width;
    int  max_file_dstsize_column_width;
    memory_group memgp;
    MPS_HEADER_PTR first_headerptr, last_headerptr;
    MPS_RECORD_ORDER_NODE_PTR
            first_recordptr, last_recordptr,
            current_recordptr, first_commentptr,
            last_commentptr, first_dataptr,
            last_dataptr;
    struct MPS_PARSER_NODE *next;
    hash_table file_info_hash_table;
} MPS_PARSER_TYPE, *MPS_PARSER_PTR;

extern MPS_PARSER_PTR mps_parser_root_ptr;
extern char *this_routine,
            mps_error_message[],
                    *reuse_string();
extern int  mps_return_code,
            mps_xstrlexcmp(),
            mps_transtime(),
            mps_error(),
                    init_reusable_string();                    /*30MAY91*/
```

```
/*
 * mps_parser.c:  Parsing routines for Modular Porting System files
 * Author:  Gina Liao
 *
 * Change History:
 *    Date    Name       Description
 *    ------------------------------------------------------------
 *    30MAY91 POSNER     Modified mps_parser_uniq_or_last_or_all and
 *                       process_data to reuse data strings in order
 *                       to save memory.
 *    30MAY91 POSNER     Modified check_size, check_permission, and
 *                       check_date to allow "<NULL>"
 */ include <stdio.h>
include "lsisys.h"
#include "lsigpal.h"
#include "lsinhsh.h"
#include "lsilex.h"
#include "mps_func.h"
#include "mps_package.h"

/*******************************************************/
#define DEBUG   0
/*******************************************************/
/* lexical scanning definitions */
#define IDENTIFIER      1
#define NEWLINE         2
#define BEGIN_HEADER    3
define END_HEADER      4 define MAX             1024
define LEN             20
#define EOS             '\0'
#define BLNK            ' '
#define EMPTY_STR       ""
#define LOW_NULL        "<null>"
#define UPPER_NULL      "<NULL>"
#define ERROR           "<ERROR>"

static memory_group memgp;
static tstream tstr;
static int lex_linenumber,
           tok,
           record_area;
static boolean  last_token_was_newline,
                got_begin_header,
                got_end_header,
                header_area;

extern MPS_PARSER_PTR mps_parser_root_ptr,
                      mps_parser_last_ptr;
/* -------------------------------------------------------------*/
static init_parser()
{
    this_routine = "init_parser";
    if (DEBUG) {
        printf("\n\nAdded columns to MPS formats:\n");
        printf("================================\n");
        printf("REASON: reason code\n");
        printf("CHK_SUM: check sum\n");
        printf("DEST_SYM_LINK: destination file name's symbolic link\n");
        printf("COMMENT1: extra comment\n");
        printf("COMMENT2: extra comment\n");
        printf("COMMENT3: extra comment\n");
        printf("COMMENT4: extra comment\n");
```

— Page 86 —

```
            printf("\n");

printf("\n\nChanged features:\n");
            printf("=================\n");
            printf(".  store <NULL> in data structre and \n");
            printf("   return <NULL> to mps_file_size, mps_file_name...\n\n");
            printf(".  add chksum, dstlink, comment1, comment2, comment3\n");
            printf("   and comment4 to mps_create_data\n");
            printf(".  change data structure of MPS_DATA_NODE \n");
            printf(".  mps_file_type is changed to be mps_file_reason\n");
            printf(".  add mps_file_chksum, mps_file_dstlink, \n");
            printf("   mps_file_comment1, mps_comment2, mps_comment3\n");
            printf("   mps_file_comment4\n");
            printf("\n");

printf("skip headers except the first one header\n");
        }
        lex_linenumber = 0;
        mps_return_code = OK;
        last_token_was_newline = TRUE;
        record_area = FALSE;
        header_area = FALSE;
        got_begin_header = FALSE;
        got_end_header = FALSE;
        load_reason_codes();
}

/* -----------------------------------------------------------*/
static token_kind()
{
        char line[MAX], temp[MAX], string[MAX];

this_routine = "token_kind";
        /* TITLE2:"==================================================================
        if (strcmp(TITLE2, tstr) == 0) {
            if (!got_end_header)   {
                mps_return_code = END_HEADER_MISSING;
                sprintf(string, "%d", --lex_linenumber);
                mps_error(string);
                return(SYNTAX_ERROR);
            }
            record_area = TRUE;
            return(TITLE);
        }
        if (strcmp("REASON", tstr) == 0) {
            strcpy(line, tstr);
            lexgrab(temp, "EN\n", MAX, tstr);
            strcat(line, temp);
            if (mps_xstrlexcmp(line, TITLE1, " \t")) return(TITLE);
            else return(SYNTAX_ERROR);
        }
        if ((*tstr == '#') && (last_token_was_newline))
            return(COMMENT);
        if (record_area) return(DATA);
        if (header_area) return(HEADER);
        return(SYNTAX_ERROR);
}
/* -----------------------------------------------------------*/
static process_comment(filename)
char *filename;
{
        char comment[MAX], temp[MAX];
        pointer mps_create_comment(), newrptr;
```

— Page 87 —

```
        this_routine = "process_comment";
        strcpy(comment,tstr);
        lexgrab(temp,"EN\n",MAX,tstr);
        strcat(comment,temp);
        newrptr = mps_create_comment(comment);
        mps_append_comment(filename, newrptr);
}
/* ------------------------------------------------------------*/
static process_header(filename)
char *filename;
{
        char    key1[MAX], key[MAX], value[MAX];

this_routine = "process_header";
        strcpy(key, tstr);
        strcat(key," ");
        lexgrab(key1, "EN=", MAX, tstr);
        strcat(key, mps_space(key1));
        lexgrab(value, "IN=", MAX, tstr);
        lexgrab(value, "EN\n", MAX, tstr);
        mps_append_header(filename, key, mps_space(value));
}
/* ------------------------------------------------------------*/
static boolean check_date(time)
char *time;
{
        int i;

this_routine = "check_date";
        if (strlen(time) != 12) {
                    if (strcmp(time, UPPER_NULL) == 0) return(TRUE);   /*30MAY91*/
                    else return(FALSE);
                    }
        for (i = 0; i < 12; i++)
            if (!isdigit(time[i])) return(FALSE);
        return(TRUE);
}
/* ------------------------------------------------------------*/
static boolean check_permission(perm)
char *perm;
{
        int i;

this_routine = "check_permission";
        if (strlen(perm) != 10) {
                    if (strcmp(perm, UPPER_NULL) == 0) return(TRUE);   /*30MAY91*/
                    else return(FALSE);
                    }
        for (i = 0; i < 10; i++)
            if (perm[i] != '-' && perm[i] != 'r' &&
                perm[i] != 'w' && perm[i] != 'x' &&
                              perm[i] != 'd')
                    return(FALSE);
        return(TRUE);
}
/* ------------------------------------------------------------*/
static boolean check_checksum(checksum)
char *checksum;
{
        int i;

this_routine = "check_checksum";
        if (strcmp(checksum, LOW_NULL) == 0 ||
            strcmp(checksum, UPPER_NULL) == 0)
            return(TRUE);
        for (i = 0; i < strlen(checksum); i++)
```

```
            if (!isdigit( chksum[i])) return(FALSE);
    return(TRUE);
}
/* ----------------------------------------------------------------*/
static boolean check_size(size)
char *size;
{
    int i, i_size;

this_routine = "check_size";
    for (i = 0; i < strlen(size); i++)
        if (!isdigit(size[i])) {
                            if (strcmp(size, UPPER_NULL) == 0) return(TRUE); /*30MAY91*
                            else return(FALSE);
                            }
    i_size = atoi(size);
    if (i_size < 0) return(FALSE);
    else return(TRUE);
}
/* ----------------------------------------------------------------*/
static boolean check_dstsize(dstsize)
char *dstsize;
{
    int i_dstsize, i;

this_routine = "check_dstsize";
    if (strcmp(dstsize, LOW_NULL) == 0 ||
        strcmp(dstsize, UPPER_NULL) == 0)
        return(TRUE);
    for (i = 0; i < strlen(dstsize); i++)
        if (!isdigit(dstsize[i])) return(FALSE);
    i_dstsize = atoi(dstsize);
    if (i_dstsize < 0) return(FALSE);
    return(TRUE);
}
/* ----------------------------------------------------------------*/
/* REASON FILE_DATE SIZE PERMISSION CHK_SUM FILE_NAME SYM_LINK    */
/* DEST_FILE_NAME DEST_FILE_LINK DEST_FILE_SIZE COMMENT1 COMMENT2 */
/* COMMENT3 COMMENT4                                              */
/*
/* Modified to reuse space for previously allocated strings.      */
/* ----------------------------------------------------------------*/
static boolean process_data(filename, flag)
int flag;
char *filename;
{
    pointer newrptr, mps_create_data();
    MPS_PARSER_PTR parserptr, find_parser_node();
    char *reason, *time, *size, *perm,
        *chksum, *name, *link, *dstname, *dstlink,
        *dstsize, *comment1, *comment2, *comment3,
        *comment4, string[MAX], char_flag;

this_routine = "process_data";

/* ------ */
    /* reason */
    /* ------ */
        reason = reuse_string((char *)tstr);                       /*30MAY91*/
        look_up_reason_code_description(reason);

/* ---- */
    /* time */
    /* ---- */
    if (lexget(tstr) != IDENTIFIER) {
        mps_return_code = WRONG_NUMBER_OF_COLUMN;
```

```c
        /* locate the number of lex_linenumber */
        sprintf(string, "%d", --lex_linenumber);
        mps_error(string);
        return(FALSE);
}
if (check_date(tstr))
           time = reuse_string((char *)tstr);                    /*30MAY91*/
 else {
    mps_return_code = INVALID_DATE;
    sprintf(string, "%s", tstr);
    mps_error(string);
    time = (char *) calloc (1, strlen(ERROR)+1);
    strcpy(time, ERROR);
}

/* ---- */
/* size */
/* ---- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
if (check_size(tstr))
           size = reuse_string((char *)tstr);                    /*30MAY91*/
 else {
    mps_return_code = INVALID_SIZE;
    sprintf(string, "%s", tstr);
    mps_error(string);
    size = (char *) calloc (1, strlen(ERROR)+1);
    strcpy(size, ERROR);
}

/* ---------- */
/* permission */
/* ---------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
if (check_permission(tstr))
           perm = reuse_string((char *)tstr);                    /*30MAY91*/
else {
    mps_return_code = INVALID_PERMISSION;
    sprintf(string, "%s", tstr);
    mps_error(string);
    perm = (char *) calloc (1, strlen(ERROR)+1);
    strcpy(perm, ERROR);
}

/* --------- */
/* check sum */
/* --------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
    if (check_checksum(tstr))
               chksum = reuse_string((char *)tstr);    /*30MAY91*/
        else {
           mps_return_code = INVALID_CHECK_SUM;
```

```
                sprintf(string, "%s", tstr);
                mps_error(string);
                chksum = (char *) calloc (1, strlen(ERROR)+1);
                strcpy(chksum, ERROR);
        }
/* --------- */
/* file name */
/* --------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
        name = reuse_string((char *)tstr);                      /*30MAY91*/

/* -------------- */
/* symbolic link */
/* -------------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
        link = reuse_string((char *)tstr);                      /*30MAY91*/

/* --------------------- */
/* destination file name */
/* --------------------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
        dstname = reuse_string((char *)tstr);                   /*30MAY91*/

/* ------------------------------ */
/* destination file symbolic link */
/* ------------------------------ */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
        dstlink = reuse_string((char *)tstr);                   /*30MAY91*/

/* --------------------- */
/* destination file size */
/* --------------------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
if (check_dstsize(tstr))
            dstsize = reuse_string((char *)tstr);
 else {
    mps_return_code = INVALID_SIZE;
    sprintf(string, "%s", tstr);
    mps_error(string);
    dstsize = (char *) calloc (1, strlen(ERROR)+1);
```

```
               dstsize
    strcpy(dstsiz   ERROR);
}
/* --------- */
/* comment 1 */
/* --------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
    comment1 = reuse_string((char *)tstr);                    /*30MAY91*/

/* --------- */
/* comment 2 */
/* --------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
    comment2 = reuse_string((char *)tstr);                    /*30MAY91*/

/* --------- */
/* comment 3 */
/* --------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
    comment3 = reuse_string((char *)tstr);                    /*30MAY91*/

/* --------- */
/* comment 4 */
/* --------- */
if (lexget(tstr) != IDENTIFIER) {
    mps_return_code = WRONG_NUMBER_OF_COLUMN;
    sprintf(string, "%d", --lex_linenumber);
    mps_error(string);
    return(FALSE);
}
    comment4 = reuse_string((char *)tstr);                    /*30MAY91*/ newrptr = mps_create_data(reason, time, size, perm,
                          chksum, name, link, dstname,
                          dstlink, dstsize, comment1,
                          comment2, comment3, comment4);
if ((parserptr = find_parser_node(filename)) == NULL) {
    mps_return_code = NO_SUCH_FILE_OR_DIRECTORY;
    mps_error(filename);
        mps_free_data(newrptr);                               /*30MAY91*/
    return(FALSE);
}
/* --------------------- */
/* newrptr is a data node */
/* --------------------- */
switch (flag) {
    case UNIQ:  mps_append_data(filename, newrptr);
                break;
    case LAST:  mps_append_data_last(filename, newrptr);
                break;
            case ALL:    mps_append_data_all(filename, newrptr);
```

```
                                             break;
        case ALL_LAST:  mps_append_data_all_last(filename, newrptr);
                                             break;
        default:    mps_return_code = WRONG_INPUT_ARGUMENT;
                                             sprintf(char_flag, "%d", flag);
                                             mps_error(char_flag);
                                             break;
    } max_column_width(newrptr, parserptr);
        mps_free_data(newrptr);                                          /* 30MAY91*,
    return(TRUE);
}

/* ----------------------------------------------------------*/
pointer mps_parser_uniq_or_last_or_all(filename, flag)
char *filename;
{
    pointer p_parserptr, mps_create_parser_structure();
    MPS_PARSER_PTR parserptr;
    FILE *fp, *fopen();
    char string[MAX];

this_routine = "mps_parser_uniq_or_last_or_all";
    init_parser();
        init_reusable_strings();                                         /*30MAY91*/
    if ((fp = fopen(filename, R)) == NULL) {
        mps_return_code = OPEN_FILE_FOR_READ_FAIL;
        mps_error(filename);
        return((pointer)NULL);
    }
    memgp = gpalloc(MAX);
    tstr = lexcreate(memgp, "", LEX_ERROR, EOF, IDENTIFIER,
                    IDENTIFIER, IDENTIFIER);
    lexlinevar(tstr, &lex_linenumber);
    lexletter(tstr, 0, "#-./+=%&^$@!*(){}[]|\_~'?<>,:;");
    lexreswd(tstr, "\n", NEWLINE);
    lexreswd(tstr, "BEGIN_HEADER", BEGIN_HEADER);
    lexreswd(tstr, "END_HEADER", END_HEADER);
    if ((p_parserptr = mps_create_parser_structure(filename)) == NULL) {
        mps_return_code = CREATE_FILE_STRUCTURE_FAIL;
        mps_error(filename);
        return((pointer)NULL);
    }
    parserptr = (MPS_PARSER_PTR)p_parserptr;
    smaketab(&parserptr->file_info_hash_table, memgp, FALSE);
    lexopen(tstr, lex_file, fp);
    tok = lexget(tstr);
    while (tok != EOF) {
     switch(tok) {
        case NEWLINE:
            last_token_was_newline = TRUE;
            break;
        case LEX_ERROR:
            mps_return_code = SYNTAX_ERROR;
            sprintf(string, "%d %s", lex_linenumber, filename);
            mps_error(string);
            return((pointer)NULL);
            break;
        case BEGIN_HEADER:
            got_begin_header = TRUE;
            if (got_end_header) {
                while ((tok = lexget(tstr)) != EOF) {
                    if (strcmp(TITLE2, tstr) == 0)
                        break;
```

— Page 93 —

```
                    }
                }
                else header_area = TRUE;
                break;
            case END_HEADER:
                got_end_header = TRUE;
                header_area = FALSE;
                break;
            case IDENTIFIER:
                switch(token_kind()) {
                    case COMMENT:
                        process_comment(filename);
                        break;
                    case DATA:
                        process_data(filename, flag);
                        break;
                    case HEADER:
                        process_header(filename);
                        break;
                    case TITLE:
                        break;
                    case SYNTAX_ERROR:
                        mps_return_code = SYNTAX_ERROR;
                        sprintf(string, "%d %s", lex_linenumber, filename);
                        mps_error(string);
                        return((pointer)NULL);
                        break;
                }
                break;
        }
        tok = lexget(tstr);
    }
    if (mps_return_code == 0)   return((pointer)parserptr);
    else return((pointer)NULL);
}
/* ---------------------------------------------------------------*/
pointer mps_parser_all(filename)
char *filename;
{
    this_routine = "mps_parser_all";
    return(mps_parser_uniq_or_last_or_all(filename, ALL));
}
/* --------------------------------------------------------------- */
pointer mps_parser_last(filename)
char *filename;
{
    this_routine = "mps_parser_last";
    return(mps_parser_uniq_or_last_or_all(filename, LAST));
}
/* ---------------------------------------------------------------*/
pointer mps_parser_all_last(filename)
char *filename;
{
        this_routine = "mps_parser_all_last";
        return(mps_parser_uniq_or_last_or_all(filename, ALL_LAST));
}
/* --------------------------------------------------------------- */
/* given a MPS file format input file, load all information        */
/* about this file to a data structure pointed by                  */
/* MPS_PARSER_PTR.                                                 */
/* --------------------------------------------------------------- */
pointer mps_parser(filename)
char *filename;
{
    this_routine = "mps_parser";
    return(mps_parser_uniq_or_last_or_all(filename, UNIQ));
```

```
}
/*-------------------------------------------------------------*/
pointer mps_parse(filename, flag)
char    *filename;
boolean flag;
{
        this_routine = "mps_parse";
        return(mps_parser_uniq_or_last_or_all(filename, flag));
}
/* ----------------------------------------------------------- */
```

```
/*---------------------   -------------------------   ----------------------
 *
 *   MPS Reason Codes Include File
 *
 */ typedef struct reason_desc_struct
    {
    char    *reason_code;
    char    *reason_desc_1;
    char    *reason_desc_2;
    char    *reason_desc_3;
    } reason;

extern int load_reason_codes();
extern reason *look_up_reason_code_description();
```

```
/*----------------------    ---------------------------     ----------------------
 *
 *   MPS Reason Codes Include File
 *
 *   Version 1.1 - 24 July 1990
 *
 *   The MPS Parser and Generator will only allow reason codes from
 *   the following list.  These codes should be loaded into a hash
 *   table for checking and description look-up with the reason code
 *   being the key and the description being the contents.  The function
 *   for loading the hash table is "load_reason_codes()".  The function
 *   for looking up a description and checking for legal reason codes
 *   is "char *look_up_reason_code_description(reason_code)".
 *
 */
reason reason_desc[] = {
"RD_FAIL",
"General code to indicate that the file cannot be read at all",
"for any conceivable reason.",
"", "RD_OPEN_FAIL",
"Cannot open a file for read.",
"","", "RD_PERMISSION_FAIL",
"Do not have permission to read the file.  This is a type of",
"open failure.",
"", "RD_CORRUPT",
"File is determined to be corrupt - probably a file system error.",
"","", "RD_NO_MOUNT",
"File system is not mounted appropriately, so file cannot be accessed.",
"","", "RD_SERVER_DOWN",
"Fileserver or gateway may be down, so file cannot be accessed.",
"","", "RD_NO_FILE",
"There is no such file.",
"","", "RD_BAD_PERMISSION",
"File has incorrect permissions for distribution.",
"","", "RD_NOT_STRIPPED",
"Binary has not been stripped.",
"","", "RD_NO_DYN_LINK",
"Binary is not dynamically linked.",
"","", "RD_NOT_STRIPPED_NOR_DYN_LINK",
"Binary is neither stripped nor dynamically linked.",
"","", "WR_FAIL",
"General code to indicate that the file cannot be written at",
"all for any conceivable reason.",
"",
```

- Page 97 -

```
"WR_OPEN_FAIL",
"Cannot open a file for write.",
"","",

"WR_PERMISSION_FAIL",
"Do not have permission to write the file.  This is a type of",
"open failure.",
"", "WR_BAD_PATH",
"The path name is not legal for the file system, such as too long",
"or has illegal characters.  This is a type of open failure.",
"", "WR_NO_PATH",
"The target path name does not exist and cannot be created.",
"Thus the file being transferred could not be written.",
"", "WR_BAD_FILE_NAME",
"The file name is not legal for the file system, such as too long",
"or has an illegal format or illegal characters.  This is a type",
"of open failure.", "WR_NO_MOUNT",
"File system is not mounted appropriately, so file cannot be accessed.",
"","", "WR_SERVER_DOWN",
"Fileserver or gateway may be down, so file cannot be accessed.",
"","", "WR_DISK_FULL",
"There is not enough disk space on the target destination to copy",
"the file(s).",
"", "XM_FAIL",
"General code to indicate that the file cannot be written at",
"all for any conceivable reason.",
"", "XM_LOGIN_FAIL",
"Unable to log into a remote account or execute remote procedure calls",
"", "", "XM_BAD_HOST",
"The hostname for remote login does not appear to exist.",
"","", "XM_NO_ACCOUNT",
"The account name for remote login does not appear to exist.",
"","", "XM_BAD_PASSWORD",
"The password for the account used for remote login appears",
"incorrect.",
"", "XM_RHOSTS_FAIL",
"Unable to update the .rhosts file on the remote host home directory",
"to get permission for remote procedure calls required for the",
"update process OR the remote SUN OS release level is too low.",

"XM_SOURCE_RD_FAIL",
```

— Page 98 —

```
"A warning to indicate that the source file could not be used in",
"diffing with the target file after copying - so the diff checking",
"will be skipped.", "XM_TARGET_RD_FAIL",
"File was copied, but could not be read back for diff with the",
"source file.",
"", "XM_SIZE_FAIL",
"The source and target files have different sizes after copying.",
"","", "XM_DIFF_FAIL",
"The source and target files differ after copying.",
"","", "XM_LOCAL_DISK_PROBLEM",
"The local disk does not have enough space or has insufficient",
"permission for scratch files to be created during the update process",
"", "XM_DF_PROBLEM",
"Unable to ascertain the amount of disk space available at the target",
"site because the 'df' command failed or took excessive time and was",
"timed out.", "XM_CONNECTION_DROPPED",
"The connection was cut off or timed out, such as for ftp.",
"","", "XM_CONNECTION_HUNG",
"File transmission was taking too long - MPS assumed it was hung",
"and gave up.  MPS may assume a minimum transmittal rate and using",
"the file size decide how long transmission should take.", "XM_REMOTE_INACCESSIBLE",
"A ping command is unable to reach the remote machine.",
"This is either a network problem or the remote machine is",
"down or does not exist", "TF_FAIL",
"MPS failed in some unknown way and this file entry may not be",
"trustworthy.",
"", "TF_XM_TOOL_PROBLEM",
"The tool used for transmittal cannot be found or has a problem",
"(such as cp, tar, ftp, or compress).",
"", "TF_COMMAND_NOT_FOUND",
"A system command required by MPS cannot be found,",
"or some more general failure occurred.",
"", "TF_MPS_TOOL_NOT_FOUND",
"An MPS tool required by MPS cannot be found.",
"","", "IM_ROOT_PATH_NOT_IN_ENV_LOCATIONS",
"Path does not appear in env.locations.",
"AEIS will correct this problem.",
" ",

"IM_BOM_MISSING_IN_SOURCE",
```

```
                    application                            array
"File is in bom application file but not in source array.",
"","",
"IM_STAT_FAIL",
"Stat system call failed for file.",
"","", "IM_BOM_MISSING_IN_PORT",
"File is in bom application file but not in port.list.",
"","", "IM_SOURCE_MISSING_IN_PORT_NOPORT",
"File is in source area but not in port.list or noport.list.",
"","", "IM_SOURCE_MISSING_IN_BOM",
"File is in source area but not in bom application file.",
"","", "IM_BAD_NICKNAME",
"The nickname of the target site is not recognized.",
"It may be missing in the config file, such as for design center updates.",
"", "IM_BAD_ENVIRONMENT_FILE",
"The environment file used to specify distribution areas for software",
"has a syntax or other kind of problem.",
"", "IM_FILE_CHANGED_DURING_READ",
"File changed contents while the file was being read.",
"","", "IM_MISSING_IN_SOURCE",
"A file is in the port.list file, but is not in the",
"source area.",
"", "IM_ONLY_IN_SOURCE",
"A file is in the source area, but listed in neither the",
"port.list nor the noport.list.",
"", "IM_ONLY_IN_PORT_LIST",
"The file is listed in the port.list, but is not in either the",
"source or target areas.",
"", "IM_MISSING_IN_PORT_LIST",
"The file is in both the source and target areas, but is not",
"listed in the port.list.",
"", "IM_PORT_NOPORT_CONFLICT",
"A file is listed in both the port.list and noport.list files.",
"","", "IM_MISSING_IN_TARGET",
"The file is in the source area but not the target area.",
"","", "IM_TARGET_OUT_OF_DATE",
"The file is in the source and target areas, but they are",
"different in size, permission, date, or possibly contents.",
"",

"IM_DUMMY_SYMLINK",
```

- Page 100 -

```
                      points                              directory
"The symbolic link points to non-existing file or directory.",
"", "", "IM_LOOP_SYMLINK",
"The symbolic link points to itself.",
"", "", "IM_MANUAL_SUPPRESSION",
"Porting/updating was manually suppressed.",
"", "", "EASI_UPDATE_FAILURE",
"The EASI data base could not be updated.  The most likely problem",
"would be a FTP failure.  The EASI data base must be updated",
"manually for this site", "IM_MAX_SHIP_SIZE_REACHED",
"This shipment exceeds the maximum shipment size.",
"Files that did not fit will be sent in next shipment.",
"", "IM_MAX_PORT_SIZE_REACHED",
"The maximum number of files or total port size exceeds the",
"imposed MPS porting limits. Files not ported this time will",
"be ported the next time the MPS porting routines are run. ", "<NULL>",
"Reason code not defined",
"","", "<null>",
"Reason code not defined",
"","",

"","","",""
       };
```

```c
#include <sys/file.h>

/* Defintions for permission maps */
#define S_GREAD     0000040
#define S_GWRITE    0000020
define S_GEXEC     0000010 define S_OREAD     0000004
define S_OWRITE    0000002
define S_OEXEC     0000001 extern char *strcpy(), *strcat();

/*--------------------------------------------------------------------*
 * Store the permissions of the specified file or directory.
 *--------------------------------------------------------------------*/
store_file_permissions(full_path, field_to_load)
char *full_path;
char *field_to_load;
        {
        struct stat buf;

stat(full_path, &buf);
        if ((buf.st_mode & S_IFMT) == S_IFDIR)
                strcpy(field_to_load, "d");
        else
                strcpy(field_to_load, "-");

if (buf.st_mode & S_IREAD) strcat(field_to_load, "r");
            else strcat(field_to_load, "-");
    if (buf.st_mode & S_IWRITE) strcat(field_to_load, "w");
    else strcat(field_to_load, "-");
    if (buf.st_mode & S_IEXEC) strcat(field_to_load, "x");
    else strcat(field_to_load, "-");

if (buf.st_mode & S_GREAD) strcat(field_to_load, "r");
    else strcat(field_to_load, "-");
    if (buf.st_mode & S_GWRITE) strcat(field_to_load, "w");
    else strcat(field_to_load, "-");
    if (buf.st_mode & S_GEXEC) strcat(field_to_load, "x");
    else strcat(field_to_load, "-");

if (buf.st_mode & S_OREAD) strcat(field_to_load, "r");
    else strcat(field_to_load, "-");
    if (buf.st_mode & S_OWRITE) strcat(field_to_load, "w");
    else strcat(field_to_load, "-");
    if (buf.st_mode & S_OEXEC) strcat(field_to_load, "x");
    else strcat(field_to_load, "-");
}
```

```
/* -----------------                -------------------------    --------------*
 * package: prescription.c
 * purpose: This package deals with the loading and retrieval of
 *          data from the aspen prescription file.
 * author:  Matt Posner
 *
 * entry points:
 *      int load_prescription(prescription_file_name,
 *          job_directory, validation_only, check_for_corrupt_libs,
 *          ignore_missing_files)
 *      char *prescription_file_name;
 *      char *job_directory;
 *      boolean validation_only;
 *      boolean check_for_corrupt_libs;
 *      boolean ignore_missing_files
 *          This routine will load in the data from the prescription
 *          file and save it in various data structures.
 *          Retrun codes: PRESCRIPTION_OK when no errors
 *                        ERRORS_IN_PRESCRIPTION when error in presc.
 *                        ERRORS_BUT_CONTINUED when errors in presc.
 *                           but the "-I" option was specified.
 *
 *      sort_table get_size_hash_data()
 *          This routine will sort the size hash table based on
 *          it's keys. The size hash is used to estimate the time
 *          it will take to write jobs.  Each entry in the hash
 *          contains the total bytes to be written for env_name
 *          and media_name. The caller will be returned a pointer to
 *          an array of structures.  The structure will contain
 *          a pointer to the key and a pointer to the contents
 *          of the hash.
 *
 *      pointer get_prescription_list(list_choice)
 *      int list_choice;
 *          This routine returns a pointer to the requested list
 *          of prescription records.  The list choices may be
 *          found in prescription.h.
 *
 *      prescription_data *get_prescription_general_data()
 *          Returns a pointer to non-repeating prescription data.
 *
 *      auth_group_data *get_auth_group_list()
 *          This routine returns a pointer to the authorization
 *          group data.
 *
 *
 * prescribe.<job#> syntax:
 *              JOB_NUMBER <job_number>;
 *              PRIORITY <priority_number>;
 *              [EST_SHIPMENT_DATE <ship_date>;]
 *              [SALSE_ORDER <order_number>;]
 *              NICKNAME <nickname>;
 *              COMPANY <company_name>;
 *              JOB_CLASS <job_class>;
 *      JOB_DESCRIPTION <job_description>;
 *              TARGET_PLATFORM <platform_name> <tag>;
 *              PLANNER <userid> <full_name>;
 *              TAPEWRITER <userid> <full_name>;
 *       CHECKER <userid> <full_name>;
 *       INCLUDE_DOCS <doc_flag>;
 *              [COVER_LETTER_TEMPLATE <template_full_path>;]
 *              [AUTH_GROUP ,auth_group_number>;
 *          LICENSE_EXP_DATE <license_exp_date>;
 *          MAINT_EXP_DATE <maint_exp_date>;
 *          PRODUCT
 *              CODE <product_code>;
```

```
*                DESCRIPTION <product_description>;              [DESCRIPTION]
*             END_PRODUCT                                         [PRODUCT]
*                END_AUTH_GROUP...]
*                DIR_FILES_TO_SHIP
*                   [DISK <env_name> <env_type> <release> <product_code>
*                         <root_path> <rel_path> <output_prog> <media_name>;.
*                   [SOFTWARE_INVENTORY <env_name> <product_code> <inv_job_num>
*                         <rel_path> <media_name> [<description>]; ...]
*                   [FULL_PATH <full_path> <output_program> <media_name>;...]
*                   [MISC_INVENTORY <env_name> <product_code> <location>
*                         [<description>];...]
*             [FILE <from_full_path> <output_program> <media_name>;...]
*                END_DIR_FILES
*          [ERROR_MSGS
*             <error_msg>;...
*          END_ERROR_MSGS]
*
******************************************************************
* change history:
*    date      name           description
* -----------------------------------------------------------------
*  14MAR91   M. Posner       Added a new rec type to dir_files_to_ship.
*                            New type is FILE. Added process_file_record
*  15MAR91   M. Posner       Modified process_file_record to add file
*                            size to size_hash.
*  21MAR91   M. Posner       Modified process_soft_inv_record to not
*                            validate if filelist exists if media_name
*                            is cd_rom. Also modfied validation to
*                            not add products to product hash.
*  22MAR91   M. Posner       Modified parse_dir_files_to_ship to set
*                            error flag for default in case.
*  03APR91   M. Posner       Modified process_soft_inv_record to not
*                            add the validation of the filelist to
*                            the product_hash.
*  24APR91   M. Posner       Added parsing of CHECKER and INCLUDE_DOCS
*                            in the prescription file.
*  25APR91   M. Posner       Modified load_prescription and other
*                            routines to add the ability to load
*                            the prescription file and return a good
*                            status even if files are missing.  This
*                            feature is turned on when ingnore_missing_files
*                            is set to true.
*  07MAY91   M. Posner       Modified process_auth_record to incorporate
*                            two new option auth rec fields:
*                            output_program and media_name.
* -----------------------------------------------------------------*/
#include      <stdio.h>
#include      <sys/file.h>
#include      <sys/types.h>
#include      <sys/stat.h>
#include      "lsisys.h"
#include      "lsitype.h"
#include      "ma.h"
#include      "lsigpal.h"
#include      "lsilex.h"
#include      "lsinhsh.h"
#include      "lsisort.h"
#include      "libdef.h"
#include      "aspen_notify.h"
#include      "prescription.h"

static FILE *prescription_fp;
static memory_group p_mem;
static tstream tstr;
static int lex_line_number, tok;
static char *job_dir;
```

```
static char *prescription_file_name;
static boolean pharmacist_errors = FALSE;
static no_error_on_missing_file = FALSE;
#define MAXKEYSIZE 100
#define MODESIZE 11
#define BUFSIZE 256
#define VALIDATE_ONLY 1
#define NO_CORRUPT_LIB_CHECK 0
#define FULL_PATH_ENV_NAME "FULL_PATH"
#define FILE_REC_ENV_NAME "FILE_REC"
#define MAX_ERROR_SIZE 1024

/* lexical canning definitions for parsing the prescription file */
#define IDENTIFIER                      1
#define TERMINATOR                      2
#define JOB_NUMBER                      3
#define PRIORITY                        4
#define EST_SHIPMENT_DATE       5
#define SALES_ORDER                     6
#define NICKNAME                        7
#define COMPANY                         8
#define JOB_CLASS                       9
#define TARGET_PLATFORM         10
#define PLANNER                         11
#define TAPEWRITER                      12
#define COVER_LETTER_TEMPLATE   13
#define AUTH_GROUP                      14
#define PRODUCT                         15
#define CODE                            16
#define DESCRIPTION                     17
#define LICENSE_EXP_DATE        18
#define MAINT_EXP_DATE          19
#define END_PRODUCT                     20
#define END_AUTH_GROUP          21
#define DIR_FILES_TO_SHIP       22
#define END_DIR_FILES           23
#define DISK_RECORD                     24
#define SOFTWARE_INV_RECORD     25
#define FULL_PATH_RECORD        26
#define BOM_RECORD                      27
#define DOCUMENT_RECORD         28
#define AUTH_RECORD                     29
#define MISC_INV_RECORD         30
#define JOB_DESCRIPTION         31
#define ERROR_MSGS                      32
#define END_ERROR_MSGS          33
#define FILE_RECORD                     34
#define CHECKER                         35
#define INCLUDE_DOCS            36

/* global variables to hold prescription data */
static hash_table size_hash;
static prescription_data *prescription_info;
static auth_group_data *auth_group_list = NULL;
static auth_group_data *last_in_auth_group = NULL;
static disk_record_data *disk_list = NULL;
static soft_inv_record_data *software_inv_list = NULL;
static full_path_record_data *full_path_list = NULL;
static bom_record_data *bom_list = NULL;
static misc_inv_record_data *misc_software_inv_list = NULL;
static auth_record_data *auth_list = NULL;
static file_record_data *file_rec_list = NULL;

extern char *program_name;
```

```
/*-------------------    -------------------------   --------------*
 * function: init_prescription_parser
 * purpose:  To initialize the lsilex parser.  This involves
 *           creating a hash table, tstread, loading in reserved
 *           words and initializing data structures to hold the
 *           results from parsing.
 *--------------------------------------------------------------*/
static boolean init_prescription_parser()
        {
        prescription_fp = fopen(prescription_file_name,R);
        if (prescription_fp == NULL) {
                printf("%s cannot open or read the prescription file %s.\n",
                        program_name, prescription_file_name);
                append_notification(
                        "cannot open or read the prescription file\n");
                append_notification(prescription_file_name);
                append_notification(".\n");
                return(FALSE);
        } p_mem = gpalloc(1024);
        tstr = lexcreate(p_mem, "", LEX_ERROR, EOF, IDENTIFIER,
                IDENTIFIER, IDENTIFIER);
                lexlinevar(tstr, &lex_line_number);
        lexletter(tstr,0, "#-./+=%&^$@!*(){}[]|\_~'?<>,:");
        lexreswd(tstr, ";", TERMINATOR);
                lexreswd(tstr, "JOB_NUMBER", JOB_NUMBER);
                lexreswd(tstr, "PRIORITY", PRIORITY);
                lexreswd(tstr, "EST_SHIPMENT_DATE", EST_SHIPMENT_DATE);
                lexreswd(tstr, "SALES_ORDER", SALES_ORDER);
                lexreswd(tstr, "NICKNAME", NICKNAME);
                lexreswd(tstr, "COMPANY", COMPANY);
                lexreswd(tstr, "JOB_CLASS", JOB_CLASS);
                lexreswd(tstr, "JOB_DESCRIPTION", JOB_DESCRIPTION);
                lexreswd(tstr, "TARGET_PLATFORM", TARGET_PLATFORM);
                lexreswd(tstr, "PLANNER", PLANNER);
                lexreswd(tstr, "TAPEWRITER", TAPEWRITER);
                lexreswd(tstr, "CHECKER", CHECKER);
                lexreswd(tstr, "INCLUDE_DOCS", INCLUDE_DOCS);
                lexreswd(tstr, "COVER_LETTER_TEMPLATE",
                        COVER_LETTER_TEMPLATE);
                lexreswd(tstr, "AUTH_GROUP", AUTH_GROUP);
                lexreswd(tstr, "PRODUCT", PRODUCT);
                lexreswd(tstr, "CODE", CODE);
                lexreswd(tstr, "DESCRIPTION", DESCRIPTION);
                lexreswd(tstr, "LICENSE_EXP_DATE", LICENSE_EXP_DATE);
                lexreswd(tstr, "MAINT_EXP_DATE", MAINT_EXP_DATE);
                lexreswd(tstr, "END_PRODUCT", END_PRODUCT);
                lexreswd(tstr, "END_AUTH_GROUP", END_AUTH_GROUP);
                lexreswd(tstr, "DIR_FILES_TO_SHIP", DIR_FILES_TO_SHIP);
                lexreswd(tstr, "END_DIR_FILES", END_DIR_FILES);
                lexreswd(tstr, "DISK", DISK_RECORD);
                lexreswd(tstr, "SOFTWARE_INVENTORY", SOFTWARE_INV_RECORD);
                lexreswd(tstr, "FULL_PATH", FULL_PATH_RECORD);
                lexreswd(tstr, "DOCUMENT", DOCUMENT_RECORD);
                lexreswd(tstr, "MISC_INVENTORY", MISC_INV_RECORD);
                lexreswd(tstr, "FILE", FILE_RECORD);                        /*1.
                lexreswd(tstr, "ERROR_MSGS", ERROR_MSGS);
                lexreswd(tstr, "END_ERROR_MSGS", END_ERROR_MSGS);

lexopen(tstr, lex_file, prescription_fp);
                lex_line_number = 0;

/* initialize global data structures to hold results */
                smaketab(&size_hash, p_mem, FALSE);
```

```
                prescription_info = (prescription_data_struct *)qalloc((unsigned)
                       ^prescription                ^data
                        sizeof(struct prescription_data_struct), p_mem);
                prescription_info->est_shipment_date = NULL;
                prescription_info->sales_order = NULL;
                prescription_info->cover_letter_template = NULL;

return(TRUE);
} /* init_prescription_parser */

/*-----------------------------------------------------------------*
 * function: print_syntax_error_msg
 * purpose:  To print a parser syntax error msg to the screen
 *           and to the E-mail notification msg.
 *-----------------------------------------------------------------*/
static print_syntax_error_msg()
        {
        char error_msg[500];

sprintf(error_msg, "Syntax error on line %d in presciption file ",
                lex_line_number);
        strcat(error_msg, prescription_file_name);
        strcat(error_msg, "\n");
        printf("%s", error_msg);
        append_notification(error_msg);

} /* print_syntax_error_msg */

/*-----------------------------------------------------------------*
 * function: load_description
 * purpose:  To load a description into a record. The description
 *           can be any text upto 255 chars.
 *-----------------------------------------------------------------*/
static boolean load_description(descript_field)
char **descript_field;
        {
        char buffer[BUFSIZE];

lexgrab(buffer, "EN;", BUFSIZE-1, tstr);
        if (lexreason >= 0) {
                *descript_field = (char *)qalloc(
                        (unsigned)strlen(buffer)+1, p_mem);
                strcpy(*descript_field, buffer+1);
        }
        else {
                print_syntax_error_msg();
                return(FALSE);
        } tok = lexget(tstr);
        if (tok != TERMINATOR) {
                print_syntax_error_msg();
                return(FALSE);
        }
        else return(TRUE);
} /* load_description */

/*-----------------------------------------------------------------*
 * function: load_fields
 * purpose:  To get and store data values in
 *           prescription_info. The input parameters specify
 *           where to load the data into. Load field2 only
 *           if it is non-null.
 *-----------------------------------------------------------------*/
static boolean load_fields(field1, field2)
```

```
char **field1;
char **field2;
        {
        tok = lexget(tstr);
        if ((tok == TERMINATOR) || (tok != IDENTIFIER)) {
                print_syntax_error_msg();
                return(FALSE);
        }

*field1 = (char *)qalloc(
                (unsigned)strlen(tstr)+1, p_mem);
        strcpy(*field1, tstr);

/* IF only 1 field to load, ensure terminator at end */
        if (field2 == NULL) {
                tok = lexget(tstr);
                if (tok != TERMINATOR) {
                        print_syntax_error_msg();
                        return(FALSE);
                }
                else
                        return(TRUE);
        }

/* Load in the second field */
        if (!load_description(field2))
                return(FALSE);
        else
                return(TRUE);
} /* load_fields */

/*-----------------------------------------------------------*
 * function: load_token
 * purpose:  To load into a field the next token.
 *-----------------------------------------------------------*/
static boolean load_token(field_to_load)
char **field_to_load;
        {
        tok = lexget(tstr);
        if ((tok == TERMINATOR) || (tok != IDENTIFIER)) {
                print_syntax_error_msg();
                return(FALSE);
        }

*field_to_load = (char *)qalloc((unsigned)strlen(tstr)+1, p_mem);
        strcpy(*field_to_load, tstr);
        return(TRUE);
} /* load_token */

/*-----------------------------------------------------------*
 * function: parse_auth_group_data
 * purpose:  To extract authorization group data.  Each auth
 *           group is composed of number of products.  Associated
 *           with each product is a licensce and maint. expiration
 *           dates.  This data is used for informational purposes
 *           in the inslip.
 *-----------------------------------------------------------*/
static boolean parse_auth_group_data()
        {
        auth_group_data *this_auth_group;
        auth_product_data *this_product, *last_product;

last_product = NULL;
```

```c
/* Allocate space */
this_auth_group = (auth_group_data *)qalloc((unsigned)
        sizeof(struct auth_group_data_struct), p_mem);

/* Get auth group data */ if (!load_fields(&(this_auth_group->group_number), NULL))
        return(FALSE);

this_auth_group->products = NULL;
this_auth_group->next = NULL;

/* Process all group data for each product in the auth. group */
tok = lexget(tstr);
while ((tok != EOF)      && (tok != END_AUTH_GROUP)) {
        switch(tok) {
                case PRODUCT:
                        this_product = (auth_product_data *)qalloc((unsigne
                                sizeof(struct auth_product_data_struct), p_
                        break;
                case CODE:
                        if(!load_fields(&(this_product->product_code), NULL
                                return(FALSE);
                        break;
                case DESCRIPTION:
                        if (!load_description(
                                &(this_product->description)))
                                return(FALSE);
                        break;
                case LICENSE_EXP_DATE:
                        if(!load_fields(&(this_auth_group->license_exp_date
                                return(FALSE);
                        break;
                case MAINT_EXP_DATE:
                        if(!load_fields(&(this_auth_group->maint_exp_date),
                                return(FALSE);
                        break;
                case END_PRODUCT:
                        /* Add to product_list */
                        this_product->next = NULL;
                        if (last_product == NULL) {
                                /*new list */
                                this_auth_group->products = this_product;
                                last_product = this_product;
                        }
                        else {
                                last_product->next = this_product;
                                last_product = this_product;
                        }
                        break;
        }
        tok = lexget(tstr);
} /* while */

/* Add auth group to auth group list */
if (last_in_auth_group == NULL) {
        auth_group_list = this_auth_group;
        last_in_auth_group = this_auth_group;
}
else {
        last_in_auth_group->next = this_auth_group;
        last_in_auth_group = this_auth_group;
} return(TRUE);
```

-Page 109-

```
} /* parse_auth_data

/*----------------------------------------------------------------*
 * function: parse_dir_files_to_ship
 * purpose:  To extract shipment information and load in data
 *           structures.  In addition all files, direcotories,
 *           and files under directories will be validated and
 *           their size saved.
 *----------------------------------------------------------------*/
static boolean parse_dir_files_to_ship(validation_only, check_for_corrupt_libs)
boolean validation_only;
boolean check_for_corrupt_libs;
        {
        boolean errors_encountered;

errors_encountered = FALSE;
        tok = lexget(tstr);
        while (tok != EOF) {
                switch(tok) {
                        case DISK_RECORD:
                                if (!process_disk_record(validation_only,
                                                check_for_corrupt_libs))
                                        errors_encountered = TRUE;
                                break;
                        case SOFTWARE_INV_RECORD:
                                if (!process_soft_inv_record())
                                        errors_encountered = TRUE;
                                break;
                        case FULL_PATH_RECORD:
                                if (!process_full_path_record(validation_only,
                                                check_for_corrupt_libs))
                                        errors_encountered = TRUE;
                                break;
                        case MISC_INV_RECORD:
                                if (!process_misc_inv_record())
                                        errors_encountered = TRUE;
                                break;
                        case FILE_RECORD:
                                if (!process_file_record(validation_only,
                                                check_for_corrupt_libs))
                                        errors_encountered = TRUE;
                                break;
                        case END_DIR_FILES:
                        if (errors_encountered)
                                return(FALSE);
                        else
                                return(TRUE);
                                break;
                        default:
                                print_syntax_error_msg();
                                errors_encountered = TRUE;                      /*22MAR!
                                break;
                }
                tok = lexget(tstr);
        } /* WHILE */ if (errors_encountered)
                return(FALSE);
        else
                return(TRUE);
} /* parse_dir_files_to_ship */

/*----------------------------------------------------------------*
 * function: add_to_size_hash
```

— Page 110 —

```
 * purpose: To add 1  e/dir size to size hash tab
 *------------------------------------------------------------------*/
static add_to_size_hash(file_dir_size, size_key)
int file_dir_size;
char *size_key;
        {
        int *size_ptr;
        char *size_key_ptr;

if(shashget(&size_ptr, size_hash, size_key, 0))
                *size_ptr += file_dir_size;
        else {
                size_ptr = (int *)qalloc(4, p_mem);
                *size_ptr = file_dir_size;
                size_key_ptr = (char *)qalloc((unsigned)
                        strlen(size_key)+1, p_mem);
                strcpy(size_key_ptr, size_key);
                shashinsert(size_ptr, size_hash, size_key_ptr, 0);
        }
} /* add_to_size_hash */

/*------------------------------------------------------------------*
 * function: store_file_permissions
 * purpose:  To store the permissions of the specified file
 *           or directory.
 *------------------------------------------------------------------*/
static store_file_permissions(file_name, field_to_load)
char *file_name;
char **field_to_load;
        {
        struct stat buf;

*field_to_load = (char *)qalloc(MODESIZE,p_mem);

stat(file_name, &buf);
        if ((buf.st_mode & S_IFMT) == S_IFDIR)
                strcpy(*field_to_load, "d");
        else
                strcpy(*field_to_load, "-");

if (buf.st_mode & S_IREAD) strcat(*field_to_load, "r");
        else strcat(*field_to_load, "-");
   if (buf.st_mode & S_IWRITE) strcat(*field_to_load, "w");
   else strcat(*field_to_load, "-");
   if (buf.st_mode & S_IEXEC) strcat(*field_to_load, "x");
   else strcat(*field_to_load, "-");

if (buf.st_mode & S_GREAD) strcat(*field_to_load, "r");
   else strcat(*field_to_load, "-");
   if (buf.st_mode & S_GWRITE) strcat(*field_to_load, "w");
   else strcat(*field_to_load, "-");
   if (buf.st_mode & S_GEXEC) strcat(*field_to_load, "x");
   else strcat(*field_to_load, "-");

if (buf.st_mode & S_OREAD) strcat(*field_to_load, "r");
   else strcat(*field_to_load, "-");
   if (buf.st_mode & S_OWRITE) strcat(*field_to_load, "w");
   else strcat(*field_to_load, "-");
   if (buf.st_mode & S_OEXEC) strcat(*field_to_load, "x");
   else strcat(*field_to_load, "-");

} /* store_file_permissions */

/*------------------------------------------------------------------*
 * function: process_file_record                          14MAR91
```

```
                        validate                    total
* purpose:  To valid e file/dir in record, get t  it size of file
*           or all files under dir, and add record to
*           file_record list.
*-----------------------------------------------------------------*/
static boolean process_file_record(validation_only, check_for_corrupt_libs)
boolean validation_only;
boolean check_for_corrupt_libs;
{
        file_record_data *this_rec;
        char size_key[MAXKEYSIZE];

/* Load disk record in node */ this_rec = (file_record_data *)qalloc((unsigned)
                sizeof(struct file_record_data_struct), p_mem);

if (!load_token(&(this_rec->from_full_path)))
                return(FALSE);
        if (!load_token(&(this_rec->output_program)))
                return(FALSE);
        if (!load_token(&(this_rec->media_name)))
                return(FALSE);

/* Check for the end of the record */
        tok = lexget(tstr);
        if (tok != TERMINATOR) {
                print_syntax_error_msg();
                return(FALSE);
        }
        /*------------------------------------------------------------
        /* Validate file or directory.  If a directory, also validate
        * all the files beneath it.
        *------------------------------------------------------------*/ this_rec->size = validate_file_dir(this_rec->from_full_path, validation_onl
                check_for_corrupt_libs, NULL, NULL,
                NULL, FALSE);

if (this_rec->size < 0) {
                if (no_error_on_missing_file) return(TRUE);
                else return(FALSE);
        } store_file_permissions(this_rec->from_full_path, &this_rec->permissions);

/*-------------------------------------------------------------- 15MAR91
        * Update size info in hash table.  Since there is no environment
        * associated with a file records.  We will store all file
        * record file/dir sizes under one environment
        * (FILE_REC_ENV_NAME).
        *-------------------------------------------------------------*/
        strcpy(size_key, FILE_REC_ENV_NAME);
        strcat(size_key, "+");
        strcat(size_key, this_rec->media_name);
        add_to_size_hash(this_rec->size, size_key);

/* add node to disk list*/
        this_rec->next = file_rec_list;
        file_rec_list = this_rec;
        return(TRUE);
} /*process_file_record */

/*------------------------------------------------------------------*
* function: process_disk_record
* purpose:  To validate file/dir in record, get total size of file
```

```
 *              or all files under dir, and add record to disk list.
 *------------------------------------------------------------------*/
static boolean process_disk_record(validation_only, check_for_corrupt_libs)
boolean validation_only;
boolean check_for_corrupt_libs;
{
        disk_record_data *this_rec;
        char size_key[MAXKEYSIZE];
        char full_path[MAXFNAMESIZE];

/* Load disk record in node */ this_rec = (disk_record_data *)qalloc((unsigned)
                sizeof(struct disk_data_struct), p_mem);

if (!load_token(&(this_rec->env_name)))
                return(FALSE);
        if (!load_token(&(this_rec->env_type)))
                return(FALSE);
        if (!load_token(&(this_rec->release)))
                return(FALSE);
        if (!load_token(&(this_rec->product_code)))
                return(FALSE);
        if (!load_token(&(this_rec->root_path)))
                return(FALSE);
        if (!load_token(&(this_rec->relative_path)))
                return(FALSE);
        if (!load_token(&(this_rec->output_program)))
                return(FALSE);
        if (!load_token(&(this_rec->media_name)))
                return(FALSE);

/* Check for the end of the record */
        tok = lexget(tstr);
        if (tok != TERMINATOR) {
                print_syntax_error_msg();
                return(FALSE);
        }
        /*------------------------------------------------------------
        /* Validate file or directory.  If a directory, also validate
        * all the files beneath it.
        *------------------------------------------------------------*/
        strcpy(full_path, this_rec->root_path);
        strcat(full_path, this_rec->relative_path);

this_rec->size = validate_file_dir(full_path, validation_only,
                check_for_corrupt_libs, this_rec->product_code, this_rec->env_name,
                this_rec->relative_path, FALSE);

if (this_rec->size < 0) {
                if (no_error_on_missing_file) return(TRUE);
                else return(FALSE);
        } store_file_permissions(full_path, &this_rec->permissions);

/*------------------------------------------------------------
         * Update size info in size hash table.  If entry not in
         * table, then add an entry.  Else update size value.
         * Hash key = env_name_media_name
         *------------------------------------------------------------*/
        strcpy(size_key, this_rec->env_name);
        strcat(size_key, "+");
        strcat(size_key, this_rec->media_name);
        add_to_size_hash(this_rec->size, size_key);
```

```
                                   +0       ~ |v e x +
        /* add node t   disk list*/
        this_rec->next = disk_list;
        disk_list = this_rec;
        return(TRUE);
} /*process_disk_record */

/*-----------------------------------------------------------------*
 * function: process_soft_inv_record
 * purpose:  Validate that the product list and filelist for the inventory
 *           item exists.  If it does add record to software
 *           inventory list.
 *-----------------------------------------------------------------*/
static boolean process_soft_inv_record()
        {
        soft_inv_record_data *this_rec;
        char buffer[BUFSIZE];
        boolean validate = FALSE;
        boolean corruption_check = FALSE;

/*----------------------------------------
         * Load software inventory record into node
         *------------------------------------------*/
        this_rec = (soft_inv_record_data *)qalloc((unsigned)
                sizeof(struct soft_inv_data_struct), p_mem);

if (!load_token(&(this_rec->env_name)))
                return(FALSE);
        if (!load_token(&(this_rec->product_code)))
                return(FALSE);
        if (!load_token(&(this_rec->inv_job_number)))
                return(FALSE);
        if (!load_token(&(this_rec->relative_path)))
                return(FALSE);
        if (!load_token(&(this_rec->media_name)))
                return(FALSE);

/*----------------------------------------
         * Check if optional description is present. IF
       * so load it.  Otherwise a terminator should be
         * encountered.
         *------------------------------------------*/
        lexgrab(buffer, "EN;", BUFSIZE-1, tstr);
        if (lexreason >= 0) {
                if (strcmp(buffer,";") == 0)
                        this_rec->description = NULL;
                else {
                        this_rec->description = (char *)qalloc((unsigned)
                                strlen(buffer)+1, p_mem);
                        strcpy(this_rec->description, buffer+1);
                        tok = lexget(tstr);
                        if (tok != TERMINATOR) {
                                print_syntax_error_msg();
                                return(FALSE);
                        }
                }
        }
        /*----------------------------------------
         * Verify that the inventory product list exists.
         * If it doesn't, validate will print error msg.
         * Return false to caller.
         *------------------------------------------*/
        this_rec->prodlist_filename = (char *)qalloc(MAXFNAMESIZE, p_mem);
        strcpy(this_rec->prodlist_filename, job_dir);
        strcat(this_rec->prodlist_filename, this_rec->inv_job_number);
        strcat(this_rec->prodlist_filename, "/PRODLIST.");
```

```
              strcat(this_)   ->prodlist_filename, this_r   ->inv_job_number);

if (validate_file_dir(this_rec->prodlist_filename, validate,
                      corruption_check, NULL, NULL,
                      this_rec->relative_path, FALSE) < 0) {
              return(FALSE);
      }
      /*------------------------------------------------------
       * Verify that the inventory filelist exists.
       * If it doesn't, validate will print an error msg.
       * Return false to caller.
       * EXCEPTION: if meida_name = cd_rom the filelist will
       * not exist.
       *------------------------------------------------------*/
      this_rec->inv_filelist_filename = (char *)qalloc(MAXFNAMESIZE, p_mem);
      strcpy(this_rec->inv_filelist_filename, job_dir);
      strcat(this_rec->inv_filelist_filename, this_rec->inv_job_number);
      strcat(this_rec->inv_filelist_filename, "/FILELIST.");
      strcat(this_rec->inv_filelist_filename, this_rec->inv_job_number);

if (strcmp(this_rec->media_name, "cd_rom") != 0) {      /*21MAR91*/
              if (validate_file_dir(this_rec->inv_filelist_filename, validate,
                      corruption_check, NULL, this_rec->env_name,  /*03APR91*/
                      this_rec->relative_path, FALSE) < 0)
                      return(FALSE);
      }

/*------------------------------------------------
       * Add record to software inventory list
       *------------------------------------------*/
      this_rec->next = software_inv_list;
      software_inv_list = this_rec;
      return(TRUE);
} /* process_soft_inv_record */

/*----------------------------------------------------------------*
 * function: process_full_path_record
 * purpose:  To extract from the full path prescription record.
 *           The file/dir will be validated.  It will not be added
 *           to the product list because no product code or
 *           environmnet name is in the record.  Data will be
 *           added to the size hash.  The env_type will be
 *           set to FULL_PATH.  If the file/dir is valid, it will
 *           be added to the full path record list.
 *----------------------------------------------------------------*/
static boolean process_full_path_record(validation_only,check_for_corrupt_libs)
boolean validation_only;
boolean check_for_corrupt_libs;
      {
      full_path_record_data *this_rec;
      char size_key[MAXKEYSIZE];

/*------------------------------------------------
       * Load full path record into node.
       *------------------------------------------*/
      this_rec = (full_path_record_data *)qalloc((unsigned)
              sizeof(struct full_path_data_struct), p_mem);

if (!load_token(&(this_rec->full_path)))
              return(FALSE);
      if (!load_token(&(this_rec->output_program)))
              return(FALSE);
      if (!load_token(&(this_rec->media_name)))
              return(FALSE);
```

```
        /*-----------     ---------------------------
         * Check for terminator.  If not found error.
         *----------------------------------------*/
        tok = lexget(tstr);
        if (tok != TERMINATOR) {
                print_syntax_error_msg();
                return(FALSE);
        }
        /*-----------------------------------------------------------
         * Validate file/directory.  If a directory, also validate
         * all files beneath it. Full path entries can not be added
         * to the product list so tell validate_file_dir
         * that this test is for validation purposes only.
         *---------------------------------------------------------*/
        this_rec->size = validate_file_dir(this_rec->full_path,
                        validation_only, check_for_corrupt_libs, NULL, NULL, NULL,F;

if (this_rec->size < 0) {
                if (no_error_on_missing_file) return(TRUE);
                else return(FALSE);
        } store_file_permissions(this_rec->full_path, &this_rec->permissions);

/*-----------------------------------------------------------
         * Update size info in hash table.  Since there is no environment
         * associated with a full path we will store all full
         * path file/dir sizes under one environment
         * (FULL_PATH_ENV_NAME).
         *---------------------------------------------------------*/
        strcpy(size_key, FULL_PATH_ENV_NAME);
        strcat(size_key, "+");
        strcat(size_key, this_rec->media_name);
        add_to_size_hash(this_rec->size, size_key);

/*---------------------------------
         * Add node to full path list.
         *------------------------------*/
        this_rec->next = full_path_list;
        full_path_list = this_rec;
        return(TRUE);
} /* process_full_path_record */

/*----------------------------------------------------------------*
 * function: process_bom_record
 * purpose:  To extract from the bom prescription record.
 *           The file/dir will be validated.  It will not be added
 *           to the product list because no product code
 *           in the record.  Data will be added to the size hash.
 *           If the file/dir is valid, it will
 *           be added to the bom path record list.
 *--------------------------------------------------------------*/
static boolean process_bom_record(validation_only, check_for_corrupt_libs)
boolean validation_only;
boolean check_for_corrupt_libs;
        {
        bom_record_data *this_rec;
        char size_key[MAXKEYSIZE];
        char full_path[MAXFNAMESIZE];

/*------------------------------------------
         * Load bom record into node.
         *----------------------------------------*/
        this_rec = (bom_record_data *)qalloc((unsigned)
                sizeof(struct bom_data_struct), p_mem);
```

```
        if (!load_token(&(this_rec->env_name)))
                return(FALSE);
        if (!load_token(&(this_rec->env_type)))
                return(FALSE);
        if (!load_token(&(this_rec->release)))
                return(FALSE);
        if (!load_token(&(this_rec->bom_code)))
                return(FALSE);
        if (!load_token(&(this_rec->root_path)))
                return(FALSE);
        if (!load_token(&(this_rec->relative_path)))
                return(FALSE);
        if (!load_token(&(this_rec->output_program)))
                return(FALSE);
        if (!load_token(&(this_rec->media_name)))
                return(FALSE);

/*--------------------------------------------
         * Check for terminator.  If not found error.
         *-------------------------------------------*/
        tok = lexget(tstr);
        if (tok != TERMINATOR) {
                print_syntax_error_msg();
                return(FALSE);
        }
        /*-----------------------------------------------------------------
         * Validate file/directory.  If a directory, also validate
         * all files beneath it. Full path entries can not be added
         * to the product list so tell validate_file_dir
         * that this test is for validation purposes only.
         *----------------------------------------------------------------*/
        strcpy(full_path, this_rec->root_path);
        strcat(full_path, this_rec->relative_path);

this_rec->size = validate_file_dir(full_path,
                        validation_only, check_for_corrupt_libs, NULL, this_rec->en'
                        this_rec->relative_path, FALSE);

if (this_rec->size < 0) {
                if (no_error_on_missing_file) return(TRUE);
                else return(FALSE);
        } store_file_permissions(full_path, &this_rec->permissions);

/*-----------------------------------------------------------------
         * Update size info in hash table.
         *----------------------------------------------------------------*/
        strcpy(size_key, this_rec->env_name);
        strcat(size_key, "+");
        strcat(size_key, this_rec->media_name);
        add_to_size_hash(this_rec->size, size_key);

/*--------------------------------
         * Add node to full path list.
         *-------------------------------*/
        this_rec->next = bom_list;
        bom_list = this_rec;
        return(TRUE);
} /* process_bom_record */

/*------------------------------------------------------------------------*
 * function: process_document_record
 * purpose:  This function has not yet been implemented.
```

```
*--------------------   -------------------------   -------------*/
static boolean process_document_record()
        {

/******** TBD *********/ return(TRUE);
} /* process_document_record */

/*----------------------------------------------------------------*
 * function: process_misc_inv_record
 * purpose:  Add misc. inventory record to misc_inv_list.
 *----------------------------------------------------------------*/
static boolean process_misc_inv_record()
        {
        misc_inv_record_data *this_rec;
        char buffer[BUFSIZE];

/*-------------------------------------------
         * Load misc.  inventory record into node
         *-----------------------------------------*/
        this_rec = (misc_inv_record_data *)qalloc((unsigned)
                sizeof(struct misc_inv_data_struct), p_mem);

if (!load_token(&(this_rec->env_name)))
                return(FALSE);
        if (!load_token(&(this_rec->product_code)))
                return(FALSE);
        if (!load_token(&(this_rec->location)))
                return(FALSE);

/*-------------------------------------------------
         * Check if optional description is present. IF
     * so load it.  Otherwise a terminator should be
         * encountered.
         *-----------------------------------------------*/
        lexgrab(buffer, "EN;", BUFSIZE-1, tstr);
        if (lexreason >= 0) {
                if (strcmp(buffer, ";") == 0)
                        this_rec->description = NULL;
                else {
                        this_rec->description = (char *)qalloc((unsigned)
                                strlen(buffer)+1, p_mem);
                        strcpy(this_rec->description, buffer+1);
                        tok = lexget(tstr);
                        if (tok != TERMINATOR) {
                                print_syntax_error_msg();
                                return(FALSE);
                        }
                }
        }

/*-------------------------------------------
         * Add record to misc. software inventory list
         *-----------------------------------------*/
        this_rec->next = misc_software_inv_list;
        misc_software_inv_list = this_rec;
        return(TRUE);
} /* process_misc_inv_record */

/*----------------------------------------------------------------*
 * function: process_auth_record
 * purpose:  Validate auth files and add to auth record list.
 *----------------------------------------------------------------*/
```

```
static boolean process_auth_record()
        {
        auth_record_data *this_rec;
        char size_key[MAXKEYSIZE];

/*-----------------------------------------
         * Load authorization record into node
         *-------------------------------------*/
        this_rec = (auth_record_data *)qalloc((unsigned)
                sizeof(struct auth_data_struct), p_mem);

if (!load_token(&(this_rec->from_full_path)))
                return(FALSE);
        if (!load_token(&(this_rec->to_rel_path)))
                return(FALSE);
        if (!load_token(&(this_rec->env_type)))
                return(FALSE);

/*------------------------------------------------------------
         * The next field could be either a terminator or      07MAY91
         * if this is a job to write only an auth rec then
         * the output program and meida name must be
         * specified.
         *--------------------------------------------------------*/
        tok = lexget(tstr);
        if (tok == TERMINATOR) {
                this_rec->output_program = NULL;
                this_rec->media_name = NULL;
        }
        else if (tok != IDENTIFIER) {
                print_syntax_error_msg();
                return(FALSE);
        }
        else {
                /*-----------------------------------------
                 * Load output field followed by the media name.
                 *-------------------------------------*/
                this_rec->output_program = (char *)qalloc((unsigned)
                        strlen(tstr)+1, p_mem);
                strcpy(this_rec->output_program, tstr);

tok = lexget(tstr);
                if ((tok == TERMINATOR) || (tok != IDENTIFIER)){
                        print_syntax_error_msg();
                        return(FALSE);
                }
                else {
                        this_rec->media_name = (char *)qalloc((unsigned)
                                strlen(tstr)+1, p_mem);
                        strcpy(this_rec->media_name, tstr);
                } tok = lexget(tstr);
                if (tok != TERMINATOR) {
                        print_syntax_error_msg();
                        return(FALSE);
                }
        }

/*-----------------------------------------------------
         * Validate file/directory.  If a directory, also validate
         * all files beneath it. Auth entries can not be added
         * to the product list so tell validate_file_dir
         * that this test is for validation purposes only.
         *-------------------------------------------------*/
        this_rec->size = validate_file_dir(this_rec->from_full_path,
```

```
                            AC
                VALIDATE_ONLY, NO_CORRUPT_:   _CHECK, NULL, NULL, NULL, FALSI if (this_rec->size < 0) {
            if (no_error_on_missing_file) return(TRUE);
            else return(FALSE);
     } store_file_permissions(this_rec->from_full_path, &this_rec->permissions);

/*-----------------------------------------------------------
      * Update size info in size hash table if an auth only job.  07MAY91
      * If entry not in  table, then add an entry.
      * Else update size value.
      * Hash key = env_name_media_name
      *-----------------------------------------------------------*/
     if (this_rec->media_name != NULL ) {
            strcpy(size_key, this_rec->env_type);
            strcat(size_key, "+");
            strcat(size_key, this_rec->media_name);
            add_to_size_hash(this_rec->size, size_key);
     }

/*---------------------------------
      * Add node to auth list.
      *--------------------------------*/
     this_rec->next = auth_list;
     auth_list = this_rec;

return(TRUE);
} /* process_auth_record */

/*-----------------------------------------------------------------*
 * function: parse_error_msgs
 * purpose:  To extract error messages generated by pharmacist
 *           while generating the prescription.  The error msgs
 *           will be displayed to the screen and to the notification
 *           msg.
 *-----------------------------------------------------------------*/
static boolean parse_error_msgs()
     {
     char buffer[MAX_ERROR_SIZE];

printf("%s The following errors were encountered while generating the\n",
            program_name);
     printf("prescription file %s.\n\n", prescription_file_name);
     append_notification(program_name);
     append_notification(
            " The following errors were encounterd while generating the\n");
     append_notification("prescription file ");
     append_notification(prescription_file_name);
     append_notification(".\n\n");

/*-----------------------------------------------------------
      * Display all the error messages to the user and in the E-mail.
      *-----------------------------------------------------------*/
     lexgrab(buffer, "IN\n", MAX_ERROR_SIZE -1, tstr);

while (lexreason >= 0) {
            if (strncmp(buffer, "END_ERROR_MSGS", 14) == 0) return(TRUE);
            printf("%s", buffer);
            append_notification(buffer);
            lexgrab(buffer, "IN\n", MAX_ERROR_SIZE -1, tstr);
     }
```

```
/*----------------------------------------------------------
 * An error occurred.  One reason could be an unexpected EOF.
 *----------------------------------------------------------*/
        return(FALSE);
} /* parse_error_msgs */

/*------------------------------------------------------------------*
 * function: parse_prescription_file
 * purpose:  To extract the information in the prescription file.
 *           The extracted data will be stored in various
 *           data structures.
 *------------------------------------------------------------------*/
static boolean parse_prescription_file(validation_only, check_for_corrupt_libs)
boolean validation_only;
boolean check_for_corrupt_libs;
        {
        tok = lexget(tstr);
        while (tok != EOF) {
                switch(tok){
                        case JOB_NUMBER:
                                if (!load_fields(
                                        &(prescription_info->job_number),NULL))
                                        return(FALSE);
                                break;
                        case PRIORITY:
                                if (!load_fields(
                                        &(prescription_info->priority),NULL))
                                        return(FALSE);
                                break;
                        case EST_SHIPMENT_DATE:
                                if (!load_fields(
                                        &(prescription_info->est_shipment_date),NUL:
                                        return(FALSE);
                                break;
                        case SALES_ORDER:
                                if (!load_fields(
                                        &(prescription_info->sales_order),NULL))
                                        return(FALSE);
                                break;
                        case NICKNAME:
                                if (!load_fields(
                                        &(prescription_info->nickname),NULL))
                                        return(FALSE);
                                break;
                        case COMPANY:
                                if (!load_description(
                                        &(prescription_info->company)))
                                        return(FALSE);
                                break;
                        case JOB_CLASS:
                                if (!load_fields(
                                        &(prescription_info->job_class),NULL))
                                        return(FALSE);
                                break;
                        case JOB_DESCRIPTION:
                                if (!load_description(
                                                &(prescription_info->job_descriptio1
                                        return(FALSE);
                                break;
                        case TARGET_PLATFORM:
                                if (!load_fields(
                                        &(prescription_info->target_platform_name),
                                        &(prescription_info->target_platform_tag)))
                                        return(FALSE);
                                break;
                        case PLANNER:
```

```
                                if (!load_fields(
                                        &(prescription_info->planner_userid),
                                        &(prescription_info->planner_full_name)))
                                        return(FALSE);
                                break;
                        case TAPEWRITER:
                                if (!load_fields(
                                        &(prescription_info->tapewriter_userid),
                                        &(prescription_info->tapewriter_full_name))
                                        return(FALSE);
                                break;
                        case CHECKER:
                                if (!load_fields(
                                        &(prescription_info->checker_userid),
                                        &(prescription_info->checker_full_name)))
                                        return(FALSE);
                                break;
                        case INCLUDE_DOCS:
                                if (!load_fields(
                                        &(prescription_info->include_docs),NULL))
                                        return(FALSE);
                                break;
                        case COVER_LETTER_TEMPLATE:
                                if (!load_fields(
                                        &(prescription_info->cover_letter_template)
                                        NULL))
                                        return(FALSE);
                                break;
                        case AUTH_GROUP:
                                if (!parse_auth_group_data()){
                                        print_syntax_error_msg();
                return(FALSE);
                                }
                                break;
                        case DIR_FILES_TO_SHIP:
                                if (!parse_dir_files_to_ship(
                                                validation_only, check_for_corrupt_
                                        return(FALSE);
                                break;
                        case ERROR_MSGS:
                                pharmacist_errors = TRUE;
                                if (!parse_error_msgs())
                                        print_syntax_error_msg();
                                break;
                        default:
                                print_syntax_error_msg();
                                return(FALSE);
                }
                tok = lexget(tstr);
        } /* while */ if (pharmacist_errors) return(FALSE);
        return(TRUE);
} /* parse_prescription_file */

/*----------------------------------------------------------------*
 * function: load_prescription
 * purpose:  To load in the prescription file in local data
 *           structures.
 *----------------------------------------------------------------*/
boolean load_prescription(prescription_file,
                                        job_directory,
                                        validation_only,
                                        check_for_corrupt_libs,
                                        ignore_missing_files)
```

— Page 122 —

```
                          file;
char *prescription_fs    ,
char *job_directory;
boolean validation_only;
boolean check_for_corrupt_libs;
boolean ignore_missing_files;
        {
        job_dir = job_directory;
        no_error_on_missing_file = ignore_missing_files;                      /*2!
        prescription_file_name = prescription_file;
        if (!init_prescription_parser())
                return(FALSE);
        if (!parse_prescription_file(validation_only, check_for_corrupt_libs))
                return(FALSE);
        fclose(prescription_fp);
        return(TRUE);
} /* load_prescription */

/*-----------------------------------------------------------------
 * function: get_size_hash_data
 * purpose:  This routine will sort the size hash table based on
 *           it's keys.  The caller will be returned a pointer to
 *           an array of structures.  The structure will contain
 *           a pointer to the key and a pointer to the contents
 *           of the hash.
 *-----------------------------------------------------------*/
sort_table get_size_hash_data()
        {
        sort_table sorttbl;

sorttbl = hashsort(size_hash, p_mem, FALSE);
        return(sorttbl);

} /* get_size_hash_data */

/*-----------------------------------------------------------------
 * function: get_perescription_list
 * purpose:  This routine returns a pointer to the requested list
 *           of prescription records.  The list choices may be
 *           found in prescription.h.
 *-----------------------------------------------------------*/
pointer get_prescription_list(list_choice)
int list_choice;
        {
        switch(list_choice) {
                case DISK_LIST:
                        return((pointer)disk_list);
                        break;
                case SOFTWARE_INV_LIST:
                        return((pointer)software_inv_list);
                        break;
                case FULL_PATH_LIST:
                        return((pointer)full_path_list);
                        break;
                case MISC_INV_LIST:
                        return((pointer)misc_software_inv_list);
                        break;
                case FILE_RECORD_LIST:
                        return((pointer)file_rec_list);
                        break;
        }
        return(NULL);
} /* get_prescription_list */
```

-Page 123-

```
/*-------------------         -------------------------    --------------
 * function: get_prescription_general_data
 * purpose:  This routine returns a pointer to the  structure
 *           containing all prescription non-repeating data.
 *-----------------------------------------------------------------*/
prescription_data *get_prescription_general_data()
        {
        return(prescription_info);
} /* get_prescription_general_data */

/*-----------------------------------------------------------------
 * function: get_auth_group_list
 * purpose:  This routine returns a pointer to the authoriztion
 *           group data list.
 *-----------------------------------------------------------------*/
auth_group_data *get_auth_group_list()
        {
        return(auth_group_list);
} /* get_auth_group_list */
```

```
/*---------------------                ---------------------------     --------------------------
**
** module    : site_config
**
** purpose   : provide utilities to process site_config related issues
**
** author    : Eric J. Chang
**
** date      : Feb. 15 1991
**
** entry points : get_site_config(file_name)
**
**-----------------------------------------------------------------------*/ include      "cd-rom.h"

extern SITE_CONFIG site_config;
extern LOOKUP      product_lookup;
extern LOOKUP      cd_lookup;
extern YMTRANS_TBL ym_trans;
extern int         tok;

/*-----------------------------------------------------------
** function : get_site_config()
** purpose  : read input site_config full path name into
**            SITE_CONFIG structure
**-----------------------------------------------------------*/
get_site_config(file_name)
char *file_name;
        {
        FILE *ifp;
        boolean parser_ok;

if ((ifp = fopen(file_name, "r")) == NULL) {
                perror("fopen");
                return(FALSE);
                }
    init_decrypt();
        site_config.site_config_fp = ifp;
        parser_ok = site_config_parser(&site_config);
        fclose(ifp);
        return(parser_ok);
        }
```

Appendix 2 - Code listing for CD Loader

```
/*--------------------------------------------------------------------------
** program   : cd_load
**
** purpose   : load LSI CD ROM software into disks
**
** author    : Eric J. Chang
**
** date      : Feb. 15 1991
**
** syntax    : cd_load
**
** input     : customers'encrypted site_config files
**             README file on CD ROM
**             cd_volume file on CD ROM
**             encrypted cd_lookup file on CD ROM
**             encrypted tarfile set on CD ROM
**
** output    : decrypted LSI software on disks
**
**-----------------------------------------------------------------------*/
#include <sys/param.h>
#include "cd-rom.h"

SITE_CONFIG      site_config;
LOOKUP           product_lookup;
LOOKUP           cd_lookup;
YMTRANS_TBL      ym_trans;
CD_VOLUME        cd_volume;
int              tok;
int              volume_remain_cnt;
int              path_has_product;
int              sub_product;
int              loading_path_no;

memory_group     load_product_mem;
hash_table       load_product_ht;
hash_table       load_class_ht;
hash_table       load_tarfile_ht;
hash_table       tarfile_key_ht;
hash_table       load_volume_ht;
TARFILE_LIST     *tarfile_head;
TARFILE_LIST     *tarfile_tail;
LOADING_PATH     *target_path_head;
LOADING_PATH     *target_path_tail;
char             site_config_dir[256];
char             cd_dir[256];
char             cd_id_str[256];
char             temp_dir[256];
static int       max_work_size = 0;
static int       tot_load_size = 0;
extern hash_table  encrypt_key_ht;

static char hex_hostid[64];
extern char *realpath(), *upper(), *getwd();
extern long gethostid();

int print_1_load_product_of_path_no();
int print_1_loading_product();
int load_1_file();
int print_1_load_volume();
int get_1_tarfile();
int compare_1_work_size();
int insert_all_product_ht();
int get_load_class_ht();
int insert_load_tarfile_ht();
```

```
main()
{
    printf("(c) Copyright 1991 LSI Logic Corporation\n");
    printf("CD-ROM Loader Tool\n");
    printf("Version 2.0 - July 1991\n\n");

if (! main_init()) exit(99);
    if (! loading_process()) {
        printf("cd_load: Loading Failure\n");
        exit(99);
    };
}

/*---------------------------------------------------------------
 * function : main_init
 * purpose  : initialize program environments
 *---------------------------------------------------------------*/ static int main_init()
{
YM_REC *ym_rec;
char cwd[256];
int  i;
char file[BUFSIZE];
char entered_path[BUFSIZE];
char ym_filename[BUFSIZE];
char ans[BUFSIZE];

/* initialize Young-Minds Translation Table */
    ym_trans.ym_fp  = NULL;
    ym_trans.ym_mem = NULL;

while (TRUE) {
        printf(
"cd_load:  Please enter the directory which contains your site_config file:\n");
        printf(
"          site_config dir-->> ");
        scanf("%s", entered_path);
            if (strcmp(entered_path, "quit") == 0) exit(0);
            if (strcmp(entered_path, "q") == 0) exit(0);
        if (realpath(entered_path, site_config_dir) == NULL) {
            printf("cd_load:  Invalid path entered\n");
            printf("cd_load:  Please try again.\n");
            continue;
        }
        if (strcmp(site_config_dir,"/") == 0) {
            printf("cd_load: Do not enter ROOT directory\n");
            printf("cd_load: Please try again.\n");
            continue;
        }
        if (access(site_config_dir, R_OK) != 0) {
            printf("cd_load: Directory does not exist: %s\n",
                site_config_dir);
            printf("cd_load: Please try again.\n");
            continue;
        }
        if (access(site_config_dir, X_OK) != 0) {
            printf("cd_load: Directory cannot be accessed: %s\n",
                site_config_dir);
            printf("cd_load: Please try again.\n");
            continue;
        }
        break;
    } while (TRUE) {
```

```
                        load,                    Master
    printf("cd_        d:    Please enter the CD-ROM  aster number of your site confi(
    printf("                 Note that this may be different from the Master number p:
    printf("                 the CD-ROM itself if you are re-using an old site config
    printf("                 CD-ROM Master number-->> ");
    scanf("%s", cd_id_str);
            if (strcmp(cd_id_str, "quit") == 0) exit(0);
            if (strcmp(cd_id_str, "q") == 0) exit(0);

sprintf(file, "%s/site_config.%s", site_config_dir, cd_id_str);
    printf("\ncd_load:  Reading site_config file:   %s\n", file);

if (access(file, R_OK) != 0) {
        printf("cd_load:  site_config file does not exist: %s\n", file);
        printf("cd_load:  Please try again.\n");
        continue;
    } if (! get_site_config(file)) {
        printf("cd_load:  Failed to load site_config info from %s\n", file);
        return(FALSE);
    };
    break;
} if (! verify_host()) {
    printf("cd_load:  This machine is not authorized to load this CD-ROM.\n");
    printf("          Please contact LSI Logic for an updated site_config\n");
    printf("          file to correct the problem.  Specify your host_id\n");
    printf("          %s and the CD-ROM Master number %s\n",
        hex_hostid, cd_id_str);
    return(FALSE);
};

while(TRUE) {
    printf("cd_load:  Enter the mount-point directory of the CD-ROM:\n");
    printf("          CD-ROM dir-->> ");
    scanf("%s", entered_path);
            if (strcmp(entered_path, "quit") == 0) exit(0);
            if (strcmp(entered_path, "q") == 0) exit(0);

if (realpath(entered_path, cd_dir) == NULL) {
        printf("cd_load: Invalid path entered\n");
        printf("cd_load: Please try again.\n");
        continue;
    }
    if (strcmp(cd_dir,"/") == 0) {
        printf("cd_load: Do not enter the ROOT directory\n");
        printf("cd_load: Please try again.\n");
        continue;
    } if (! is_dir(cd_dir)) {
        printf("cd_load:  CD-ROM directory does not exist: %s\n", cd_dir);
        printf("cd_load:  Please try again.\n");
        continue;
    }
    break;
} if (getwd(cwd) == NULL) {
    printf("cd_load:  Unable to obtain current scratch directory...\n");
    printf("%s\n", cwd);
    exit(99);
    } while(TRUE) {                        -Page 3-
```

```
            cd               )
    if (strcmp( _dir, cwd) == 0) chdir("/");
    printf("cd_load:  Please mount your CD ROM on %s.\n", cd_dir);
    printf("          Enter 'ok' when ready...");
    scanf("%s", ans);

if (strcmp(cd_dir, cwd) == 0) chdir(cwd);
    if (access(cd_dir, R_OK) != 0) {
        printf("cd_load:  Directory is not readable: %s\n", cd_dir);
        printf("cd_load:  Please try again.\n");
        continue;
    }
    if (access(cd_dir, X_OK) != 0) {
        printf("cd_load:  Directory cannot be accessed: %s\n", cd_dir);
        printf("cd_load:  Please try again.\n");
        continue;
    } if (! read_translation_table()) {
        printf("cd_load:  Please try again.\n");
        continue;
                    }
    /*----------------------------------------------
    ** check existence of cd_lookup file on CD ROM
    *----------------------------------------------*/
    if (! shashget((pointer *)&ym_rec, ym_trans.ym_ht, "cd_lookup", 0)) {
        printf("cd_load:  Internal error. cd_lookup not found in YM Trans Tab:
        return(FALSE);
    }

/*----------------------------------------------------------
    ** the translated name in table is upper case, but file name
    ** on CD ROM is always lower case
    *----------------------------------------------------------*/
    strcpy(ym_filename, ym_rec->trans_name);
    lower(ym_filename);

/* get rid of ';' in the translated name */
    for(i=0;*(ym_filename+i) != '\0' ;i++) {
        if (*(ym_filename+i) == '\;') {
            *(ym_filename+i) = '\0';
            break;
        }
    } sprintf(file, "%s/%s", cd_dir, ym_filename);
    if (access(file, R_OK) != 0) {
        printf("cd_load:  cd_lookup file %s cannot be read from CD-ROM\n", f:
        printf("          Is the CD-ROM properly mounted?\n");
        printf("          Try to 'cd' to the CD-ROM directory and examine fi:
        printf("          There should be a README file in that directory.\n'
        return(FALSE);
    } if (! get_cd_lookup(file)) {
        printf("cd_load:  Internal error.  Failed to load cd_lookup info\n")
        return(FALSE);
    };
    break;
} cd_volume.volume_no = 0;
cd_volume.cd_volume_mem = NULL;
verify_volume(0);

return(TRUE);
}
```

```
/*----------------------------------------------------------------
 * function : get_ym_trans
 * purpose  : get YMTRANS table
 *---------------------------------------------------------------*/
static int get_ym_trans(ym_table)
char *ym_table;
{
    FILE *fp;

if (ym_trans.ym_fp != NULL) {
        fclose(ym_trans.ym_fp);
        gpfree(ym_trans.ym_mem);
    } if ((fp = fopen(ym_table,"r")) == NULL) {
        printf("cd_load:  Failed to open YM Trans Table %s\n", ym_table);
        printf("          Is the CD-ROM mounted properly?\n");
        printf("          Try to 'cd' to the CD-ROM directory and examine files\n"
        return(FALSE);
    } ym_trans.ym_fp = fp;
    if (! ym_parser(&ym_trans)) return(FALSE);
    fclose(fp);
    return(TRUE);
}

/*----------------------------------------------------------------
 * function : verify_host
 * purpose  : check if the running host is an authorized host or not
 *            return TRUE if yes, otherwise FALSE
 *---------------------------------------------------------------*/
static int verify_host()
{
char *cpu_id;

sprintf(hex_hostid, "%x", gethostid());
    upper(hex_hostid);

/* check with site_config cpu_list */
    if (! shashget((pointer *)&cpu_id, site_config.site_cpu_ht, hex_hostid, 0)) {
        return(FALSE);
    }
    return(TRUE);
}

/*----------------------------------------------------------------
 * function : ask_load_product
 * program  : ask loading product lists
 *---------------------------------------------------------------*/
static ask_load_product()
{
char ans[BUFSIZE];

load_product_mem = gpalloc(1024);
    while (TRUE) {
        smaketab(&load_product_ht, load_product_mem, FALSE);
        printf("cd_load:  Do you wish to load them all? \[y/n\] ");
        scanf("%s",ans);

if ((strcmp(ans,"y") == 0) || (strcmp(ans,"Y") == 0))
            load_all_products();
        else get_load_product_ht();

printf("\n\ncd_load:  Here are the products which will be loaded...\n\n");
```

```
        print_load_product_ht();
        printf("cd_load:  Is this correct? \[y/n\] ");
        scanf("%s",ans);
        if ((strcmp(ans,"y") == 0) || (strcmp(ans,"Y") == 0)) break;
        if (strcmp(ans,"quit") == 0) exit(0);
        if (strcmp(ans,"q") == 0) exit(0);
        printf("\n\n");
    }
}

/*-------------------------------------------------------------
** function : print_licensed_product()
** purpose  : display 1 PRODUCT_CODE
**            called by print_site_licensed()
**-----------------------------------------------------------*/
static int print_licensed_product(unused, product_code)
char *unused;
char *product_code;
{
PRODUCT_MAP *product_map_pt;

if (shashget((pointer *)&product_map_pt, cd_lookup.product_map_ht,
        product_code, 0)) {
        printf("cd_load:  product %s (%s)\n",
            product_code, product_map_pt->product_description);
    }
}

/*-------------------------------------------------------------
** function : print_site_licensed()
** purpose  : display licensed products from SITE_CONFIG
**-----------------------------------------------------------*/
print_site_licensed(site_config_ptr)
SITE_CONFIG *site_config_ptr;
{
    printf("\ncd_load:  These are the products you are licensed for on this CD-ROM
        /* NOT DONE YET */
        /* Here, any products which are missing keys due to classes missing
       in site_config need to be skipped, i.e. deleted from the ht */
    shashact(site_config_ptr->site_product_ht, print_licensed_product);
    printf("\n\n");
}
/*-------------------------------------------------------------
 * function : loading_process
 * purpose  : ask loading product lists and load each product
 *-----------------------------------------------------------*/
static int loading_process()
{
    print_site_licensed(&site_config);
    ask_load_product();
    if (! load_tarfiles()) return(FALSE);
    printf("\ncd_load:  Finished loading.\n\n");
    return(TRUE);
}

/*-------------------------------------------------------------
 * function : insert_all_product_ht
 * purpose  : insert 1 entry into load_product_ht
 *            called by load_all_products()
 *-----------------------------------------------------------*/
int insert_all_product_ht(unused, product_code)
char *unused;
char *product_code;
{
PRODUCT_MAP *product_map_pt;
```

```c
    if (shashget((pointer *)&product_map_pt, cd_lookup.product_map_ht,
        product_code, 0)) {
        shashinsert((pointer)(product_map_pt->product_description),
                load_product_ht, product_code, 0);
        }
    return(TRUE);
}

/*-----------------------------------------------------------------
 * function : load_all_products
 * purpose  : build load_product_ht for all authorized products
 *-----------------------------------------------------------------*/
static load_all_products()
{
    shashact(site_config.site_product_ht, insert_all_product_ht);
}

/*-----------------------------------------------------------------
 * function : insert_load_product_ht
 * purpose  : insert 1 entry into load_product_ht
 *            called by get_load_product_ht()
 *-----------------------------------------------------------------*/
static int insert_load_product_ht(unused, product_code)
char *unused;
char *product_code;
{
PRODUCT_MAP *product_map_pt;
char ans[BUFSIZE];

if (shashget((pointer *)&product_map_pt, cd_lookup.product_map_ht,
        product_code, 0)) {
        printf("cd_load:  Do you wish to load %s (%s) ? \[y/n\] ",
                    product_code, product_map_pt->product_description);
        scanf("%s",ans);
        if ((strcmp(ans,"y") == 0) || (strcmp(ans,"Y") == 0))
            shashinsert((pointer)product_map_pt->product_description,
                load_product_ht, product_code, 0);
    }
    return(TRUE);
}

/*-----------------------------------------------------------------
 * function : get_load_product_ht
 * purpose  : build load_product_ht for users' own product selections
 *-----------------------------------------------------------------*/
static get_load_product_ht()
{
    shashact(site_config.site_product_ht, insert_load_product_ht);
}

/*-----------------------------------------------------------------
 * function : print_1_loading_product
 * purpose  : display 1 entry of load_product_ht
 *            called by print_load_product_ht
 *-----------------------------------------------------------------*/
int print_1_loading_product(product_description, product_code)
char *product_description;
char *product_code;
{
    printf("cd_load:  product %s (%s)\n",
                product_code, product_description);
    return(TRUE);
}

/*-----------------------------------------------------------------
```

```
                                    load
                                     v
 * function : print_l   l_product_ht
 * purpose  : display load_product_ht
 *            load_product_ht keeps user's product selection
 *------------------------------------------------------------------*/
static print_load_product_ht()
{
    shashact(load_product_ht, print_1_loading_product);
}

/*------------------------------------------------------------------
 * look up the encryption key for this class in the site_config file.
 * if any class has a missing key, exit because some portion of a
 * product cannot be loaded, and loading partial products is dangerous
 * Note that if encryption keys are re-used between CD-ROM masters,
 * then the class names are also re-used.
 *------------------------------------------------------------------*/
static int get_encryption_key_for_this_class(class_ptr)
CLASS *class_ptr;
        {
        char *encryption_key;

if (! shashget((pointer *)&encryption_key, encrypt_key_ht,
            class_ptr->class_name, 0)) return(FALSE);
      class_ptr->key = encryption_key;

return(TRUE);
        }
/*------------------------------------------------------------------
 * function : get_load_class_ht
 * purpose  : build load_class_ht
 *            load_class_ht keeps all the related class from loading
 *            product lists
 *------------------------------------------------------------------*/
static get_load_class_ht(product_description, product_code)
char *product_description;
char *product_code;
{
    PRODUCT_MAP *product_map_pt;
    PRODUCT_CLASS_LIST *product_class_hd;
    CLASS *class_ptr;

if (! shashget((pointer *)&product_map_pt,
        cd_lookup.product_map_ht, product_code, 0)) {
    return;
    }

/*-----------------------------------
    ** do for each selected product list
    *-----------------------------*/
    for (product_class_hd = product_map_pt->product_class_list;
         product_class_hd != NULL; product_class_hd = product_class_hd->next) {
        if (shashget((pointer *)&product_map_pt,
            cd_lookup.product_map_ht,
            product_class_hd->product_class_name, 0)) {
            /*------------------------------------------------------------
            ** If class name itself is a product name, then get all related
            ** class for this product
            *-----------------------------------------------------------*/
            get_load_class_ht(product_class_hd->product_class_name,
                product_class_hd->product_class_name);
        }
        else {
            /* it is a class */
            if (! shashget((pointer *)&class_ptr, cd_lookup.class_ht,
                product_class_hd->product_class_name, 0)) {
                printf("cd_load: Internal error - Class names incorrect in cd_lo(
```

```
                        exit
                        /
                        exit (99);
                }
                else {
                        /* insert into load_class_ht */
                        if (! get_encryption_key_for_this_class(class_ptr)) {
                                printf("cd_load:  Your site config file does not contain al:
                                printf("          the permissions required to load\n");
                                printf("          product %s (%s)\n\n",
                                                        product_code, product_descriptio)
                                printf("          Perhaps this site_config file was origina:
                                printf("          generated for a different CD-ROM Master\n'
                                printf("          and you need an updated site_config file.'
                                printf("          You may try re-loading, but skipping this
                                exit(99);
                        }
                        shashinsert((pointer)product_class_hd->product_class_name,
                                load_class_ht, product_class_hd->product_class_name, 0);

/* build tarfile decrypt key map for this class name */
                        get_tarfile_key_ht(class_ptr);
                }
        }
    }
}

/*--------------------------------------------------------------------
 * function : get_tarfile_key_ht
 * purpose  : build tarfile_key_ht from a class pointer
 *--------------------------------------------------------------------*/
static get_tarfile_key_ht(class_ptr)
CLASS *class_ptr;
{
FILE_LIST *file_hd;
TAR_KEY *tar_key_ptr;

for (file_hd = class_ptr->file_list; file_hd != NULL;
                file_hd = file_hd->next) {
                tar_key_ptr = (TAR_KEY *) qalloc(
                        sizeof(TAR_KEY), load_product_mem);
                tar_key_ptr->tarfile_name = file_hd->file_name;
                tar_key_ptr->tarfile_key = class_ptr->key;
                shashinsert((pointer)tar_key_ptr, tarfile_key_ht,
                        tar_key_ptr->tarfile_name, 0);
        }
}

/*--------------------------------------------------------------------
 * function : insert_load_tarfile_ht
 * purpose  : insert 1 entry into load_tarfile_ht
 *            called by get_load_tarfile_ht
 *--------------------------------------------------------------------*/
static int insert_load_tarfile_ht(class_ptr, class_name)
char *class_ptr, *class_name;
{
CLASS *class_pt;
FILE_LIST *file_hd;
TAR_FILE *tar_file_ptr;

if (! shashget((pointer *)&class_pt, cd_lookup.class_ht, class_name, 0)) {
                printf("cd_load: Internal error:  Class Names not correct in cd_lookup\n"
                exit(99);
        }

/*-----------------------------------
        ** do for each file set in this class
        *-----------------------------------*/
```

```
        for (file_hd = class pt->file_list;
            file_hd != NULL; file_hd = file_hd->next) {
            if (! shashget((pointer *)&tar_file_ptr, cd_lookup.tar_file_ht,
                file_hd->file_name, 0)) {
                printf(
"cd_load: Internal error:  File Set Names incorrect in cd_lookup\n");
                exit(99);
            }
            shashinsert((pointer)tar_file_ptr, load_tarfile_ht,
                file_hd->file_name, 0);
        }
        return(TRUE);
}
/*----------------------------------------------------------------
 * function : get_load_tarfile_ht
 * purpose  : build load_tarfile_ht which keeps all information about
 *            loading tarfiles
 *---------------------------------------------------------------*/
static get_load_tarfile_ht()
{
    smaketab(&load_class_ht, load_product_mem, FALSE);
    smaketab(&tarfile_key_ht, load_product_mem, FALSE);

shashact(load_product_ht, get_load_class_ht);

smaketab(&load_tarfile_ht,load_product_mem,FALSE);
    shashact(load_class_ht, insert_load_tarfile_ht);
}

/*----------------------------------------------------------------
 *
 *---------------------------------------------------------------*/
static int verify_volume(volume)
int volume;
{
    YM_REC *ym_rec;
    LOAD_VOLUME *load_volume_ptr;
    char ym_filename[BUFSIZE];
    char file[BUFSIZE];
    char vol_str[10];
    FILE *fp;
    int  i;

/* check if the filename exists in ymtrans.tbls */
    if (! shashget((pointer *)&ym_rec, ym_trans.ym_ht, "cd_volume", 0)) {
        printf(
"cd_load: Internal error.  YM Translation for cd_volume not found.\n");
        return(FALSE);
    }

/*----------------------------------------------------------------
    ** the translated name in table is upper case, but file name on CD ROM
    ** is always lower case
    *---------------------------------------------------------------*/
    strcpy(ym_filename,ym_rec->trans_name);
    lower(ym_filename);

/* get rid of ';' in the translated name */
    for(i=0;*(ym_filename+i) != '\0' ;i++) {
        if (*(ym_filename+i) == ';') {
            *(ym_filename+i) = '\0';
            break;
        }
    }
```

```
        /*----------------    -----------------
        ** get cd_volume on CD ROM directory
        *--------------------------------*/
        sprintf(file, "%s/%s", cd_dir, ym_filename);
        if (cd_volume.cd_volume_mem != NULL) gpfree(cd_volume.cd_volume_mem);
        if ((fp = fopen(file,"r")) == NULL) {
            printf("cd_load:  Failed to read file from CD-ROM %s\n", file);
            printf("          Is the CD-ROM still mounted properly?\n");
            printf("          Try to 'cd' to the CD-ROM directory and examine files\n"
            return(FALSE);
        } cd_volume.cd_volume_fp = fp;
        if (! cd_volume_parser(&cd_volume)) return(FALSE);
        fclose(fp);
        if (volume == 0) return(TRUE);

sprintf(vol_str, "%d", cd_volume.volume_no);
        if (! shashget((pointer *)&load_volume_ptr, load_volume_ht, vol_str, 0)) {
            printf("cd_load:  This volume (%d) was already loaded or is not necessary\n'
                cd_volume.volume_no);
            printf("          for loading the products you are licensed for.\n");
            return(FALSE);
        }
        return(TRUE);
}

/*---------------------------------------------------------------------
 * function : load_tarfiles
 * purpose  : load all the tarfiles for selected products from
 *            first available volume and from the largest tarfile
 *            to smallest on each volume
 *-------------------------------------------------------------------*/
static int load_tarfiles()
{
TARFILE_LIST *tarfile_list_ptr;
int    tot_vol,
       vol,
       min,
       vol_size,
       first_volume;
char ans[BUFSIZE];
char entered_path[BUFSIZE];
char vol_str[32];
char cwd[256];
struct statfs space;
float disk_space;
LOAD_VOLUME *load_volume_ptr;

vol = 0;
        get_load_tarfile_ht();

/*---------------------------------------------------------------
        ** get the minimum scratch area size for decrypted tarfiles which
        ** will be the maximun tarfile size
        *--------------------------------------------------------------*/
        getworking_area_and_total_size();
        /*print_load_tarfiles();*/ printf("\ncd_load:  This loader tool requires a temporary area on hard-disk fo:
        printf("          and decrypting files from the CD-ROM.  This area is referred'
        printf("          to by this tool as the scratch directory.  Please note that\1
        printf("          this scratch area is NOT the same as the scratch area used\n'
        printf("          by installation scripts for software tools such as MDE or CM]
        printf("          The scratch directory must have read,write and execute permi:
        printf("          and must have at least %d bytes of free space...\n\n",
```

— Page 11 —

```
                                work
                                 v
                max_   rk_size);
    printf("            Please enter the full path name of the scratch directory\n")

while (TRUE) {
        printf("cd_load:  SCRATCH DIR-->> ");
        scanf("%s", entered_path);
            if (strcmp(entered_path, "quit") == 0) exit(0);
            if (strcmp(entered_path, "q") == 0) exit(0);
        if (realpath(entered_path,temp_dir) == NULL) {
            printf("cd_load: Scratch directory does not exist...\n");
            printf("cd_load: Please try again.\n");
            continue;
        }
        if (strcmp(temp_dir,"\/") == 0) {
            printf("cd_load:  Do not enter ROOT directory\n");
            printf("cd_load:  Please try again.\n");
            continue;
        }
        if (! is_dir_rwx(temp_dir)) {
            printf(
"cd_load:  Scratch directory %s does not exist or has a permission problem\n",
                          temp_dir);
            printf("cd_load:  Please try again.\n");
            continue;
        }

/* check scratch area size */
        if(statfs(temp_dir, &space) == 0) {
            disk_space = space.f_bsize * space.f_bavail;
            if (disk_space < max_work_size) {
                printf("cd_load:  Scratch directory %s has less than %d bytes\n'
                                          temp_dir, max_work_size);
                printf("cd_load:  Please try again.\n");
                continue;
            }
        }
        else {
            printf("cd_load:  Failed to get file system information about %s\n",
                              temp_dir);
            return(FALSE);
        }
        break;
    } printf("\n\n");
    /*---------------------------------------------------------------
    ** get the sorted tarfile list. The sorted list is in decreasing order.
    *----------------------------------------------------------------*/
    get_tarfile_list();

/*--------------------------
    ** get total volume number
    *--------------------------*/
    tot_vol = 0;
    for(tarfile_list_ptr=tarfile_head;tarfile_list_ptr!=NULL;
                    tarfile_list_ptr=tarfile_list_ptr->next) {
        if (tarfile_list_ptr->tarfile->volume > tot_vol)
            tot_vol = tarfile_list_ptr->tarfile->volume;
    }

/*-----------------------------------
    ** get path name for each path number
    *-----------------------------------*/
    if (!get_loading_path()) return(FALSE);

/*--------------------
```

— Page 12 —

```
                        volume
        ** get LOAD_VOL
        **------------------*/
        get_load_volume_ht(tot_vol);

/*--------------------------------
        ** estimates total time needed
        **-----------------------------*/
        min = (tot_load_size / 1000000 ) * 0.48;
        min = min+1;
        printf(
"\ncd_load:  It will take about %d minutes to load all of the specified products\n"
                min);

/*---------------------
        ** do for each volume
        *---------------------*/
        first_volume = TRUE;
        while(TRUE) {
                if (is_load_finish()) break;
                if (first_volume != TRUE) {
                        while(TRUE) {
                                if (getwd(cwd) == NULL) {
                                        printf(
                                "cd_load:  Unable to obtain current scratch directory...\n");
                                        printf("%s\n", cwd);
                                        exit(99);
                                }
                                chdir("/");

print_loading_volume();
                                printf("cd_load:  At this point, you must eject the previous vo:
                                printf("          then insert and mount the next volume.\n");
                                printf("\n          Enter 'ok' when ready...");
                                scanf("%s", ans);

/*-----------------------------------------------------------
                                ** check if the mounted CD ROM is the correct one or not
                                ** Verify cd_id and volume number
                                *-----------------------------------------------------------*/
                                printf("cd_load:  Did you mount the CD-ROM on %s ? \[y/n\] ",
                                        cd_dir);
                                scanf("%s",ans);

chdir(cwd);
                                if ((strcmp(ans,"n") == 0) || (strcmp(ans,"N") == 0)) {
                                        /*-------------------------
                                        ** get new CD ROM mount point
                                        *--------------------------*/
                                        while(TRUE) {
                                                printf(
"cd_load:  Enter the directory where you mounted the CD ROM : \n");
                                                printf("          CD ROM dir-->> ");
                                                scanf("%s", entered_path);
                                                        if (strcmp(entered_path, "quit") == 0) exit((
                                                        if (strcmp(entered_path, "q") == 0) exit(0);

if (realpath(entered_path, cd_dir) == NULL) {
                                                        printf("cd_load:  Invalid path entered...");
                                                        printf("cd_load:  Please try again.\n");
                                                        continue;
                                                }
                                                if (strcmp(cd_dir,"/") == 0) {
                                                        printf("cd_load:  Do not enter the ROOT director:
                                                        printf("cd_load:  Please try again.\n");
                                                        continue;
                                                }
                                        }
```

— Page 13 —

```
                        if (!is_dir(cd_dir)) {
                            printf("cd_load:   CD-ROM directory: %s does not (
                                    cd_dir);
                            printf("cd_load:   Please try again.\n");
                            continue;
                        }
                        break;
                    }
                };

if (!verify_volume(vol)) {
                    printf("cd_load:   Please try again.\n");
                    continue;
                };
                vol = cd_volume.volume_no;
                break;
            }
        }
        else {
            vol = cd_volume.volume_no;
            sprintf(vol_str,"%d", vol);
            if (! shashget((pointer *)&load_volume_ptr, load_volume_ht, vol_str,
                printf("cd_load:   This volume was loaded already or is not\n");
                printf("           necessary to load the products you are license(
                if (first_volume) first_volume = FALSE;
                continue;
            }
        }

/* read Young mind translation table */
        if (!read_translation_table()) {
            if (first_volume) first_volume = FALSE;
            continue;
        }

/* -----------------------------------------------
        ** cal vol_size and estimate time needed for each vol
        *-----------------------------------------------*/ vol_size = 0;
        for(tarfile_list_ptr=tarfile_head;tarfile_list_ptr!=NULL;
                    tarfile_list_ptr=tarfile_list_ptr->next) {
            if (tarfile_list_ptr->tarfile->volume == vol) {
                vol_size += tarfile_list_ptr->tarfile->size;
            }
        } min = (vol_size / 1000000 ) * 0.48;
        min = min + 1;
        printf("cd_load:   It will take about %d minutes to load volume %d \n",
            min, vol);
        /* -----------------------------------------------
        ** process sorted tarfiles for this volume one by one
        *-----------------------------------------------*/
        for(tarfile_list_ptr = tarfile_head; tarfile_list_ptr!=NULL;
                    tarfile_list_ptr = tarfile_list_ptr->next) {
            if (tarfile_list_ptr->tarfile->volume == vol) {
                if (! load_1_file(tarfile_list_ptr->tarfile))
                    return(FALSE);
            }
        } if (first_volume) first_volume = FALSE;
        sprintf(vol_str,"%d",vol);
```

```
              shashdelete( oad_volume_ht, vol_str, 0);
      }
      return(TRUE);
}
/*-----------------------------------------------------------------
 * function : is_load_finish()
 * purpose  :
 *---------------------------------------------------------------*/ static is_load_finish()
{
int volume_remain();

volume_remain_cnt = 0;
    shashact(load_volume_ht, volume_remain);
    return((volume_remain_cnt == 0) ? TRUE : FALSE);
}
/*-----------------------------------------------------------------
 *
 *---------------------------------------------------------------*/ static volume_remain(load_volume_ptr,volume_str)
LOAD_VOLUME *load_volume_ptr;
char *volume_str;
{
    volume_remain_cnt++;
}

/*-----------------------------------------------------------------
 * function : print_1_load_volume()
 * purpose  :
 *---------------------------------------------------------------*/
print_1_load_volume(load_volume_ptr,volume_str)
LOAD_VOLUME *load_volume_ptr;
char *volume_str;
{
    printf(" %s", load_volume_ptr->volume_no);
}

/*-----------------------------------------------------------------
 * function : print_loading_volume()
 * purpose  :
 *---------------------------------------------------------------*/
static print_loading_volume()
{ printf("\ncd_load:  Please insert one of the following volumes: ");
    shashact(load_volume_ht, print_1_load_volume);
    printf("\n");
}

/*-----------------------------------------------------------------
 * function : get_load_volume_ht()
 * purpose  : initialize LOAD_VOLUME structure
 *---------------------------------------------------------------*/ static get_load_volume_ht(tot_vol)
int tot_vol;
{
    int i;
    LOAD_VOLUME *load_volume_ptr;

smaketab(&load_volume_ht, load_product_mem, FALSE);

for (i=1; i<=tot_vol; i++) {
```

```
            if (!volume_exist(i)) continue;

load_volume_ptr = (LOAD_VOLUME *)
                        qalloc(sizeof(LOAD_VOLUME), load_product_mem);
            load_volume_ptr->status = FALSE;
            sprintf(load_volume_ptr->volume_no, "%d", i);

shashinsert((pointer)load_volume_ptr, load_volume_ht,
                load_volume_ptr->volume_no, 0);
        }
}

/*----------------------------------------------------------------
 * function : read_translation_table
 * purpose  : get young mind translation table information
 *---------------------------------------------------------------*/
static int read_translation_table()
{
    char file[BUFSIZE];

sprintf(file,"%s/ymtrans.tbl", cd_dir);

if (access(file, R_OK) != 0) {
        printf("cd_load:   Error reading YM Trans Table from CD-ROM\n");
        printf("           Is the CD-ROM properly mounted?\n");
        return(FALSE);
    } if (!get_ym_trans(file)) {
        printf("cd_load:   Error reading YM Trans Table from CD-ROM\n");
        printf("           Is the CD-ROM properly mounted?\n");
        return(FALSE);
    };
    return(TRUE);
}

/*----------------------------------------------------------------
 * function : volume_exist
 * purpose  : check if the loading tarfiles exist in this volume or not
 *---------------------------------------------------------------*/ static int volume_exist(vol)
int vol;
{
TARFILE_LIST *tarfile_list_ptr;

for(tarfile_list_ptr = tarfile_head; tarfile_list_ptr != NULL;
            tarfile_list_ptr = tarfile_list_ptr->next) {
        if (tarfile_list_ptr->tarfile->volume == vol) {
            return(TRUE);
        }
    } return(FALSE);
}

/*----------------------------------------------------------------
 * function : load_1_file
 * purpose  : load the input tarfile
 *---------------------------------------------------------------*/
int load_1_file(tarfile)
TAR_FILE *tarfile;
{
LOADING_PATH *tar_hd;
TAR_KEY *tar_key_ptr;
FILE *tar_ifp,*tar_ofp;
```

```
    YM_REC *ym_rec;
    struct stat buf;
    char source_file[BUFSIZE],
        ym_filename[BUFSIZE],
        working_file[BUFSIZE],
        target_file[BUFSIZE],
        writelist_file[BUFSIZE],
        writelist_error_file[BUFSIZE],
        cmd[BUFSIZE];
    int  i;

/*------------------------------------------------
        ** check if the filename exists in ymtrans.tbls
        *-----------------------------------------------*/
        if (! shashget((pointer *)&ym_rec,ym_trans.ym_ht, tarfile->tar_file_name, 0))
            printf("cd_load:  Internal error translating a file set name\n");
            return(FALSE);
        }

/*----------------------------------------------------------------------
        ** the translated name in table is upper case, but file name on CD ROM
        ** is always lower case
        *---------------------------------------------------------------------*/
        strcpy(ym_filename,ym_rec->trans_name);
        lower(ym_filename);

/*-------------------------------------------
        ** get rid of ';' in the translated name
        *------------------------------------------*/
        for(i=0;*(ym_filename+i) != '\0' ;i++) {
            if (*(ym_filename+i) == '\;') {
                *(ym_filename+i) = '\0';
                break;
            }
        }

/*---------------------------------------------
        ** get the fullpath name of loading tarfile
        *--------------------------------------------*/
        sprintf(source_file,"%s/%s",cd_dir,ym_filename);
        if (access(source_file, R_OK) != 0) {
            printf("cd_load: Unable to access a file on the CD-ROM\n");
            printf("         Is the CD-ROM still properly mounted and accessible?\n")
            return(FALSE);
        }

/*-------------------------------------------------------
        ** get the fullpath name of decrypted loading tarfile
        *------------------------------------------------------*/
        sprintf(working_file,"%s/%s", temp_dir, tarfile->tar_file_name);
        if (access(working_file, F_OK) == 0) {

/*-------------------------------------------------
            ** if exists from previous loadind work, deleted it
            *------------------------------------------------*/ if (unlink(working_file) != 0) {
                printf("cd_load:  Warning:  Unable to delete scratch file %s\n",
                                        working_file);
            };
        }

/*---------------------------------------------
        ** get the fullpath name of tarfile writelist
        *--------------------------------------------*/
        sprintf(writelist_file,"%s/%s.writelist",
```

```
                       tar
      temp_dir, 4  file->tar_file_name);
if (access(writelist_file, F_OK) == 0) {
    if (unlink(writelist_file) != 0) {
        printf("cd_load:  Warning:  Unable to delete scratch file %s \n",
                        writelist_file);
    };
}

/*----------------------------------------------------
** get the fullpath name of tarfile writelist_error
*-----------------------------------------------------*/
sprintf(writelist_error_file, "%s/%s.writelist_error",
    temp_dir, tarfile->tar_file_name);
if (access(writelist_error_file, F_OK) == 0) {
    if (unlink(writelist_error_file) != 0) {
        printf("cd_load:  Warning:  Unable to delete scratch file %s \n",
                        writelist_error_file);
    };
} if ((tar_ifp = fopen(source_file,"r")) == NULL) {
    printf("cd_load: Failed to read a file on the CD-ROM\n");
    printf("         Is the CD-ROM still properly mounted and accessible?\n")
    return(FALSE);
};
if ((tar_ofp = fopen(working_file,"w")) == NULL) {
    printf("cd_load: Failed to open scratch file %s \n",working_file);
    printf("         Is the scratch directory still accessible and has free s]
    fclose(tar_ifp);
    return(FALSE);
};

/* get the decrypted key for this tarfile */
if (! shashget((pointer *)&tar_key_ptr, tarfile_key_ht, tarfile->tar_file_name
    printf("cd_load: Internal error:  Missing decryption key for a file set\n'
    fclose(tar_ifp);
    fclose(tar_ofp);
    return(FALSE);
}

/* decrypted it */
bdecrypt(tar_ifp,tar_ofp,tar_key_ptr->tarfile_key);

fclose(tar_ifp);
fclose(tar_ofp);

/*--------------------------------------------------------------
** get the location which this decrypted tarfile will go into
*---------------------------------------------------------------*/
for(tar_hd=target_path_head; tar_hd != NULL; tar_hd=tar_hd->next) {
    if (tar_hd->path_no == tarfile->path_no) break;
} strcpy(target_file,tar_hd->target_path);

/*-----------
** untar it
*-----------*/
sprintf(cmd,"cd %s;/bin/tar -xvfBp %s \> %s 2\>\&1",
        target_file,working_file,writelist_file);
system(cmd);

sprintf(cmd,"/bin/grep \"tar:\" %s \> %s",
    writelist_file, writelist_error_file);
system(cmd);
```

— Page 18 —

```
                                list
        if (stat(writelist_error_file, &buf) == -1) {
            return(FALSE);
        }
        else if (buf.st_size == 0) {
            printf("cd_load:  No errors occurred while processing File Set %s\n",
                            tarfile->tar_file_name);
        }
        else {
            printf("cd_load:  Errors occurred while processing File Set %s\n",
                                tarfile->tar_file_name);
            printf("cd_load:  Look at this file for more details: %s\n",
                            writelist_error_file);
            return(FALSE);
        } if (unlink(working_file) != 0) {
            printf("cd_load:  Warning:  Unable to delete scratch file %s\n",
                working_file);
        };
        if (unlink(writelist_file) != 0) {
            printf("cd_load:  Warning:  Unable to delete scratch file %s\n",
                writelist_file);
        };
        if (unlink(writelist_error_file) != 0) {
            printf("cd_load:  Warning:  Unable to delete scratch file %s\n",
                writelist_error_file);
        };
        return(TRUE);
}

/*-----------------------------------------------------------------
 * function : size_compare
 * purpose  : used by lsisort routine to compare size of
 *            left_key and right_key
 *----------------------------------------------------------------*/
static int size_compare(left_key,right_key)
TARFILE_LIST *left_key,*right_key;
{
        return((left_key->tarfile->size > right_key->tarfile->size)?TRUE:FALSE);
}

/*-----------------------------------------------------------------
 * function : get_1_tarfile
 * purpose  : link for each TAR_FILE pointer
 *----------------------------------------------------------------*/
int get_1_tarfile(tar_file_ptr,tarfile_name)
TAR_FILE *tar_file_ptr;
char *tarfile_name;
{
        TARFILE_LIST *tarfile_list_ptr;

tarfile_list_ptr = (TARFILE_LIST *)
                        qalloc(sizeof(TARFILE_LIST), load_product_mem);

tarfile_list_ptr->tarfile = tar_file_ptr;
        tarfile_list_ptr->next = NULL;

if (tarfile_head == NULL) tarfile_head = tarfile_list_ptr;
        else tarfile_tail->next = tarfile_list_ptr;
        tarfile_tail = tarfile_list_ptr;
        return(TRUE);
}

/*-----------------------------------------------------------------
 * function : get_tarfile_list
 * purpose  : build the sorted tarfile linked list
```

```
/*--------------------           ----------------------          ----------------*/
static get_tarfile_list()
{
    int   size_compare();

tarfile_head = NULL;
    tarfile_tail = NULL;
    shashact(load_tarfile_ht, get_1_tarfile);
    tarfile_head = (TARFILE_LIST *)
        listsort(tarfile_head, &tarfile_head->next, NULL, size_compare);
    /* print_tarfile_list(tarfile_head);*/
}

/*----------------------------------------------------------------
 * function : get_loading_path
 * purpose  : get the loading path for each path number
 *----------------------------------------------------------------*/
static int get_loading_path()
{
TARFILE_LIST *tarfile_list_ptr;

printf("\ncd_load:  The products you have requested to load from the CD-ROM ne
    printf("          to be loaded into one or more separate directory trees, depe
    printf("          on the nature of the products.\n\n");
    printf("          For each directory tree, the tool will inform you of\n");
    printf("          which products will be loaded into that tree and how much\n"
    printf("          disk space is required to store that directory tree.\n\n");
    printf("          You must provide a separate location (i.e. path name) for ea
    printf("          directory tree.  Each path must be owned by the user of this
    printf("          If necessary, you may want to do a 'chown' on each path firs target_path_head = NULL;
    target_path_tail = NULL;

for(tarfile_list_ptr=tarfile_head;tarfile_list_ptr!=NULL;
                    tarfile_list_ptr=tarfile_list_ptr->next) {
        if(! get_path(tarfile_list_ptr->tarfile->path_no)) return(FALSE);
    }

/*print_loading_path(target_path_head);*/
    return(TRUE);
}

/*----------------------------------------------------------------
 *
 *----------------------------------------------------------------*/
static int get_path(path_no)
int path_no;
{
    LOADING_PATH *target_ptr, *this_target_ptr;
    char path[BUFSIZE];
    int get_path_size();
    int  path_exists;
    char entered_path[BUFSIZE];

for(target_ptr=target_path_head; target_ptr!=NULL;
        target_ptr=target_ptr->next) {
        /* already know paths */
        if (target_ptr->path_no == path_no) return(TRUE);
    } target_ptr = (LOADING_PATH *) qalloc(sizeof(LOADING_PATH), load_product_mem);

target_ptr->path_no = path_no;
    target_ptr->next = NULL;
    while(TRUE) {
```

```
                          \n*d          with
    printf("\n   d_load:  Enter a location w   r at least %d bytes\n",
        get_path_size(path_no));
              Path
    print_load_products_of_path_no(path_no);

printf("\ncd_load:  The directory must have read, write, execute permissi(
    printf("          and be owned by the user.\n");
    printf("cd_load:  Software Location -->> ");
    scanf("%s", entered_path);
            if (strcmp(entered_path, "quit") == 0) exit(0);
            if (strcmp(entered_path, "q") == 0) exit(0);

if (realpath(entered_path, path) == NULL) {
        printf("cd_load:  Invalid path entered\n");
        printf("cd_load:  Please try again.\n");
        continue;
    } path_exists = FALSE;
    for(this_target_ptr=target_path_head;
                this_target_ptr!=NULL;
                this_target_ptr=this_target_ptr->next) {
        /* path exists already */
        if (strcmp(path, this_target_ptr->target_path) == 0) {
            printf("cd_load:  Location %s is already being used\n",
                entered_path);
            printf("cd_load:  You must enter a different path\n");
            printf("cd_load:  Please try again.\n");
            path_exists = TRUE;
            break;
        }
    }
    if (path_exists) continue;

if (strcmp(path,"/") == 0) {
        printf("cd_load:  Do not enter the ROOT directory\n");
        printf("cd_load:  Please try again.\n");
        continue;
    } if (!is_dir_rwx(path)) {
        printf("cd_load:  This location does not exist or has bad permissio)
        printf("cd_load:  Please try again\n");
        continue;
    } if(!is_dir_owned_by_user(path)) {
        printf("cd_load:  This location is not owned by the user\n");
        continue;
    } break;
}
target_ptr->target_path = (char *) qalloc(
    (unsigned)strlen(path)+1, load_product_mem);
strcpy(target_ptr->target_path, path);

if (target_path_head == NULL) {
    target_path_head = target_ptr;
    target_path_tail = target_ptr;
}
else {
    target_path_tail->next = target_ptr;
    target_path_tail = target_ptr;
}
return(TRUE);
```

```
}
/*------------------------------------------------------------------
 * function : get_path_size
 * purpose  : get the min file system size for path_no
 *------------------------------------------------------------------*/
static int get_path_size(path_no)
int path_no;
{
TARFILE_LIST *tarfile_list_ptr;
int size;
    size = 0;
    for(tarfile_list_ptr=tarfile_head;tarfile_list_ptr!=NULL;
                    tarfile_list_ptr=tarfile_list_ptr->next) {
        if (tarfile_list_ptr->tarfile->path_no == path_no) {
            size += tarfile_list_ptr->tarfile->size;
        }
    }
    return(size);
}

/*------------------------------------------------------------------
 * function : compare_1_work_size
 * purpose  : called by getworking_area_and_total_size()
 *------------------------------------------------------------------*/
int compare_1_work_size(tar_file_ptr,tarfile_name)
TAR_FILE *tar_file_ptr;
char *tarfile_name;
{
    if (max_work_size < tar_file_ptr->size)
        max_work_size = tar_file_ptr->size;
    tot_load_size += tar_file_ptr->size;
}

/*------------------------------------------------------------------
 * function : getworking_area_and_total_size
 * purpose  : get the min working area size which should be the
 *            max tarfile size (minmax rule)
 *------------------------------------------------------------------*/
static int getworking_area_and_total_size()
{
    shashact(load_tarfile_ht, compare_1_work_size);
    max_work_size = max_work_size * 1.1;
}

/*------------------------------------------------------------------
 * function : print_load_products_of_path_no
 * purpose  : print the loading products of given path_no
 *------------------------------------------------------------------*/
static print_load_products_of_path_no(path_no)
int path_no;
{
    printf("cd_load:  This location will be used to store the following products..
    loading_path_no = path_no;
    sub_product = FALSE;
    shashact(load_product_ht, print_1_load_product_of_path_no);
}

/*------------------------------------------------------------------
 * function : print_1_load_product_of_path_no
 * purpose  :
 *------------------------------------------------------------------*/
print_1_load_product_of_path_no(product_description, product_code)
char *product_description;
char *product_code;
{
```

```
                       product                          Name
PRODUCT_MAP *prc  ct_map_pt;                         i/
PRODUCT_CLASS list *product_class_hd, *class_name_pt;
CLASS *class_pt; List
FILE_LIST *file_list_pt;
TAR_FILE *tar_file_ptr;

path_has_product = FALSE;
if (! shashget((pointer *)&product_map_pt, cd_lookup.product_map_ht,
     product_code, 0)) return;

/*----------------------------------
** do for each selected product list
*-------------------------------*/ for (product_class_hd = product_map_pt->product_class_list;
     product_class_hd != NULL;product_class_hd = product_class_hd->next) { if (shashget((pointer *)&product_map_pt,cd_lookup.product_map_ht,
         product_class_hd->product_class_name,0)==TRUE) {

/*-------------------------------------------------------------
        ** If class name itself is a product name, then check related
        ** products
        *-----------------------------------------------------------*/
        sub_product = TRUE;
        print_1_load_product_of_path_no(product_map_pt->product_description,
                                product_map_pt->product_code);
        if (path_has_product == TRUE) {
            printf("cd_load:  product %s (%s)\n",
                product_code, product_description);
            sub_product = FALSE;
            return;
        }
        sub_product = FALSE;
    }
    else {
        for(class_name_pt=product_class_hd;
            class_name_pt!=NULL;
            class_name_pt=class_name_pt->next    ) {
            shashget((pointer *)&class_pt,cd_lookup.class_ht,
                  class_name_pt->product_class_name,0);
            for(file_list_pt=class_pt->file_list;file_list_pt != NULL;
                file_list_pt = file_list_pt->next) {
                shashget((pointer *)&tar_file_ptr,cd_lookup.tar_file_ht,
                    file_list_pt->file_name,0);
                if (tar_file_ptr->path_no == loading_path_no) {
                    if (sub_product == FALSE) {
                        printf("cd_load:  product %s (%s)\n",
                            product_code, product_description);
                    }
                    path_has_product = TRUE;
                    return;
                }
            }
        }
    }
}
}
```

```
/*---------------------------          -------------------------           ------------------------
**
** module    : cd_lookup
**
** purpose   : provide utilities processing LOOKUP structure or
**             cd_lookup file and product_lookup file
**
** author    : Eric J. Chang
**
** date      : Feb. 15 1991
**
** entry points : get_product_lookup(char *product_lookup_file)
**
**                get_cd_lookup(char *file_name)
**
**----------------------------------------------------------------------*/ include    "cd-rom.h"

extern SITE_CONFIG site_config;
extern LOOKUP      product_lookup;
extern LOOKUP      cd_lookup;
extern YMTRANS_TBL ym_trans;
extern int         tok;

/*--------------------------------------------------------------
** function : get_product_lookup()
** purpose  : get the LOOKUP structure for the input
**            product lookup file name
**-----------------------------------------------------------*/
get_product_lookup(product_lookup_file)
char *product_lookup_file;
        {
        FILE *fp;
        boolean parser_ok;

fp = fopen(product_lookup_file,"r");
        if (fp == NULL) {
                printf("cd_master:  Failed to open %s for read",
            product_lookup_file);
                return(FALSE);
                }
        product_lookup.lookup_fp = fp;
        parser_ok = lookup_parser(&product_lookup, FALSE);
        fclose(fp);
        return(parser_ok);
        }
/*--------------------------------------------------------------
** function : get_cd_lookup()
** purpose  : get the LOOKUP structure for the input encrypted
**            cd lookup file name
**-----------------------------------------------------------*/
int get_cd_lookup(file_name)
char *file_name;
        {
        FILE *ifp;
        boolean parser_ok;

if ((ifp = fopen(file_name,"r")) == NULL) {
                perror("fopen");
                return(FALSE);
                }
        init_decrypt();
        cd_lookup.lookup_fp = ifp;
        parser_ok = lookup_parser(&cd_lookup, TRUE);
        fclose(ifp);
```

- Page 24 -

```
                 parser_ok
return(parser_ok);
}
```

Appendix 1 Code listing for cd_master

```c
#include      "cd-rom.h"

#define ASPEN_CONFIG_FILE "/w/aspen/aspen.config"

typedef struct not_in_dist_struct {
    char *filename;
    struct not_in_dist_struct *next;
} not_in_dist;

SITE_CONFIG     site_config;
LOOKUP          product_lookup;
LOOKUP          cd_lookup;
YMTRANS_TBL     ym_trans;
CD_VOLUME       cd_volume;
int             tok;

memory_group    master_mem;
memory_group    dir_mem;
hash_table      product_ht;
hash_table      class_ht;
hash_table      tarfile_ht;
hash_table      tarfile_key_ht;
hash_table      dir_ht;
hash_table      load_class_ht;
hash_table      load_tarfile_ht;
TARFILE_LIST    *tarfile_head;
TARFILE_LIST    *tarfile_tail;
LOADING_PATH    *target_path_head;
LOADING_PATH    *target_path_tail;
char            product_lookup_file[MAXFNAMESIZE+1];
char            job_dir[MAXFNAMESIZE+1];
char            *job_number;
char            vol_dir[MAXFNAMESIZE+1];
char            fileset_dir[MAXFNAMESIZE+1];
char            work_dir[MAXFNAMESIZE+1];
char            test_dir[MAXFNAMESIZE+1];
char            target_drive[MAXFNAMESIZE+1];
char            mps_file[MAXFNAMESIZE+1];
pointer         mps_ptr;
int             mps_return_code;
int             volume_selection;
int             max_volume;
aspen_data      *aspen_info;
char            *program_name;

char            aspen_jobs[] = {"/w/aspen/jobs"};

extern char *mktemp();

/*-------------------------------------------------------------------
** program  : cd_master
**
** purpose  : produce CD-ROM ISO 9660 format for LSI Logic software on tape
**            or disks.
**
** author   : Eric J. Chang
**
** date     : Feb. 15 1991
**
** syntax   : cd_master <job#>
**            where <job#> = CD-ROM job# in AEIS scheduler.
**
** input    : /w/aspen/jobs/<job#>/job.<job#>
**            /w/aspen/jobs/<job#>/README.<job#>
**            /w/aspen/jobs/<job#>/cd_lookup.<job#>
**            /t/IST/released_sun3/cd_load
```

- Page 1 -

```
**                /t/IST/   leased_sun4/cd_load
                                  ↑
                               released
**                The first 3 files are generated by cd_mapper
**
** output   : CD-ROM ISO 9660 images of encrypted tarfiles on tape or disk
**
**--------------------------------------------------------------------------*/ main(argc,argv)
int argc;
char *argv[];
{
    printf("(c) Copyright 1991 LSI Logic Corporation\n");
    printf("CD-ROM Master Tape Generation Tool\n");
    printf("Version 2.0 - July 1991\n\n");
    if (argc != 2) {
        printf("\nUsage: cd_master <job#>\n");
        exit(99);
    }
    job_number = argv[1];
    main_init();
    printf("Pre-requisite:  you must create a prescription file and then run\n");
    printf("                   the cd_mapper tool first.\n");
    printf("This CD-ROM Mastering Tool does these basic steps:\n");
    printf("   1.  Reads the job files from the /w/aspen/jobs/<job#> directory\n")
    printf("   2.  Creates symbolic links to distribution areas for files which\n"
    printf("         will reside on the CD-ROM\n");
    printf("   3.  Builds and encrypts one or more tar files to hold the files.\n"
    printf("         The building of the tar file requires a working directory.\n'
    printf("   4.  Writes the encrypted tar files, an encrypted lookup file,\n");
    printf("         a README file, and the cd_load loader program into a so-call(
    printf("         target directory for each CD-ROM volume\n");
    printf("   5.  Optionally uses Young-Minds software to write all the files for'
    printf("         a given CD-ROM volume onto either an exabyte tape in\n");
    printf("         ISO-9660 format for sending to a CD-ROM manufacturer\n");
    printf("         such as 3M or Sony, or onto a hard disk attached\n");
    printf("         to your SUN4 (e.g. SparcStation) configured as\n");
    printf("         a raw partition for simulation of a CD-ROM device.\n");
    printf("This cd_master tool will ask you a few questions which allow you to sk:
    printf("or re-run some of the above steps.\n\n");
    process();
    main_end();
}

/*-------------------------------------------------------------------------
** function : main_init()
** purpose  : initialize program environment
**-------------------------------------------------------------------------*/ static int main_init()
{
    sprintf(job_dir, "%s/%s", aspen_jobs, job_number);
    if (!is_dir_rwx(job_dir)) {
        printf("cd_master: job directory %s is not writeable\n", job_dir);
        exit(99);
    } sprintf(product_lookup_file,"%s/%s/prod_lookup.%s",
            aspen_jobs, job_number, job_number);

if (access(product_lookup_file, R_OK) != 0) {
        printf("cd_master: Product lookup file %s is not readable\n",
          product_lookup_file);
            exit(99);
    } sprintf(mps_file,"%s/%s/job.%s",
```

- Page 2 -

```
                    aspen-jobs
            asper   abs, job_number, job_number if (access(mps_file, R_OK) != 0) {
        printf("cd_master: MPS file %s is not readable\n",mps_file);
        exit(99);
     } mps_ptr = mps_parse(mps_file, ALL_LAST);
    if (mps_return_code != 0) {
        printf("cd_master: error parsing MPS file: %s\n", mps_file);
        exit(99);
    } master_mem = gpalloc(1024);
    smaketab(&tarfile_key_ht,master_mem,FALSE);

if (!get_product_lookup(product_lookup_file)) {
        printf("cd_master:  Error parsing product lookup file %s\n",
                    product_lookup_file);
        exit(99);
    };

load_aspen_config_info();

if (!load_environment(aspen_info->environment_file)) {
        printf("cd_master: Could not load env file %s\n",
            aspen_info->environment_file);
        exit(99);
    }
}
/*--------------------------------------------------------------------------
** function : main_end()
** purpose  : program ending routine
**------------------------------------------------------------------------*/
static int main_end()
{
    printf("cd_master: Completed CD MASTERING process\n");
    fclose(product_lookup.lookup_fp);
    gpfree(product_lookup.lookup_mem);
}

/*--------------------------------------------------------------------------
** function : process()
** purpose  : CD MASTERING process
**------------------------------------------------------------------------*/
static int process()
{
char ans[BUFSIZE];
char cmd[BUFSIZE];

build_fileset_key_map();

while (TRUE) {
        printf(
"cd_master: Do you want to build symbolic links to distribution areas,\n");
        printf("          even if this was done before? \[y\/n\]\n");
        printf("          Note: you should say 'y' if you re-ran cd_mapper\n");
        scanf("%s",ans);
        if ((strcmp(ans,"Y") == 0) || (strcmp(ans,"y") == 0)) {
            sprintf(cmd,"rm -rf %s/writelist*",job_dir);
            printf("cd_master: Removing any existing symbolic links\n");
            system(cmd);
            sprintf(cmd,"rm -rf %s/volume.*",job_dir);
```

— Page 3 —

```
                        system_cmd
                         ↓
                system_ed);
                create_symbolic_links_for_filesets();
                break;
            }
            else if ((strcmp(ans,"N") == 0) || (strcmp(ans,"n") == 0)) break;
            else printf("cd_master: Please answer y or n\n");
    }
    tar_and_encrypt_filesets();
}

/*------------------------------------------------------------------------
** function : build_fileset_key_map()
** purpose  : build tarfile_key_ht
**----------------------------------------------------------------------*/ static int build_fileset_key_map()
{
    int build_1_fileset_key_map();
    shashact(product_lookup.class_ht,build_1_fileset_key_map);
}

/*------------------------------------------------------------------------
** function : build_1_fileset_key_map()
** purpose  : insert 1 entry into tarfile_key_ht
**            called by build_fileset_key_map()
**----------------------------------------------------------------------*/ static int build_1_fileset_key_map(class_ptr,class_name)
CLASS *class_ptr;
char *class_name;
{
FILE_LIST *file_hd;
TAR_KEY *tar_key_ptr;

for (file_hd = class_ptr->file_list; file_hd != NULL;
         file_hd = file_hd->next) {
            tar_key_ptr = (TAR_KEY *)qalloc(sizeof(TAR_KEY), master_mem);
            tar_key_ptr->tarfile_name = file_hd->file_name;
            tar_key_ptr->tarfile_key = class_ptr->key;
            shashinsert((pointer)tar_key_ptr, tarfile_key_ht,
                tar_key_ptr->tarfile_name, 0);
    }
}

/*------------------------------------------------------------------------
** function : make_fileset_dir()
** purpose  : build dirs for each input vol_no and fileset_name
**----------------------------------------------------------------------*/ static int make_fileset_dir(vol_no,fileset_name)
int vol_no;
char *fileset_name;
{
char cmd_string[BUFSIZE];

/*-----------------------------------
    ** make volume dirs if they don't exist
    *---------------------------------*/
    make_vol_dir(vol_no);

/*-------------------------------------------
    ** if fileset dir exists, remove it and recreate it
    *-----------------------------------------*/
    sprintf(fileset_dir,"%s/%s",vol_dir,fileset_name);
    if (access(fileset_dir, F_OK) == 0) {
        strcpy(cmd_string, "/bin/rm -fr ");
```

```
            string
        strcat(cmd_ string, fileset_dir);
        system(cmd_string);
    }              string
    mkdir(fileset_dir, 775);
    chmod(fileset_dir, 0775);
}

/*-------------------------------------------------------------------
** function : make_vol_dir()
** purpose  : create volume dirs if they don't exist
**-----------------------------------------------------------------*/ static int make_vol_dir(vol_no)
int vol_no;
{
    sprintf(vol_dir,"%s/volume.%d",job_dir,vol_no);
    if (access(vol_dir, F_OK) == 0) {
        return;
    }
    mkdir(vol_dir, 775);
    chmod(vol_dir, 0775);
}

/*-------------------------------------------------------------------
** function : create_symbolic_links_for_1_fileset()
** purpose  : create tree structure symbolic links for one fileset
**            called by create_symbolic_links_for_filesets()
**-----------------------------------------------------------------*/ static int create_symbolic_links_for_1_fileset(tar_file,tar_file_name)
TAR_FILE *tar_file;
char *tar_file_name;
{
not_in_dist *files_not_in_dist = NULL;
not_in_dist *a_rec;

make_fileset_dir(tar_file->volume,tar_file->tar_file_name);
    dir_mem = gpalloc(1024);
    smaketab(&dir_ht, dir_mem, FALSE);
    printf("cd_master: Constructing %s data structures...\n",
        tar_file->tar_file_name);

mps_reset_record(mps_file);
    while ((mps_ptr = mps_next_record(mps_file)) != NULL) {
        if (mps_record_type(mps_ptr) != DATA) continue;
        if (strcmp(tar_file->tar_file_name,mps_file_comment1(mps_ptr)))
    {
            continue;
    }
        make_link(fileset_dir,mps_file_name(mps_ptr),
            &files_not_in_dist);
    }

/*----------------------------------------------------------------
     * Check if any files in subjob were not found in our distribution
     * areas as defined by env.locations. If some files were found.
     * Display the files to the user and see if they want to continue.
     *--------------------------------------------------------------*/ if (files_not_in_dist != NULL) {
        printf("cd_master: These files were not found in the distribution areas:
        for (a_rec = files_not_in_dist; a_rec != NULL; a_rec = a_rec->next) {
            printf("   %s\n ",a_rec->filename);
        printf("cd_master:  No further processing will occur.\n");
        exit(99);
    }
```

```
        }
       gpfree(dir_mem);
}
/*-------------------------------------------------------------------------
** function : create_symbolic_links_for_filesets()
** purpose  : create tree structure symbolic links for all filesets
**-----------------------------------------------------------------------*/ static int create_symbolic_links_for_filesets()
{
int create_symbolic_links_for_1_fileset();
       shashact(product_lookup.tar_file_ht,create_symbolic_links_for_1_fileset);
}

/*-------------------------------------------------------------------------
** function : make_link()
** purpose  : create a symbolic link for input filename under fileset_dir
**            if not exists, put it into files_not_in_dist
**-----------------------------------------------------------------------*/
static make_link(fileset_dir,filename,files_not_in_dist)
char *fileset_dir;
char *filename;
not_in_dist **files_not_in_dist;
{
       not_in_dist *a_file_rec;
       char *ptr, *subptr;
       int len;
       env_desc *env_ptr;
       char new_dir[MAXFNAMESIZE];
       char link_name[MAXFNAMESIZE];

/*----------------------------------------------------------
        * Strip out the local portion of the path from the filename
        * passed in (path).  If the releative file location can not
        * be determined, the full path will be used. This means the
        * file is not in our distrubuition area or env.locations is
        * not up to date.
        *--------------------------------------------------------*/
       env_ptr = find_environment(filename);
       ptr = env_ptr->relative_file_location;

if (strcmp(ptr, filename+1) == 0 ) {
           a_file_rec = (not_in_dist *)qalloc(
               sizeof(struct not_in_dist_struct), dir_mem);
           a_file_rec->filename = (char *)qalloc((unsigned)
               strlen(filename)+1, dir_mem);
           strcpy(a_file_rec->filename, filename);
           a_file_rec->next = *files_not_in_dist;
           *files_not_in_dist = a_file_rec;
       } while (*ptr != '\0') {
           if (*ptr == '\/') {
               *ptr = '\0';
               len = ptr - env_ptr->relative_file_location + 1;
               subptr = (char *)qalloc((unsigned)len, dir_mem);
               strcpy(subptr, env_ptr->relative_file_location);

/*--------------------------------------------------
                * If it goes into the hash table, create a new dir.
                *------------------------------------------------*/
               if (shashinsert((pointer)subptr, dir_ht, subptr,len)) {
                   strcpy(new_dir, fileset_dir);
                   strcat(new_dir, "/");
                   strcat(new_dir, subptr);
```

```
                    mkdir(
                mkdir  new_dir, 755);
                chmod(new_dir, 0755);
            }        d
            *ptr = '\/';
            ptr++;
        }
        else ptr++;
    }
    /*----------------------------------------------------
     * make symbolic link to file in distribution area.
     *----------------------------------------------------*/
    strcpy(link_name, fileset_dir);
    strcat(link_name, "/");
    strcat(link_name, env_ptr->relative_file_location);
    symlink(filename, link_name);
}

/*----------------------------------------------------------------------
 * function: load_aspen_config_info
 * purpose:  Load in the aspen configuration file
 *----------------------------------------------------------------------*/
static load_aspen_config_info()
    {
    if (!load_aspen_config(ASPEN_CONFIG_FILE)) {
        printf("cd_master: An error occurred while reading the aspen.config \n");
        printf("file %s\n", ASPEN_CONFIG_FILE);
        printf("cd_master: Either the file was not readable or a syntax error was "
        printf("           encountered.\n");
        exit(99);
    } aspen_info = get_general_aspen_data();
} /* load_aspen_config_info */

/*----------------------------------------------------------------------
** function : tar_and_encrypt_filesets()
** purpose  : generate tarfiles and encrypt tarfiles into destination location
**----------------------------------------------------------------------*/ static int tar_and_encrypt_filesets()
{
int tar_and_encrypt_1_fileset();
char ans[BUFSIZE];
    get_max_volume();
    while (TRUE) {
        if (max_volume > 1)
            ask_volume_no();
        else volume_selection = 1;
        if (volume_selection == 0)
            break;

while(TRUE) {
            printf(
"cd_master: Do you want to generate encrypted tar files for volume %d \n",
            volume_selection);
            printf("          even if they were created before? \[y\/n\]\n");
            printf("          Answer 'y' if you re-built symbolic links\n");
            scanf("%s",ans);
            if ((strcmp(ans,"Y") == 0) || (strcmp(ans,"y") == 0)) {
                ask_work_dirs();
                generate_cd_volume();
                generate_cd_lookup();
                generate_cd_load();
                generate_README();
                shashact(product_lookup.tar_file_ht,tar_and_encrypt_1_fileset);
```

```
                    break
                b   k;
            }
            else if ((strcmp(ans,"N") == 0) || (strcmp(ans,"n") == 0)) break;
        } while(TRUE) {
            printf(
"cd_master: Generate CD-ROM images (to disk or tape) for volume %d? \[y/n\] \n",
                volume_selection);
            scanf("%s",ans);
            if ((strcmp(ans,"Y") == 0) || (strcmp(ans,"y") == 0)) {
                ask_work_dirs();
                ask_drive();
                tar_to_tape();
                break;
            }
            else if ((strcmp(ans,"N") == 0) || (strcmp(ans,"n") == 0)) break;
        } if (max_volume == 1) break;
    }
}

/*------------------------------------------------------------------------
** function : ask_drive()
** purpose  : get dump device target_drive
**----------------------------------------------------------------------*/ static ask_drive()
{
    char ans[BUFSIZE];
    while(TRUE) {
        printf("cd_master: Enter the target device where the CD-ROM image goes:\n");
        printf("cd_master: i.e. /dev/rst8 cis15:/dev/rsd2a ...\n");
        printf("cd_master: target tape drive/disk ---> ");

scanf("%s",target_drive);

printf("cd_master: Target tape drive : %s\n",target_drive);
        printf("cd_master: Is this correct \[y/n\] ? ");
        scanf("%s",ans);
        if ((strcmp(ans,"Y") == 0) || (strcmp(ans,"y") == 0)) break;
    }
}

/*------------------------------------------------------------------------
** function : ask_work_dirs()
** purpose  : get test_dir and work_dir
**----------------------------------------------------------------------*/ static ask_work_dirs()
{
    char ans[BUFSIZE];

while (TRUE) {
        /**---------------------
         ** get encrypted dir
         **---------------------*/
        while(TRUE) {
            printf(
"cd_master: Enter the directory where encrypted tar files will be kept:\n");
            printf("cd_master: directory ---> ");
            scanf("%s",test_dir);
            if (!is_dir_rwx(test_dir)) {
                printf("cd_master: Directory %s does not exist\n", test_dir);
                printf("cd_master: Retry !!\n");
```

```
                    continue;
                }
                break;
        }
        /**----------------------
         ** get working dir
         **--------------------*/
        while(TRUE) {
                printf("cd_master: Enter the working directory for generating tar fi.
                printf("cd_master: working directory ---> ");
                scanf("%s",work_dir);
                if (!is_dir_rwx(work_dir)) {
                        printf("cd_master: Directory %s does not exist\n", work_dir);
                        printf("cd_master: Retry !!\n");
                        continue;
                }
                break;
        } printf("cd_master: Target directory  : %s\n",test_dir);
        printf("cd_master: Working directory : %s\n",work_dir);
        printf("cd_master: Is this correct \[y/n\] ? ");
        scanf("%s",ans);
        if ((strcmp(ans,"y") == 0) || (strcmp(ans,"Y") == 0)) break;
    }
}
/*------------------------------------------------------------------------
** function : generate_cd_volume()
** purpose  : generate cd_volume file for each volume
**            volume number specified by volume_selection
**----------------------------------------------------------------------*/
static int generate_cd_volume()
{
char target_volume_file[MAXFNAMESIZE+1];
char cmd[BUFSIZE];
FILE *target_volume_file_fp;

printf("cd_master: Generating cd_volume file for volume %d...\n",volume_select:
        sprintf(target_volume_file,"%s/volume.%d/cd_volume",job_dir,volume_selection);
        if ((target_volume_file_fp = fopen(target_volume_file,"w")) == NULL) {
                printf("cd_master: Open file %s fail !!\n",target_volume_file);
                exit(99);
        } fprintf(target_volume_file_fp,"cd_id %s\;\n",product_lookup.cd_id);
        fprintf(target_volume_file_fp,"volume_no %d\;\n",volume_selection);
        fclose(target_volume_file_fp);

sprintf(cmd,"cp -p %s %s", target_volume_file, test_dir);
        system(cmd);
}

/*------------------------------------------------------------------------
** function : generate_cd_lookup()
** purpose  : generate cd_lookup file for each volume
**            volume number specified by volume_selection
**----------------------------------------------------------------------*/
static int generate_cd_lookup()
{
static char key[] = {"ZZZZZZZZZZZZ"};
char source_cd_lookup[MAXFNAMESIZE+1];
char target_cd_lookup[MAXFNAMESIZE+1];
char cmd[BUFSIZE];
```

```
FILE *source_cd_lookup_fp;
FILE *target_cd_lookup_fp;

printf("cd_master: Generating cd_lookup file for volume %d...\n",
        volume_selection);

sprintf(source_cd_lookup,"%s/cd_lookup.%s",job_dir,job_number);
    if (access(source_cd_lookup, R_OK) != 0) {
        printf("cd_master: cd_lookup file %s is not readable\n",
            source_cd_lookup);
        exit(99);
    }
    sprintf(target_cd_lookup, "%s/volume.%d/cd_lookup",
        job_dir, volume_selection);

if ((source_cd_lookup_fp = fopen(source_cd_lookup,"r")) == NULL) {
        printf("cd_master: Cannot open %s for read\n",
            source_cd_lookup);
        exit(99);
    }
    if ((target_cd_lookup_fp = fopen(target_cd_lookup,"w")) == NULL) {
        printf("cd_master: Cannot open %s for write\n",
            target_cd_lookup);
        exit(99);
    }
    encrypt_cd_lookup(source_cd_lookup_fp, target_cd_lookup_fp, key);

fclose(source_cd_lookup_fp);
    fclose(target_cd_lookup_fp);

sprintf(cmd,"cp -p %s %s", target_cd_lookup, test_dir);
    system(cmd);
}
/*-----------------------------------------------------------------*
 *
 *-----------------------------------------------------------------*/
static boolean is_stripped(filename)
char *filename;
    {
    static struct stat buf;
    char template[MAXFNAMESIZE+1];
    char cmd[BUFSIZE];

strcpy(template, work_dir);
    strcat(template, "/STRIP_TEMP_XXXXXX");

mktemp(template);
    strcpy(cmd, "file ");
    strcat(cmd, filename);
    strcat(cmd, "| egrep 'not stripped' > ");
    strcat(cmd, template);
    system(cmd);

if (stat(template, &buf) != 0) return(FALSE);
    unlink(template);
    if (buf.st_size == 0) return(TRUE);
    return(FALSE);
    }
/*-----------------------------------------------------------------
** function : generate_cd_load()
** purpose  : generate cd_load.sun4 for each volume
**            volume number specified by volume_selection
**-----------------------------------------------------------------*/
static int generate_cd_load()
{
```

- Page 10 -

SUN4

```c
char source_cd_load_s  [MAXFNAMESIZE+1];
char target_cd_load_sun4[MAXFNAMESIZE+1];
char cmd[BUFSIZE];

printf("cd_master: Getting cd_load program for volume %d...\n",
        volume_selection);
    sprintf(target_cd_load_sun4, "%s/volume.%d/cd_load",
        job_dir, volume_selection);
    sprintf(source_cd_load_sun4, "/t/IST/released_sun4/cd_load");

if (access(source_cd_load_sun4, R_OK) != 0) {
       printf("cd_master: Loader program %s does not exist\n",
           source_cd_load_sun4);
       printf("cd_master: No further processing will occur\n");
       exit(99);
    }
    sprintf(cmd,"cp -p %s %s", source_cd_load_sun4, target_cd_load_sun4);
    system(cmd);
    chmod(target_cd_load_sun4, 0755);
    if (! is_stripped(target_cd_load_sun4)) {
       unlink(target_cd_load_sun4);
       printf("cd_master:  Loader program %s is not stripped\n",
           source_cd_load_sun4);
       printf("cd_master: No further processing will occur\n");
       exit(99);
       }
    sprintf(cmd,"cp -p %s %s", target_cd_load_sun4, test_dir);
    system(cmd);
}

/*-------------------------------------------------------------------
** function : generate_README()
** purpose  : generate README file for each volume
**----------------------------------------------------------------*/ static int generate_README()
{
char source_README[MAXFNAMESIZE+1];
char target_README[MAXFNAMESIZE+1];
char cmd[BUFSIZE];

printf("cd_master: Getting README file for volume %d...\n",
        volume_selection);

sprintf(source_README, "%s/README.%s", job_dir, job_number);
    if (access(source_README, R_OK) != 0) {
        printf("cd_master: Cannot find README file %s\n",
           source_README);
        exit(99);
    }
    sprintf(target_README, "%s/volume.%d/README",
        job_dir, volume_selection);
    sprintf(cmd,"/bin/cp -p %s %s", source_README, target_README);
    system(cmd);

sprintf(cmd, "/bin/cp -p %s %s", target_README, test_dir);
    system(cmd);
}

/*-------------------------------------------------------------------
** function : tar_to_tape()
** purpose  : use Young Mind software to generate ISO 9660 image into
**            specified destination which may be tape or disk
**----------------------------------------------------------------*/ static int tar_to_tape()
```

— Page 11 —

```
{
char cmd[BUFSIZE];

sprintf(cmd,"cp /t/cd-tools/project/volume.inf %s",work_dir);
    system(cmd);

sprintf(cmd, "cd /t/cd-tools;makedisc -c -b4 -s %s %s YMTRANS.TBL %s 600",
        work_dir, test_dir, target_drive);

printf("cd_master: Generating CD-ROM image on %s\n", target_drive);
    system(cmd);
}

/*-------------------------------------------------------------------------
** function : tar_and_encrypt_1_fileset()
** purpose  : tar and encrypt input tar_file
**            called by tar_and_encrypt_filesets
**-----------------------------------------------------------------------*/ static int tar_and_encrypt_1_fileset(tar_file,tar_file_name)
TAR_FILE *tar_file;
char *tar_file_name;
{
    if (tar_file->volume != volume_selection)
        return;
    if (!tar_it(tar_file->tar_file_name)) {
        printf("cd_master: Errors generating tarfile %s\n",
            tar_file->tar_file_name);
        exit(99);
    };
    if (!encrypt_it(tar_file->tar_file_name)) {
        printf("cd_master: Error encrypting tarfile %s\n",
            tar_file->tar_file_name);
        exit(99);
    };
}

/*-------------------------------------------------------------------------
** function : tar_it()
** purpose  : put the input fileset into a tarfile format
**            called by tar_and_encrypt_1_fileset()
**-----------------------------------------------------------------------*/ static int tar_it(fileset)
char *fileset;
{
    char cmd_string[BUFSIZE];
    char writelist_file[MAXFNAMESIZE+1];
    char writelist_error_file[MAXFNAMESIZE+1];
    char from_dir[MAXFNAMESIZE+1];
    char to_file[MAXFNAMESIZE+1];
    struct stat buf;

sprintf(writelist_error_file,"%s/writelist_error.%s",job_dir,fileset);
    unlink(writelist_error_file);
    sprintf(writelist_file,"%s/writelist.%s",job_dir,fileset);
    unlink(writelist_file);

sprintf(from_dir,"%s/volume.%d/%s",job_dir,volume_selection,fileset);
    sprintf(to_file,"%s/%s",work_dir,fileset);
    unlink(to_file);

/*-------------------------------------------------------------
     * Construct the tar command.
     * examples:
     * tar cvhBf <device/file> -C <volume_dir> -C <lookme> [-C <aaa_testfile] .
```

```
                        volume                    qua-
 * tar cvhB -C <\   ume_dir> -C <lookme> [-C <&  ,testfile} .
 *-----------------------------------------------------------------*/ sprintf(cmd_string,"tar cvhBf %s -C %s \. \> %s 2\>\&1",
        to_file, from_dir, writelist_file);

printf("cd_master: Writing tarfile %s ...\n", to_file);
    /*printf("\ncd_master: %s",cmd_string);*/
    system(cmd_string);

/*----------------------------------------------------------
     * Check writelist for any tar errors.  The erors will be
     * denoted by "tar:".
     *---------------------------------------------------------*/ printf("cd_master: Checking for tar errors...\n");

sprintf(cmd_string,"/bin/grep \"tar:\" %s \> %s",
        writelist_file, writelist_error_file);
    system(cmd_string);

if (stat(writelist_error_file, &buf) == -1) {
        printf("cd_master: The writelist error check file was not generated.\n");
        return(FALSE);
    }
    else if (buf.st_size == 0) {
        printf("cd_master: No tar errors occurred while writing the volume.\n");
    }
    else {
        printf("cd_master:  Tar errors occurred while writing\n");
        return(FALSE);
    } return(TRUE);
} /* tar_it */

/*-------------------------------------------------------------------
** function : encrypt_it()
** purpose  : encrypt input fileset tarfile into destination
**            called by tar_and_encrypt_1_fileset()
**-----------------------------------------------------------------*/ static int encrypt_it(fileset)
char *fileset;
{
    TAR_KEY *tar_key_ptr;
    FILE *ifp,*ofp;
    char from_file[MAXFNAMESIZE+1];
    char to_file[MAXFNAMESIZE+1];

sprintf(from_file,"%s/%s", work_dir, fileset);
    sprintf(to_file,"%s/%s", test_dir, fileset);

/*---------------------
    ** get encrypted key
    *--------------------*/ if (shashget(&tar_key_ptr,tarfile_key_ht,fileset,0)==FALSE) {
        printf("\ncd_master: Encryption key for fileset %s not found\n",
            fileset);
        return(FALSE);
    }
    printf("cd_master: Begin encrypting %s to %s ...\n",
        from_file, to_file);

if ((ifp = fopen(from_file,"r")) == NULL) {
```
- Page 13 -

```
            printf("cd_master: Open file %s error !!\n",from_file);
            return(FALSE);
        } if ((ofp = fopen(to_file,"w")) == NULL) {
            printf("cd_master: Open file %s error !!\n",to_file);
            fclose(ifp);
            return(FALSE);
        } bencrypt(ifp,ofp,tar_key_ptr->tarfile_key);

fclose(ifp);
        fclose(ofp);

printf("cd_master: Finish encrypting %s to %s ...\n",
            from_file, to_file);
        printf("cd_master: Begin verifying %s with encrypted %s\n",
            from_file, to_file);

if ((ifp = fopen(from_file,"r")) == NULL) {
            printf("cd_master: Error opening file %s\n",from_file);
            return(FALSE);
        } if ((ofp = fopen(to_file,"r")) == NULL) {
            printf("cd_master: Error opening file %s\n",to_file);
            return(FALSE);
        } if (!verify_bencrypt(ifp,ofp,tar_key_ptr->tarfile_key)) {
            printf("cd_master: Error encrypting tarfile %s\n",to_file);
            fclose(ifp);
            fclose(ofp);
            return(FALSE);
        };

fclose(ifp);
        fclose(ofp);

unlink(from_file);

printf("cd_master: Finish verifying %s with %s ...\n",
            from_file, to_file);
        return(TRUE);
}
/*----------------------------------------------------------------------
** function : ask_volume_no()
** purpose  : ask volume number you want to make
**--------------------------------------------------------------------*/
static int ask_volume_no()
{
    printf("cd_master: There are %d volume(s)\n", max_volume);
    printf("cd_master: Please enter the volume you want to generate: \n");
    printf("cd_master: Enter 0 to exit\n");
    printf("cd_master: volume number --> ");
    scanf("%d", &volume_selection);
    if (volume_selection == 0) return;
    if (volume_selection < 1 || volume_selection > max_volume)
        ask_volume_no();
}

/*----------------------------------------------------------------------
** function : compare_1_fileset_volume()
```

```
                           to                    total
** purpose  : called t  get_max_volume() to get the    tal volumes
**---------------------------------------------------------------------*/ static int compare_1_fileset_volume(tar_file,tar_file_name)
TAR_FILE *tar_file;
char *tar_file_name;
{
    if (tar_file->volume > max_volume) max_volume = tar_file->volume;
}

/*---------------------------------------------------------------------
** function : get_max_volume()
** purpose  : get get the total volumes of CD ROM
**---------------------------------------------------------------------*/ static int get_max_volume()
{
    max_volume = 1;
    shashact(product_lookup.tar_file_ht, compare_1_fileset_volume);
}
```

Appendix 4: Code listing for CD Configuration

```
/*-------------------------------------------------------------------------
** program  : cd_config
**
** purpose  : Generate LSI CD-ROM product authorization file - site_config
**            file.
**
** author   : Eric J. Chang
**
** date     : July 15 1991
**
** syntax   : cd_config <job#> <cd_id#>
**            where job#  = job# in AEIS scheduler
**                  cd_id# = CD-ROM serial # (which is the job# which
**                           produced CD-ROM)
**
** input    : product_lookup file -
**                  /w/aspen/jobs/<cd_id#>/prod_lookup.<cd_id#> which generated
**                  by cd_master
**
** output   : site_config file -
**                  /w/aspen/jobs/<job#>/site_config.<job#>.data
**                  /w/aspen/jobs/<job#>/site_config.<job#>
**
**------------------------------------------------------------------------*/ include     "cd-rom.h"
include     "/t/sybase/sun3/include/sybfront.h"
#include     "/t/sybase/sun3/include/sybdb.h"

#define      CONFIGTYPE_UNKNOWN    0
#define      AUTOCONFIG_JOBNO      1
#define      AUTOCONFIG_NICKNAME   2
#define      MANUAL_CONFIG         3

SITE_CONFIG          site_config;
LOOKUP               product_lookup;
LOOKUP               cd_lookup;
int                  tok;
hash_table           load_class_ht;

static YMTRANS_TBL   ym_trans;
static CD_VOLUME     cd_volume;
static char          product_lookup_file[BUFSIZE];
static char          site_config_file[BUFSIZE];
static char          site_config_data[BUFSIZE];
static char          input_site_config_data[BUFSIZE];
static char          job_no_str[BUFSIZE];
static char          cd_id_str[BUFSIZE];
static char          nick_name[BUFSIZE];
static char          platform_name[BUFSIZE];
static memory_group  work_mem;
static hash_table    product_ht;
static hash_table    cpu_ht;
static hash_table    load_tarfile_ht;
static hash_table    tarfile_key_ht;
static hash_table    load_product_ht;
static FILE          *site_config_fp;
static FILE          *site_config_data_fp;
static FILE          *error_fp;

int                  err_handler();
int                  msg_handler();

static LOGINREC      *login;
static DBPROCESS     *dbproc;
```

```
                                                aspen
static char          aspen_jobs_dir[] = {"/w/at  a/jobs"};
static char          site_config_area[] = {"/w/authcodearea/SITE_CONFIG"};
static char          key[] = {"ZZZZZZZZZ"};
static char          site_config_error_file[BUFSIZE];
static char          output_dir[] = {""};

static int           status_code = 0;
static int           tot_cpus_added = 0;
static int           tot_products_added = 0;
static int           config_type = CONFIGTYPE_UNKNOWN;

main(argc,argv)
int argc;
char *argv[];
{
    parse_arg(argc,argv);

switch(config_type) {
        case AUTOCONFIG_NICKNAME :
        case AUTOCONFIG_JOBNO :
            auto_process(argc,argv);
            break;
        case MANUAL_CONFIG :
            manual_process(argc,argv);
            break;
        case CONFIGTYPE_UNKNOWN :
        default :
            printf("\n\ncd_config <cd_id#> [<this_job#>|<nickname>|<input_file_n;
            printf("if 'this_job#' is specified, it must be an integer\n");
            printf("if 'nickname' is specified, it must be a string with no slasl
            printf("if 'input_file_name' is specified, it must begin with 'site_
            exit(99);
    } exit(status_code);
}

/*------------------------------------------------------------------
** function : auto_main_init()
** purpose  : initialize program environments
**-----------------------------------------------------------------*/ static auto_main_init(argc,argv)
int argc;
char *argv[];
{
    char current_job_dir[BUFSIZE];

sprintf(current_job_dir,"%s",site_config_area);
    if (!is_dir(current_job_dir)) {
        if (mkdir(current_job_dir, 775) == -1) {
            printf("(cd_config) : Cannot create %s \n",current_job_dir);
            exit(99);
        };
        chmod(current_job_dir, 0775);
    }

/*---------------
    ** init db-lib
    **-------------*/ dberrhandle(err_handler);
    dbmsghandle(msg_handler);
```

```c
        login = dblogin(
        DBSETLUSER(login,"control");
        DBSETLPWD(login,"fremont");
        DBSETLAPP(login,"cd_config");

dbproc = dbopen(login, (char *) NULL);
        /*dbuse(dbproc,"OZBETA");*/

/*---------------------------
        ** check and get nick_name
        **--------------------------*/
        check_nick_name();

/*---------------------------
        ** site_config_error_file
        **--------------------------*/ sprintf(site_config_error_file,"%s/site_config.%s.%s.error",site_config_area,c if (access(site_config_error_file, R_OK) == 0) {
            unlink(site_config_error_file);
        } if ((error_fp = fopen(site_config_error_file,"w")) == NULL) {
            printf("(cd_config) : Fail to open site_config_error_file file %s !!\n",
        };

/*---------------------------
        ** get product_lookup info
        **--------------------------*/ sprintf(product_lookup_file,"%s/%s/prod_lookup.%s",aspen_jobs_dir,cd_id_str,cd if (access(product_lookup_file, R_OK) != 0) {
            fprintf(error_fp,"(cd_config) : product_lookup_file file %s does not exi
            exit(1);
        } work_mem = gpalloc(BUFSIZE);
        smaketab(&product_ht,work_mem,FALSE);
        smaketab(&cpu_ht,work_mem,FALSE);

if (!get_product_lookup(product_lookup_file)){
            fprintf(error_fp,"Parse product lookup file %s error !!",product_lookup_f
            exit(99);
        };

}

/*--------------------------------------------------------------------
** function : check_nick_name()
** purpose  :
**--------------------------------------------------------------------*/ static check_nick_name()
{
RETCODE     result_code,
            row_code;
char        test_nick_name[BUFSIZE];
char        test_platform_name[BUFSIZE];

if (config_type == AUTOCONFIG_JOBNO) {
            nick_name[0] = '\0';
            platform_name[0] = '\0';
```

```
        dbfcmd(dbproc," select distinct a.nick_name, c.platform_name ");
        dbfcmd(dbproc," from control.installation a, control.job b, control.platf(
        dbfcmd(dbproc," where b.job_id = %s ",job_no_str);
        dbfcmd(dbproc," and a.installation_id = b.installation_id ");
        dbfcmd(dbproc," and b.platform_id   = c.platform_id ");
        dbfcmd(dbproc," and a.record_revlevel = ");
        dbfcmd(dbproc,"        \(select max\(control.installation.record_revlevel\)

dbfcmd(dbproc,"          from control.installation ");
        dbfcmd(dbproc,"          where control.installation.installation_id = a.inst;

dbsqlexec(dbproc);

while ((result_code = dbresults(dbproc)) != NO_MORE_RESULTS) {
            if (result_code == SUCCEED) {
                dbbind(dbproc,1,NTBSTRINGBIND,0,nick_name);
                dbbind(dbproc,2,NTBSTRINGBIND,0,platform_name);
            }
            while((row_code = dbnextrow(dbproc)) != NO_MORE_ROWS) {
                if (strlen(nick_name) == 0) {
                    printf("\n\nNO such job exists \n\n");
                    exit(99);
                };
                if (strlen(platform_name) == 0) {
                    printf("\n\nNO such platform exists with this nickname %s\1
                    exit(99);
                };
                upper(nick_name);
                upper(platform_name);
                return;
            }
        } printf("\nNO such nickname or platform exists \n");
        exit(99);

} if (config_type == AUTOCONFIG_NICKNAME) { test_nick_name[0] = '\0';
        test_platform_name[0] = '\0';

dbfcmd(dbproc," select distinct a.nick_name,b.platform_name ");
        dbfcmd(dbproc," from control.installation a, control.platform b ");
        dbfcmd(dbproc," where a.nick_name = \"%s\" ", nick_name);
        dbfcmd(dbproc," and a.record_revlevel = ");
        dbfcmd(dbproc,"        \(select max\(control.installation.record_revlevel\)

dbfcmd(dbproc,"          from control.installation ");
        dbfcmd(dbproc,"          where control.installation.nick_name = \"%s\"\) ",n:
        dbfcmd(dbproc," and a.platform_id = b.platform_id ");
        dbfcmd(dbproc," and upper\(b.platform_name\) = \"%s\" ",platform_name);

dbsqlexec(dbproc);

while ((result_code = dbresults(dbproc)) != NO_MORE_RESULTS) {
            if (result_code == SUCCEED) {
                dbbind(dbproc,1,NTBSTRINGBIND,0,test_nick_name);
                dbbind(dbproc,2,NTBSTRINGBIND,0,test_platform_name);
            }
            while((row_code = dbnextrow(dbproc)) != NO_MORE_ROWS) {
                if (strcmp(nick_name,test_nick_name) != 0) {
                    printf("\n\nNO such nick_name exists \n\n");
                    exit(99);
```

— Page 19 —

```
                    };
                    if (strcmp(platform_name,test_platform_name) != 0) {
                        printf("\n\nNO such platform exists \n\n");
                        exit(99);
                    };
                    return;
                }
            }
            printf("\nNO such nickname or platform exists \n");
            exit(99);
        }
}

/*-------------------------------------------------------------------
** function : auto_main_end()
** purpose  : program terminate routine
**-----------------------------------------------------------------*/ static auto_main_end()
{
    fclose(error_fp);
    dbexit();

chmod(site_config_file, 0664);
    chmod(site_config_data, 0664);
    chmod(site_config_error_file, 0664);
    printf("\nThe following encrypted, data and error files were put under /w/auth(
    printf("\t %s \n",site_config_file );
    printf("\t %s \n",site_config_data );
    printf("\t %s \n",site_config_error_file );

}

/*-------------------------------------------------------------------
** function : parse_arg()
** purpose  : parse program arguments
**            Syntax :
**            cd_config <cd_id#> [<this_job#>|<nickname>|<input_file_name>]
**                cd_id#                 : CD ROM serial #
**                job#                   : current job#
**-----------------------------------------------------------------*/ static parse_arg(argc,argv)
int argc;
char *argv[];
{
    if (argc != 3 && argc != 4) {
        printf("\ncd_config <cd_id#> [<this_job#>|<input_file_name>]");
        printf("\ncd_config <cd_id#> <nickname> <platform> \n\n");
        exit(99);
    } if (is_digit_str(argv[1]))
        strcpy(cd_id_str,argv[1]);
    else {
        printf("\ncd_config <cd_id#> [<this_job#>|<input_file_name>]");
        printf("\ncd_config <cd_id#> <nickname> <platform> \n\n");
        exit(99);
    } if (argc == 3) {
        if (is_digit_str(argv[2])) {
            strcpy(job_no_str,argv[2]);
            config_type = AUTOCONFIG_JOBNO;
```

```
            }
            else if (is_pathname(argv[2]) || is_site_config_name(argv[2])) {
                strcpy(input_site_config_data,argv[2]);
                config_type = MANUAL_CONFIG;
            }
            else {
                printf("\ncd_config <cd_id#> [<this_job#>|<input_file_name>]");
                printf("\ncd_config <cd_id#> <nickname> <platform> \n\n");
                exit(99);
            };
    }
    if (argc == 4) {
        if (is_digit_str(argv[2])||is_pathname(argv[2]) || is_site_config_name(ar(
            printf("\ncd_config <cd_id#> [<this_job#>|<input_file_name>]");
            printf("\ncd_config <cd_id#> <nickname> <platform> \n\n");
            exit(99);
        }
        else {
            strcpy(nick_name,argv[2]);
            upper(nick_name);
            strcpy(platform_name,argv[3]);
            upper(platform_name);
            config_type = AUTOCONFIG_NICKNAME;
        };
    }
}

/*------------------------------------------------------------------
** function : is_pathname()
** purpose  : return TRUE id inputname is a absolute or relative path
**            name
**------------------------------------------------------------------*/ static int is_pathname(name)
char *name;
{
    return( (index(name,'/') == NULL) ? FALSE : TRUE);
}

/*------------------------------------------------------------------
** function : is_site_config_name()
** purpose  : return TRUE if the input name string start with site_config
**------------------------------------------------------------------*/ static int is_site_config_name(name)
char *name;
{
    return((strstr(name,"site_config")==NULL)?FALSE:TRUE);
}

/*------------------------------------------------------------------
** function : auto_process()
** purpose  : doing program main logic
**------------------------------------------------------------------*/ static auto_process(argc,argv)
int argc;
char *argv[];
{ auto_main_init(argc,argv);

if (config_type == AUTOCONFIG_JOBNO) {
        get_license_product();
```

```
            get_license_cpu();
    } if (config_type == AUTOCONFIG_NICKNAME) {
        get_license_product_by_nickname();
        get_license_cpu_by_nickname();
    } get_loading_class();

generate_site_license();

if (tot_cpus_added == 0) {
        status_code += 2;
        printf("(cd_config) No cpus were added !!\n");
        fprintf(error_fp,"(cd_config) No cpus were added !!\n");
    } if (tot_products_added == 0) {
        status_code += 3;
        printf("(cd_config) No products were added !!\n");
        fprintf(error_fp,"(cd_config) No products were added !!\n");
    } auto_main_end();
}
/*---------------------------------------------------------------
** function : generate_site_license()
** purpose  : generate encrypted site_config file
**-------------------------------------------------------------*/
static generate_site_license()
{
    /*---------------------------------------------------
    ** generate source site_config.job#.data file
    **-------------------------------------------------*/ sprintf(site_config_data,"%s/site_config.%s.data.%s_%s",site_config_area,cd_id if ((site_config_data_fp = fopen(site_config_data,"w")) == NULL) {
        printf("(cd_config) Fail to open site_config_data file %s !!\n",site_conf
        fprintf(error_fp,"(cd_config) Fail to open site_config_data file %s!!\n",
        exit(99);
    };

print_cd_id();
    print_license_cpus();
    print_license_products();
    print_class_keys();
    print_end();
    fclose(site_config_data_fp);

/*---------------------------------------------------
    ** geterate encrypted site_config.job# file
    **-------------------------------------------------*/ sprintf(site_config_file,"%s/site_config.%s.%s_%s",site_config_area,cd_id_str, if ((site_config_fp = fopen(site_config_file,"w")) == NULL) {
        printf("(cd_config) Fail to open site_config file %s !!\n",site_config_fi
        fprintf(error_fp,"(cd_config) Fail to open site_config file %s!!\n",site_
        exit(99);
    };
```

```c
                                                    data
            config   data                            ↓
    if ((site_config_data_fp = fopen(site_config_data,"r")) == NULL) {
        printf("(cd_config) Fail to open site_config_data file %s !!\n",site_conf:
        fprintf(error_fp,"(cd_config) Fail to open site_config_data file %s!!\n",:
        exit(99);
    };

encrypt_site_config(site_config_data_fp,site_config_fp,key);

fclose(site_config_fp);
    fclose(site_config_data_fp);
}

/*-------------------------------------------------------------
** function : print_cd_id()
** purpose  : geterate cd_id for site_config data file
**            cd_id comes from product_lookup file
**------------------------------------------------------------*/ static print_cd_id()
{
char output[BUFSIZE];

if (config_type != MANUAL_CONFIG) {
        fprintf(site_config_data_fp,"cd_id %s;\n",product_lookup.cd_id);
        }
    else {
        fprintf(site_config_data_fp,"cd_id %s;\n",site_config.cd_id);
        }
}
/*-------------------------------------------------------------
** function : print_end()
** purpose  : geterate end for site_config data file
**------------------------------------------------------------*/ static print_end()
{
    fprintf(site_config_data_fp,"end\n");
}

/*-------------------------------------------------------------
** function : print_1_cpu()
** purpose  : generate 1 cpu_list for site_licence
**            called by print_license_cpus()
**------------------------------------------------------------*/ static print_1_cpu(cpu_id_ptr,cpu_id)
CPU_ID *cpu_id_ptr,*cpu_id;
{
    fprintf(site_config_data_fp,"cpu_list %s;\n",cpu_id_ptr);
    tot_cpus_added++;
}

/*-------------------------------------------------------------
** function : print_license_cpus()
** purpose  : generate cpu_list for site_config data file
**------------------------------------------------------------*/ static print_license_cpus()
{
int  print_1_cpu();

if (config_type != MANUAL_CONFIG)
```

— Page 23 —

```
                          cpu-ht
            shashact(cp    .t,print_1_cpu);
      else
            shashact(site_config.site_cpu_ht,print_1_cpu);
}

/*---------------------------------------------------------------
** function : print_1_product()
** purpose  : generate 1 product_list for site_config file
**            called by print_license_products()
**--------------------------------------------------------------*/ static print_1_product(product_code_ptr,product_code)
PRODUCT_CODE *product_code_ptr,*product_code;
{
      fprintf(site_config_data_fp,"product_list %s;\n",product_code);
      tot_products_added++;
}

/*---------------------------------------------------------------
** function : print_license_products()
** purpose  : generate product_list for site_config file
**--------------------------------------------------------------*/ static print_license_products()
{
      int print_1_product();
      if (config_type != MANUAL_CONFIG)
            shashact(product_ht,print_1_product);
      else
            shashact(site_config.site_product_ht,print_1_product);
}

/*---------------------------------------------------------------
** function : print_1_class_key()
** purpose  : generate 1 class encryption key for site_licence
**            called by print_class_keys()
**--------------------------------------------------------------*/ static print_1_class_key(class_ptr,name)
CLASS *class_ptr;
char *name;
{
      shashget((pointer) &class_ptr,
                  product_lookup.class_ht,name,0);

fprintf(site_config_data_fp,"class %s %s;\n",name,class_ptr->key);
}

/*---------------------------------------------------------------
** function : print_class_keys()
** purpose  : generate class key lists for site_config data file
**--------------------------------------------------------------*/ static print_class_keys()
{
int   print_1_class_key();
      shashact(load_class_ht,print_1_class_key);
}

/*---------------------------------------------------------------
** function : get_license_cpu()
** purpose  : build cpu_ht from sybase authcode_group_cpu table for
**            this table
**--------------------------------------------------------------*/ static get_license_cpu()
```

— Page 24 —

```
{
RETCODE      result_code,
             row_code;
char         cpu_id[17];

dbfcmd(dbproc," select distinct c.cpu_id ");
    dbfcmd(dbproc," from control.installation a, control.authcode_group b, control
    dbfcmd(dbproc," where d.job_id = %s ",job_no_str);
    dbfcmd(dbproc," and a.installation_id = d.installation_id ");
    dbfcmd(dbproc," and a.record_revlevel = ");
    dbfcmd(dbproc,"     \(select max\(control.installation.record_revlevel\) ");

dbfcmd(dbproc,"       from control.installation ");
    dbfcmd(dbproc,"       where control.installation.installation_id = a.installat:
    dbfcmd(dbproc," and a.buried = 0 ");
    dbfcmd(dbproc," and b.installation_id = a.installation_id ");
    dbfcmd(dbproc," and b.record_revlevel = ");
    dbfcmd(dbproc,"     \(select max\(control.authcode_group.record_revlevel\) ");
    dbfcmd(dbproc,"       from control.authcode_group ");
    dbfcmd(dbproc,"       where control.authcode_group.installation_id = b.installa
    dbfcmd(dbproc,"       and control.authcode_group.group_no = b.group_no\) ");
    dbfcmd(dbproc," and b.buried = 0 ");
    dbfcmd(dbproc," and b.licence_expiration_date > getdate\(\) ");
    dbfcmd(dbproc," and c.authcode_group_id = b.authcode_group_id ");

dbsqlexec(dbproc);

while ((result_code = dbresults(dbproc)) != NO_MORE_RESULTS) {
        if (result_code == SUCCEED) {
            dbbind(dbproc,1,NTBSTRINGBIND,0,cpu_id);
        }
        while((row_code = dbnextrow(dbproc)) != NO_MORE_ROWS) {
            if (strlen(cpu_id) == 0) continue;
            if (is_hex_str(cpu_id))
                build_cpu_ht(cpu_id);
            else {
                printf("(cd_config) : Non hex cpu_id %s detected !!", cpu_id);
                fprintf(error_fp,"(cd_config) : Non hex cpu_id %s detected !!",
                exit(99);
            }
        }
    }
}

/*------------------------------------------------------------------
** function : build_cpu_ht()
** purpose  : insert 1 cpu entry into licensed cpu_ht
**----------------------------------------------------------------*/ static int build_cpu_ht(cpu_id)
CPU_ID *cpu_id;
{
CPU_ID *cpu_ptr;

cpu_ptr=(char *) qalloc(strlen(cpu_id)+1,work_mem);
    strcpy(cpu_ptr,cpu_id);
    shashinsert(cpu_ptr,cpu_ht,cpu_ptr,0);

}

/*------------------------------------------------------------------
** function : get_license_product()
** purpose  : build licensed product_ht from sybase authcode_licence
**            table for this customer
**----------------------------------------------------------------*/
```

```
                         product
static get_license_pr   .et()
{
RETCODE      result_code, row_code;
char         product_code[25];
PRODUCT_MAP  *product_map_ptr;

product_code[0] = '\0';

dbfcmd(dbproc," select distinct c.product_code ");
    dbfcmd(dbproc," from control.installation a, control.authcode_group b, control
    dbfcmd(dbproc," where d.job_id = %s ",job_no_str);
    dbfcmd(dbproc," and a.installation_id = d.installation_id ");
    dbfcmd(dbproc," and a.record_revlevel = ");
    dbfcmd(dbproc,"     \(select max\(control.installation.record_revlevel\) ");

dbfcmd(dbproc,"      from control.installation ");
    dbfcmd(dbproc,"      where control.installation.installation_id = a.installat:
    dbfcmd(dbproc," and a.buried = 0 ");
    dbfcmd(dbproc," and b.installation_id = a.installation_id ");
    dbfcmd(dbproc," and b.record_revlevel = ");
    dbfcmd(dbproc,"     \(select max\(control.authcode_group.record_revlevel\) ");
    dbfcmd(dbproc,"      from control.authcode_group ");
    dbfcmd(dbproc,"      where control.authcode_group.installation_id = b.installa1
    dbfcmd(dbproc,"      and control.authcode_group.group_no = b.group_no\) ");
    dbfcmd(dbproc," and b.buried = 0 ");
    dbfcmd(dbproc," and b.licence_expiration_date > getdate\(\) ");
    dbfcmd(dbproc," and c.authcode_group_id = b.authcode_group_id ");

dbsqlexec(dbproc);

while ((result_code = dbresults(dbproc)) != NO_MORE_RESULTS) { if (result_code == SUCCEED) {
             dbbind(dbproc,1,NTBSTRINGBIND,0,product_code);
         } while((row_code = dbnextrow(dbproc)) != NO_MORE_ROWS) { if (strlen(product_code) == 0) continue;
/*
??        -----------
??        don't check
??        -----------
??
??             if(shashget(&product_map_ptr,product_lookup.product_map_ht,product_
??                 continue;
??             }
*/
             build_product_ht(product_code);

}
    }

}
/*----------------------------------------------------------------
** function : build_product_ht()
** purpose  : insert 1 product_code into licensed product_ht
**----------------------------------------------------------------*/ static build_product_ht(product_code)
char *product_code;
{
PRODUCT_CODE *product_ptr;
```

-Page 26-

```
        product_ptr=(char *) qalloc(strlen(product_code)+1,work_mem);
        strcpy(product_ptr,product_code);

shashinsert(product_ptr,product_ht,product_ptr,0);
} get_loading_class()
{
int get_load_class_ht();

smaketab(&load_product_ht, work_mem, FALSE);
        load_all_products();

smaketab(&load_class_ht, work_mem, FALSE);
        shashact(load_product_ht, get_load_class_ht);

}

/*----------------------------------------------------------------
 * function : insert_all_product_ht
 * purpose  : insert 1 entry into load_product_ht
 *            called by load_all_products()
 *----------------------------------------------------------------*/
int insert_all_product_ht(unused, product_code)
char *unused;
char *product_code;
{
PRODUCT_MAP *product_map_pt;

if (shashget((pointer *)&product_map_pt, product_lookup.product_map_ht,
        product_code, 0)) {
        shashinsert((pointer)product_map_pt,
           load_product_ht, product_code, 0);
        }
    return(TRUE);
}

/*----------------------------------------------------------------
 * function : load_all_products
 * purpose  : build load_product_ht for all authorized products
 *----------------------------------------------------------------*/
static load_all_products()
{ if (config_type != MANUAL_CONFIG)
        shashact(product_ht, insert_all_product_ht);
    else
        shashact(site_config.site_product_ht, insert_all_product_ht);

}

/*----------------------------------------------------------------
 * function : get_load_class_ht
 * purpose  : build load_class_ht
 *            load_class_ht keeps all the related class from loading
 *            product lists
 *----------------------------------------------------------------*/
static get_load_class_ht(product_description, product_code)
char *product_description;
char *product_code;
{
    PRODUCT_MAP *product_map_pt;
    PRODUCT_CLASS_LIST *product_class_hd;
    CLASS *class_ptr;
```

—Page 27—

```
        shashget((pointer *)&product_map_pt,
            product_lookup.product_map_ht, product_code, 0);
        /*---------------------------------
        ** do for each selected product list
        *---------------------------------*/
        for (product_class_hd = product_map_pt->product_class_list;
            product_class_hd != NULL; product_class_hd = product_class_hd->next) {
                product_lookup.product_map_ht,
                product_class_hd->product_class_name, 0)) {
                /*------------------------------------------------------------
                ** If class name itself is a product name, then get all related
                ** class for this product
                *------------------------------------------------------------*/
                get_load_class_ht(product_class_hd->product_class_name,
                    product_class_hd->product_class_name);
            }
            else {
                /* it is a class */
                if (! shashget((pointer *)&class_ptr, product_lookup.class_ht,
                    product_class_hd->product_class_name, 0)) {
                    printf("cd_load: Internal error - Class names incorrect in prod_
                    exit(99);
                }
                else {
                    shashinsert((pointer)product_class_hd,
                        load_class_ht, product_class_hd->product_class_name, 0);
                }
            }
        }
} infinity()
{
}

/*---------------------------------------------------------------
** function : err_handler()
** purpose  : db-lib error handler
**-------------------------------------------------------------*/
static int err_handler(dbproc,severity,errno,oserr)
DBPROCESS   *dbproc;
int         severity;
int         errno;
int         oserr;
{
    printf("DB-LIB error\n\t%s\n", dberrstr(errno));

if (oserr != DBNOERR)
        printf("Operating-system error:\n\t%s\n",dboserrstr(errno));

if ((dbproc == NULL) || (DBDEAD(dbproc)))
            return(INT_EXIT);
    else
            return(INT_CANCEL);

}

/*---------------------------------------------------------------
** function : msg_handler()
** purpose  : db-lib message handler
**-------------------------------------------------------------*/
```

```
                    ---  *dbproc         severity
static int msg_handle  dbproc,msgno,msgstate,sever   ,msgtext)
DBPROCESS    *dbproc;
int          msgno;
int          msgstate;
int          severity;
char         *msgtext;
{
    if (severity == 0) return(0);
    printf("Data server mesg %d, state %d, severity %d:\n\t%s\n",
        msgno,msgstate,severity,msgtext);
        return(DBNOSAVE);
}

/**********************************************************
* THE FOLLOWING FUNCTIONS ARE FOR COMPLETE MANUAL MODE
**********************************************************/ manual_process(argc,argv)
int argc;
char **argv;
{
    manual_main_init();
    process_config();
    process_lookup();
    verify();
    get_loading_class();
    manual_site_license();
    manual_main_end();
}

/*-----------------------------------------------------------------
** function : manual_site_license()
** purpose  : generate site_config for manual mode
**---------------------------------------------------------------*/ static manual_site_license()
{ if ((site_config_data_fp = fopen(site_config_data,"w")) == NULL) {
        printf("(cd_config) : Fail to open site_config_data file %s !!\n",site_cc
        fprintf(error_fp,"(cd_config) : Fail to open site_config_data file %s !!
        exit(99);
    };

print_cd_id();
    print_license_cpus();
    print_license_products();
    print_class_keys();
    print_end();
    fclose(site_config_data_fp);

/*---------------------------------------------
    ** geterate encrypted site_config.job# file
    **-------------------------------------------*/ if ((site_config_fp = fopen(site_config_file,"w")) == NULL) {
        printf("(cd_config) Fail to open site_config file %s !!\n",site_config_fi
        fprintf(error_fp,"(cd_config) Fail to open site_config file %s!!\n",site_c
        exit(99);
    };

if ((site_config_data_fp = fopen(site_config_data,"r")) == NULL) {
        printf("(cd_config) Fail to open site_config_data file %s !!\n",site_conf:
```

```
                    ERROR-                         OPEN-SITE
                      ↓                              ↓
            fprintf(err    _fp,"(cd_config) Fail to ops site_config_data file %s!!\n",:
            exit(99);
    };

encrypt_site_config(site_config_data_fp,site_config_fp,key);

fclose(site_config_fp);
    fclose(site_config_data_fp);

if (!get_site_config(site_config_file)) {
        printf("(cd_config) Failed to load site_config info ...\n");
        fprintf(error_fp,"(cd_config) Failed to load site_config info ...\n");
        exit(99);
    };

}
/*---------------------------------------------------------------------
** function : manual_main_init()
** purpose  : initialize program environments
**-------------------------------------------------------------------*/ static manual_main_init()
{
char current_job_dir[BUFSIZE];

/*-------------------------
    ** site_config_error_file
    **-----------------------*/ strcpy(site_config_error_file,"site_config.error");

if (access(site_config_error_file, R_OK) == 0) {
        unlink(site_config_error_file);
    } if ((error_fp = fopen(site_config_error_file,"w")) == NULL) {
        printf("(cd_config) : Fail to open site_config_error_file file %s !!\n",:
        fprintf(error_fp,"(cd_config) : Fail to open site_config_error_file file
        exit(99);
    };

work_mem = gpalloc(BUFSIZE);

}
/*---------------------------------------------------------------------
** function : process_lookup()
** purpose  : get product_lookup structure
**-------------------------------------------------------------------*/ process_lookup()
{
    /*-------------------------
    ** get product_lookup info
    **-----------------------*/ sprintf(product_lookup_file,"%s/%s/prod_lookup.%s",aspen_jobs_dir,cd_id_str,cd_ if (access(product_lookup_file, R_OK) != 0) {
        printf("(cd_config) : product_lookup_file file %s does not exits!!\n",pr(
        fprintf(error_fp,"(cd_config) : product_lookup_file file %s does not exit
        exit(99);
    } if (!get_product_lookup(product_lookup_file)){
```

```
                            Parse                    error !
        printf("Par   product lookup file %s errc  ?!",product_lookup_file);
        fprintf(error_fp,"Parse product lookup file %s error !!",product_lookup_f:
        exit(99);
    };
}

/*----------------------------------------------------------------
** function : manual_main_end()
** purpose  : program terminate routine
**----------------------------------------------------------------*/ static manual_main_end()
{
    fclose(error_fp);
    chmod(site_config_file, 0664);
    chmod(site_config_data, 0664);
    chmod(site_config_error_file, 0664);
    printf("\nThe following encrypted, data and error files were put under current
    printf("\t %s \n",site_config_file );
    printf("\t %s \n",site_config_data );
    printf("\t %s \n",site_config_error_file );
}

/*----------------------------------------------------------------
** function : process_config()
** purpose  : doing program main logic
**----------------------------------------------------------------*/ static process_config()
{ char cmd[BUFSIZE];

/*--------------------------
    ** site_config_data
    **------------------------*/ sprintf(site_config_data,"site_config.%s.data",cd_id_str);

sprintf(cmd,"cp %s %s",input_site_config_data,site_config_data);

system(cmd);

if ((site_config_data_fp = fopen(site_config_data,"r")) == NULL) {
        printf("(cd_config) : Fail to open site_config_data file %s !!\n",site_c(
        fprintf(error_fp,"(cd_config) : Fail to open site_config_data file %s !!'
        exit(99);
    };

sprintf(site_config_file,"site_config.%s",cd_id_str);

if ((site_config_fp = fopen(site_config_file,"w")) == NULL) {
        printf("(cd_config) : Fail to open site_config file %s !!\n",site_config
        fprintf(error_fp,"(cd_config) : Fail to open site_config file %s !!\n",s:
        exit(99);
    };

encrypt_site_config(site_config_data_fp,site_config_fp,key);

fclose(site_config_data_fp);
    fclose(site_config_fp);

if (!get_site_config(site_config_file)) {
        printf("(cd_config) Failed to load site_config info ...\n");
        fprintf(error_fp,"(cd_config) Failed to load site_config info ...\n");
```

— Page 31 —

```
            exit(99);
    };
}

/*------------------------------------------------------------------
** function : verify()
** purpose  : verify cd_id, cpu list, product list
**----------------------------------------------------------------*/ verify()
{
/*
    check_cd_id();
*/
    check_cpus();
/*
    check_products();
*/
}

/*------------------------------------------------------------------
** function : check_cd_id()
** purpose  : verify cd_id
**----------------------------------------------------------------*/ check_cd_id()
{
    if (strcmp(product_lookup.cd_id,site_config.cd_id)) {
        printf("(cd_config) : cd_id doesnot match !!\n");
        fprintf(error_fp,"(cd_config) : cd_id doesnot match !!\n");
    }
}

/*------------------------------------------------------------------
** function : check_1_cpu()
** purpose  :
**----------------------------------------------------------------*/ static check_1_cpu(cpu_id_ptr,cpu_id)
CPU_ID *cpu_id_ptr,*cpu_id;
{
    if (!is_hex_str(cpu_id)) {
        printf("(cd_config) : Non hex cpu id found - %s !!\n",cpu_id);
        fprintf(error_fp,"(cd_config) : Non hex cpu id found - %s !!\n",cpu_id);
    }
}

/*------------------------------------------------------------------
** function : check_cpus()
** purpose  :
**----------------------------------------------------------------*/ static check_cpus()
{
    int check_1_cpu();

shashact(site_config.site_cpu_ht,check_1_cpu);
}

/*------------------------------------------------------------------
** function : check_cpus()
** purpose  :
**----------------------------------------------------------------*/ static check_1_product(product_code_ptr,product_code)
```

```
                             _code
PRODUCT_CODE  *product_code_ptr,*product_code;
{
PRODUCT_MAP   *product_map_ptr;

if(!shashget(&product_map_ptr,product_lookup.product_map_ht,
            product_code_ptr,0)) {
        printf("(cd_config) : No such product %s found in %s !!\n",
            product_code,product_lookup_file);
        fprintf(error_fp,"(cd_config) : No such product %s found in %s !!\n",
            product_code,product_lookup_file);
    }

}

/*-----------------------------------------------------------------
** function : check_products()
** purpose  :
**---------------------------------------------------------------*/ static check_products()
{
    int check_1_product();

shashact(site_config.site_product_ht,check_1_product);
}

/**********************************************************
* THE FOLLOWING FUNCTIONS ARE FOR MANUAL MODE FROM DB
**********************************************************/

/*-----------------------------------------------------------------
** function : get_license_cpu_by_nickname()
** purpose  : build cpu_ht from sybase authcode_group_cpu table for
**            this table
**---------------------------------------------------------------*/ static get_license_cpu_by_nickname()
{
RETCODE    result_code,
           row_code;
char       cpu_id[17];

dbfcmd(dbproc," select distinct c.cpu_id ");
    dbfcmd(dbproc," from control.installation a, control.authcode_group b, control
    dbfcmd(dbproc," where upper\(a.nick_name\) = \"%s\" ",nick_name);
    dbfcmd(dbproc," and a.record_revlevel = ");
    dbfcmd(dbproc,"      \(select max\(control.installation.record_revlevel\) ");

dbfcmd(dbproc,"         from control.installation ");
    dbfcmd(dbproc,"         where upper\(control.installation.nick_name\) = \"%s\"\)
    dbfcmd(dbproc," and a.buried = 0 ");
    dbfcmd(dbproc," and a.platform_id = d.platform_id ");
    dbfcmd(dbproc," and upper\(d.platform_name\) = \"%s\" ", platform_name);
    dbfcmd(dbproc," and b.installation_id = a.installation_id ");
    dbfcmd(dbproc," and b.record_revlevel = ");
    dbfcmd(dbproc,"      \(select max\(control.authcode_group.record_revlevel\) ");
    dbfcmd(dbproc,"         from control.authcode_group ");
    dbfcmd(dbproc,"         where control.authcode_group.installation_id = b.installa1
    dbfcmd(dbproc,"         and control.authcode_group.group_no = b.group_no\) ");
    dbfcmd(dbproc," and b.buried = 0 ");
    dbfcmd(dbproc," and b.licence_expiration_date > getdate\(\) ");
    dbfcmd(dbproc," and c.authcode_group_id = b.authcode_group_id ");

dbsqlexec(dbproc);

while ((result_code = dbresults(dbproc)) != NO_MORE_RESULTS) {
```

```c
                          code
                           ↓
        if (result_code == SUCCEED) {
            dbbind(dbproc,1,NTBSTRINGBIND,0,cpu_id);
        }
        while((row_code = dbnextrow(dbproc)) != NO_MORE_ROWS) {
            if (strlen(cpu_id) == 0) continue;
            if (is_hex_str(cpu_id))
                build_cpu_ht(cpu_id);
            else {
                printf("(cd_config) : Non hex cpu_id %s detected !!", cpu_id);
                fprintf(error_fp,"(cd_config) : Non hex cpu_id %s detected !!",
                exit(99);
            }
        }
    }
}

/*----------------------------------------------------------------
** function : get_license_product_by_nickname()
** purpose  : build licensed product_ht from sybase authcode_licence
**            table for this customer
**----------------------------------------------------------------*/
static get_license_product_by_nickname()
{
RETCODE       result_code, row_code;
char          product_code[25];
PRODUCT_MAP   *product_map_ptr;

product_code[0] = '\0';

dbfcmd(dbproc," select distinct c.product_code ");
    dbfcmd(dbproc," from control.installation a, control.authcode_group b, control
    dbfcmd(dbproc," where upper\(a.nick_name\) = \"%s\" ",nick_name);
    dbfcmd(dbproc," and a.record_revlevel = ");
    dbfcmd(dbproc,"      \(select max\(control.installation.record_revlevel\) ");

dbfcmd(dbproc,"         from control.installation ");
    dbfcmd(dbproc,"         where upper\(control.installation.nick_name\) = \"%s\"\)
    dbfcmd(dbproc," and a.buried = 0 ");
    dbfcmd(dbproc," and a.platform_id = d.platform_id ");
    dbfcmd(dbproc," and upper\(d.platform_name\) = \"%s\" ", platform_name);
    dbfcmd(dbproc," and b.installation_id = a.installation_id ");
    dbfcmd(dbproc," and b.record_revlevel = ");
    dbfcmd(dbproc,"      \(select max\(control.authcode_group.record_revlevel\) ");
    dbfcmd(dbproc,"         from control.authcode_group ");
    dbfcmd(dbproc,"         where control.authcode_group.installation_id = b.installat
    dbfcmd(dbproc,"         and control.authcode_group.group_no = b.group_no\) ");
    dbfcmd(dbproc," and b.buried = 0 ");
    dbfcmd(dbproc," and b.licence_expiration_date > getdate\(\) ");
    dbfcmd(dbproc," and c.authcode_group_id = b.authcode_group_id ");

dbsqlexec(dbproc);

while ((result_code = dbresults(dbproc)) != NO_MORE_RESULTS) { if (result_code == SUCCEED) {
            dbbind(dbproc,1,NTBSTRINGBIND,0,product_code);
        } while((row_code = dbnextrow(dbproc)) != NO_MORE_ROWS) { if (strlen(product_code) == 0) continue;

/*
??          -----------
??          don't check
```

```
??          -----------
??
??              if(shashget(&product_map_ptr,product_lookup.product_map_ht,product_
??                  continue;
??              }
*/ build_product_ht(product_code);

}
    }

}
``` aeis09:forbin cd-rom.h

Fri Jul 19 11:56:29 1991 lw11 / LaserWriter II NT

```
lw11  aeis09:forbin   Job: cd-rom.h   Date: Fri Jul 19 11:56:29 1991
lw11  aeis09:forbin   Job: cd-rom.h   Date: Fri Jul 19 11:56:29 1991
lw11  aeis09:forbin   Job: cd-rom.h   Date: Fri Jul 19 11:56:29 1991
lw11  aeis09:forbin   Job: cd-rom.h   Date: Fri Jul 19 11:56:29 1991
```

```c
#include <stdio.h>
#include <strings.h>
#include <ctype.h>
#include <sys/param.h>
#include <sys/dir.h>
#include <sys/stat.h>
#include <sys/file.h>
#include <sys/types.h>
#include <sys/time.h>
#include <sys/stat.h>
#include <sys/vfs.h>
#include "lsisys.h"
#include "ma.h"
#include "lsigpal.h"
#include "lsilex.h"
#include "lsinhsh.h"
#include "lsisort.h"
#include "mps.h"
#include "mps_def.h"
#include "mps_func.h"
#include "environ.h"
#include "aspen_notify.h"
#include "aspen_config.h"

#define     tok_cd_id           1
#define     tok_cpu_list        2
#define     tok_product_list    3
#define     tok_product         4
#define     tok_class           5
#define     tok_file            6
#define     tok_terminator      7
#define     tok_identifier      8
#define     tok_cd_volume       9
#define     tok_end             10
define     tok_prod_desc       11 define     BUFSIZE             1024

/* define site_config */ typedef char CD_ID;
typedef char CPU_ID;
typedef char PRODUCT_CODE;

typedef struct site_config {
    CD_ID *cd_id;
    hash_table      site_product_ht;
    hash_table      site_cpu_ht;
    FILE            *site_config_fp;
    memory_group    site_config_mem;
    tstream         site_config_tstr;
} SITE_CONFIG;

/* define cd_lookup */ typedef struct product_class_list {
    char *product_class_name;
    struct product_class_list *next;
} PRODUCT_CLASS_LIST;

typedef struct product_map {
    char *product_code;
    char *product_description;
    PRODUCT_CLASS_LIST *product_class_list;
} PRODUCT_MAP;
```

-Page 37-

```
typedef struct file_l {
      char *file_name;
      struct file_list *next;
} FILE_LIST;

typedef struct class {
      char *class_name;
      char *key;
      FILE_LIST *file_list;
} CLASS;

typedef struct tar_file {
      char *tar_file_name;
      int  volume;
      int  size;
      int  path_no;
} TAR_FILE;

typedef struct lookup {
      CD_ID         *cd_id;
      hash_table    product_map_ht;
      hash_table    class_ht;
      hash_table    tar_file_ht;
      FILE          *lookup_fp;
      memory_group  lookup_mem;
      tstream       lookup_tstr;
} LOOKUP;

typedef struct tar_key {
      char *tarfile_name;
      char *tarfile_key;
} TAR_KEY;

typedef struct tarfile_list {
      TAR_FILE *tarfile;
      struct tarfile_list *next;
} TARFILE_LIST;

typedef struct loading_path {
      int path_no;
      char *target_path;
      struct loading_path *next;
} LOADING_PATH;

typedef struct cd_volume {
      CD_ID         *cd_id;
      int           volume_no;
      FILE          *cd_volume_fp;
      memory_group  cd_volume_mem;
      tstream       cd_volume_tstr;
} CD_VOLUME;

typedef struct ym_rec {
      char          *file_type;
      char          *trans_name;
      char          *original_name;
} YM_REC;

typedef struct ymtrans_tbl {
      hash_table    ym_ht;
      FILE          *ym_fp;
      memory_group  ym_mem;
      tstream       ym_tstr;
} YMTRANS_TBL;

typedef struct load_volume {
```

```
        char          volume_no[10];
        int           status;
} LOAD_VOLUME;
```

What is claimed is:

1. A system for distributing software products and limiting access thereto, comprising:
   a first storage device including:
      files, file sets, classes, and products; each of said file sets comprising at least one of said files; each of said classes comprising at least one of said file sets; each of said products comprising at least one of said classes; each of said products being assigned a different product encryption key code; and each of said classes belonging to each of said products being encrypted using the product's said assigned product encryption key code;
      a common look-up file comprising (1) a list of said products contained in said first storage device, (2) a list of said classes in each of said products, and (3) a list of said file sets in each of said classes; and
      a decryptor; and
   a second storage device including a separate site configuration file containing a list of at least one class selected from said classes included in said first storage device, and at least one of said product encryption key codes;
   wherein said decryptor is configured to:
      (1) read said site configuration file to retrieve said at least one product encryption key code;
      (2) read said site configuration file to retrieve said list of at least one selected class;
      (3) read said storage device to decrypt said at least one selected class, using said at least one product encryption key code contained in said site configuration file, to produce at least one decrypted class; and
      (4) load said at least one decrypted class onto a computer.

2. A system as claimed in claim 1, wherein said site configuration file includes a list of CPU-IDs, and said decryptor only loads said at least one decrypted class onto a computer having a CPU-ID that is included in said list of CPU-IDs.

3. A system as claimed in claim 1, wherein said files in each of said file sets have a same root path.

4. A system as claimed in claim 1, wherein said second storage device includes a floppy diskette.

5. A system as claimed in claim 1, wherein said products comprise Electronic Computer Aided Design (ECAD) tools and design libraries.

6. A digital data storage system, comprising:
   a first storage medium being used to store a first data, said first data including:
      files, file sets, classes, and products; each of said file sets comprising at least one of said files; each of said classes comprising at least one of said file sets; each of said products comprising at least one of said classes; and each of said classes being encrypted using a different key code; and
      a common look-up file comprising (1) a list of said products included in said first storage medium, (2) a list of said classes belonging to each of said products, and (3) a list of said file sets belonging to each of said classes; and
   a second storage medium being used to store a second data, said second data including a list of at least one class selected from said classes included in first storage medium, and at least one key code used to encrypt said at least one selected class.

7. A system as claimed in claim 6, wherein said first storage medium includes at least one CD-ROM.

8. A system as claimed in claim 7, wherein:
   each of said at least one CD-ROM has a maximum storage capacity; and
   each of said file sets has a size which is below approximately 10% of said maximum storage capacity.

9. A system as claimed in claim 6, wherein said files in each of said file sets have a same root path.

10. A system as claimed in claim 6, wherein said second storage medium includes at least one floppy diskette.

11. A system as claimed in claim 6, wherein said products are Electronic Computer Aided Design (ECAD) tools and design libraries.

12. A system for distributing software products and limiting access thereto, comprising:
   (1) a computer;
   (2) a first storage device which includes at least one CD ROM, said first storage device including:
      (a) a file system including files, file sets, classes, and products; each of said file sets comprising at least one of said files; each of said classes comprising at least one of said file sets; and each of said products comprising at least one of said classes;
      (b) a common look-up file comprising (i) a list of said products contained on said at least one CD-ROM, (ii) a list of said classes in each of said products, and (iii) a list of said file sets in each of said classes; and
      (c) a loader; and
   (3) a second storage device including a site configuration file that contains a list of at least one product selected from said file system;
   wherein said loader is configured to:
      (a) read said site configuration file to retrieve said list of at least one selected product;
      (b) read said common look-up file to retrieve a list of at least one selected class that belongs to said at least one selected product;
      (c) read said common look-up file to retrieve a list of at least one selected file set that belongs to said at least one selected class; and
      (d) access said at least one volume of CD-ROM and load said at least one selected file set onto said computer.

13. A system as claimed in claim 12, wherein said second storage device includes a floppy diskette.

14. A system as claimed in claim 12, wherein said second storage device comprises a list of CPU IDs of computers permitted to access said products stored in said first storage device.

15. A system as claimed in claim 14, wherein said loader determines whether a computer accessing said first storage medium has a CPU ID that is in said list of CPU-IDs.

16. A method of loading only selected software products onto a computer, comprising:
   providing on a first storage medium:
      files, file sets, classes, and products; each of said file sets comprising at least one of said files; each of said classes comprising at least one of said file sets; each product comprising at least one of said classes; and said classes being encrypted using encryption key codes; and
      a common look-up file comprising (i) a list of said products contained on said at least one volume of CD-ROM, (ii) a list of said classes in each of said products, and (iii) a list of said file sets in each of said classes;
   providing on a second storage medium a site configuration file containing a list of at least one product selected from said first storage medium, and at least one encryption key code selected from said encryption key codes;

reading said site configuration file to retrieve said at least one selected encryption key code, and said list of at least one selected product;

reading said common look-up file to retrieve a list of at least one selected class that belongs to said at least one selected product;

decrypting said at least one selected class, using said selected encryption key codes, to produce at least one decrypted class; and loading said at least one decrypted class onto a computer.

17. A method as claimed in claim 16, further comprising a step of providing a list of CPU-IDs, wherein each CPU-ID identifies a computer that has permission to access said products provided on said first storage medium.

18. A method as claimed in claim 17, further comprising a step of determining whether a computer onto which said decrypted classes may be loaded has a CPU-ID that is included in said list of CPU-IDs.

\* \* \* \* \*